US007744849B2

(12) United States Patent
Hagemeyer et al.

(10) Patent No.: US 7,744,849 B2
(45) Date of Patent: Jun. 29, 2010

(54) PLATINUM-ALKALI/ALKALINE-EARTH CATALYST FORMULATIONS FOR HYDROGEN GENERATION

(75) Inventors: Alfred Hagemeyer, Sunnyvale, CA (US); Raymond E. Carhart, Cupertino, CA (US); Karin Yaccato, Santa Clara, CA (US); Andreas Lesik, Heilbronn (DE); Christopher James Brooks, Dublin, OH (US); Cory Bernard Phillips, Detroit, MI (US)

(73) Assignees: Honda Giken Kogyo Kabushiki Kaisha, Tokyo (JP); FreeSlate, Inc., Sunnyvale, CA (US)

( * ) Notice: Subject to any disclaimer, the term of this patent is extended or adjusted under 35 U.S.C. 154(b) by 1084 days.

(21) Appl. No.: 10/739,955

(22) Filed: Dec. 18, 2003

(65) Prior Publication Data

US 2004/0184986 A1 Sep. 23, 2004

Related U.S. Application Data

(60) Provisional application No. 60/434,682, filed on Dec. 20, 2002.

(51) Int. Cl.
*C01B 3/16* (2006.01)

(52) U.S. Cl. ........................ 423/656; 423/644; 423/655

(58) Field of Classification Search ................ 423/655, 423/656
See application file for complete search history.

(56) References Cited

U.S. PATENT DOCUMENTS 3,666,412 A 5/1972 Sowards (Continued)

FOREIGN PATENT DOCUMENTS

EP 0 404 046 A1 12/1990
EP 0 645 173 A2 3/1995
EP 0 864 359 A1 9/1998
EP 1 046 612 A1 10/2000
EP 1 136 441 A2 9/2001
EP 1 138 384 A2 10/2001

(Continued)

OTHER PUBLICATIONS

Inoue, M, Nakajima, K., Kurusu, A., Miyake, T., and Inui, T.; Alcohol Synthesis from Syngas on Group VIII Metal Catalysts Promoted by Mo-$Na_2O$; Applied Catalysis, vol. 49, 1989, pp. 213-217, Elsevier Science B.V., The Netherlands.

(Continued)

*Primary Examiner*—Stanley Silverman
*Assistant Examiner*—Paul Wartalowicz
(74) *Attorney, Agent, or Firm*—Capitol City TechLaw, PLLC; Mark E. Duell

(57) ABSTRACT

A method and catalysts and fuel processing apparatus for producing a hydrogen-rich gas, such as a hydrogen-rich syngas are disclosed. According to the method a CO-containing gas, such as a syngas, contacts a water gas shift catalyst in the presence of water, preferably at a temperature of less than about 450° C. to produce a hydrogen-rich gas, such as a hydrogen-rich syngas. Also disclosed is a water gas shift catalyst comprising:

a) Pt, its oxides or mixtures thereof;
b) at least one of Li, Na, K, Rb, Cs, Mg, Ca, Sr, Ba, their oxides and mixtures thereof; and
c) at least one of Sc, Y, Ti, Zr, V, Nb, Ta, Cr, Mo, W, Mn, Fe, Co, Ir, Ni, Pd, La, Ce, Pr, Nd, Sm, Eu, their oxides and mixtures thereof.

The WGS catalyst may be supported on a carrier, such as any one member or a combination of alumina, zirconia, titania, ceria, magnesia, lanthania, niobia, yttria and iron oxide. Fuel processors containing such water gas shift catalysts are also disclosed.

24 Claims, 25 Drawing Sheets without carrier
without water

U.S. PATENT DOCUMENTS

| | | | | |
|---|---|---|---|---|
| 3,718,418 | A | 2/1973 | Fleming et al. | |
| 4,032,589 | A | 6/1977 | Wall | |
| 4,191,733 | A | 3/1980 | Swift et al. | |
| 4,255,290 | A | 3/1981 | Flagg et al. | |
| 4,367,166 | A | 1/1983 | Fujitani et al. | |
| 4,381,257 | A | 4/1983 | Antos | |
| 4,464,480 | A * | 8/1984 | Windawi et al. | 502/207 |
| 4,693,882 | A | 9/1987 | Setzer et al. | |
| 4,810,485 | A | 3/1989 | Marianowski et al. | |
| 5,030,440 | A * | 7/1991 | Lywood et al. | 423/655 |
| 5,134,109 | A | 7/1992 | Uchiyama et al. | |
| 5,368,835 | A | 11/1994 | Choudhary et al. | |
| 5,478,370 | A | 12/1995 | Spangler | |
| 5,498,404 | A | 3/1996 | Hansen et al. | |
| 5,500,198 | A | 3/1996 | Liu et al. | |
| 5,599,517 | A | 2/1997 | Ul-Haque et al. | |
| 5,830,425 | A | 11/1998 | Schneider et al. | |
| 5,877,377 | A | 3/1999 | Golunski et al. | |
| 5,997,835 | A | 12/1999 | Hyldtoft et al. | |
| 6,083,425 | A | 7/2000 | Clawson et al. | |
| 6,123,913 | A | 9/2000 | Clawson et al. | |
| 6,221,117 | B1 | 4/2001 | Edlund et al. | |
| 6,238,816 | B1 | 5/2001 | Cable et al. | |
| 6,254,807 | B1 | 7/2001 | Schmidt et al. | |
| 6,293,979 | B1 | 9/2001 | Choudhary et al. | |
| 6,299,994 | B1 | 10/2001 | Towler et al. | |
| 6,299,995 | B1 | 10/2001 | Abdo et al. | |
| 6,303,098 | B1 | 10/2001 | Kramarz et al. | |
| 6,312,660 | B1 | 11/2001 | Yagi et al. | |
| 6,340,437 | B1 | 1/2002 | Yagi et al. | |
| 6,409,939 | B1 * | 6/2002 | Abdo et al. | 252/373 |
| 6,555,088 | B1 | 4/2003 | Baumann et al. | |
| 6,562,315 | B2 | 5/2003 | Korotkikh et al. | |
| 6,692,545 | B2 | 2/2004 | Gittleman et al. | |
| 6,713,040 | B2 * | 3/2004 | Ahmed et al. | 423/652 |
| 6,723,298 | B1 | 4/2004 | Baumann et al. | |
| 6,777,117 | B1 * | 8/2004 | Igarashi et al. | 429/19 |
| 6,784,135 | B2 | 8/2004 | Scholten et al. | |
| 7,160,533 | B2 * | 1/2007 | Hagemeyer et al. | 423/655 |
| 7,179,442 | B2 * | 2/2007 | Hagemeyer et al. | 423/655 |
| 2001/0005559 | A1 | 6/2001 | Takemura et al. | |
| 2001/0009653 | A1 | 7/2001 | Clawson et al. | |
| 2001/0055560 | A1 | 12/2001 | Schiodt et al. | |
| 2002/0009408 | A1 | 1/2002 | Weiland et al. | |
| 2002/0061277 | A1 | 5/2002 | Ruettinger et al. | |
| 2002/0192136 | A1 | 12/2002 | Baumann et al. | |
| 2003/0026747 | A1 | 2/2003 | Zhu et al. | |
| 2003/0027874 | A1 * | 2/2003 | Herron et al. | 518/713 |
| 2004/0063577 | A1 | 4/2004 | Wieland et al. | |
| 2004/0177556 | A1 * | 9/2004 | Hagemeyer et al. | 48/198.7 |
| 2005/0005520 | A1 | 1/2005 | Faur-Ghenciu et al. | |
| 2006/0194694 | A1 * | 8/2006 | Hagemeyer et al. | 502/302 |

FOREIGN PATENT DOCUMENTS

| | | | | |
|---|---|---|---|---|
| EP | 1 149 799 | A1 | | 10/2001 |
| EP | 1 161 991 | A1 | | 12/2001 |
| EP | 1 184 445 | A2 | | 3/2002 |
| JP | 54-112793 | | | 9/1979 |
| JP | 58-032001 | A | | 2/1983 |
| WO | WO 92/19574 | | | 11/1992 |
| WO | WO 00/54879 | | * | 9/2000 |
| WO | WO 02/26618 | A2 | | 4/2002 |

OTHER PUBLICATIONS

Chen, Y., Osamu, Y., Tomishige, K., and Fujimoto, K.; Noble metal promoted $Ni_{0.03}Mg_{0.97}O$ solid solution catalysts for the reforming of $CH_4$ with $CO_2$; Catalysis Letters 39, 1996, pp. 91-95, J.C. Baltzer A.G., Science Publishers, Basel, Switzerland.

Park, S.H., Tzou, M.S., and Sachtler, W.M.H.; Temperature Programmed Reduction and Re-Oxidation of Platinum in Y-Zeolites; Applied Catalysis, vol. 24, 1986, pp. 85-98, Elsevier Science B.V., The Netherlands.

Cocco, G., Carturan, G., Enzo, S., and Schiffini, L.; Supported PdPt Alloy Catalysts: Synthesis, Structure Characterization and Effects of Hydrogen Absorption; J. Catalysis, vol. 85, 1984, pp. 405-414, Academic Press, Inc., Burlington, MA.

Gidaspow, D., and Onischak, M.; Regenerative Sorption of Nitric Oxide. A Concept for Environmental Control and Kinetics for Ferrous Sorbents; Can. J. Chem. Eng., V. 51, No. 3, Jun. 1973, pp. 337-344, Abstract only.

Whittington, B.I., Jiang, C.J., and Trimm, D.L.; Vehicle Exhaust Catalysis: I. The Relative Importance of Catalytic Oxidation, Steam Reforming and Water-Gas Shift Reactions; Catalysis Today, vol. 26, 1995, pp. 41-45, Elsevier Science B.V., The Netherlands.

Grau, J. M., Daza, L., Seoane, X.L., and Arcoya, A.; Effect of Ba and Rare Earths Cations on the Properties and Dehydrocyclization Activity of Pt/K-LTL Catalysts; Catalysis Letters 53, 1998 pp. 161-166, J.C. Baltzer A.G., Science Publishers, Basel, Switzerland.

Xue, E., O'Keeffe, M., Ross, J.R.H.; Water-gas shift conversion using a feed with a low steam to carbon monoxide ratio and containing sulphur; Catalysis Today, 1996, vol. 30, pp. 107-118; Elsevier Science B.V., The Netherlands.

Bunluesin, T, Gorte, R.J., Graham, G.W.; Studies of the water-gas-shift reaction on ceria-supported Pt, Pd, and Rh; implications for oxygen-storage properties; Applied Catalysis B: Environmental, 1998, vol. 15, pp. 107-114; Elsevier Science B.V., The Netherlands.

Hilaire, S., Wang, X., Luo, T., Gorte, R.J., Wagner, J.; A comparative study of water-gas-shift reaction over ceria-supported metallic catalysts; Applied Catalysis A: General, 2001, vol. 25, pp. 271-278; Elsevier Science B.V., The Netherlands.

Rase, H.F., editor; Chapter 19—Synthesis Gas and Its Products; Handbook of Commercial Catalysts-Heterogeneous Catalysts, 2000, pp. 403-426;CRC Press, Boca Raton, Florida, US.

Kalakkad, D.S., Datye, A.K., Robota, H.J.; Pt-CeO2 Contact and Its Effect on CO Hydrogenation Selectivity; Journal of Catalysis; 1994, vol. 148, pp. 729-736, Academic Press, Inc.

Mendelovici, L., Steinberg, M.; Methanation and Water-Gas Shift Reactions over Pt/CeO2; Journal of Catalysis, 1985, vol. 96, pp. 285-287; Academic Press, Inc.

NexTech Materials; Print-out of website "http://www.nextechmaterials.com/products.htm"; Mar. 2001; 3 pages.

Swartz, S.L., Holt, C.T., Dawson, W.J.; Nanoscale Water-Gas-Shift Catalysts; Undated; 4 pages.

* cited by examiner without carrier
without water without carrier final wafer 133386 without carrier
without water without carrier final wafer 131728

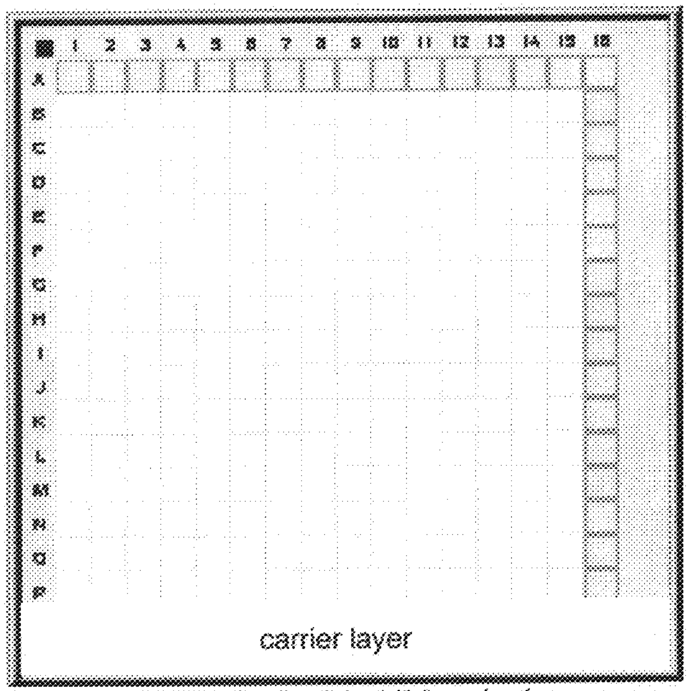

5PT Pt-Co_Ru_Mo-14M carrier 1st

FIG. 3 A

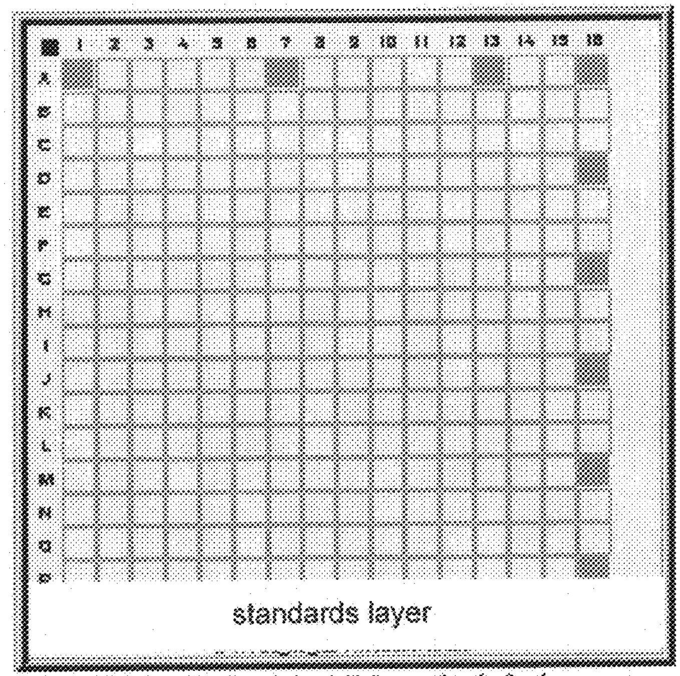

5PT Pt-Co_Ru_Mo-14M standards 2nd

FIG. 3 B

Legend:
- Cerium(IV) ex NH42CeNO36_0.25M
- Cobalt(II) ex CoNO32_0.25M
- Ruthenium ex RuNONO33_0.5%
- Molybdenum ex H2MoO4_0.25M
- Cobalt(II) ex CoOAc2_0.25M
- Cobalt(II) ex Na3CoNO26_0.25M
- Ruthenium ex KRuO4_0.5%Ru
- Ruthenium ex RuNOOAc3_0.5%Ru
- Lanthanum ex LaNO33_0.25M
- Cerium(III) ex CeNO33_0.25M
- Zirconium ex ZrONO32_0.25M
- Zirconium ex ZrOOAc2_0.25M
- Copper ex CuNO32_0.25M
- Rhenium ex NH4ReO4_1%Re
- Germanium ex GeOX2_0.1M
- H20
- Platinum ex PtNH32NO22 (unstabilized)_1%Pt
- Zirconia-carrier ex ZrO2 XZ16052-s
- Pt1.0%/ZrO2 std-s 5PT Pt - Co_Ru_Mo - 14M 14M 4th 5PT Pt - Co_Ru_Mo 14MCo_Ru_Mo 3rd SPT Pt-Co_Ru_Mo-14M $ZrO_2$ XZ16052

SPT Pt-Co_Ru_Mo-14M Pt 5th final wafer (with carrier)

final wafer (without carrier)

final wafer (without carrier and water)

without carrier
without water without carrier final wafer 133208

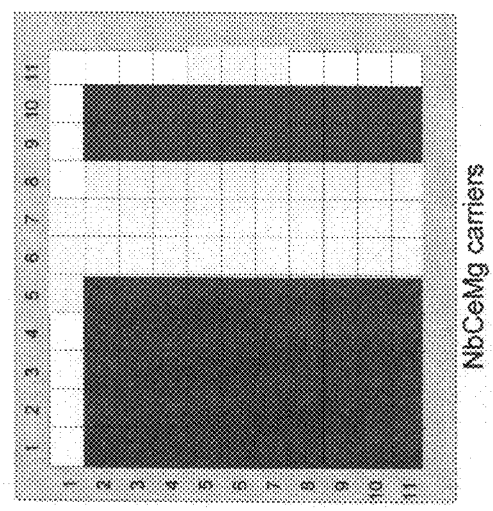
Fig. 5A
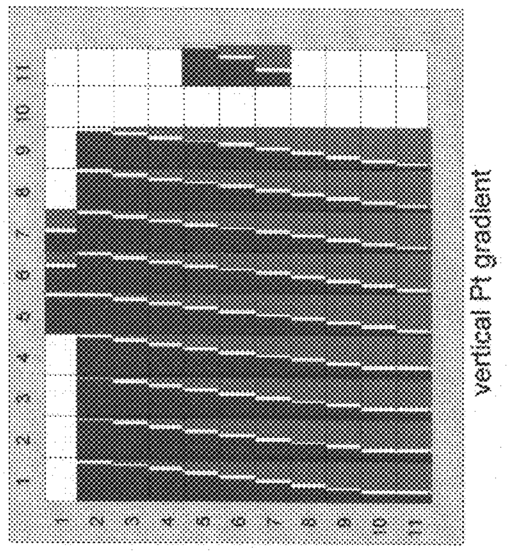
Fig. 5B
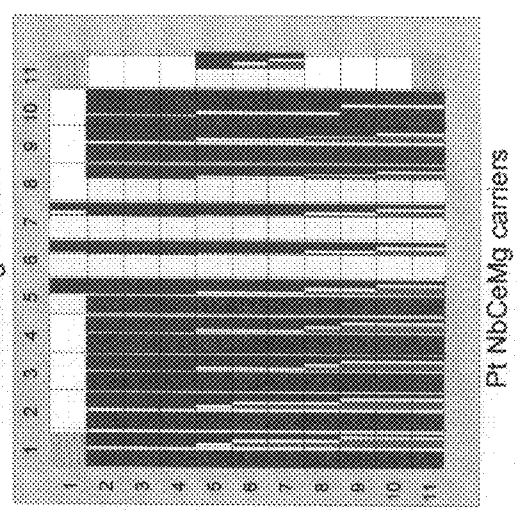
Fig. 5C
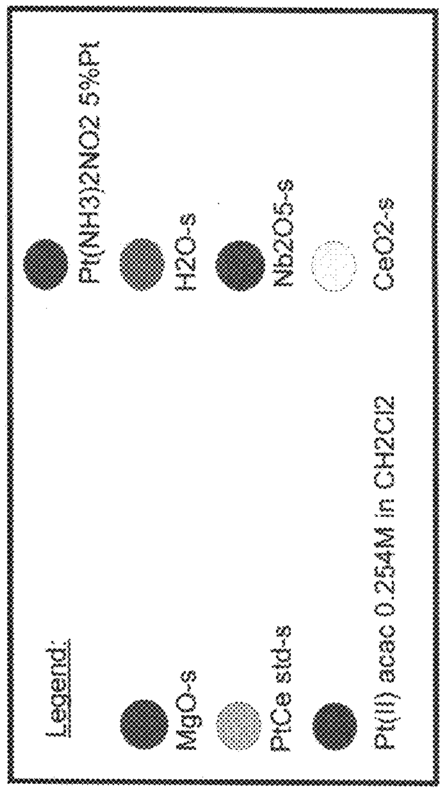

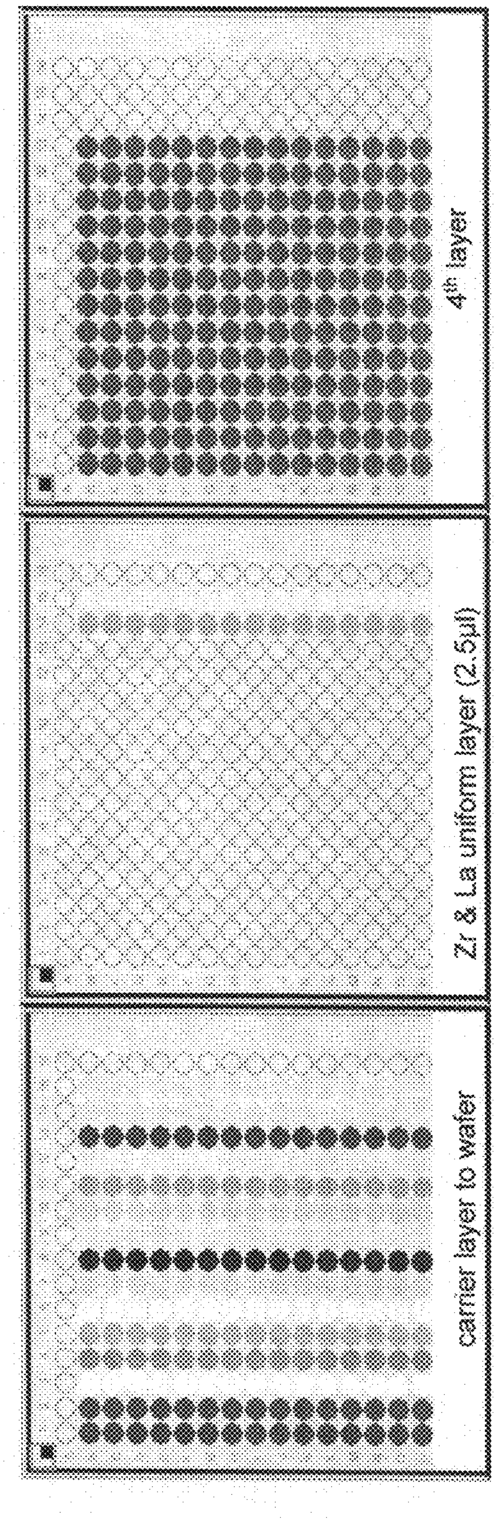
15PB Pt-Zr_La-14 carriers
carriers 1st
Fig. 6 A
15PB Pt-Zr_La-14 carriers
Zr_La 3rd
Fig. 6 B
15PB Pt-Zr_La-14
carriers Pt 4th
Fig. 6 C
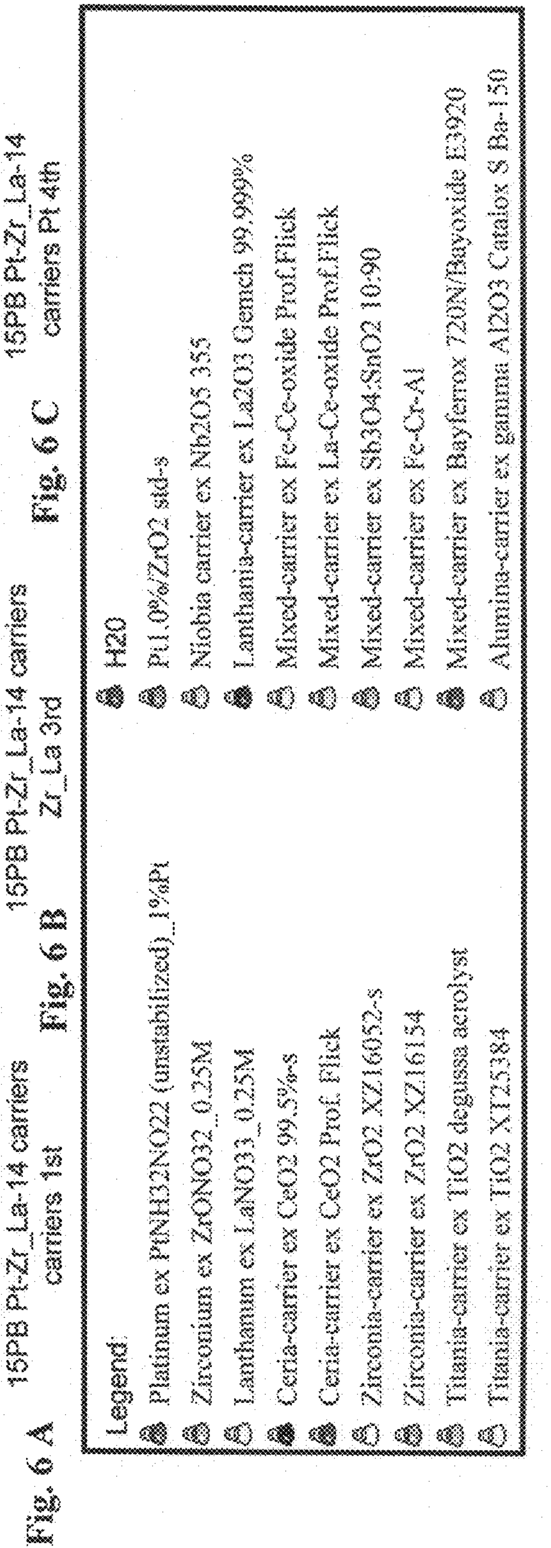
Fig. 6

15PB Pt-Zr_La-14 carriers Pt 5th

15PB Pt-Zr_La-14 carriers standards 2nd

15PB Pt-Zr_La-14 carriers

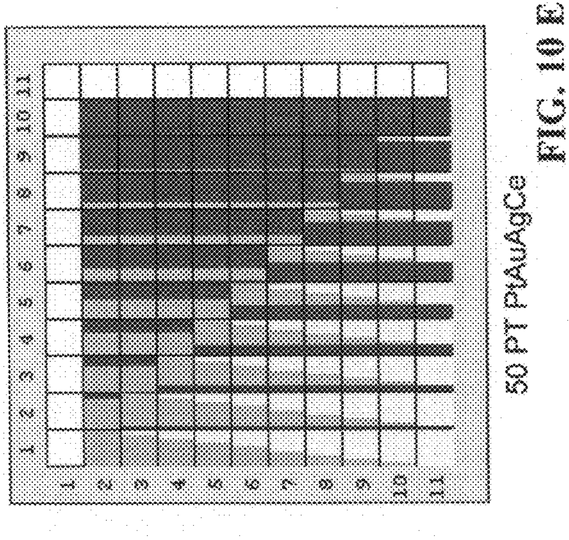
FIG. 10 E
50 PT PtAuAgCe
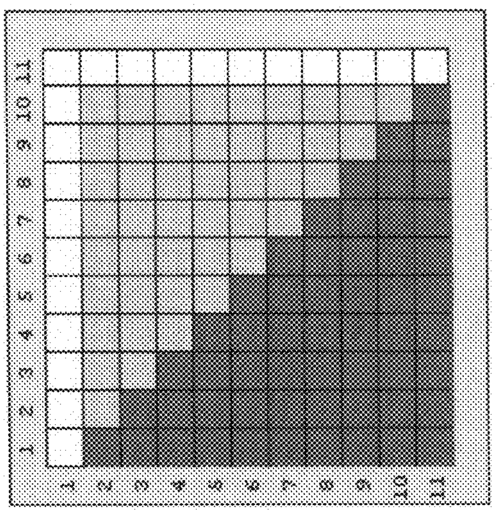
FIG. 10 D
ZrO2 CeO2 carriers
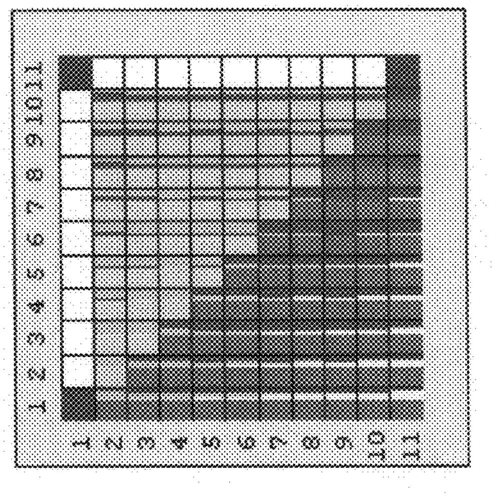
FIG. 10 F
PtAuAgCeZr
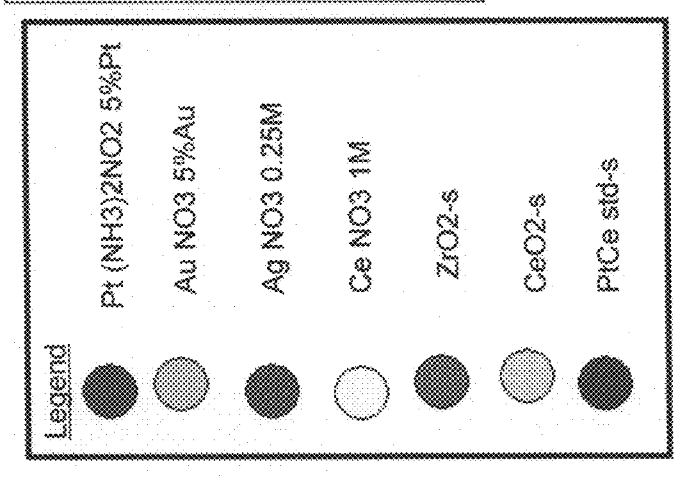

PLATINUM-ALKALI/ALKALINE-EARTH CATALYST FORMULATIONS FOR HYDROGEN GENERATION

CROSS-REFERENCE TO RELATED APPLICATIONS

The present application claims benefit from earlier filed U.S. Provisional Application No. 60/434,682, filed Dec. 20, 2002, which is incorporated herein in its entirety by reference for all purposes. The present application also incorporates by reference PCT International Patent Application No. PCT/US03/40214 entitled "Platinum-Alkali/Alkaline-Earth Catalyst Formulations For Hydrogen Generation" naming as inventors Hagemeyer et al. filed on the same date as the present application.

BACKGROUND OF THE INVENTION

1. Field of the Invention

This invention relates to methods and catalysts to generate a hydrogen-rich gas from gas mixtures containing carbon monoxide and water, such as water-containing syngas mixtures. More particularly, the invention includes methods using platinum-based catalysts which contain alkali or alkaline-earth metals. The catalysts may be supported on a variety of catalyst support materials. Catalysts of the invention exhibit both high activity and selectivity to hydrogen generation and carbon monoxide oxidation.

2. Discussion of the Related Art

Numerous chemical and energy-producing processes require a hydrogen-rich composition (e.g. feed stream.) A hydrogen-rich feed stream is typically combined with other reactants to carry out various processes. Nitrogen fixation processes, for example, produce ammonia by reacting feed streams containing hydrogen and nitrogen under high pressures and temperatures in the presence of a catalyst. In other processes, the hydrogen-rich feed stream should not contain components detrimental to the process. Fuel cells such as polymer electrode membrane (PEM) fuel cells, produce energy from a hydrogen-rich feed stream. PEM fuel cells typically operate with a feed stream gas inlet temperature of less than 450° C. Carbon monoxide is excluded from the feed stream to the extent possible to prevent poisoning of the electrode catalyst, which is typically a platinum-containing catalyst. See U.S. Pat. No. 6,299,995.

One route for producing a hydrogen-rich gas is hydrocarbon steam reforming. In a hydrocarbon steam reforming process steam is reacted with a hydrocarbon fuel, such as methane, iso-octane, toluene, etc., to produce hydrogen gas and carbon dioxide. The reaction, shown below with methane ($CH_4$), is strongly endothermic; it requires a significant amount of heat.

$$CH_4+2H_2O \rightarrow 4H_2+CO_2$$

In the petrochemical industry, hydrocarbon steam reforming of natural gas is typically performed at temperatures in excess of 900° C. Even for catalyst assisted hydrocarbon steam reforming the temperature requirement is often still above 700° C. See, for example, U.S. Pat. No. 6,303,098. Steam reforming of hydrocarbons, such as methane, using nickel- and gold-containing catalysts and temperatures greater than 450° C. is described in U.S. Pat. No. 5,997,835. The catalyzed process forms a hydrogen-rich gas, with depressed carbon formation.

One example of effective hydrocarbon steam reforming catalysts is the Sinfelt compositions which are composed of Pt, a Group 11 metal, and a Group 8-10 metal. Group 11 metals include Cu, Ag and Au while Group 8-10 metals include the other noble metals. These catalyst formulations are well known in the promotion of hydrogenation, hydrogenolysis, hydrocracking, dealkylation of aromatics, and naphtha reforming processes. See, for example, U.S. Pat. Nos. 3,567,625 and 3,953,368. The application of catalysts based on the Sinfelt model to the water gas shift ("WGS") reaction, in particular at conditions suitable for lower temperature WGS applications such as PEM fuel cells, has not been previously reported.

Purified hydrogen-containing feed streams have also been produced by filtering the gas mixture produced by hydrocarbon steam reformation through hydrogen-permeable and hydrogen-selective membranes. See, for example, U.S. Pat. No. 6,221,117. Such approaches suffer from drawbacks due to the complexity of the system and slow flow rates through the membranes.

Another method of producing a hydrogen-rich gas such as a feed stream starts with a gas mixture containing hydrogen and carbon monoxide and with the absence of any substantial amount of water. For instance, this may be the product of reforming a hydrocarbon or an alcohol, and selectively removes the carbon monoxide from that gas mixture. The carbon monoxide can be removed by absorption of the carbon monoxide and/or by its oxidation to carbon dioxide. Such a process utilizing a ruthenium based catalyst to remove and oxidize the carbon monoxide is disclosed in U.S. Pat. No. 6,190,430.

The WGS reaction is another mechanism for producing a hydrogen-rich gas but from water (steam) and carbon monoxide. An equilibrium process, the water gas shift reaction, shown below, converts water and carbon monoxide to hydrogen and carbon dioxide, and vice versa.

$$H_2O+CO \rightleftharpoons H_2+CO_2$$

Various catalysts have been developed to catalyze the WGS reaction. These catalysts are typically intended for use at temperatures greater than 450° C. and/or pressures above 1 bar. For instance, U.S. Pat. No. 5,030,440 relates to a palladium and platinum-containing catalyst formulation for catalyzing the shift reaction at 550° C. to 650° C. See also U.S. Pat. No. 5,830,425 for an iron/copper based catalyst formulation.

Catalytic conversion of water and carbon monoxide under water gas shift reaction conditions has been used to produce hydrogen-rich and carbon monoxide-poor gas mixtures. Existing WGS catalysts, however, do not exhibit sufficient activity at a given temperature to reach or even closely approach thermodynamic equilibrium concentrations of hydrogen and carbon monoxide such that the product gas may subsequently be used as a hydrogen feed stream. Specifically, existing catalyst formulations are not sufficiently active at low temperatures, that is, below about 450° C. See U.S. Pat. No. 5,030,440.

Platinum (Pt) is a well-known catalyst for both hydrocarbon steam reforming and water gas shift reactions. Under typical hydrocarbon steam reforming conditions, high temperature (above 850° C.) and high pressure (greater than 10 bar), the WGS reaction may occur post-reforming over the hydrocarbon steam reforming catalyst due to the high temperature and generally unselective catalyst compositions. See, for instance, U.S. Pat. Nos. 6,254,807; 5,368,835; 5,134,109 and 5,030,440 for a variety of catalyst compositions and reaction conditions under which the water gas shift reaction may occur post-reforming.

Metals such as cobalt (Co), ruthenium (Ru), palladium (Pd), rhodium (Rh) and nickel (Ni) have also been used as WGS catalysts but are normally too active for the selective WGS reaction and cause methanation of CO to $CH_4$ under typical reaction conditions. In other words, the hydrogen produced by the water gas shift reaction is consumed as it reacts with the CO present in the presence of such catalysts to yield methane. This methanation reaction activity has limited the utility of metals such as Co, Ru, Pd, Rh and Ni as water gas shift catalysts.

A need exists, therefore, for a method to produce a hydrogen-rich syngas, and catalysts which are highly active and highly selective for both hydrogen generation and carbon monoxide oxidation at moderate temperatures (e.g. below about 450° C.) to provide a hydrogen-rich syngas from a gas mixture containing hydrogen and carbon monoxide.

SUMMARY OF THE INVENTION

The invention meets the need for highly active and selective catalysts for the generation of hydrogen and the oxidation of carbon monoxide and to thereby provide a hydrogen-rich gas, such as a hydrogen-rich syngas, from a gas mixture of at least carbon monoxide and water. Accordingly, the invention provides methods and catalysts for producing a hydrogen-rich gas.

The invention is, in a first general embodiment, a method for producing a hydrogen-rich gas (e.g., syngas) by contacting a CO-containing gas, such as a syngas mixture, with a water gas shift catalyst in the presence of water at a temperature of not more than 450° C. In the first general embodiment, the water gas shift catalyst comprises a) Pt, its oxides or mixtures thereof; b) at least one of Li, Na, K, Rb, Cs, Mg, Ca, Sr, Ba, their oxides and mixtures thereof; and c) at least one of Sc, Y, Ti, Zr, V, Nb, Ta, Cr, Mo, W, Mn, Fe, Co, Ir, Ni, Pd, Rh, La, Ce, Pr, Nd, Sm, Eu, their oxides and mixtures thereof. In another method of the first general embodiment, the water gas shift catalyst comprises Pt, its oxides or mixtures thereof; at least one of V, Zr, their oxides and mixtures thereof; and at least one of Ti, Mo, Co, their oxides and mixtures thereof. The catalyst may be supported on a carrier, for example, at least one member selected from the group consisting of alumina, zirconia, titania, ceria, magnesia, lanthania, niobia, zeolite, perovskite, silica clay, yttria, iron oxide and mixtures thereof. The method of the invention may be conducted at a temperature ranging from about 150° C. to about 450° C.

In a second general embodiment, the invention relates to the water gas shift catalysts themselves—both supported and unsupported catalysts. The inventive water gas shift catalyst comprises a) Pt, its oxides or mixtures thereof; b) at least one of Li, Na, K, Rb, Cs, Mg, Ca, Sr, Ba, their oxides and mixtures thereof; and c) at least one of Sc, Y, Ti, Zr, V, Nb, Ta, Cr, Mo, W, Mn, Fe, Co, Ir, Ni, Pd, Rh, La, Ce, Pr, Nd, Sm, Eu, their oxides and mixtures thereof. In another catalyst of the second general embodiment, the water gas shift catalyst comprises Pt, its oxides or mixtures thereof; at least one of V, Zr, their oxides and mixtures thereof; and at least one of Ti, Mo, Co, their oxides and mixtures thereof. The catalysts may be supported on a carrier comprising at least one member selected from the group consisting of alumina, zirconia, titania, ceria, magnesia, lanthania, niobia, yttria, iron oxide and mixtures thereof.

In a third general embodiment, the invention is directed to the aforementioned water gas shift catalysts of the second general embodiment in an apparatus for generating a hydrogen gas containing stream from a hydrocarbon or substituted hydrocarbon feed stream. The apparatus further comprises, in addition to the WGS catalyst, a fuel reformer, a water gas shift reactor, and a temperature controller.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of the invention and are incorporated in and constitute a part of this specification, illustrate preferred embodiments of the invention and together with the detailed description serve to explain the principles of the invention. In the drawings:

FIGS. 5A-5C illustrate the process of producing a library test wafer;

DETAILED DESCRIPTION OF THE INVENTION

Figure 1:
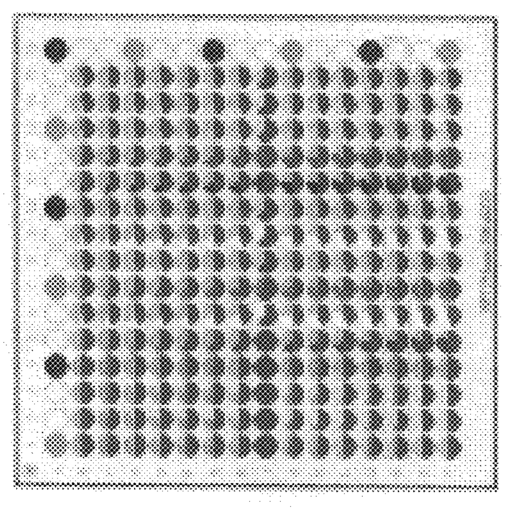
FIGS. 1A-1C illustrate the process of producing a library test wafer.
Figure 1:
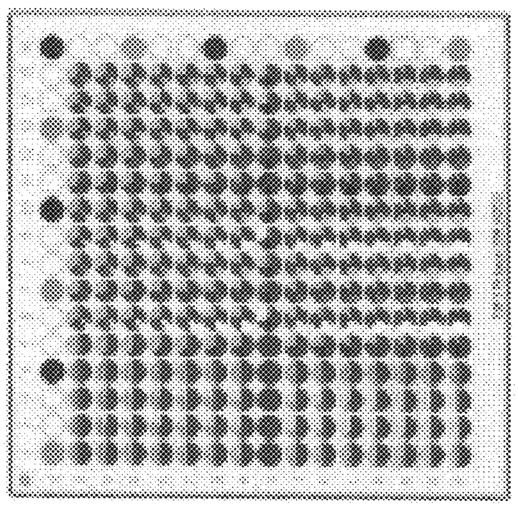
Figure 1:
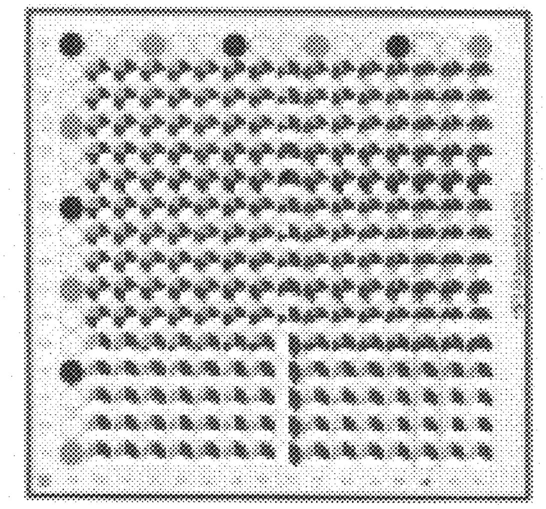

The invention relates to a method for producing a hydrogen-rich gas, such as a hydrogen-rich syngas. According to the method, a CO-containing gas, such as a syngas, contacts a water gas shift catalyst, in the presence of water, preferably a stoichiometric excess of water, preferably at a reaction temperature of less than about 450° C. to produce a hydrogen-rich gas, such as a hydrogen-rich syngas. The reaction pressure is preferably not more than about 10 bar. The invention also relates to a water gas shift catalyst itself and to apparatus such as water gas shift reactors and fuel processing apparatus comprising such WGS catalysts.

A water gas shift catalyst according to the invention comprises a platinum-based catalyst containing at least one alkali or alkaline-earth metal and at least a third metal. The presence of the alkali or alkaline-earth metal enhances the activity of the water gas shift catalyst at low temperature reaction conditions. Water gas shift catalysts of the invention comprise:

a) Pt, its oxides or mixtures thereof;

b) at least one of Li, Na, K, Rb, Cs, Mg, Ca, Sr, Ba, their oxides and mixtures thereof; and c) at least one of Sc, Y, Ti, Zr, V, Nb, Ta, Cr, Mo, W, Mn, Fe, Co, Ir, Ni, Pd, Rh, La, Ce, Pr, Nd, Sm, Eu, their oxides and mixtures thereof.

The WGS catalysts of the invention comprise combinations of at least three metals or metalloids, selected from at least three groups a), b) and c) indicated above, in each and every possible permutation and combination, except as specifically and expressly excluded. Although particular subgroupings of preferred combinations of metals or metalloids are also presented, the present invention is not limited to the particularly recited subgroupings.

In one particularly preferred subgrouping which incorporates additional metals not listed in the above groups a), b) and c), a water gas shift catalyst according to the invention comprises Pt, its oxides or mixtures thereof; at least one of V, Zr, their oxides and mixtures thereof; and at least one of Ti, Mo, Co, their oxides and mixtures thereof. This subgrouping comprises combinations of at least three metals or metalloids, selected from the three groups described immediately above, in each and every possible permutation and combination, except as specifically and expressly excluded.

Discussion regarding the particular function of various components of catalysts and catalyst systems is provided herein solely to explain the advantage of the invention, and is not limiting as to the scope of the invention or the intended use, function, or mechanism of the various components and/or compositions disclosed and claimed. As such, any discussion of component and/or compositional function is made, without being bound by theory and by current understanding, unless and except such requirements are expressly recited in the claims. Generally, for example, and without being bound by theory, Pt, component a), has activity as a WGS catalyst. The alkali and alkaline-earth metals enhance the low temperature activity of the catalyst and provide basic sites for the adsorption of water by the catalyst. The metals of component c) may or may not themselves have activity as WGS catalysts but function in combination with Pt and the alkali and/or alkaline-earth metals to impart beneficial properties to the catalyst of the invention.

Catalysts of the invention can catalyze the WGS reaction at varying temperatures, avoid or attenuate unwanted side reactions such as methanation reactions, as well as generate a hydrogen-rich gas, such as a hydrogen-rich syngas. The composition of the WGS catalysts of the invention and their use in WGS reactions are discussed below.

1. Definitions

Water gas shift ("WGS") reaction: Reaction which produces hydrogen and carbon dioxide from water and carbon monoxide, and vice versa:

$$H_2O+CO \rightleftharpoons H_2+CO_2$$

Generally, and unless explicitly stated to the contrary, each of the WGS catalysts of the invention can be advantageously applied both in connection with the forward reaction as shown above (i.e., for the production of $H_2$), or alternatively, in connection with the reverse reaction as shown above (i.e., for the production of CO). As such, the various catalysts disclosed herein can be used to specifically control the ratio of $H_2$ to CO in a gas stream.

Methanation reaction: Reaction which produces methane and water from a carbon source, such as carbon monoxide or carbon dioxide, and hydrogen:

$$CO+3H_2 \rightarrow CH_4+H_2O$$

$$CO_2+4H_2 \rightarrow CH_4+2H_2O$$

"Syngas" (also called synthesis gas): Gaseous mixture comprising hydrogen ($H_2$) and carbon monoxide (CO) which may also contain other gas components such as carbon dioxide ($CO_2$), water ($H_2O$), methane ($CH_4$) and nitrogen ($N_2$).

LTS: Refers to "low temperature shift" reaction conditions where the reaction temperature is less than about 250° C., preferably ranging from about 150° C. to about 250° C.

MTS: Refers to "medium temperature shift" reaction conditions where the reaction temperature ranges from about 250° C. to about 350° C.

HTS: Refers to "high temperature shift" reaction conditions where the reaction temperature is more than about 350° C. and up to about 450° C.

Hydrocarbon: Compound containing hydrogen, carbon, and optionally, oxygen.

The Periodic Table of the Elements is based on the present TUPAC convention, thus, for example, Group 1 contains the alkali metals Li, Na, K, Rb, and Cs. (See http://www.iupac.org dated May 30, 2002.) As discussed herein, the catalyst composition nomenclature uses a dash (i.e., "-") to separate catalyst component groups where a catalyst may contain one or more of the catalyst components listed for each component group, brackets (i.e., "{ }") are used to enclose the members of a catalyst component group, "{two of . . . }" is used if two or more members of a catalyst component group are required to be present in a catalyst composition, "blank" is used within the "{ }" to indicate the possible choice that no additional element is added, and a slash (i.e., "/") is used to separate supported catalyst components from their support material, if any. Additionally, the elements within catalyst composition formulations include all possible oxidation states, including oxides, or salts, or mixtures thereof.

Using this shorthand nomenclature, for example, "Pt-{Rh, Ni}-{Na, K, Fe, Os}/$ZrO_2$" would represent catalyst compositions containing Pt, one or more of Rh and Ni, and one or more of Na, K, Fe, and Os supported on $ZrO_2$; all of the catalyst elements may be in any possible oxidation state, unless explicitly indicated otherwise. "Pt-Rh-Ni-{two of Na, K, Fe, Os}" would represent a supported or unsupported catalyst composition containing Pt, Rh, and Ni, and two or more of Na, K, Fe, and Os. "Rh-{Cu, Ag, Au}-{Na, K, blank}/$TiO_2$" would represent catalyst compositions containing Rh, one or more of Cu, Ag, and Au, and optionally, one of Na or K supported on $TiO_2$.

2. WGS Catalyst

A water gas shift catalyst of the invention comprises:

a) Pt, its oxides or mixtures thereof;

b) at least one of Li, Na, K, Rb, Cs, Mg, Ca, Sr, Ba, their oxides and mixtures thereof; and c) at least one of Sc, Y, Ti, Zr, V, Nb, Ta, Cr, Mo, W, Mn, Fe, Co, Ir, Ni, Pd, Rh, La, Ce, Pr, Nd, Sm, Eu, their oxides and mixtures thereof.

Another water gas shift catalyst according to the invention comprises Pt, its oxides or mixtures thereof; at least one of V, Zr, their oxides and mixtures thereof; and at least one of Ti, Mo, Co, their oxides and mixtures thereof.

Suitable carriers for supported catalysts are discussed below.

The catalyst components are typically present in a mixture of the reduced or oxide forms; typically, one of the forms will predominate in the mixture. A WGS catalyst of the invention may be prepared by mixing the metals and/or metalloids in their elemental forms or as oxides or salts to form a catalyst precursor. This catalyst precursor mixture generally undergoes a calcination and/or reductive treatment, which may be in-situ (within the reactor), prior to use as a WGS catalyst. Without being bound by theory, the catalytically active species are generally understood to be species which are in the reduced elemental state or in other possible higher oxidation states. The catalyst precursor species are believed to be substantially completely converted to the catalytically active species by the pre-use treatment. Nonetheless, the catalyst component species present after calcination and/or reduction may be a mixture of catalytically active species such as the reduced metal or other possible higher oxidation states and uncalcined or unreduced species depending on the efficiency of the calcination and/or reduction conditions.

A. Catalyst Compositions

As discussed above, one embodiment of the invention is a catalyst for catalyzing the water gas shift reaction (or its reverse reaction). According to the invention, a WGS catalyst may have the following composition:

a) Pt, its oxides or mixtures thereof;

b) at least one of Li, Na, K, Rb, Cs, Mg, Ca, Sr, Ba, their oxides and mixtures thereof; and c) at least one of Sc, Y, Ti, Zr, V, Nb, Ta, Cr, Mo, W, Mn, Fe, Co, Ir, Ni, Pd, Rh, La, Ce, Pr, Nd, Sm, Eu, their oxides and mixtures thereof.

Water gas shift catalysts where component b) is at least one of Li, Na, K, their oxides, and mixtures thereof represent a preferred group of catalysts. Another preferred group of catalysts are those where component c) is Fe, its oxides or a mixture thereof. Particularly preferred catalysts are those where component b) is at least one of Li, Na, K, their oxides, and mixtures thereof; and component c) is Fe, its oxides or a mixture thereof. Specific water gas shift catalysts of the invention, using the shorthand notation discussed above, include but are not limited to:

Pt—Li—{Fe, Co, Ce};

Pt—Na—{Zr, La, Y, Ce, Mo, Fe, Co, Mn};

Pt—Na—Zr—Co;

Pt—K—{Ce, Fe, Co}/$ZrO_2$; and

Pt—K—Ce/$ZrO_2$.

A discussion of each of the catalyst components a), b) and c) follows.

Another water gas shift catalyst according to the invention comprises Pt, its oxides or mixtures thereof; at least one of V, Zr, their oxides and mixtures thereof; and at least one of Ti, Mo, Co, their oxides and mixtures thereof.

The amount of a given metal present in a WGS catalyst of to the invention varies depending on the water gas shift reaction conditions under which the catalyst is to operate. The amount of each metal present depends on the total weight of the catalyst component in its final state in the catalyst composition after the final catalyst preparation step (i.e., the resulting oxidation state or states) with respect to the total weight of all catalyst components plus the support material, if any. Generally, a Group 8, 9, or 10 metal may be present in an amount ranging from about 0.01 wt. % to about 10 wt. %, preferably about 0.01 wt. % to about 2 wt. %, and more preferably about 0.05 wt. % to about 0.5 wt. %. The lanthanide elements and transition metals may be present, typically, in amounts ranging from about 0.01 wt. % to about 40 wt. %, preferably about 0.1 wt. % to about 30 wt. %. The main group elements, including the alkali and alkaline-earth metals, and the metalloid elements may be present in amounts ranging, generally, from about 0.02 wt. % to about 30 wt. %, preferably about 0.04 wt. % to about 20 wt. %. The presence of a given catalyst component in the support material and the extent and type of its interaction with other catalyst components may effect the amount of a component needed to achieve the desired performance effect.

B. Catalyst Component a): Pt

A first component in a catalyst of the invention is Pt, component a). Platinum may be present in its reduced form, as an oxide, or a combination of those forms. As discussed in the Background of the Invention, Pt itself is well known to catalyze the WGS reaction.

C. Catalyst Component b): Alkali/Alkaline-earth Metals

The catalysts of the invention, containing at least one alkali (Group 1) metals and/or alkaline-earth (Group 2) metals, are not only active WGS catalysts over a broad range of temperatures, but are particularly active under LTS water gas shift conditions. The presence of the alkali and/or alkaline-earth metal basic sites within the catalyst which are believed to adsorb and activate water in the WGS reaction, resulting in better WGS performance. Particularly preferred alkali and alkaline-earth metals include Li, Na and K, with Na and K being most preferred for use in WGS catalysts of the invention. In general, Na-containing catalysts show greater activity than K-containing catalysts at LTS water gas shift conditions. Under HTS water gas shift conditions the presence of an alkali and/or alkaline-earth metal may act to moderate or slightly deactivate the catalyst. It is preferred and in fact advantageous, then, to use the catalysts of the invention under LTS and MTS water gas shift reaction conditions.

D. Catalyst Component c): "Functional" Metals or Metalloids

The WGS catalysts of the invention contain at least three metals or metalloids. In addition to components a) and b), discussed above, a WGS catalyst contains metals or metalloids which, when used in combination with Pt and an alkali and/or alkaline-earth metal, function to impart beneficial properties to the catalyst of the invention. A catalyst of the invention, then, further comprises at least one of Sc, Y, Ti, Zr, V, Nb, Ta, Cr, Mo, W, Mn, Fe, Co, Ir, Ni, Pd, Rh, La, Ce, Pr, Nd, Sm, Eu, their oxides and mixtures thereof, component c).

In a preferred embodiment of the invention, component c) of the WGS catalyst is Fe. WGS catalysts according to the invention which contain Fe have high activity under MTS conditions. Fe has an affinity for CO which enhances CO absorption by the catalyst and the catalyst's activity.

E. Functional Classification of Catalyst Components

Without limiting the scope of the invention, a discussion of the functions of the various catalyst components is offered, along with a template for composing catalyst compositions according to the invention. The following classification of catalyst components will direct one of skill in the art in the selection of various catalyst components to formulate WGS catalyst compositions according to the present invention and depending on the reaction conditions of interest.

Furthermore, according to the invention, there are several classes of catalyst components and metals which may be incorporated into a water gas shift catalyst. Hence, the various elements recited as components in any of the described embodiments (e.g., as component (c)), may be included in any various combination and permutation to achieve a catalyst composition that is coarsely or finely tuned for a specific application (e.g. including for a specific set of conditions, such as, temperature, pressure, space velocity, catalyst precursor, catalyst loading, catalyst surface area/presentation, reactant flow rates, reactant ratios, etc.). In some cases, the effect of a given component may vary with the operating temperature for the catalyst. These catalyst components may function as, for instance, activators or moderators depending upon their effect on the performance characteristics of the catalyst. For example, if greater activity is desired, an activator may be incorporated into a catalyst, or a moderator may be replaced by at least one activator or, alternatively, by at least one moderator one step further up the "activity ladder." An "activity ladder" ranks secondary or added catalyst components, such as activators or moderators, in order of the magnitude of their respective effect on the performance of a principal catalyst constituent. Conversely, if WGS selectivity of a catalyst needs to be increased (e.g., decrease the occurrence of the competing methanation reaction), then either an activator may be removed from the catalyst or, alternatively, the current moderator may be replaced by at least one moderator one step down the "activity ladder." The function of these catalyst components may be further described as "hard" or "soft" depending on the relative effect obtained by incorporating a given component into a catalyst. The catalyst components may be metals, metalloids, or non-metals.

For instance, typically, a WGS catalyst according to the invention suitable for use under LTS conditions employs activators and may only be minimally moderated, if at all, because activation is generally the important parameter to be considered under LTS conditions. Such LTS catalysts also may preferably employ high surface area carriers to enhance catalyst activity. Conversely, WGS catalysts used in HTS conditions may benefit from the catalyst being moderated because selectivity and methanation are parameters to be considered. Such HTS catalysts may use, for example, low surface area carriers. Accordingly, operating temperature may be considered in selecting a WGS catalyst according to the present invention for a particular operating environment.

Activators used in catalysts according to the invention, such as for example Co, are active and selective WGS-promoting metals. Pd is an example of a metal that is moderately active but not very selective and also promotes methanation. Ir has also been observed to have a slight moderating or activating function, depending on the presence of other counter metals. Other activators may include, but are not limited to, Ti, Zr, V, Mo, La, Ce, Pr and Eu. Ce may be the most active rare earth metal for activating the WGS reaction. La, Pr, Sm and Eu may also be active, particularly at lower temperatures. For HTS, Pr and Sm are preferred soft moderators enhancing selectivity without sacrificing much activity. For LTS, La and Eu may be useful activators. In general, all lanthanides, other than Ce, show comparable performance and tend to moderate rather than activate noble metal containing catalyst systems. Y is a highly selective moderator for HTS systems whereas La and Eu are active and comparable to Ce for LTS. La is only slightly moderating when doping Ce, and may therefore be used to adjust the selectivity of Ce containing catalysts.

Catalyst components that are slightly moderating and highly selective over a relatively broad temperature range (e.g., a temperature range of at least about 50° C., preferably at least about 75° C., and most preferably a temperature range of at least about 100° C.), where such temperature range is included within the overall preferred temperature ranges of up to about 450° C., include Y, Mo, Fe, Pr and Sm; these tend to be selective but not very active at low temperatures, about 250° C. The redox dopants Mo, Fe, Pr and Sm generally lose activity with increasing pre-reduction temperatures while Fe becomes moderately active on its own at high WGS reaction temperatures.

F. Supports

The support or carrier may be any support or carrier used with the catalyst which allows the water gas shift reaction to proceed. The support or carrier may be a porous, adsorptive, high surface area support with a surface area of about 25 to about 500 $m^2/g$. The porous carrier material may be relatively inert to the conditions utilized in the WGS process, and may include carrier materials that have traditionally be utilized in hydrocarbon steam reforming processes, such as, (1) activated carbon, coke, or charcoal; (2) silica or silica gel, silicon carbide, clays, and silicates including those synthetically prepared and naturally occurring, for example, china clay, diatomaceous earth, fuller's earth, kaolin, etc.; (3) ceramics, porcelain, bauxite; (4) refractory inorganic oxides such as alumina, titanium dioxide, zirconium oxide, magnesia, etc.; (5) crystalline and amorphous aluminosilicates such as naturally occurring or synthetically prepared mordenite and/or faujasite; and, (6) combinations of these groups.

When a WGS catalyst of the invention is a supported catalyst, the support utilized may contain one or more of the metals (or metalloids) of the catalyst. The support may contain sufficient or excess amounts of the metal for the catalyst such that the catalyst may be formed by combining the other components with the support. Examples of such supports include ceria which can contribute cerium, Ce, (component c)) to a catalyst, or iron oxide which can contribute iron, Fe, (component c)). When such supports are used the amount of the catalyst component in the support typically may be far in excess of the amount of the catalyst component needed for the catalyst. Thus the support may act as both an active catalyst component and a support material for the catalyst. Alternatively, the support may have only minor amounts of a metal making up the WGS catalyst such that the catalyst may be formed by combining all desired components on the support.

Carrier screening with catalysts containing Pt as the only active noble metal revealed that a water gas shift catalyst may also be supported on a carrier comprising alumina, zirconia, titania, ceria, magnesia, lanthania, niobia, yttria and iron oxide. Perovskite, supported on the above listed carriers or unsupported, may also be utilized as a support for the inventive catalyst formulations.

Zirconia, titania and ceria may be supports for the present invention and provide high activity for the WGS reaction. Preferably, zirconia is in the monoclinic phase. Highly pure ceria was found to activate Pt in LTS conditions more than cerias doped with additives. Niobia, yttria and iron oxide carriers provide high selectivity but are also less active which is believed to be due to a lack of surface area. In addition to their use as carriers, iron, yttrium, and magnesium oxides may be utilized as primary layers on carriers such as zirconia to provide both higher surface area and low moderator concentration. Pt on magnesia carriers formulated to have high surface areas (approximately 100 $m^2/g$) exhibit high selectivity but also exhibit activity which decreases rapidly with falling reaction temperature.

In general, alumina has been found to be an active but unselective carrier for Pt only containing WGS catalysts. However, the selectivity of gamma alumina may be improved by doping with Zr, Co, or one of the rare earth elements, such as, for example, La and Ce alone or in combination. This doping may be accomplished by addition of the oxides or other salts such as nitrates, in either liquid or solid form, to the alumina. Other possible dopants to increase the selectivity include redox dopants, such as for instance, Mo, Fe and basic dopants. Preferred is an embodiment of gamma alumina combined with Zr and/or Co which exhibits both high activity and selectivity over a broad temperature range.

High surface area aluminas, such as gamma-, delta-, or theta-alumina are preferred alumina carriers. Other alumina carriers, such as mixed silica alumina, sol-gel alumina, as well as sol-gel or co-precipitated alumina-zirconia carriers may be used. Alumina typically has a higher surface area and a higher pore volume than carriers such as zirconia and offers a price advantage over other more expensive carriers.

Examples of a WGS catalyst of the invention supported on a carrier, using the shorthand notation discussed above, include:

Pt—Na—{Zr, La, Y, Ce, Mo, Fe, Co, Mn}/$Al_2O_3$;

Pt—Na—Zr—Co/$Al_2O_3$;

Pt—Na—{Fe, Co, Ce}/$ZrO_2$;

Pt—K—{Fe, Co, Ce}/$ZrO_2$; and

Pt—Li—{Fe, Co, Ce}/$ZrO_2$.

For the alumina supported catalysts, gamma alumina ($\gamma$-$Al_2O_3$) is preferred.

G. Methods of Making a WGS Catalyst

As set forth above, a WGS catalyst of the invention may be prepared by mixing the metals and/or metalloids in their elemental forms or as oxides or salts to form a catalyst precursor, which generally undergoes a calcination and/or reductive treatment. Without being bound by theory, the catalytically active species are generally understood to be species which are in the reduced elemental state or in other possible higher oxidation states.

The WGS catalysts of the invention may be prepared by any well known catalyst synthesis processes. See, for example, U.S. Pat. Nos. 6,299,995 and 6,293,979. Spray drying, precipitation, impregnation, incipient wetness, ion exchange, fluid bed coating, physical or chemical vapor deposition are just examples of several methods that may be utilized to make the present WGS catalysts. Preferred approaches, include, for instance, impregnation or incipient wetness. The catalyst may be in any suitable form, such as, pellets, granular, bed, or monolith. See also co-pending U.S. patent application Ser. No. 10/739,428, entitled "Methods For The Preparation Of Catalysts For Hydrogen Generation" to Hagemeyer et al., filed on the same date as the present application, for further details on methods of catalyst preparation and catalyst precursors.

The WGS catalyst of the invention may be prepared on a solid support or carrier material. Preferably, the support or carrier is, or is coated with, a high surface area material onto which the precursors of the catalyst are added by any of several different possible techniques, as set forth above and as known in the art. The catalyst of the invention may be employed in the form of pellets, or on a support, preferably a monolith, for instance a honeycomb monolith.

One preferred method of preparing the catalysts involves depositing or impregnating catalyst components onto the catalyst in a sequence such that the catalyst components are deposited onto the substrate in the order of decreasing calcination temperature, with a calcination step following each deposition step, and with Pt typically impregnated and calcined last. One exception to this preparation procedure concerns catalyst formulations which contain both Pt and an alkali metal, like Na; in such a case the Pt is impregnated and calcined next to last, with the alkali metal then added and calcined at a calcination temperature of less than about 300° C., preferably about 200° C., or more preferably about the reaction temperature of the intended function of the catalyst. Pre-reduction under, for example, $H_2$ of the calcined Pt-containing catalyst formulation may also be beneficial to catalyst performance. High temperature, greater than about 300° C. tends to be deleterious to the performance of Na containing formulations. This procedure appears to be especially beneficial to catalysts formulated to operate at LTS and/or MTS operating conditions.

Catalyst precursor solutions are preferably composed of easily decomposable forms of the catalyst component in a sufficiently high enough concentration to permit convenient preparation. Examples of easily decomposable precursor forms include the nitrate, amine, and oxalate salts. Typically, chlorine containing precursors are avoided to prevent chlorine poisoning of the catalyst. Solutions can be aqueous or non-aqueous solutions. Exemplary non-aqueous solvents can include polar solvents, aprotic solvents, alcohols, and crown ethers, for example, tetrahydrofuran and ethanol. Concentration of the precursor solutions generally may be up to the solubility limitations of the preparation technique with consideration given to such parameters as, for example, porosity of the support, number of impregnation steps, pH of the precursor solutions, and so forth. The appropriate catalyst component precursor concentration can be readily determined by one of ordinary skill in the art of catalyst preparation.

Li—The acetate, hydroxide, nitrate and formate salts are both possible catalyst precursors for lithium.

Na—Sodium acetate, alkoxides including methoxide, propoxide, and ethoxide, bicarbonate, carbonate, citrate, formate, hydroxide, nitrate, nitrite and oxalate may be used to prepare WGS catalysts of the invention.

Mg—Water soluble magnesium precursors include the nitrate, acetate, lactate and formate salts.

K—Potassium nitrate, acetate, carbonate, hydroxide and formate are possible potassium catalyst precursors. The KOAc salt is volatile with possible potassium losses when heating up to calcination temperature.

Ca—The nitrate, acetate and hydroxide salts, preferable salts highly soluble in water, may be used to prepare catalysts of the invention.

Sc—The nitrate salt, $Sc(NO_3)_3$ may be a precursor for scandium.

Ti—Titanium precursors which may be utilized in the present invention include ammonium titanyl oxalate, $(NH_4)_2TiO(C_2O_4)_2$, available from Aldrich, and titanium(IV) bis(ammonium lactato)dihydroxide, 50 wt % solution in water, $[CH_3CH(O—)CO_2NH_4]_2Ti(OH)_2$, available from Aldrich. Other titanium containing precursors include Ti oxalate prepared by dissolving a Ti(IV) alkoxide, such as Ti(IV) propoxide, $Ti(OCH_2CH_2CH_3)_4$, (Aldrich) in 1M aqueous oxalic acid at 60° C. and stirring for a couple of hours, to produce a 0.72M clear colorless solution; TiO(acac)oxalate prepared by dissolving Ti(IV) oxide acetylacetonate, $TiO(acac)_2$, (Aldrich) in 1.5M aqueous oxalic acid at 60° C. with stirring for a couple of hours, following by cooling to room temperature overnight to produce 1M clear yellow-brown solution; TiO (acac)$_2$, may also be dissolved in dilute acetic acid (50:50 HOAc:$H_2O$) at room temperature to produce a 1M clear yellow solution of TiO acac. Preferably, titanium dioxide in the anatase form is utilized as a catalyst precursor material.

V—Vanadium (IV) oxalate, a vanadium precursor, may be prepared from $V_2O_5$, (Aldrich), which is slurried in 1.5M aqueous oxalic acid on hot plate for 1 hour until it turns dark blue due to V(V) reduction to V(IV) by oxalic acid. Ammonium metavanadate(V), $(NH_4)VO_3$, (Cerac, Alfa) may be used as a precursor by dissolving it in water, preferably hot, about 80° C. water. Various polycarboxylic organic acid vanadium precursors can be prepared and used as catalyst precursors, for example, citric, maleic, malonic, and tartatic. Vanadium citrate can be prepared by reacting $V_2O_5$ with citric acid and heating to about 80° C. Ammonium vanadium(V) oxalate may be prepared by reacting $(NH_4)VO_3$ and $NH_4OH$ in room temperature water, increasing temperature to 90° C., stirring to dissolve all solids, cooling to room temperature and adding oxalic acid; this produces a clear orange solution, which is stable for about 2 days. Ammonium vanadium(V) citrate and ammonium vanadium(V) lactate are both prepared by shaking $NH_4VO_3$ in, respectively, aqueous citric acid or aqueous lactic acid, at room temperature. Diammonium vanadium(V) citrate may be prepared by dissolving, for instance, 0.25M $NH_4VO_3$ in citric acid diammonium salt (Alfa) at room temperature. An exemplary method of preparing ammonium vanadium(V) formate is to dissolve $NH_4VO_3$ (0.25M) in water at 95° C., react with 98% formic acid and $NH_4OH$ to produce the desired ammonium vanadium(V) formate.

Cr—Both the nitrate and acetate hydroxides are possible catalyst precursors for chromium.

Mn—Manganese nitrate, manganese acetate (Aldrich) and manganese formate (Alfa) are all possible catalyst precursors for manganese.

Fe—Iron (III) nitrate, $Fe(NO_3)_3$, iron(III) ammonium oxalate, $(NH_4)_3$ $Fe(C_2O_4)_3$, iron(III) oxalate, $Fe_2(C_2O_4)_3$, and iron(II) acetate, $Fe(OAc)_2$, are all water soluble; although the iron(III)oxalate undergoes thermal decomposition at only 100° C. Potassium iron(III) oxalate, iron(III) formate and iron(III) citrate are additional iron precursors.

Co—Both cobalt nitrate and acetate are water soluble precursor solutions. The cobalt (II) formate, $Co(OOCH)_2$, has low solubility in cold water of about 5 g/100 ml, while cobalt (II) oxalate is soluble in aqueous $NH_4OH$. Another possible precursor is sodium hexanitrocobaltate(III), $Na_3Co(NO_2)_6$ which is water soluble, with gradual decomposition of aqueous solutions slowed by addition of small amounts of acetic acid. Hexaammine Co(III) nitrate is also soluble in hot (65° C.) water and $NMe_4OH$. Cobalt citrate, prepared by dissolving $Co(OH)_2$ in aqueous citric acid at 80° C. for 1 to 2 hours, is another suitable cobalt precursor.

Ni—Nickel nitrate, $Ni(NO_3)_2$, and nickel formate are both possible nickel precursors. The nickel formate may be prepared by dissolving $Ni(HCO_2)_2$ in water and adding formic acid, or by dissolving in dilute formic acid, to produce clear greenish solutions.

Cu—Copper precursors include nitrate, $Cu(NO_3)_2$, acetate, $Cu(OAc)_2$, and formate, $Cu(OOCH)_2$, which are increasingly less water soluble in the order presented. Ammonium hydroxide is used to solublize oxalate, $Cu(C_2O_4)_2$, and $Cu(NH_3)_4(OH)_2$ which is soluble in aqueous 5N $NH_4OH$. Copper citrate and copper amine carbonate may be prepared from $Cu(OH)_2$.

Zn—Zinc nitrate, acetate and formate are all water soluble and possible catalyst precursors. Ammonium zinc carbonate, $(NH_4)_2Zn(OH)_2CO_3$, prepared by reacting zinc hydroxide and ammonium carbonate for a week at room temperature, is another possible precursor for zinc.

Ge—Germanium oxalate may be prepared from amorphous Ge(IV) oxide, glycol-soluble $GeO_2$, (Aldrich) by reaction with 1M aqueous oxalic acid at room temperature. $H_2GeO_3$ may be prepared by dissolving $GeO_2$ in water at 80° C. and adding 3 drops of $NH_4OH$ (25%) to produce a clear, colorless $H_2GeO_3$ solution. $(NMe_4)_2GeO_3$ may be prepared by dissolving 0.25 M $GeO_2$ in 0.1 M $NMe_4OH$. $(NH_4)_2GeO_3$ may be prepared by dissolving 0.25 M $GeO_2$ in 0.25M $NH_4OH$.

Rb—The nitrate, acetate, carbonate and hydroxide salts may be used as catalyst precursors to prepare the WGS catalyst of the invention. Preferred are water soluble salts.

Sr—The acetate is soluble in cold water to produce a clear colorless solution.

Y—Yttrium nitrate and acetate are both possible catalyst precursors.

Zr—Zirconyl nitrate and acetate, commercially available from Aldrich, and ammonium Zr carbonate and zirconia, available from MEI, are possible precursors for zirconium in either or both the support or catalyst formulation itself.

Nb—Niobium oxalate prepared by dissolving niobium (V) ethoxide in aqueous oxalic acid at 60° C. for 12 hours is a possible catalyst precursor. Another preparative route to the oxalate is dissolving niobic acid or niobic oxide ($Nb_2O_5$) in oxalic acid at 65° C. Ammonium Nb oxalate is also a possible catalyst precursor for niobium. Dissolving niobic oxide (0.10 M Nb) in $NMe_4OH$ (0.25 M) and stirring overnight at 65° C. will produce $(NMe_4)_2NbO_6$.

Mo—Molybdenum containing precursor solutions may be derived from ammonium molybdate $(NH_4)_2MoO_4$ (Aldrich) dissolved in room temperature water; Mo oxalate prepared by dissolving $MoO_3$ (Aldrich) in 1.5M aqueous oxalic acid at 60° C. overnight; and ammonium Mo oxalate prepared from $(NH_4)_6Mo_7O_{24}4H_2O$ (Strem) dissolved in 1M aqueous oxalic acid at room temperature. $(NH_4)_6Mo_7O_{24}.4H_2O$ (Strem) may also be dissolved in water at room temperature to produce a stable solution of ammonium paramolybdate tetrahydrate. Molybdic acid, $H_2MoO_4$, (Alfa Aesar or Aldrich) may each be dissolved in room temperature water to produce 1M Mo containing solutions.

Ru—Ru nitrosyl nitrate, $Ru(NO)(NO_3)_3$ (Aldrich), potassium ruthenium oxide, $K_2RuO_4.H_2O$, potassium perruthenate, $KRuO_4$, ruthenium nitrosyl acetate, $Ru(NO)(OAc)_3$, and tetrabutylammonium perruthenate, $NBu_4RuO_4$, are all possible ruthenium metal catalyst precursors. $NMe_4Ru(NO)(OH)_4$ solution can be prepared by dissolving $Ru(NO)(OH)_3$ (0.1 M) (H. C. Starck) in $NMe_4OH$ (0.12M) at 80° C. produces a clear dark red-brown 0.1M Ru solution useful as a catalyst precursor solution.

Rh—A suitable rhodium catalyst precursor is Rh nitrate (Aldrich or Strem).

Pd—Catalyst compositions containing Pd can be prepared by using precursors like Pd nitrate, typically stabilized by dilute $HNO_3$, and available as a 10 wt. % solution from Aldrich, or $Pd(NH_3)_2(NO_2)_2$ available as a 5 wt. % Pd commercial solution, stabilized by dilute $NH_4OH$. $Pd(NH_3)_4(NO_3)_2$ and $Pd(NH_3)_4(0H)_2$ are also available commercially.

Ag—Silver nitrate, silver nitrite, silver diammine nitrite, and silver acetate are possible silver catalyst precursors.

Cd—Cadmium nitrate is water soluble and a suitable catalyst precursor.

In—Indium formate and indium nitrate are preferred precursors for indium.

Sn—Tin oxalate produced by reacting the acetate with oxalic acid may be used as a catalyst precursor. Tin tartrate, 5

$nC_4H_4O_6$, in $NMe_4OH$ at about 0.25 M Sn concentration, and tin acetate, also dissolved in $NMe_4OH$ at about 0.25 M Sn concentration, may be used as catalyst precursors.

Sb—Ammonium antimony oxalate produced by reacting the acetate with oxalic acid and ammonia is a suitable antimony precursor. Antimony oxalate, $Sb_2(C_2O_4)_3$, available from Pfaltz & Bauer, is a water soluble precursor. Potassium antimony oxide, $KSbO_3$, and antimony citrate, prepared by stirring antimony(II) acetate in 1 M citric acid at room temperature, are both possible catalyst precursors.

Te—Telluric acid, $Te(OH)_6$, may be used as a precursor for tellurium.

Cs—Cs salts including the nitrate, acetate, carbonate, and hydroxide are soluble in water and possible catalyst precursors.

Ba—Barium acetate and barium nitrate are both suitable precursors for barium catalyst components.

La—Lanthanum precursors include nitrate, $La(NO_3)_3$, acetate, $La(OAc)_3$, and perchlorate, $La(ClO_4)_3$, all of which may be prepared as aqueous solutions.

Ce—Ce(III) and Ce(IV) solutions may be prepared from Ce(III) nitrate hexahydrate, $Ce(NO_3)_3.6H_2O$, (Aldrich) and ammonium cerium(IV) nitrate, $(NH_4)_2Ce(NO_3)_6$, (Aldrich), respectively, by dissolution in room temperature water. Nitric acid, 5 vol. %, may be added to the Ce(III) salt to increase solubility and stability. $Ce(OAc)_3$ (Alfa) or $Ce(NO_3)_4$ (Alfa) may also be utilized as a catalyst precursor.

Pr, Nd, Sm and Eu—The nitrate, $Ln(NO_3)_3$, or acetate, $Ln(O_2CCH_3)_3$, are possible catalyst precursors for these lanthanides.

Hf—Hafnoyl chloride and nitrate are both possible precursors. Preparing the hafnoyl nitrate by dissolving $Hf(acac)_4$ in dilute $HNO_3$ at low heat provides a clear stable solution of hafnoyl nitrate.

Ta—Tantalum oxalate solution, $Ta_2O(C_2O_4)_4$, available from H. C. Starck, or prepared by dissolving $Ta(OEt)_5$ in aqueous oxalic acid at 60° C. for 12 hours, is a possible catalyst precursor.

W—Ammonium metatungstate hydrate, $(NH_4)_6W_{12}O_{39}$, is water soluble and a possible tungsten catalyst precursor. $H_2WO_4$ is reacted with $NH_4OH$ and $NMe_4OH$, respectively, to prepare $(NH_4)_2WO_4$ and $(NMe_4)_2WO_4$ which are both possible precursors.

Re—Rhenium oxide in $H_2O_2$, perrhenic acid, $(HReO_4)$, $NaReO_4$ and $NH_4ReO_4$ are suitable rhenium precursors.

Ir—Hexachloroiridate acid, $H_2IrCl_6$, potassium hexacyanoiridate and potassium hexanitroiridate are all possible catalyst precursors for iridium.

Pt—Platinum containing catalyst compositions may be prepared by using any one of a number of precursor solutions, such as, $Pt(NH_3)_4(NO_3)_2$ (Aldrich, Alfa, Heraeus, or Strem), $Pt(NH_3)_2(NO_2)_2$ in nitric acid, $Pt(NH_3)_4(OH)_2$ (Alfa), $K_2Pt(NO_2)_4$, $Pt(NO_3)_2$, $PtCl_4$ and $H_2PtCl_6$ (chloroplatinic acid). $Pt(NH_3)_4(HCO_3)_2$, $Pt(NH_3)_4(HPO_4)$, $(NMe_4)_2Pt(OH)_6$, $H_2Pt(OH)_6$, $K_2Pt(OH)_6$, $Na_2Pt(OH)_6$ and $K_2Pt(CN)_6$ are also possible choices along with Pt oxalate salts, such as $K_2Pt(C_2O_4)_2$. The Pt oxalate salts may be prepared from $Pt(NH_3)_4(OH)_2$ which is reacted with 1M oxalic acid solution to produce a clear, colorless solution of the desired Pt oxalate salts.

Au—Auric acid, $HAuCl_4$, in dilute HCl at about 5% Au may be a gold precursor. Gold nitrate in 0.1 M concentration may be prepared by dissolving $HAu(NO_3)_4$ (Alfa) in concentrated nitric acid, followed by stirring at room temperature for 1 week in the dark, then diluting 1:1 with water to produce a yellow solution. It should be noted that further dilution may result in Au precipitation. More concentrated, 0.25M, for example, gold nitrate may be prepared by starting with $Au(OH)_3$ (Alfa). $NaAu(OH)_4$, $KAu(OH)_4$, and $NMe_4Au(OH)_4$ may each be prepared from $Au(OH)_3$ dissolved in bases NaOH, KOH, or $NMe_4OH$, respectively, in base concentrations ranging from, for instance, 0.25 M or higher.

3. Producing a Hydrogen-rich Gas, such as a Hydrogen-Rich Syngas

The invention also relates to a method for producing a hydrogen-rich gas, such as a hydrogen-rich syngas. An additional embodiment of the invention may be directed to a method of producing a CO depleted gas, such as a CO-depleted syngas.

A CO-containing gas, such as a syngas contacts a water gas shift catalyst in the presence of water according to the method of the invention. The reaction preferably may occur at a temperature of less than 450° C. to produce a hydrogen-rich gas such as a hydrogen-rich syngas.

A method of the invention may be utilized over a broad range of reaction conditions. Preferably, the method is conducted at a pressure of no more than about 75 bar, preferably at a pressure of no more than about 50 bar to produce a hydrogen-rich syngas. Even more preferred is to have the reaction occur at a pressure of no more than about 25 bar, or even no more than about 15 bar, or not more than about 10 bar. Especially preferred is to have the reaction occur at, or about atmospheric pressure. Depending on the formulation of the catalyst according to the present invention, the present method may be conducted at reactant gas temperatures ranging from less than about 250° C. to up to about 450° C. Preferably, the reaction occurs at a temperature selected from one or more temperature subranges of LTS, MTS and/or HTS as described above. Space velocities may range from about 1 $hr^{-1}$ up to about 1,000,000 $hr^{-1}$. Feed ratios, temperature, pressure and the desired product ratio are factors that would normally be considered by one of skill in the art to determine a desired optimum space velocity for a particular catalyst formulation.

4. Fuel Processor Apparatus

The invention further relates to a fuel processing system for generation of a hydrogen-rich gas from a hydrocarbon or substituted hydrocarbon fuel. Such a fuel processing system would comprise, for example, a fuel reformer, a water gas shift reactor and a temperature controller.

The fuel reformer would convert a fuel reactant stream comprising a hydrocarbon or a substituted hydrocarbon fuel to a reformed product stream comprising carbon monoxide and water. The fuel reformer may typically have an inlet for receiving the reactant stream, a reaction chamber for converting the reactant stream to the product stream, and an outlet for discharging the product stream.

The fuel processor system would also comprise a water gas shift reactor for effecting a water gas shift reaction at a temperature of less than about 450° C. This water gas shift reactor may comprise an inlet for receiving a water gas shift feed stream comprising carbon monoxide and water from the product stream of the fuel reformer, a reaction chamber having a water gas shift catalyst as described herein located therein, and an outlet for discharging the resulting hydrogen-rich gas. The water gas shift catalyst would preferable be effective for generating hydrogen and carbon dioxide from the water gas shift feed stream.

The temperature controller may be adapted to maintain the temperature of the reaction chamber of the water gas shift reactor at a temperature of less than about 450° C.

5. Industrial Applications

Syngas is used as a reactant feed in number of industrial applications, including for example, methanol synthesis, ammonia synthesis, oxoaldehyde synthesis from olefins (typically in combination with a subsequent hydrogenation to form the corresponding oxoalcohol), hydrogenations and carbonylations. Each of these various industrial applications preferably includes a certain ratio of $H_2$ to CO in the syngas reactant stream. For methanol synthesis the ratio of $H_2$:CO is preferably about 2:1. For oxosynthesis of oxoaldehydes from olefins, the ratio of $H_2$:CO is preferably about 1:1. For ammonia synthesis, the ratio of $H_2$ to $N_2$ (e.g., supplied from air) is preferably about 3:1. For hydrogenations, syngas feed streams that have higher ratios of $H_2$:CO are preferred (e.g., feed streams that are $H_2$ enriched, and that are preferably substantially $H_2$ pure feed streams). Carbonylation reactions are preferably effected using feed streams that have lower ratios of $H_2$:CO (e.g., feed streams that are CO enriched, and that are preferably substantially CO pure feed streams).

The WGS catalysts of the present invention, and the methods disclosed herein that employ such WGS catalysts, can be applied industrially to adjust or control the relative ratio $H_2$:CO in a feed stream for a synthesis reaction, such as methanol synthesis, ammonia synthesis, oxoaldehyde synthesis, hydrogenation reactions and carbonylation reactions. In one embodiment, for example, a syngas product stream comprising CO and $H_2$ can be produced from a hydrocarbon by a reforming reaction in a reformer (e.g., by steam reforming of a hydrocarbon such as methanol or naphtha). The syngas product stream can then be fed (directly or indirectly after further downstream processing) as the feed stream to a WGS reactor, preferably having a temperature controller adapted to maintain the temperature of the WGS reactor at a temperature of about 450° C. or less during the WGS reaction (or at lower temperatures or temperature ranges as described herein in connection with the catalysts of the present invention). The WGS catalyst(s) employed in the WGS reactor are preferably selected from one or more of the catalysts and/or methods of the invention. The feed stream to the WGS reactor is contacted with the WGS catalyst(s) under reaction conditions effective for controlling the ratio of $H_2$:CO in the product stream from the WGS reactor (i.e., the "shifted product stream") to the desired ratio for the downstream reaction of interest (e.g., methanol synthesis), including to ratios described above in connection with the various reactions of industrial significance. As a non-limiting example, a syngas product stream from a methane steam reformer will typically have a $H_2$:CO ratio of about 6:1. The WGS catalyst(s) of the present invention can be employed in a WGS reaction (in the forward direction as shown above) to further enhance the amount of $H_2$ relative to CO, for example to more than about 10:1, for a downstream hydrogenation reaction. As another example, the ratio of $H_2$:CO in such a syngas product stream can be reduced by using a WGS catalyst(s) of the present invention in a WGS reaction (in the reverse direction as shown above) to achieve or approach the desired 2:1 ratio for methanol synthesis. Other examples will be known to a person of skill in the art in view of the teachings of the present invention.

6. Preparative Method for Li- and Fe-Containing Catalyst Formulations

The invention further provides a method of producing a water gas shift catalyst comprising Pt, Li and Fe, their oxides or mixtures thereof. The preparative method comprises the steps of depositing Li and Fe onto a surface, preferably a catalyst support, calcining at a calcination temperature from about 600° C. to about 900° C. and then depositing Pt onto the Li and Fe containing catalyst. More preferably the calcination temperature is from about 650° C. to about 800° C., and most preferably at a temperature of about 700° C. A further embodiment of this invention includes a step of depositing Na onto the catalyst after the calcination of Li and Fe. The Na deposition may occur simultaneous with the Pt deposition.

A person of skill in the art will understand and appreciate that with respect to each of the preferred catalyst embodiments as described in the preceding paragraphs, the particular components of each embodiment can be present in their elemental state, or in one or more oxide states, or mixtures thereof.

Although the foregoing description is directed to the preferred embodiments of the invention, it is noted that other variations and modifications will be apparent to those skilled in the art, and which may be made without departing from the spirit or scope of the invention.

EXAMPLES

General

Small quantity catalyst composition samples are generally prepared by automated liquid dispensing robots (Cavro Scientific Instruments) on flat quartz test wafers.

Generally, supported catalysts are prepared by providing a catalyst support (e.g. alumina, silica, titania, etc.) to the wafer substrate, typically as a slurry composition using a liquid-handling robot to individual regions or locations on the substrate or by wash-coating a surface of the substrate using techniques known to those of skill in the art, and drying to form dried solid support material on the substrate. Discrete regions of the support-containing substrate are then impregnated with specified compositions intended to operate as catalysts or catalyst precursors, with the compositions comprising metals (e.g. various combinations of transition metal salts). In some circumstances the compositions are delivered to the region as a mixture of different metal-containing components and in some circumstances (additionally or alternatively) repeated or repetitive impregnation steps are performed using different metal-containing precursors. The compositions are dried to form supported catalyst precursors. The supported catalyst precursors are treated by calcining and/or reducing to form active supported catalytic materials at discrete regions on the wafer substrate.

Bulk catalysts may also be prepared on the substrate. Such multi-component bulk catalysts are purchased from a commercial source and/or are prepared by precipitation or co-precipitation protocols, and then optionally treated—including mechanical pretreatment (grinding, sieving, pressing). The bulk catalysts are placed on the substrate, typically by slurry dispensing and drying, and then optionally further doped with additional metal-containing components (e.g. metal salt precursors) by impregnation and/or incipient wetness techniques to form bulk catalyst precursors, with such techniques being generally known to those of skill in the art. The bulk catalyst precursors are treated by calcining and/or reducing to form active bulk catalytic materials at discrete regions on the wafer substrate.

The catalytic materials (e.g., supported or bulk) on the substrate are tested for activity and selectivity for the WGS reaction using a scanning mass spectrometer (SMS) comprising a scanning/sniffing probe and a mass spectrometer. More details on the scanning mass spectrometer instrument and screening procedure are set forth in U.S. Pat. No. 6,248,540, in European Patent No. EP 1019947, and in European Patent Application No. EP 1186892 and corresponding U.S. application Ser. No. 09/652,489 filed Aug. 31, 2000 by Wang et al., the complete disclosure of each of which is incorporated herein in its entirety. Generally, the reaction conditions (e.g. contact time and/or space velocities, temperature, pressure, etc.) associated with the scanning mass spectrometer catalyst screening reactor are controlled such that partial conversions (i.e., non-equilibrium conversions, e.g., ranging from about 10% to about 40% conversion) are obtained in the scanning mass spectrometer, for discrimination and ranking of catalyst activities for the various catalytic materials being screened. Additionally, the reaction conditions and catalyst loadings are established such that the results scale appropriately with the reaction conditions and catalyst loadings of larger scale laboratory research reactors for WGS reactions. A limited set of tie-point experiments are performed to demonstrate the scalability of results determined using the scanning mass spectrometer to those using larger scale laboratory research reactors for WGS reactions. See, for example, Example 12 of U.S. Provisional Patent Application Ser. No. 60/434,708 entitled "Platinum-Ruthenium Containing Catalyst Formulations for Hydrogen Generation" filed by Hagemeyer et al. on Dec. 20, 2002.

Preparative and Testing Procedures

The catalysts and compositions of the present invention were identified using high-throughput experimental technology, with the catalysts being prepared and tested in library format, as described generally above, and in more detail below. Specifically, such techniques were used for identifying catalyst compositions that were active and selective as WGS catalysts. As used in these examples, a "catalyst library" refers to an associated collection of candidate WGS catalysts arrayed on a wafer substrate, and having at least two, and typically three or more common metal components (including metals in the fully reduced state, or in a partially or fully oxidized state, such as metal salts), but differing from each other with respect to relative stoichiometry of the common metal components.

Depending on the library design and the scope of the investigation with respect to a particular library, multiple (i.e., two or more) libraries were typically formed on each wafer substrate. A first group of test wafers each comprised about 100 different catalyst compositions formed on a three-inch wafer substrate, typically with most catalysts being formed using at least three different metals. A second group of test wafers each comprised about 225 different catalyst compositions on a four-inch wafer substrate, again typically with most catalysts being formed using at least three different metals. Each test wafer itself typically comprised multiple libraries. Each library typically comprised binary, ternary or higher-order compositions—that is, for example, as ternary compositions that comprised at least three components (e.g., A, B, C) combined in various relative ratios to form catalytic materials having a molar stoichiometry covering a range of interest (e.g., typically ranging from about 20% to about 80% or more (e.g. to about 100% in some cases) of each component). For supported catalysts, in addition to varying component stoichiometry for the ternary compositions, relative total metal loadings were also investigated.

Typical libraries formed on the first group of (three-inch) test wafers included, for example, "five-point libraries" (e.g., twenty libraries, each having five different associated catalyst compositions), or "ten-point" libraries (e.g., ten libraries, each having ten different associated catalyst compositions), or "fifteen-point libraries" (e.g., six libraries, each having fifteen different associated catalyst compositions) or "twenty-point libraries" (e.g., five libraries, each having twenty different associated catalyst compositions). Typical libraries formed on the second group of (four-inch) test wafers included, for example, "nine-point libraries" (e.g., twenty-five libraries, each having nine different associated catalyst compositions), or "twenty-five point" libraries (e.g., nine libraries, each having twenty-five different associated catalyst compositions). Larger compositional investigations, including "fifty-point libraries" (e.g., two or more libraries on a test wafer, each having fifty associated catalyst compositions), were also investigated. Typically, the stoichiometric increments of candidate catalyst library members ranged from about 1.5% (e.g. for a "fifty-five point ternary") to about 15% (e.g., for a "five-point " ternary). See, generally, for example, WO 00/17413 for a more detailed discussion of library design and array organization. FIGS. 10A-10F show library designs for libraries prepared on a common test wafer, as graphically represented using Library Studios (Symyx Technologies, Inc., Santa Clara, Calif.), where the libraries may vary with respect to both stoichiometry and catalyst loading. Libraries of catalytic materials that vary with respect to relative stoichiometry and/or relative catalyst loading can also be represented in a compositional table, such as is shown in the several examples of this application.

Referring to FIG. 10A, for example, the test wafer includes nine libraries, where each of the nine libraries comprise nine different ternary compositions of the same three-component system. In the nomenclature of the following examples, such a test wafer is said to include nine, nine-point-ternary ("9PT") libraries. The library depicted in the upper right hand corner of this test wafer includes catalyst compositions comprising components A, B and XI in 9 different stoichiometries. As another example, with reference to FIG. 10B, a partial test wafer is depicted that includes a fifteen-point-ternary ("15PT") library having catalyst compositions of Pt, Pd and Cu in fifteen various stoichiometries. Generally, the composition of each catalyst included within a library is graphically represented by an association between the relative amount (e.g., moles or weight) of individual components of the composition and the relative area shown as corresponding to that component. Hence, referring again to the fifteen different catalyst compositions depicted on the partial test wafer represented in FIG. 10B, it can be seen that each composition includes Pt (red), Pd (green) and Cu (blue), with the relative amount of Pt increasing from column 1 to column 5 (but being the same as compared between rows within a given column), with the relative amount of Pd decreasing from row 1 to row 5 (but being the same as compared between columns within a given row), and with the relative amount of Cu decreasing from a maximum value at row 5, column 1 to a minimum at, for example, row 1, column 1. FIG. 10C shows a test wafer that includes a fifty-point-ternary ("50PT") library having catalyst compositions of Pt, Pd and Cu in fifty various stoichiometries. This test library could also include another fifty-point ternary library (not shown), for example with three different components of interest.

FIGS. 10D-10F are graphical representations of two fifty-point ternary libraries ("bis 50PT libraries") at various stages of preparation—including a Pt—Au—Ag/$CeO_2$ library (shown as the upper right ternary library of FIG. 10E) and a Pt—Au—Ce/$ZrO_2$ library (shown as the lower left ternary library of FIG. 1E). Note that the Pt—Au—Ag/$CeO_2$ library also includes binary-impregnated compositions—Pt—Au/$CeO_2$ binary catalysts (row 2) and Pt—Ag/$CeO_2$ (column 10). Likewise, the Pt—Au—Ce/$ZrO_2$ library includes binary-impregnated compositions—Pt—Ce/$ZrO_2$ (row 11) and Au—Ce/$ZrO_2$ (column 1). Briefly, the bis 50PT libraries were prepared by depositing $CeO_2$ and $ZrO_2$ supports onto respective portions of the test wafer as represented graphically in FIG. 10D. The supports were deposited onto the test wafer as a slurry in a liquid media using a liquid handling robot, and the test wafer was subsequently dried to form dried supports.

Thereafter, salts of Pt, Au and Ag were impregnated onto the regions of the test wafer containing the $CeO_2$ supports in the various relative stoichiometries as represented in FIG. 10E (upper-right-hand library). Likewise, salts of Pt, Au and Ce were impregnated onto the regions of the test wafer containing the $ZrO_2$ supports in the various relative stoichiometries as represented in FIG. 10E (lower-left-hand library). FIG. 10F is a graphical representation of the composite library design, including the relative amount of catalyst support.

Specific compositions of tested catalytic materials of the invention are detailed in the following examples for selected libraries.

Performance benchmarks and reference experiments (e.g., blanks) were also provided on each quartz catalyst test wafer as a basis for comparing the catalyst compositions of the libraries on the test wafer. The benchmark catalytic material formulations included a Pt/zirconia catalyst standard with about 3% Pt catalyst loading (by weight, relative to total weight of catalyst and support). The Pt/zirconia standard was typically synthesized by impregnating 3 μL of, for example, 1.0% or 2.5% by weight, Pt stock solution onto zirconia supports on the wafer prior to calcination and reduction pretreatment.

Typically wafers were calcined in air at a temperature ranging from 300° C. to 500° C. and/or reduced under a continuous flow of 5% hydrogen at a temperature ranging from about 200° C. to about 500° C. (e.g., 450° C.). Specific treatment protocols are described below with respect to each of the libraries of the examples.

For testing using the scanning mass spectrometer, the catalyst wafers were mounted on a wafer holder which provided movement in an XY plane. The sniffing/scanning probe of the scanning mass spectrometer moved in the Z direction (a direction normal to the XY plane of movement for the wafer holder), and approached in close proximity to the wafer to surround each independent catalyst element, deliver the feed gas and transmit the product gas stream from the catalyst surface to the quadrupole mass spectrometer. Each element was heated locally from the backside using a $CO_2$ laser, allowing for an accessible temperature range of about 200° C. to about 600° C. The mass spectrometer monitored seven masses for hydrogen, methane, water, carbon monoxide, argon, carbon dioxide and krypton: 2, 16, 18, 28, 40, 44 and 84, respectively.

Catalyst compositions were tested at various reaction temperatures, typically including for example at about 300° C., 350° C. and/or 400° C. and additionally, usually for more active formulations, at 250° C. Particularly for LTS formulations, testing of catalyst activity at reaction temperatures starting as low as 200° C. may occur. The feed gas typically consisted of 51.6% $H_2$, 7.4% Kr, 7.4% CO, 7.4% $CO_2$ and 26.2% $H_2O$. The $H_2$, CO, $CO_2$ and Kr internal standard are premixed in a single gas cylinder and then combined with the water feed. Treated water (18.1 mega-ohms-cm at 27.5° C.) produced by a Barnstead Nano Pure Ultra Water system was used, without degassing.

Data Processing and Analysis

Data analysis was based on mass balance plots where CO conversion was plotted versus $CO_2$ production. The mass spectrometer signals were uncalibrated for CO and $CO_2$ but were based on Kr-normalized mass spectrometer signals. The software package SpotFire™ (sold by SpotFire, Inc. of Somerville, Mass.) was used for data visualization.

Figure 11:
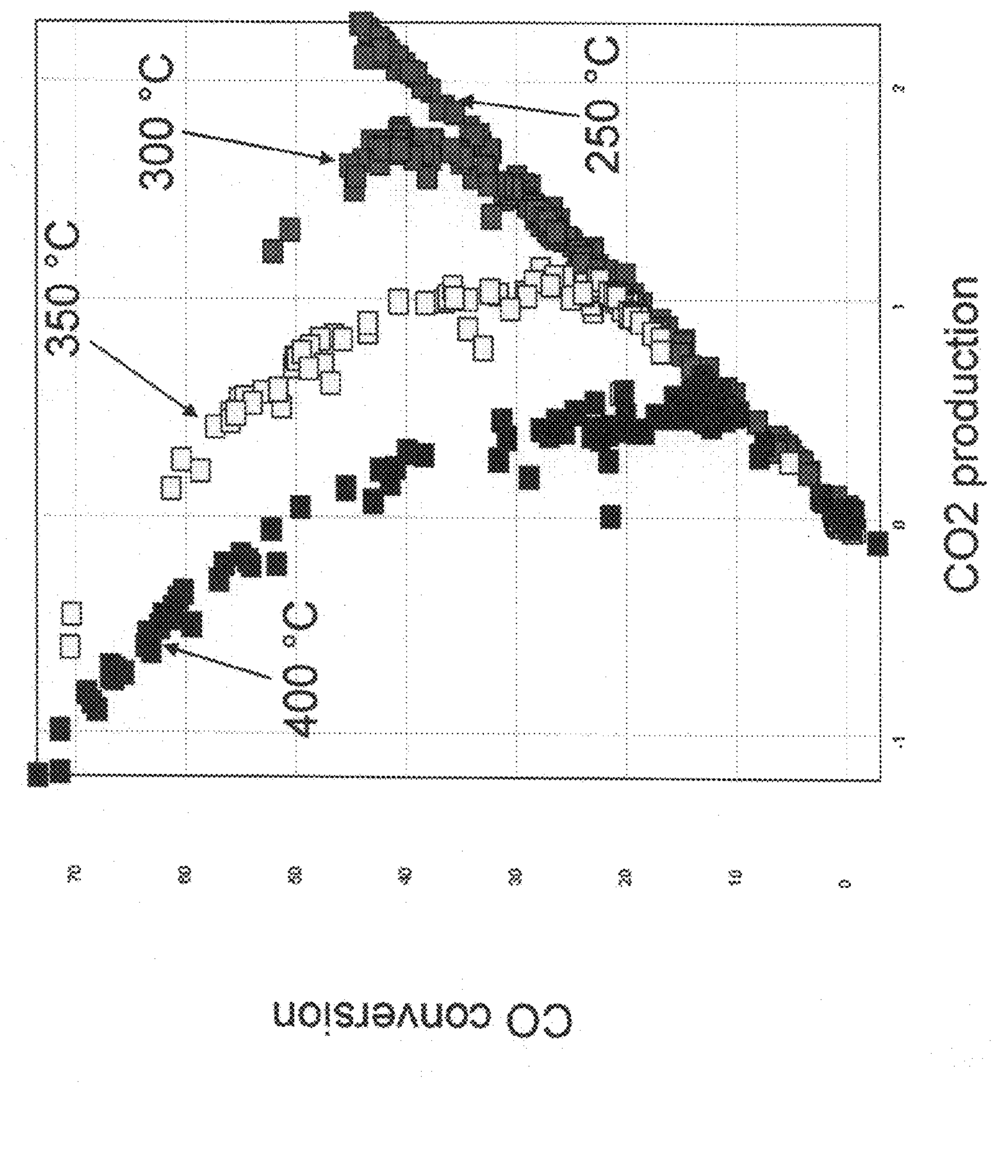
FIG. 11A illustrates a representative plot of CO conversion versus $CO_2$ production for a prototypical library test wafer at various temperatures.
FIG. 11B illustrates the effect of catalyst selectivity and activity versus the WGS mass balance.
FIG. 11C illustrates the effect of temperature on catalyst performance under WGS conditions.
Figure 11B:
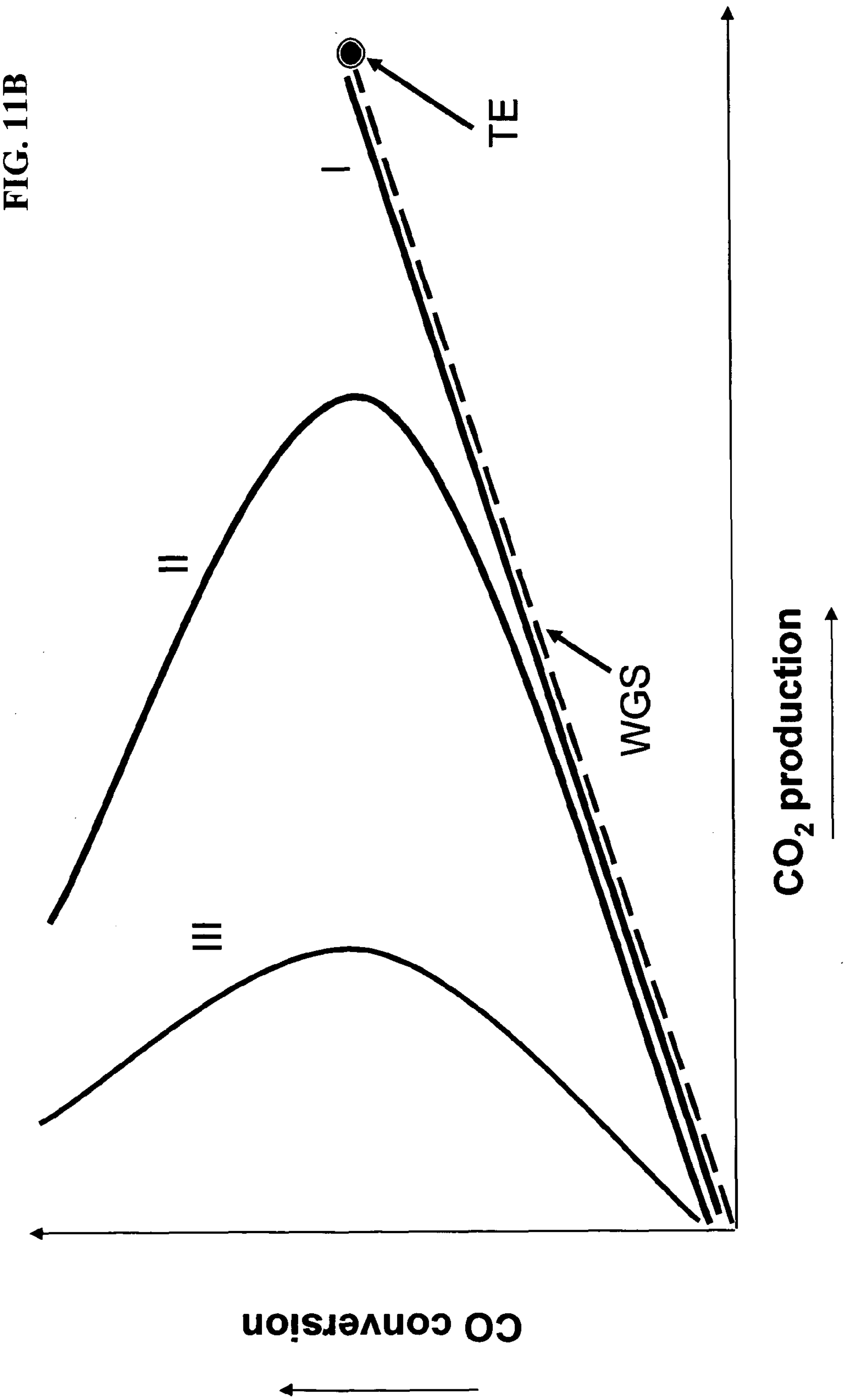
Figure 11C:
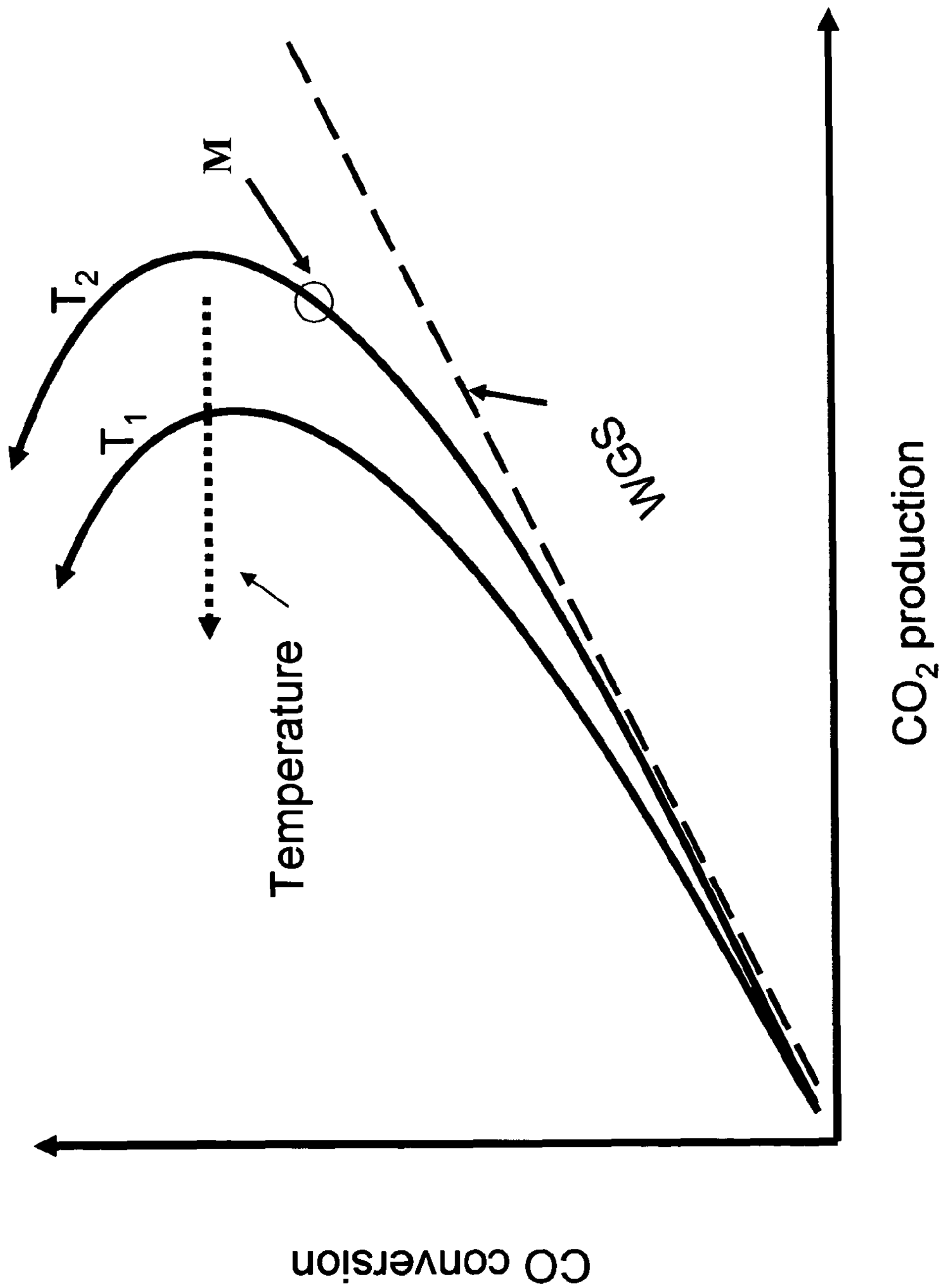

A representative plot of CO conversion versus $CO_2$ production for a WGS reaction is shown in FIG. 11A involving, for discussion purposes, two ternary catalyst systems—a Pt—Au—Ag /$CeO_2$ catalyst library and a Pt—Au—Ce/$ZrO_2$ catalyst library—as described above in connection with FIGS. 10D-10F. The catalyst compositions of these libraries were screened at four temperatures: 250° C., 300° C., 350° C. and 400° C. With reference to the schematic diagram shown in FIG. 1I B, active and highly selective WGS catalysts (e.g., Line I of FIG. 11B) will approach a line defined by the mass balance for the water-gas-shift reaction (the "WGS diagonal") with minimal deviation, even at relatively high conversions (i.e., at CO conversions approaching the thermodynamic equilibrium conversion (point "TE" on FIG. 11B)). Highly active catalysts may begin to deviate from the WGS diagonal due to cross-over to the competing methanation reaction (point "M" on FIG. 11C). Catalyst compositions that exhibit such deviation may still, however, be useful WGS catalysts depending on the conversion level at which such deviation occurs. For example, catalysts that first deviate from the WGS diagonal at higher conversion levels (e.g., Line II of FIG. 11B) can be employed as effective WGS catalysts by reducing the overall conversion (e.g., by lowering catalyst loading or by increasing space velocity) to the operational point near the WGS diagonal. In contrast, catalysts that deviate from the WGS diagonal at low conversion levels (e.g., Line III of FIG. 11B) will be relatively less effective as WGS catalysts, since they are unselective for the WGS reaction even at low conversions. Temperature affects the thermodynamic maximum CO conversion, and can affect the point of deviation from the mass-balance WGS diagonal as well as the overall shape of the deviating trajectory, since lower temperatures will generally reduce catalytic activity. For some compositions, lower temperatures will result in a more selective catalyst, demonstrated by a WGS trajectory that more closely approximates the WGS mass-balance diagonal. (See FIG. 11C). Referring again to FIG. 11A, it can be seen that the Pt—Au—Ag/$CeO_2$ and the Pt—Au—Ce/$ZrO_2$ catalyst compositions are active and selective WGS catalysts at each of the screened temperatures, and particularly at lower temperatures.

Generally, the compositions on a given wafer substrate were tested together in a common experimental run using the scanning mass spectrometer and the results were considered together. In this application, candidate catalyst compositions of a particular library on the substrate (e.g., ternary or higher-order catalysts comprising three or more metal components) were considered as promising candidates for an active and selective commercial catalyst for the WGS reaction based on a comparison to the Pt/$ZrO_2$ standard composition included on that wafer. Specifically, libraries of catalytic materials were deemed to be particularly preferred WGS catalysts if the results demonstrated that a meaningful number of catalyst compositions in that library compared favorably to the Pt/$ZrO_2$ standard composition included on the wafer substrate with respect to catalytic performance. In this context, a meaningful number of compositions was generally considered to be at least three of the tested compositions of a given library. Also in this context, favorable comparison means that the compositions had catalytic performance that was as good as or better than the standard on that wafer, considering factors such as conversion, selectivity and catalyst loading. All catalyst compositions of a given library were in many cases positively identified as active and selective WGS catalysts even in situations where only some of the library members compared favorably to the Pt/$ZrO_2$ standard, and other compositions within that library compared less than favorably to the Pt/$ZrO_2$ standard. In such situations, the basis for also including members of the library that compared somewhat less favorably to the standard is that these members in fact positively catalyzed the WGS reaction (i.e., were effective as catalysts for this reaction). Additionally, it is noted that such compositions may be synthesized and/or tested under more optimally tuned conditions (e.g., synthesis conditions, treatment conditions and/or testing conditions (e.g., temperature)) than occurred during actual testing in the library format, and significantly, that the optimal conditions for the particular catalytic materials being tested may differ from the optimal conditions for the $Pt/ZrO_2$ standard—such that the actual test conditions may have been closer to the optimal conditions for the standard than for some of the particular members. Therefore, it was specifically contemplated that optimization of synthesis, treatment and/or screening conditions, within the generally defined ranges of the invention as set forth herein, would result in even more active and selective WGS catalysts than what was demonstrated in the experiments supporting this invention. Hence, in view of the foregoing discussion, the entire range of compositions defined by each of the claimed compositions (e.g., each three-component catalytic material, or each four-component catalytic material) was demonstrated as being effective for catalyzing the WGS reaction. Further optimization is considered, with various specific advantages associated with various specific catalyst compositions, depending on the desired or required commercial application of interest. Such optimization can be achieved, for example, using techniques and instruments such as those described in U.S. Pat. No. 6,149,882, or those described in WO 01/66245 and its corresponding U.S. applications, U.S. Ser. No. 09/801,390, entitled "Parallel Flow Process Optimization Reactor" filed Mar. 7, 2001 by Bergh et al., and U.S. Ser. No. 09/801,389, entitled "Parallel Flow Reactor Having Variable Feed Composition" filed Mar. 7, 2001 by Bergh et al., each of which are incorporated herein by reference for all purposes.

Additionally, based on the results of screening of initial libraries, selective additional "focus" libraries were selectively prepared and tested to confirm the results of the initial library screening, and to further identify better performing compositions, in some cases under the same and/or different conditions. The test wafers for the focus libraries typically comprised about 225 different candidate catalyst compositions formed on a four-inch wafer substrate, with one or more libraries (e.g. associated ternary compositions A, B, C) formed on each test wafer. Again, the metal-containing components of a given library were typically combined in various relative ratios to form catalysts having stoichiometry ranging from about 0% to about 100% of each component, and for example, having stoichiometric increments of about 10% or less, typically about 2% or less (e.g., for a "fifty-six point ternary"). Focus libraries are more generally discussed, for example, in WO 00/17413. Such focus libraries were evaluated according to the protocols described above for the initial libraries.

The raw residual gas analyzer ("rga") signal values generated by the mass spectrometer for the individual gases are uncalibrated and therefore different gases may not be directly compared. Methane data (mass 16) was also collected as a control. The signals are typically standardized by using the raw rga signal for krypton (mass 84) to remove the effect of gas flow rate variations. Thus, for each library element, the standardized signal is determined as, for example, $sH_2O$=raw $H_2O$/raw Kr; sCO=raw CO/raw Kr; $sCO_2$=raw $CO_2$/raw Kr and so forth.

Blank or inlet concentrations are determined from the average of the standardized signals for all blank library elements, i.e. library elements for which the composition contains at most only support. For example, $b_{avg}$ $H_2O$=average $sH_2O$ for all blank elements in the library; $b_{avg}$ CO=average sCO for all blank elements in the library; and so forth.

Conversion percentages are calculated using the blank averages to estimate the input level (e.g., $b_{avg}$ CO) and the standardized signal (e.g., sCO) as the output for each library element of interest. Thus, for each library element, $CO_{conversion}=100\times(b_{avg}\ CO-sCO)/b_{avg}\ CO$ and $H_2O_{conversion}=100\times(b_{avg}\ H_2O-sH_2O)/bavg\ H_2O$.

The carbon monoxide (CO) to carbon dioxide ($CO_2$) selectivity is estimated by dividing the amount of $CO_2$ produced ($sCO_2-b_{avg}\ CO_2$) by the amount of CO consumed ($b_{avg}$ CO−sCO). The $CO_2$ and CO signals are not directly comparable because the rga signals are uncalibrated. However, an empirical conversion constant (0.6 $CO_2$ units=1 CO unit) has been derived, based on the behavior of highly selective standard catalyst compositions. The selectivity of the highly selective standard catalyst compositions approach 100% selectivity at low conversion rates. Therefore, for each library element, estimated CO to $CO_2$ selectivity=$100\times0.6\times(sCO_2-b_{avg}\ CO_2)/(b_{avg}\ CO-sCO)$. Low CO consumption rates can produce highly variable results, and thus the reproducibility of $CO_2$ selectivity values is maintained by artificially limiting the $CO_2$ selectivity to a range of 0 to 140%.

The complete disclosure of all references cited herein are incorporated herein in their entireties for all purposes.

The following examples are representative of the screening of libraries that lead to identification of the particularly claimed inventions herein.

Example 1

A 4" quartz wafer was precoated with a $\gamma$-$Al_2O_3$ (Catalox Sba-150) carrier by slurry dispensing 3 μL (1 g of $\gamma$-$Al_2O_3$ in 4 mL of ethylene glycol ("EG")/$H_2O$, 50:50) to each element of a 15×15 square on the wafer. The wafer was then oven-dried at 70° C. for 12 minutes.

Six internal standards were synthesized by Cavro spotting 3 μL of a $Pt(NH_3)_2(NO_2)_2$ (2.5% Pt) stock solution into the corresponding first row/last column positions. The wafer was impregnated with a uniform Pt layer by dispensing into columns C1 to C5 (2.5 μL per well) a stock solution of $Na_2Pt(OH)_6$ (from powder, 1% Pt) to the wafer.

Columns C6 to C15 of the wafer were then impregnated with the following ten metal-gradients respectively from top to bottom: $ZrO(NO_3)_2$, $La(NO_3)_3$, $Y(NO_3)_3$, $Ce(NO_3)_3$, $H_2MoO_4$, $Fe(NO_3)_3$, $Co(NO_3)_2$, $ZrO(OAc)_2$, $Mn(NO_3)_2$ and $KRuO_4$ by Cavro dispensing from the respective stock solution vials to a microtiter plate and diluted with distilled water. A replica transfer of the microtiter plate pattern to the wafer followed (2.5 μL dispense volume per well), resulting in a 10×15 point rectangle on the wafer (10 columns with metal gradients).

The wafer was dried for 3.5 hours at room temperature and then coated with base gradients (0.5M, opposing gradients) including CsOH—NaOH, LiOH—NaOH, RbOH—NaOH and KOH—NaOH separately in each of the first four columns, respectively, and NaOH in columns 5 to 15 (1M base with a gradient from bottom to top) by Cavro dispensing from the corresponding stock solution vials to the microtiter plate and diluting with distilled water. A replica transfer of the microtiter plate pattern to the wafer followed (2.5 μL dispense volume per well), resulting in a 15×15 point rectangle on the wafer (15 columns with base gradients). The wafer was dried overnight at room temperature and oven-dried for 2 minutes.

The final impregnation was a uniform dispensing (2.5 μL dispense volume per well, resulting a 10×15 point square)

from a stock solution vial of $Na_2Pt(OH)_6$ (from powder, 1% Pt) to the wafer (C6-C15.) as a ternary layer.

The wafer was dried at room temperature for 4 hours and then calcined in air at 450° C. for 2 hours followed by reduction with 5% $H_2/N_2$ at 250° C. for 2 hours. Commercial catalyst was slurried into 5 positions of the first row and last column as an external standard (3 μL). See FIGS. 1A-1C.

The library was screened in a scanning mass spectrometer ("SMS") for WGS activity with a $H_2/CO/CO_2/H_2O$ mixed feed at 200° C., 230° C. and 260° C.

This experiment demonstrated active and selective WGS catalyst formulations of various alkali and Pt containing formulations on the wafer.

Example 2

A 4" 16×16 quartz wafer was pre-coated with $ZrO_2$ (Norton $ZrO_2$ XZ16052) carrier by slurry dispensing 3 μL (1.5 g of $ZrO_2$ in 4 mL of EG/$H_2O$/MEO, 32.5:30:37.5) to each element of a 15×15 square on the wafer. The wafer was then oven-dried at 70° C. for 12 minutes.

The zirconia carrier pre-coated wafer was impregnated with a 8-point $Ce(NO_3)_3$ concentration gradient (0.25M Ce stock solution) and a 7-point $Fe(NO_3)_3$ concentration gradient (0.5M Fe stock solution) by Cavro dispensing from the Ce- and Fe-nitrate stock solution vials to a microtiter plate and diluting with distilled water. A replica transfer of the microtiter plate pattern to the wafer followed (2.5 μL dispense volume per well).

The wafer was dried for 4 hours at room temperature and then coated with Na- and K-hydroxide gradients by Cavro dispensing from NaOH (1M) and KOH (1M) stock solution vials to the microtiter plate and diluting with distilled water (sodium onto the upper and potassium onto the lower part of the wafer). A replica transfer of the microtiter plate pattern to the wafer followed (2.5 μL dispense volume per well, 7 replicas of the 8-point gradient and 8 replicas of the 7-point gradient, 7×8=56 point ternaries). The wafer was dried at room temperature overnight and oven-dried for 2 minutes.

The final impregnation was a uniform dispensing (2.5 μl dispense volume per well, resulting in a 15×15 point square) from a stock solution vial of $Pt(NH_3)_2(NO_2)_2$ (1% Pt) to the wafer. Six internal standards were synthesized by spotting 3 μL of $Pt(NH_3)_2(NO_2)_2$ stock solution (2.5% Pt) into the corresponding first row/last column positions.

Figure 2:
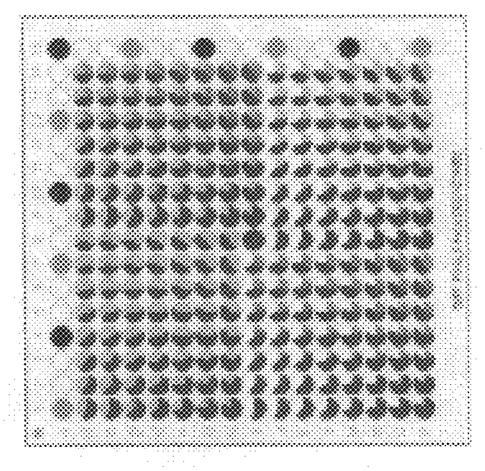
FIGS. 2A-2C illustrate the process of producing a library test wafer.
Figure 2:
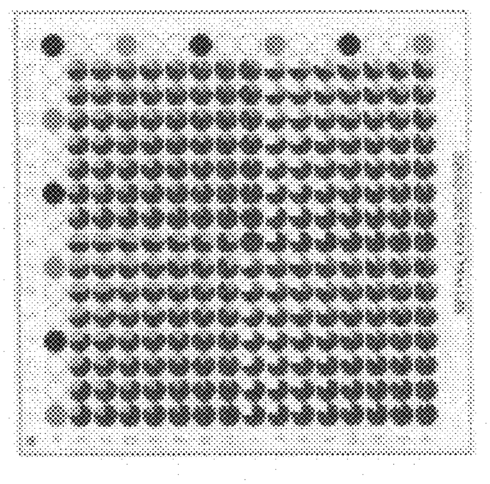
Figure 2:
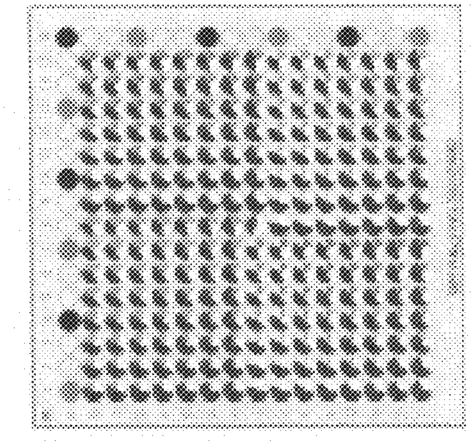
Figure 3:
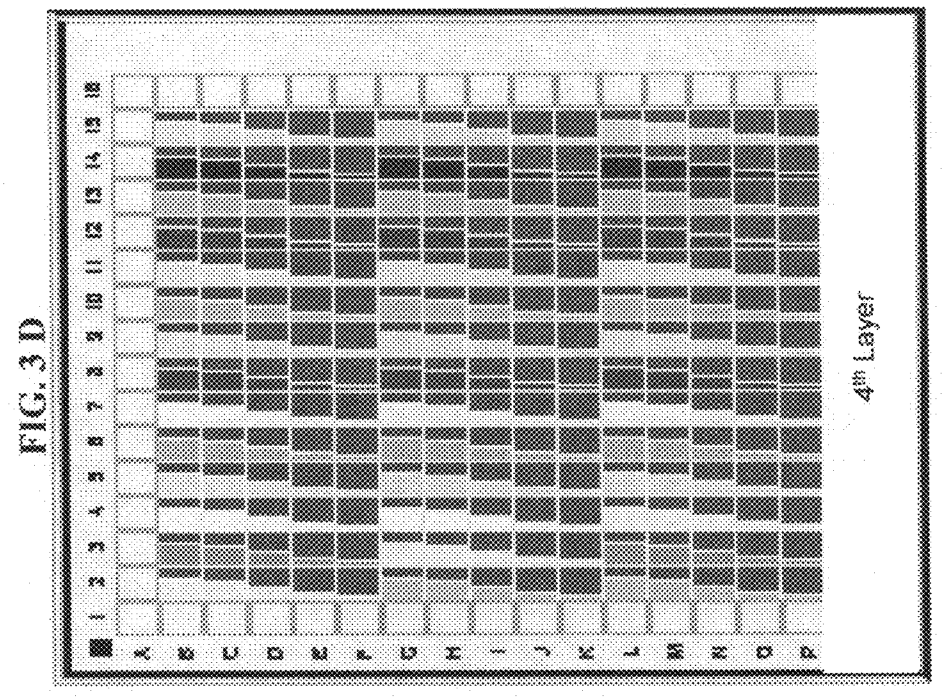
FIGS. 3A-3I, illustrate the process of producing a library test wafer.
FIGS. 3J-3K, illustrate SpotFire plots of the CO conversion versus $CO_2$ production for the wafer under WGS conditions at various temperatures. The legend for FIG. 3A also applies to FIGS. 3B-3I exclusively.
Figure 3:
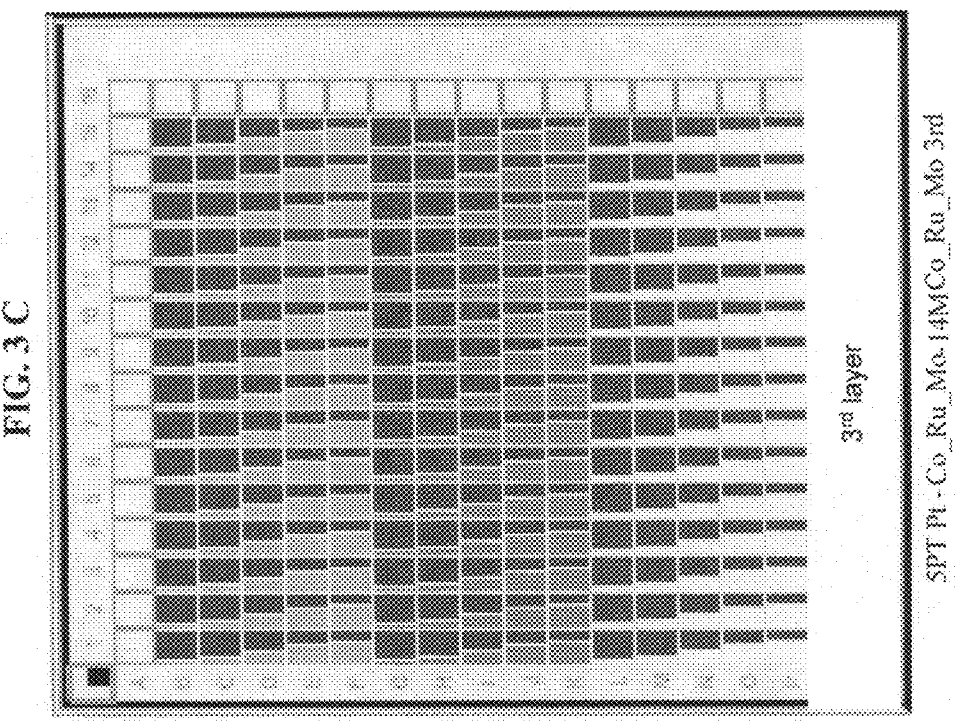
Figure 3:
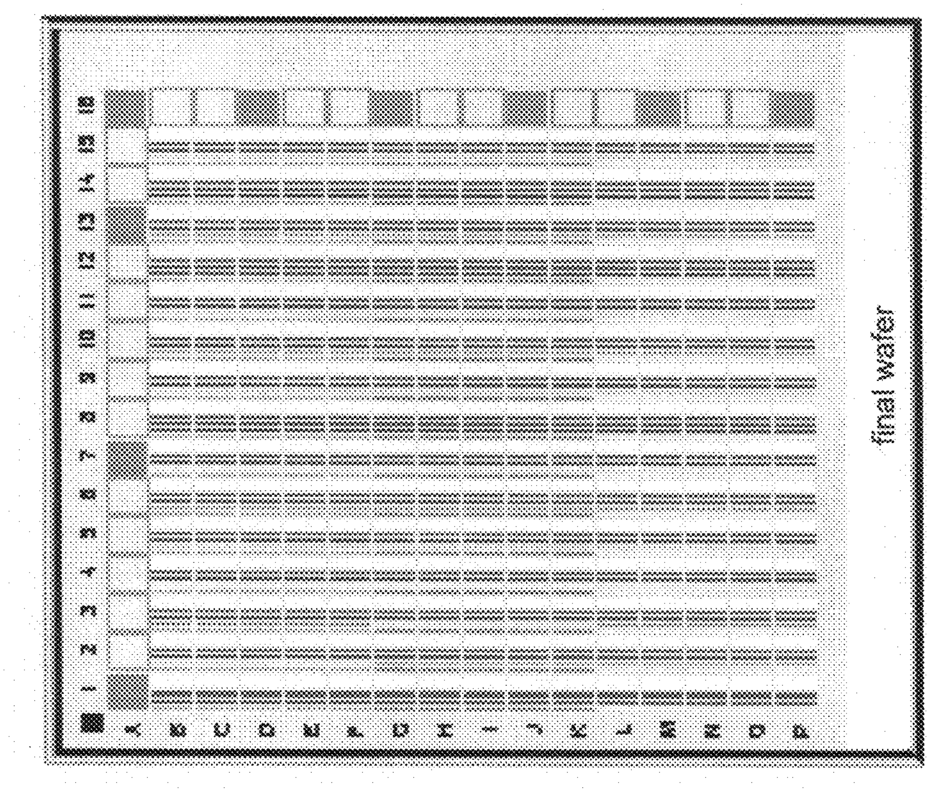
Figure 3:
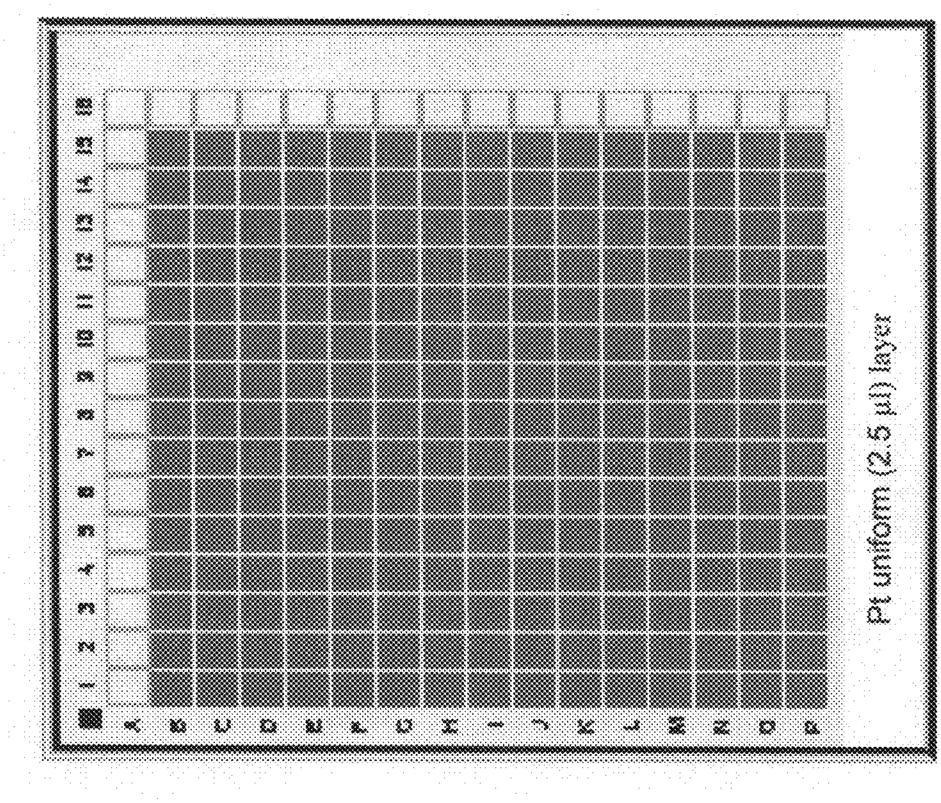
Figure 3:
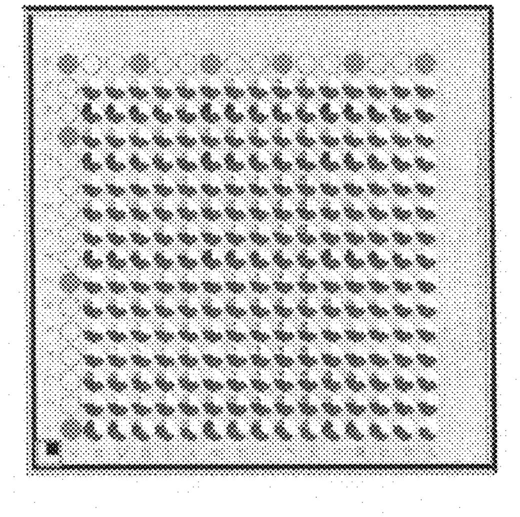
Figure 3:
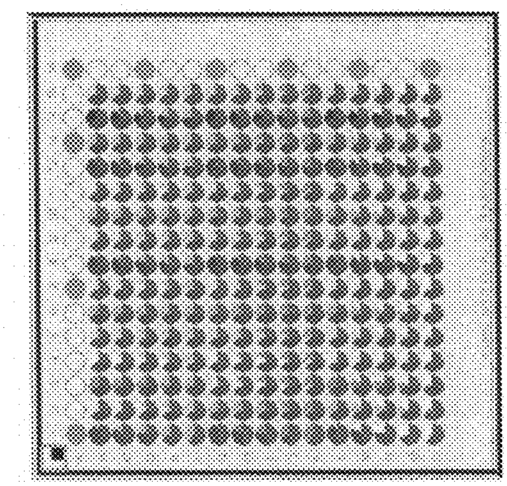
Figure 3:
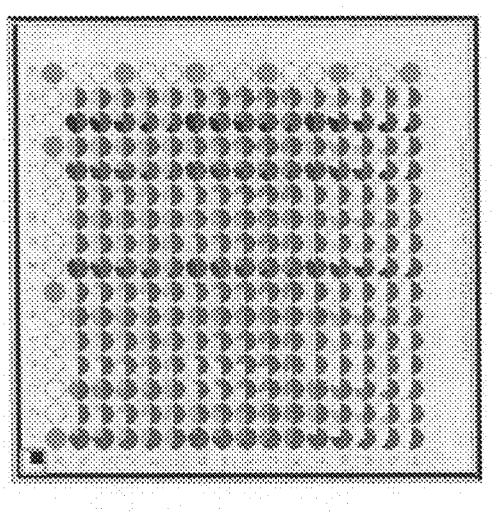
Figure 3:
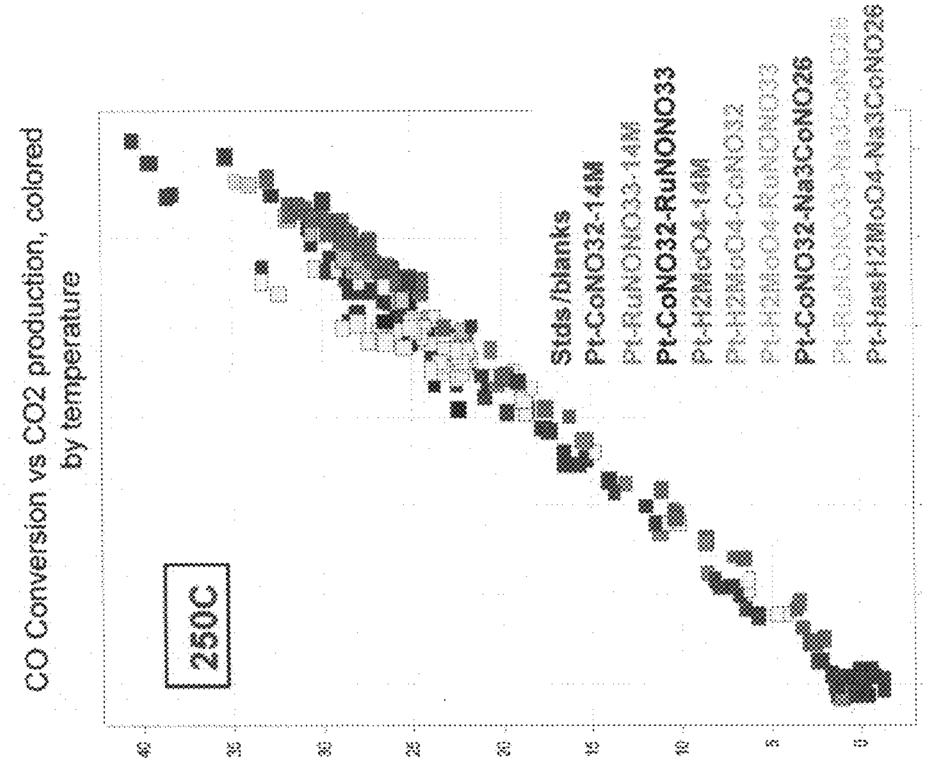
Figure 3:
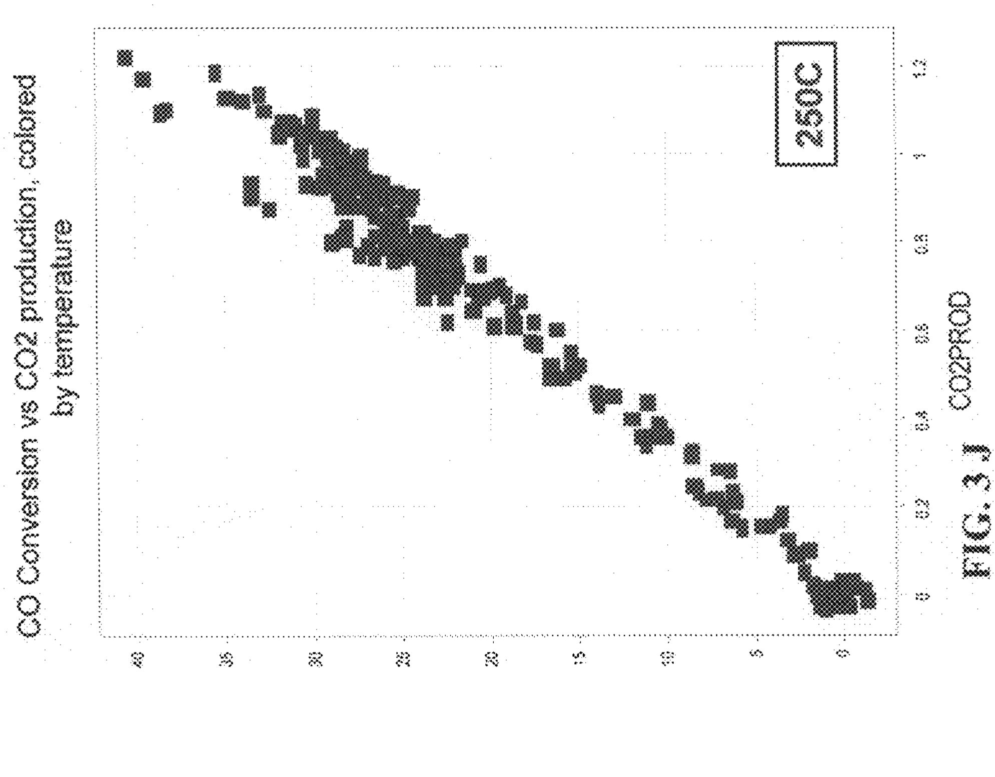
Figure 4:
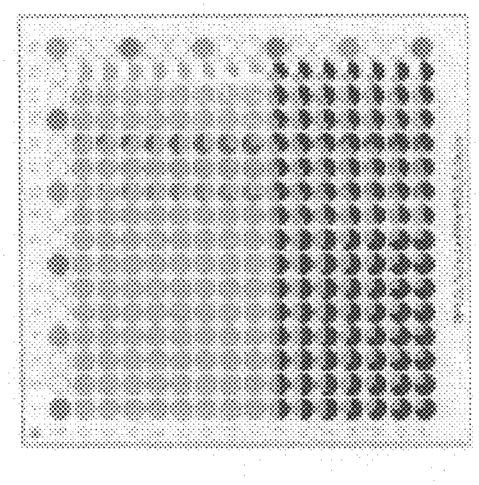
FIGS. 4A-4C illustrate the process of producing a library test wafer.
Figure 4:
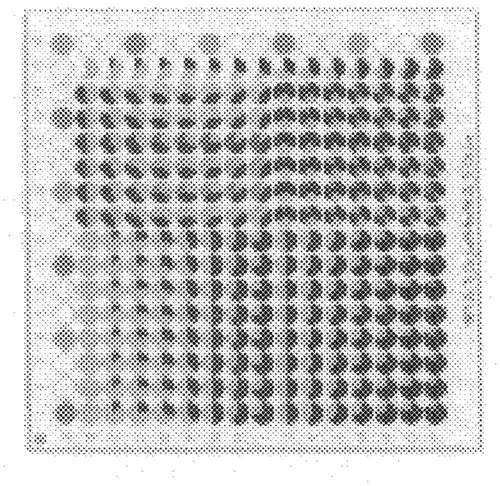
Figure 4:
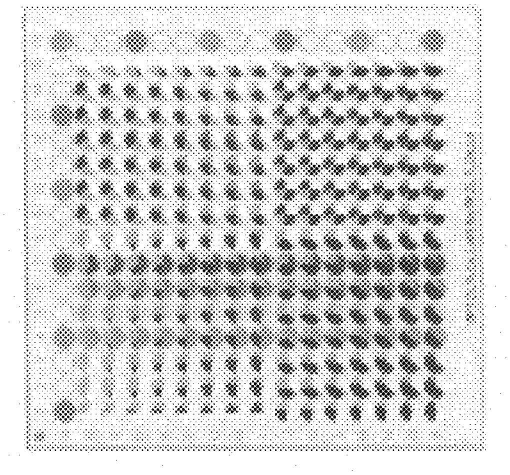
Figure 5D:
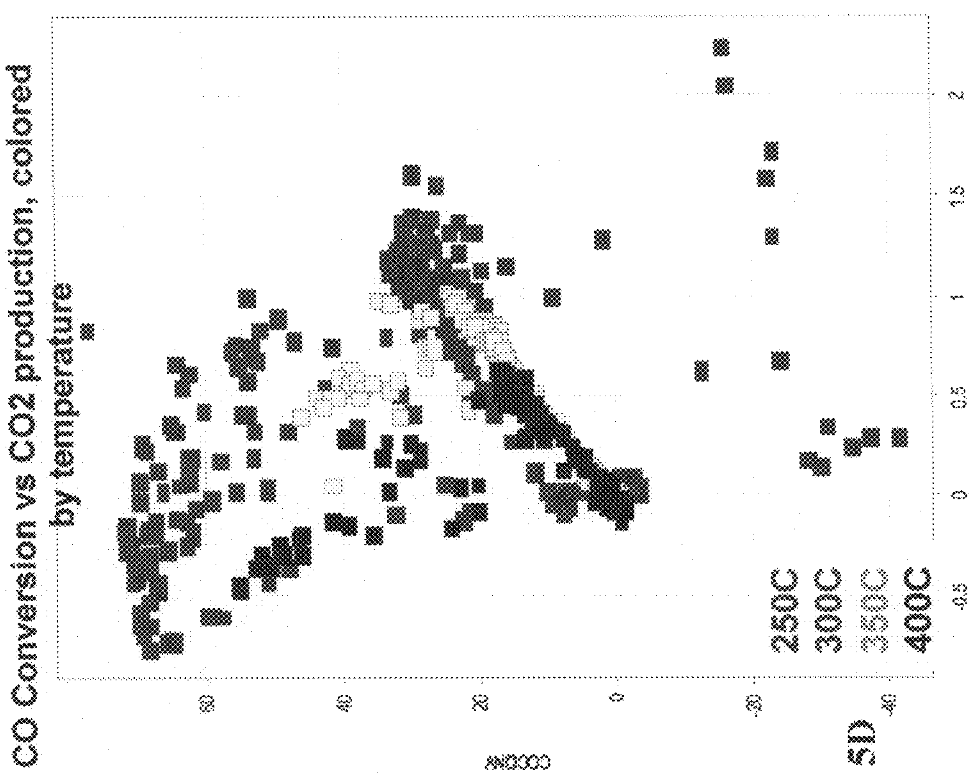
FIGS. 5D-5H illustrate SpotFire plots of the CO conversion versus $CO_2$ production for the wafer under WGS conditions. The legend for FIG. 5A also applies to FIGS. 5B and 5C exclusively.
Figure 5E:
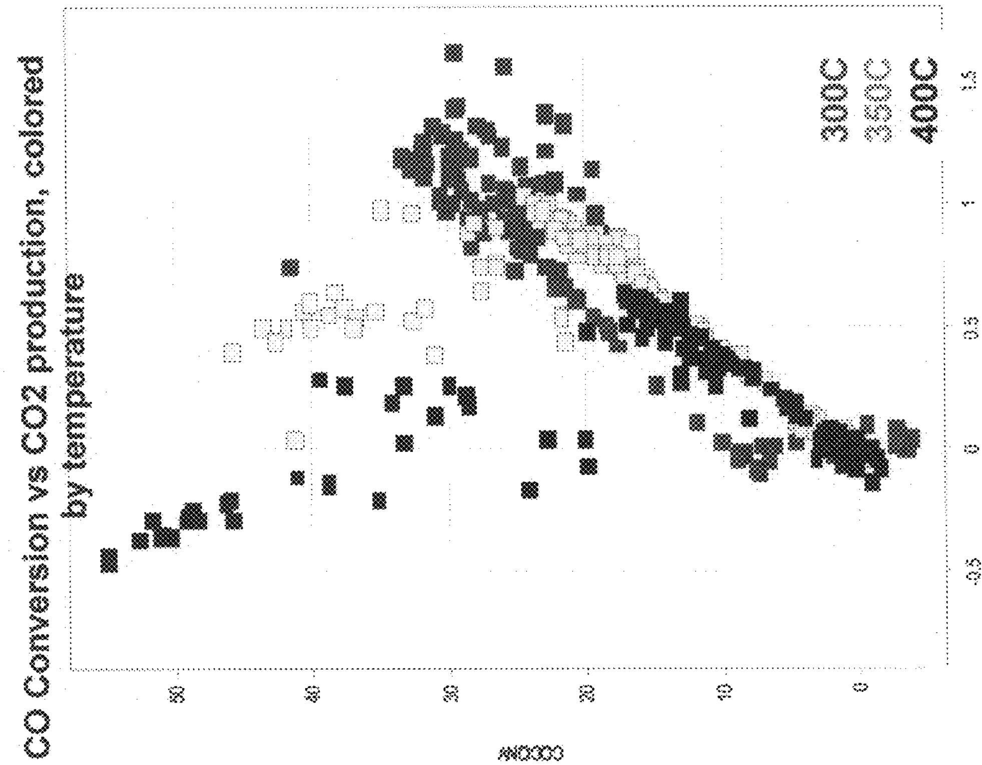
Figure 5G:
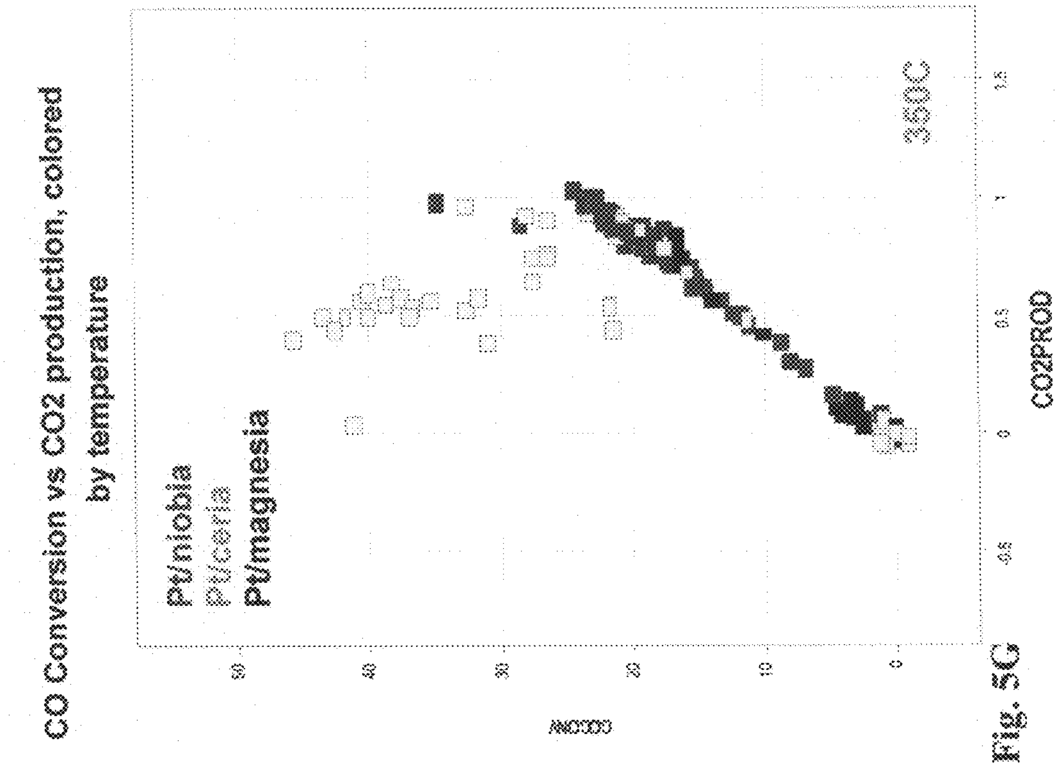
Figure 5F:
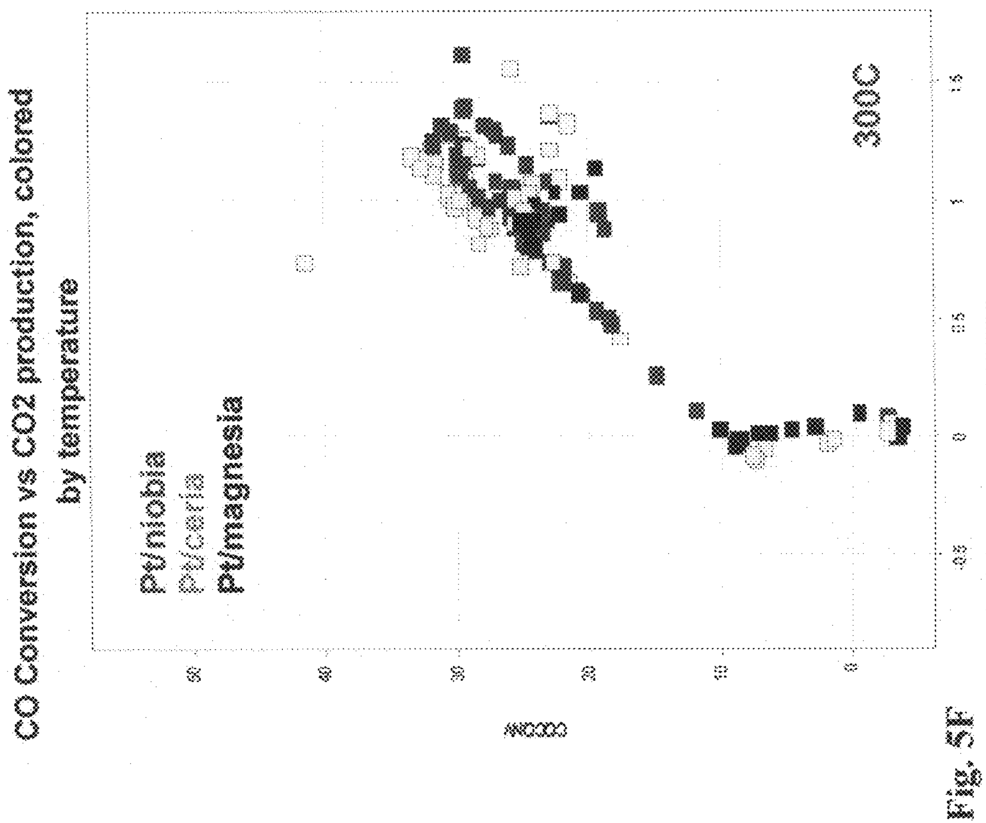
Figure 5H:
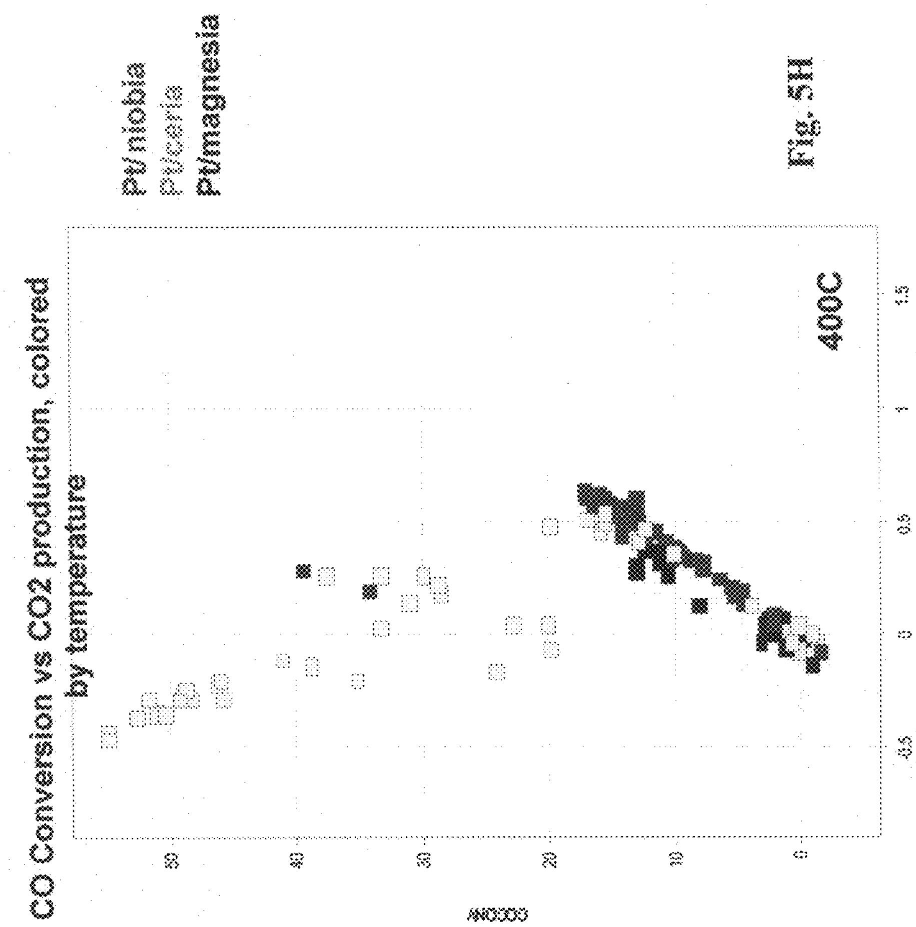
Figure 6:
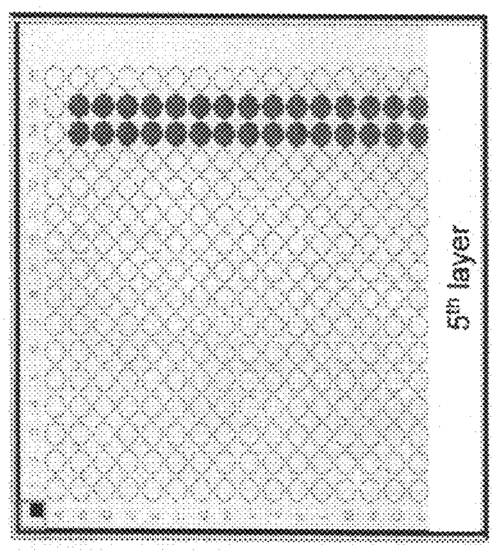
FIGS. 6A-6F, illustrate the process of producing a library test wafer.
FIGS. 6G, 6H, and 6I, illustrate SpotFire plots of the CO conversion versus $CO_2$ production for the wafer under WGS conditions at various temperatures. The legend for FIG. 6A also applies to FIGS. 6B-6F exclusively.
Figure 6:
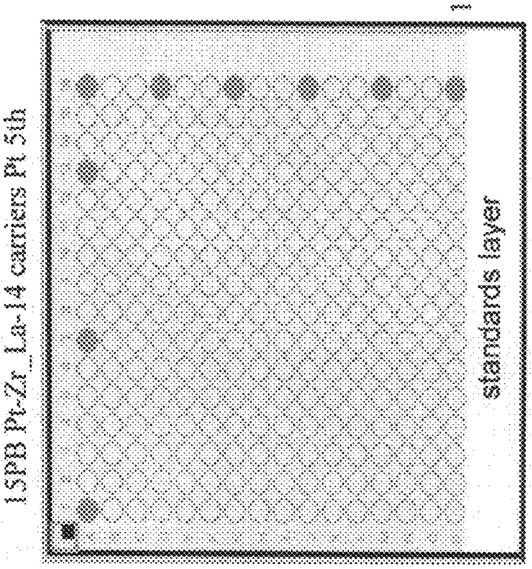
Figure 6:
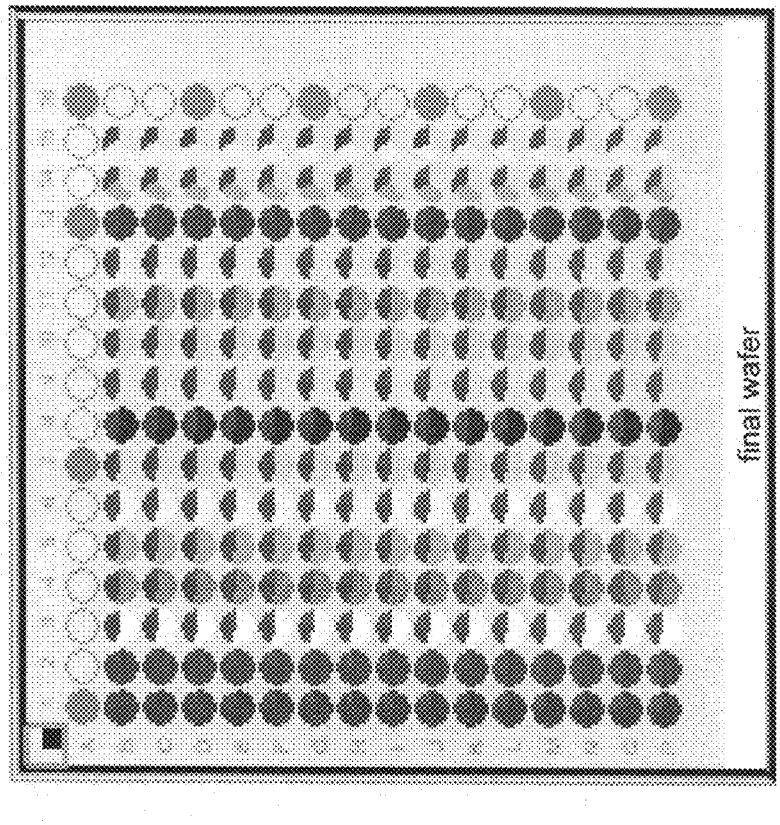
Figure 6:
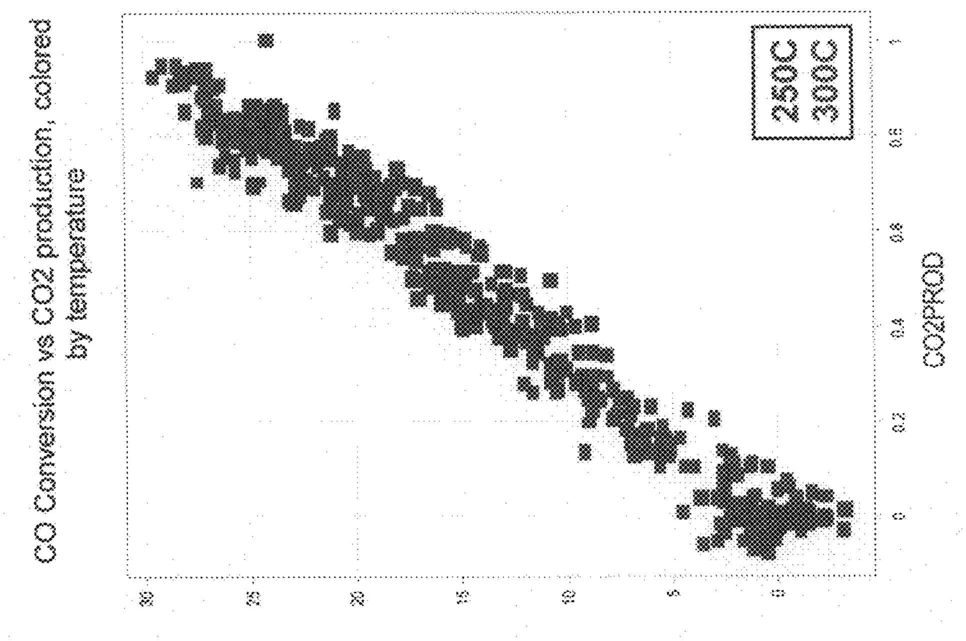
Figure 6:
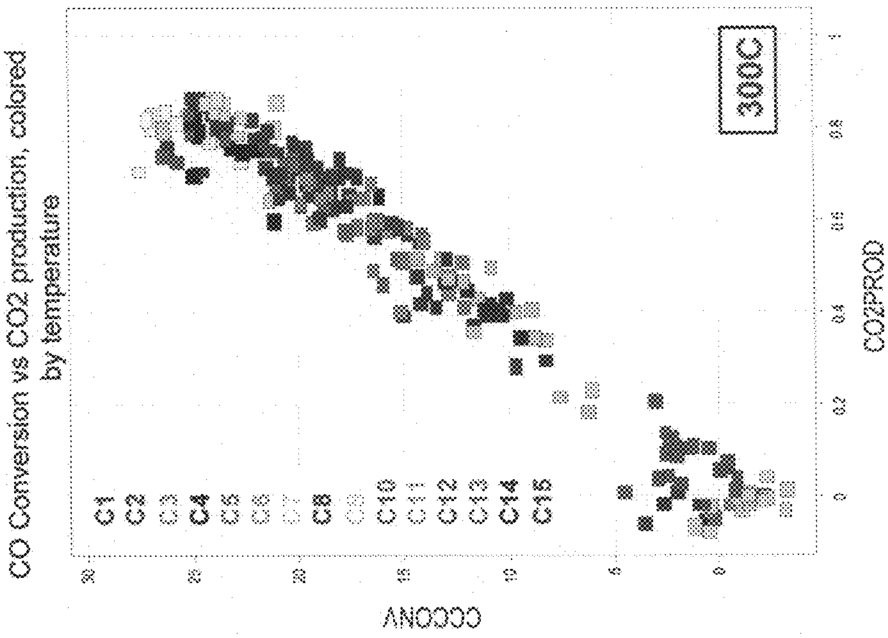
Figure 6:
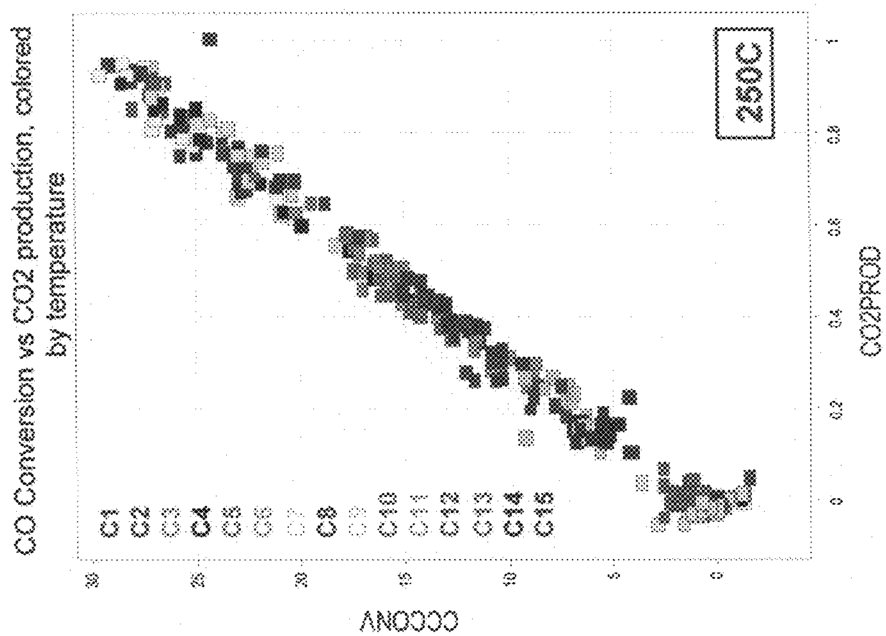

The wafer was dried at room temperature for 2 hours and then calcined in air at 450° C. for 2 hours followed by reduction with 5% $H_2/N_2$ at 200° C. for 2 hours. Commercial catalyst was slurried into 5 positions of the first row and last column as an external standard (3 μL). See FIGS. 2A-AC.

The library was then screened in SMS for WGS activity with a $H_2/CO/CO_2/H_2O$ mixed feed at 200° C., 230° C. and 260° C.

This experiment demonstrated active and selective WGS catalyst formulations of Pt, alkali and Fe or Ce containing formulations on the wafer.

Example 3

A 4" quartz wafer was pre-coated with a $ZrO_2$ (Norton XZ16052) carrier by slurry dispensing 3 μL (1.5 g of $ZrO_2$ in 4 mL of EG/$H_2O$/MEO, 32.5:30:37.5) to each element of a 15×15 square on the wafer. The wafer was then oven-dried at 70° C. for 12 minutes.

Nine internal standards were synthesized by Cavro spotting 2.5 μL of a $Pt(NH_3)_2(NO_2)_2$ (1% Pt) stock solution into the corresponding first row/last column positions. The wafer was impregnated with 3 metal gradients (5-point gradients) from top to bottom as follows: rows 2 through 6 with $Co(NO_3)_2$ (0.25M), rows 7 through 11 with $Ru(NO)(NO_3)_3$ (0.05M) and rows 12-16 with $H_2MoO_4$ (0.25M) by Cavro dispensing from the corresponding stock solution vials to a microtiter plate and diluted with distilled water. A replica transfer of the microtiter plate pattern to the wafer followed (2.5 μL dispense volume per well), resulting in three 5×15 point rectangles on the wafer.

The wafer was dried for 4 hours at room temperature and then coated with the following metal gradients (reverse gradients) from bottom to top to produce 5 point dopant binaries at various column/row positions on the wafer: $(NH_4)_2Ce(NO_3)_6$, $Co(NO_3)_2$, $Ru(NO)(NO_3)_3$, $H_2MoO_4$, $Co(OAc)_2$, $Na_3Co(NO_3)_6$, $KRuO_4$, $Ru(NO)(OAc)_3$, $La(NO_3)_3$, $Cd(NO_3)_3$, $ZrO(NO_3)_2$, $ZrO(OAc)_2$, $Cu(NO_3)_2$, $NH_4ReO_4$ and $Ge(OX)_2$ by Cavro dispensing from the respective stock solution vials to the microtiter plate and diluted with distilled water. A replica transfer of the microtiter plate to the wafer followed (2.5 μL dispense volume per well), resulting in three 5×15 point rectangles on the wafer.

The wafer was dried for 4 hours at room temperature and then coated with a uniform top layer (2.5 μL dispense volume per well) from the corresponding stock solution vials to the wafer consisting of $Pt(NH_3)_2(NO_2)_2$ (1% Pt) as a third layer.

The wafer was dried overnight at room temperature and then calcined in air at 350° C. for 2 hours followed by reduction with 5% $H_2/N_2$ at 300° C. for 2 hours. See FIGS. 3A-31.

The library was then screened in SMS for WGS activity with a $H_2/CO/CO_2/H_2O$ mixed feed at 250° C. Detailed test results, such as CO conversion, $CO_2$ production and $CH_4$ production at 250° C. for each of the 225 individual catalyst wells are presented in Table 1.

This experiment demonstrated that Pt—Co—Na where both Na and Co were derived from $Na_3Co(NO_2)_6$ exhibited WGS activity superior to the Pt/$ZrO_2$ standards. See FIGS. 3J-3K.

Example 4

A 4" quartz wafer was precoated with 7 different carriers by slurry dispensing an amount of 3 μL to vertical 15 point columns on the wafer. The carrier deposition was carried out with the following carriers: $CeO_2$, 99.5% (Alfa, 0.75 g in 4 mL of EG/$H_2O$, 50:50); $La_2O_3$, 99.9% (Gernch, 1.5 g in 4 mL of EG/$H_2O$/MEO, 40:30:30); $ZrVO_x$ (1 g in 4 mL of EG/$H_2O$, 50:50); $ZrO_2$ FZO 923 (MEI 1.5 g in 4 mL of EG/$H_2O$/MEO, 32.5:30:37.5); $TiO_2$ (Aerolyst 7708, P25, Degussa, 1 g in 4 mL of EG/$H_2O$/MEO, 32.5:30:37.5); $TiO_2$ VKR611 (BASF, 1 g in 4 mL of EG/$H_2O$/MEO, 32.5.5:30:37.5); $TiO_2$ XT25384 (Norton, 1 g in 4 mL of EG/$H_2O$/MEO, 32.5.5:30:37.5) and $ZrO_2$ XZ16052 (Norton, 1.5 g in 4 mL of EG/$H_2O$/MEO, 32.5.5:30:37.5). After dispensing, the samples were oven-dried at 70° C. for 12 minutes, except for the dispensed ceria from Alfa which was oven-dried for 24 minutes at 70° C.

Selected carrier pre-coated columns were impregnated by Cavro with 6 metal gradients from top to bottom: $Co(NO_3)_2$, $Fe(NO_3)_3$, $Ce(NO_3)_3$, $(NH_4)_2MoO_4$, $Pd(NH_3)_2(NO_2)_2$ and $La(NO_3)_3$ by Cavro dispensing from the corresponding stock solution vials to microtiter plate and diluting with distilled water. A replica transfer of the microtiter plate to the wafer followed (2.5 μL dispense volume per well), resulting in a 6×15 point rectangle on the wafer.

Six internal standards were synthesized by Cavro spotting of 3 μL of a $Pt(NH_3)_2(NO_2)_2$ (2.5% Pt) stock solution into the corresponding first row/last column positions and then the last column was coated with a uniform layer of $HAu(NO_3)_4$ (0.1M) by dispensing of 2 μL by pipette.

The non-impregnated columns were coated with 2 platinum gradients from bottom to top consisting of $Pt(NH_3)_2(NO_2)_2$ (1% Pt) by Cavro dispensing from the respective stock solution vials to the microtiter plate and diluting with distilled water. A replica transfer of the microtiter plate to the wafer followed (2.5 μL dispense volume per well), resulting in a 8×15 point rectangle on the wafer and dispensing 2.5 μl dispense volume per well.

The wafer was dried overnight at room temperature and then coated with a uniform layer of sodium hydroxide (NaOH, 1M) by Cavro dispensing (2.5 μL dispense volume per well) from the respective stock solution vial to water resulting in a 7×15 point rectangle on the lower part of the wafer.

The wafer was dried for 2 hours at room temperature and oven-dried for 2 minutes at 70° C. The last impregnation was a dispensing of the ternary layer to the columns with 2 Pt-gradients from bottom to top consisting of $Pt(NH_3)_2(NO_2)_2$ (1% Pt) by Cavro dispensing from the corresponding stock solution vial to the microtiter plate and diluting with distilled water. A replica transfer of the microtiter plate to the wafer followed (2.5 μL dispense volume per well), resulting in a 7×15 point rectangle on the wafer.

The wafer was dried at room temperature for 4 hours and then calcined in air at 500° C. for 2 hours followed by reduction with 5% $H_2/N_2$ at 500° C. for 2 hours. See FIGS. 4A-4C.

The library was then screened in SMS for WGS activity with a $H_2/CO/CO_2/H_2O$ mixed feed at 230° C. and 260° C. More detailed test results, such as CO conversion, $CO_2$ production and $CH_4$ production at 200° C. for each of the 225 individual catalyst wells are presented in Table 2.

This experiment demonstrated active and selective WGS catalyst formulations of Pt and alkali metal containing compositions on the wafer. Also the positive effect of Na post-impregnation is observed.

Example 5

A 3" quartz wafer was coated with niobia, ceria and magnesia carriers by slurry-dispensing aqueous carrier slurries onto the wafer (4 μl slurry/well, 1 g of carrier powder slurried in 2 ml $H_2O$ for niobia and ceria; 500 mg of carrier powder slurried in 2 ml $H_2O$ for magnesia). Niobia carriers were produced by Norton, product numbers 2001250214, 2000250356, 2000250355, 2000250354 and 2000250351. Cerias came from Norton (product numbers 2001080053, 2001080052 and 2001080051) and Aldrich (product number 21,157-50. Magnesia was obtained from Aldrich (product number 24,338-8).

The carrier precoated wafer was then loaded with the same Pt gradient for each carrier in a single impregnation step by liquid dispensing 3 μl $Pt(NH_3)_2(NO_2)_2$ solution (5% Pt) from microtiter plate to wafer. The wafer was dried and then reduced in 5% $H_2/Ar$ at 450° C. for 2 hours. See FIGS. 5A-5C.

The reduced library was then screened in SMS for WGS activity with a $H_2/CO/CO_2/H_2O$ mixed feed at 250° C., 300° C., 350° C., and 400° C. Results at 250° C., 300° C., 350° C., and 400° C. are presented in FIGS. 5D-5H. This set of experiments demonstrated active and selective WGS catalyst formulations of various Pt on one of Nb oxide, Ce oxide or Mg oxide formulations on the wafer. Various Norton niobia carriers were found to be very active and selective over a broad temperature range. Norton ceria 2001080051 was found to be very selective at higher temperatures. Magnesia was less active than either of niobia or ceria but did exhibit highly selective WGS performance.

Example 6

A 4" quartz wafer was coated with fourteen different catalyst carriers by slurry-dispensing the carrier slurries onto the wafer. The carriers were slurried in a mixture of $EG/H_2O/MEO$ at a ratio of 40:30:30. Each wafer column was coated with a different carrier, except for columns 14 and 15 which were both coated with gamma-alumina, described below:

1) Ceria, 99.5% purity; 9 to 15 nm particle size; BET ($m^2/g$): 55-95; Alfa 43136; dispensed onto the wafer from a slurry of 0.75 g powder slurried in 4 mL $EG/H_2O/MEO$.
2) Ceria, produced by the low temperature calcination of precipitated Ce hydroxide; dispensed onto the wafer from a slurry of 1.5 g powder slurried in 4 mL $EG/H_2O/MEO$.
3) Zirconia; 99.8% purity; BET ($m^2/g$): greater than 90; Norton XZ16052; dispensed onto the wafer from a slurry of 1.5 g powder slurried in 4 mL $EG/H_2O/MEO$.
4) Zirconia; 99.8% purity; BET ($m^2/g$): 269; Norton XZ16154; dispensed onto the wafer from a slurry of 1.5 g powder slurried in 4 mL $EG/H_2O/MEO$.
5) Titania; BET ($m^2/g$): 45; Degussa Aerolyst 7708; dispensed onto the wafer from a slurry of 1.0 g powder slurried in 4 mL $EG/H_2O/MEO$.
6) Titania; 99% purity; BET ($m^2/g$): 37; Norton XT25384; dispensed onto the wafer from a slurry of 1.0 g powder slurried in 4 mL $EG/H_2O/MEO$.
7) Niobia; 97% purity; BET ($m^2/g$): 27; Norton 2000250355; dispensed onto the wafer from a slurry of 1.0 g powder slurried in 4 mL $EG/H_2O/MEO$.
8) Lanthania; 99.999% purity; Gemre-5N from Gemch Co., Ltd. (Shanghai, China); dispensed onto the wafer from a slurry of 1.5 g powder slurried in 4 mL $EG/H_2O/MEO$.
9) Mixed Fe—Ce—O; coprecipitated Fe and Ce oxalate; calcined at 360° C.; dispensed onto the wafer from a slurry of 1.0 g powder slurried in 4 mL $EG/H_2O/MEO$.
10) Mixed La—Ce—O; coprecipitated La and Ce oxalate; calcined at 760° C.; dispensed onto the wafer from a slurry of 1.0 g powder slurried in 4 mL $EG/H_2O/MEO$.
11) Mixed $Sb_3O_4$—$SnO_2$ carrier from Alfa; 99.5% purity; BET ($m^2/g$): 30-80; $Sb_3O_4$:$SnO_2$ ratio is 10:90 by weight; dispensed onto the wafer from a slurry of 1.0 g powder slurried in 4 mL $EG/H_2O/MEO$.
12) Mixed Fe—Cr—Al—O; commercially available high temperature water gas shift catalyst; dispensed onto the wafer from a slurry of 1.0 powder slurried in 4 mL. $EG/H_2O/MEO$.
13) $Fe_2O_3$/FeOOH; BET ($m^2/g$): 14; 50:50 physical mixture of commercial powders (Bayferrox 720N: Bayoxide E3920 from Bayer); dispensed onto the wafer from a slurry of 1.0 g powder slurried in 4 mL $EG/H_2O/MEO$.
14 and 15) Gamma-$Al_2O_3$; BET ($m^2/g$): 150; Condea Catalox Sbal50; dispensed onto the wafer from a slurry of 1.0 g powder slurried in 4 mL $EG/H_2O/MEO$.

In all cases, except for carrier 1, the slurries were applied in 3 μl/well; carrier 1 was deposited as two aliquots of 3 μl/well. The wafer was then dried at 70° C. for 10 minutes.

Columns 14 and 15 were coated with 2.5 μl/well of zirconyl nitrate (0.25 M) and lanthanum nitrate (0.25 M), respectively, then dried for 10 minutes at 70° C. The first 13 columns of the carrier coated wafer were then loaded with a 15 point Pt gradient by liquid dispensing of 3 μl $Pt(NH_3)_2(NO_2)_2$ solution (1% Pt) from microtiter plate to wafer. The wafer was dried at 70° C. for 10 minutes. Columns 14 and 15 were then loaded with a 15 point Pt gradient by liquid dispensing of 3 μl $Pt(NH_3)_2(NO_2)_2$ solution (1% Pt) from microtiter plate to wafer. The wafer was dried at 70° C. for 10 minutes, calcined in air at 350° C. for 2 hours, then reduced in 5% $H_2$/Ar at 450° C. for 2 hours. Six internal standards were synthesized by spotting 3 μl $Pt(NH_3)_2(NO_2)_2$ solution (1.0% Pt) into the corresponding first row/last column positions. See FIGS. 6A-6F.

The reduced library was then screened in SMS for WGS activity with a $H_2/CO/CO_2/H_2O$ mixed feed at 250° C. and 300° C. The CO conversion versus $CO_2$ production results at 250° C. and 300° C. are presented in FIGS. 6G, 6H, and 61. More detailed test results, such as, CO conversion, $CO_2$ production and $CH_4$ production at 250° C. and 300° C. for each of the 225 individual catalyst wells on the test wafer are presented in Table 3.

This set of experiments demonstrated active and selective WGS catalyst formulations of various Pt on various of the oxide carrier formulations on the wafer.

Example 7

Scale-up catalyst samples were prepared by using incipient wetness impregnation of 0.75 grams of $ZrO_2$ support (Norton, 80-120 mesh) which had been weighed into a 10-dram vial. Aqueous metal precursor salt solutions were then added in the order: Co, Mo, or V, Pt, and then K. The precursor salt solutions were tetraammineplatinum (II) hydroxide (9.09% Pt (w/w)), cobalt (II) nitrate (11.0M), molydbic acid (1.0M), vanadium citrate (1.0M), and potassium hydroxide (13.92% K). All reagents were nominally research grade from Aldrich, Strem, or Alfa. Following each metal addition, the catalysts were dried at 80° C. overnight and then calcined in air as follows:

| | |
|---|---|
| After Pt addition | 300° C. for 3 hours |
| After Co addition | 450° C. for 3 hours |
| After Mo or V addition | 350° C. for 3 hours |

Following K addition, the catalysts were calcined at 300° C. for 3 hours, then the catalysts were reduced in-situ at 300° C. for 3 hours in a 10% $H_2/N_2$ feed.

Catalyst Testing Conditions

Catalysts were tested in a fixed bed reactor. Approximately 0.15 g of catalyst was weighed and mixed with an equivalent mass of SiC. The mixture was loaded into a reactor and heated to reaction temperature. Reaction gases were delivered via mass flow controllers (Brooks) with water introduced with a metering pump (Quizix). The composition of the reaction mixture was as follows: $H_2$ 50%, CO 10%, $CO_2$ 10%, and $H_2O$ 30%. The reactant mixture was passed through a preheater before contacting the catalyst bed. Following reaction, the product gases were analyzed using a micro gas chromatograph (Varian Instruments, or Shimadzu). Compositional data on the performance diagram (FIG. 7) is on a dry basis with water removed.

Testing Results

Figure 7:
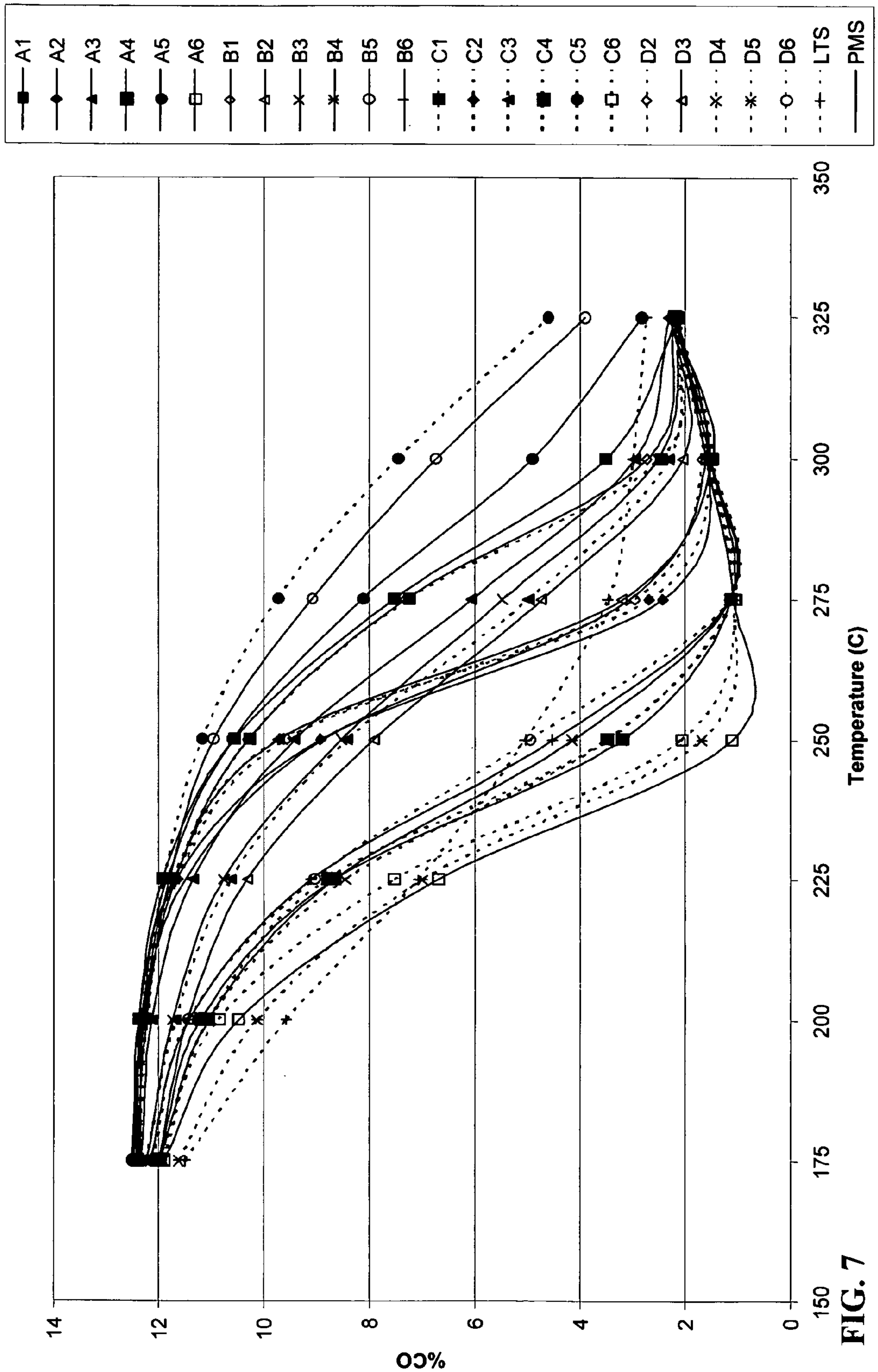
FIG. 7 illustrates plots of CO concentration versus temperature for scaled-up catalyst samples under WGS conditions.

FIG. 7 shows the CO composition in the product stream following the scale-up testing at a gas hour space velocity of 50,000 $h^{-1}$.

TABLE 4

| Catalyst Compositions (mass ratio) | | | | | | | | |
|---|---|---|---|---|---|---|---|---|
| Row | Col | ZrO2 | Co | Water | Pt | K | Mo | V |
| 1 | 1 | 0.91 | 0.005 | 0 | 0.06 | 0.025 | 0 | 0 |
| 1 | 2 | 0.885 | 0.005 | 0 | 0.06 | 0.05 | 0 | 0 |
| 1 | 3 | 0.91 | 0 | 0 | 0.06 | 0.025 | 0.005 | 0 |
| 1 | 4 | 0.885 | 0 | 0 | 0.06 | 0.05 | 0.005 | 0 |
| 1 | 5 | 0.905 | 0 | 0 | 0.06 | 0.025 | 0 | 0.01 |
| 1 | 6 | 0.88 | 0 | 0 | 0.06 | 0.05 | 0 | 0.01 |
| 2 | 1 | 0.905 | 0.01 | 0 | 0.06 | 0.025 | 0 | 0 |
| 2 | 2 | 0.88 | 0.01 | 0 | 0.06 | 0.05 | 0 | 0 |
| 2 | 3 | 0.905 | 0 | 0 | 0.06 | 0.025 | 0.01 | 0 |
| 2 | 4 | 0.88 | 0 | 0 | 0.06 | 0.05 | 0.01 | 0 |
| 2 | 5 | 0.895 | 0 | 0 | 0.06 | 0.025 | 0 | 0.02 |
| 2 | 6 | 0.87 | 0 | 0 | 0.06 | 0.05 | 0 | 0.02 |
| 3 | 1 | 0.9 | 0.015 | 0 | 0.06 | 0.025 | 0 | 0 |
| 3 | 2 | 0.875 | 0.015 | 0 | 0.06 | 0.05 | 0 | 0 |
| 3 | 3 | 0.9 | 0 | 0 | 0.06 | 0.025 | 0.015 | 0 |
| 3 | 4 | 0.875 | 0 | 0 | 0.06 | 0.05 | 0.015 | 0 |
| 3 | 5 | 0.885 | 0 | 0 | 0.06 | 0.025 | 0 | 0.03 |
| 3 | 6 | 0.86 | 0 | 0 | 0.06 | 0.05 | 0 | 0.03 |
| 4 | 1 | 0.895 | 0.02 | 0 | 0.06 | 0.025 | 0 | 0 |
| 4 | 2 | 0.87 | 0.02 | 0 | 0.06 | 0.05 | 0 | 0 |
| 4 | 3 | 0.895 | 0 | 0 | 0.06 | 0.025 | 0.02 | 0 |
| 4 | 4 | 0.87 | 0 | 0 | 0.06 | 0.05 | 0.02 | 0 |
| 4 | 5 | 0.875 | 0 | 0 | 0.06 | 0.025 | 0 | 0.04 |
| 4 | 6 | 0.85 | 0 | 0 | 0.06 | 0.05 | 0 | 0.04 |

Example 8

Scale-up catalyst samples were prepared by using incipient wetness impregnation of 0.75 grams of $ZrO_2$ support (Norton, 80-120 mesh) which had been weighed into a 10-dram vial. Aqueous metal precursor salt solutions were then added in the order: Co, Mo, or V, Pt, and then Li. The precursor salt solutions were tetraammineplatinum (II) hydroxide (9.09% Pt (w/w)), cobalt (II) nitrate (1.0M), molydbic acid (1.0M), vanadium citrate (1.0M), and lithium hydroxide monohydrate (2.5M). All reagents were nominally research grade from Aldrich, Strem, or Alfa. Following each metal addition, the catalysts were dried at 80° C. overnight and then calcined in air as follows:

| | |
|---|---|
| After Pt addition | 300° C. for 3 hours |
| After Co addition | 450° C. for 3 hours |
| After Mo, or V addition | 350° C. for 3 hours |
| After Li addition | 300° C. for 3 hours. |

Following final addition, the catalysts were reduced in-situ at 300° C. for 3 hours in a 10% $H_2/N_2$ feed.

Catalyst Testing Conditions

Catalysts were tested in a fixed bed reactor. Approximately 0.15 g of catalyst was weighed and mixed with an equivalent mass of SiC. The mixture was loaded into a reactor and heated to reaction temperature. Reaction gases were delivered via mass flow controllers (Brooks) with water introduced with a metering pump (Quizix). The composition of the reaction mixture was as follows: $H_2$ 50%, CO 10%, $CO_2$ 10%, and $H_2O$ 30%. The reactant mixture was passed through a preheater before contacting the catalyst bed. Following reaction, the product gases were analyzed using a micro gas chromatograph (Varian Instruments, or Shimadzu). Compositional data on the performance diagram (FIG. 8) is on a dry basis with water removed.

Testing Results

Figure 8:
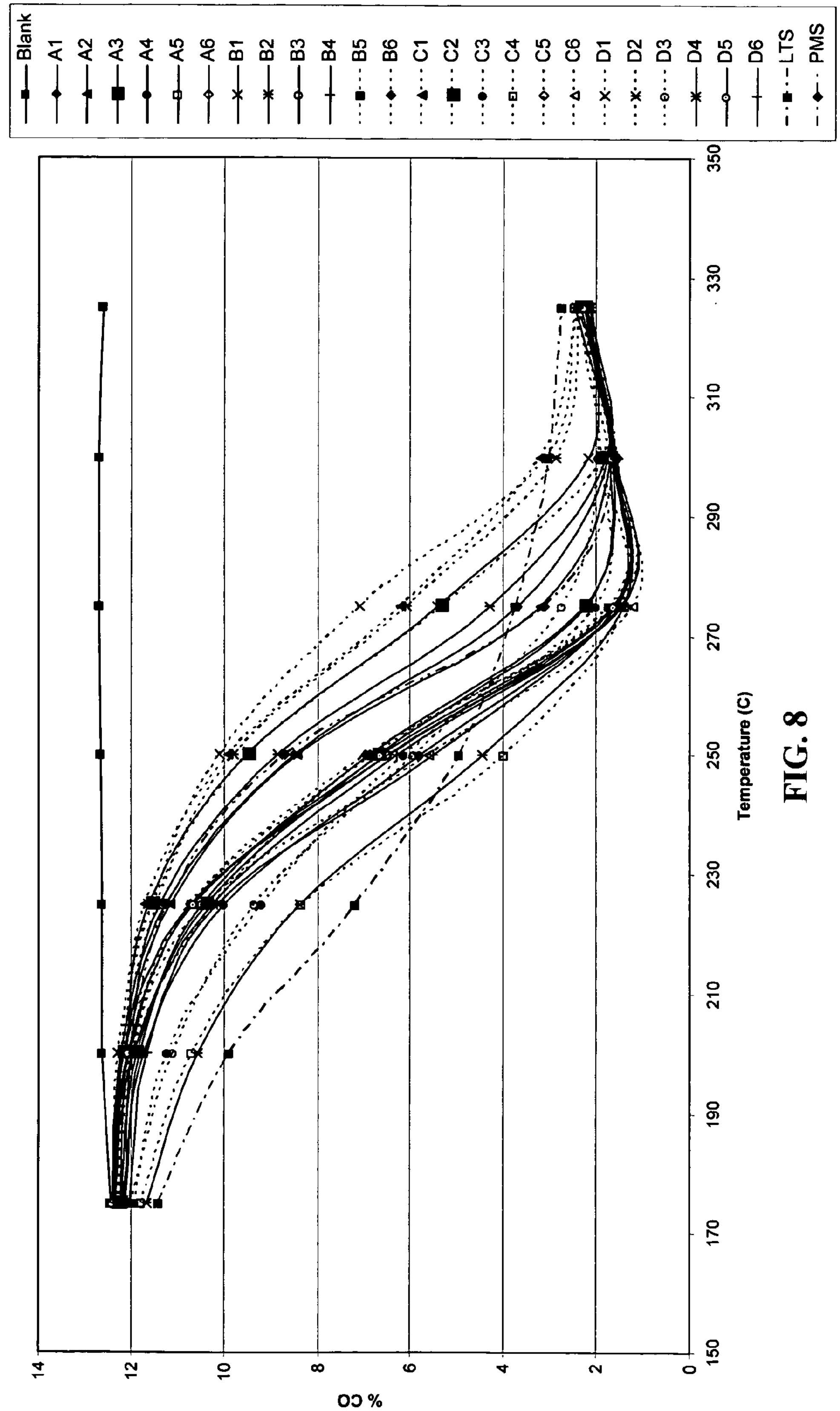
FIG. 8 illustrates plots of CO concentration versus temperature for scaled-up catalyst samples under WGS conditions.

FIG. 8 shows the CO composition in the product stream following the scale-up testing at a gas hour space velocity of 50,000 $h^{-1}$.

TABLE 5

| Catalyst Compositions (mass ratio) | | | | | | | | |
|---|---|---|---|---|---|---|---|---|
| Row | Col | ZrO2 | Co | Water | Pt | Li | Mo | V |
| A | 1 | 0.91 | 0.005 | 0 | 0.06 | 0.025 | 0 | 0 |
| A | 2 | 0.91 | 0.005 | 0 | 0.06 | 0.025 | 0 | 0 |
| A | 3 | 0.91 | 0 | 0 | 0.06 | 0.025 | 0.005 | 0 |
| A | 4 | 0.91 | 0 | 0 | 0.06 | 0.025 | 0.005 | 0 |
| A | 5 | 0.905 | 0 | 0 | 0.06 | 0.025 | 0 | 0.01 |
| A | 6 | 0.905 | 0 | 0 | 0.06 | 0.025 | 0 | 0.01 |
| B | 1 | 0.905 | 0.01 | 0 | 0.06 | 0.025 | 0 | 0 |
| B | 2 | 0.905 | 0.01 | 0 | 0.06 | 0.025 | 0 | 0 |
| B | 3 | 0.905 | 0 | 0 | 0.06 | 0.025 | 0.01 | 0 |
| B | 4 | 0.905 | 0 | 0 | 0.06 | 0.025 | 0.01 | 0 |
| B | 5 | 0.895 | 0 | 0 | 0.06 | 0.025 | 0 | 0.02 |
| B | 6 | 0.895 | 0 | 0 | 0.06 | 0.025 | 0 | 0.02 |
| C | 1 | 0.9 | 0.015 | 0 | 0.06 | 0.025 | 0 | 0 |
| C | 2 | 0.9 | 0.015 | 0 | 0.06 | 0.025 | 0 | 0 |
| C | 3 | 0.9 | 0 | 0 | 0.06 | 0.025 | 0.015 | 0 |
| C | 4 | 0.9 | 0 | 0 | 0.06 | 0.025 | 0.015 | 0 |
| C | 5 | 0.885 | 0 | 0 | 0.06 | 0.025 | 0 | 0.03 |
| C | 6 | 0.885 | 0 | 0 | 0.06 | 0.025 | 0 | 0.03 |
| D | 1 | 0.895 | 0.02 | 0 | 0.06 | 0.025 | 0 | 0 |
| D | 2 | 0.895 | 0.02 | 0 | 0.06 | 0.025 | 0 | 0 |
| D | 3 | 0.895 | 0 | 0 | 0.06 | 0.025 | 0.02 | 0 |
| D | 4 | 0.895 | 0 | 0 | 0.06 | 0.025 | 0.02 | 0 |
| D | 5 | 0.875 | 0 | 0 | 0.06 | 0.025 | 0 | 0.04 |
| D | 6 | 0.875 | 0 | 0 | 0.06 | 0.025 | 0 | 0.04 |

Example 9

Scale-up catalyst samples were prepared by using incipient wetness impregnation of 0.75 grams of $ZrO_2$ support (Norton, 80-120 mesh) which had been weighed into a 10-dram vial. Aqueous metal precursor salt solutions were then added in the order: La, Ce, one of Co, Mo, or V, Pt, and finally Na. The precursor salt solutions were tetraammineplatinum (II) hydroxide (9.09% Pt (w/w)), lanthanum (III) nitrate (1.0M), cerium (IV) nitrate (1.0N), cobalt (II) nitrate (11.0M), molybdic acid (1.0M), vanadium citrate (1.0M), and sodium hydroxide (3.0N). All reagents were nominally research grade from Aldrich, Strem, or Alfa. Following each metal addition, the catalysts were dried at 80° C. overnight and then calcined in air as follows:

| | |
|---|---|
| After Pt addition | 300° C. for 3 hours |
| After La or Ce addition | 450° C. for 3 hours |
| After Co, Mo, or V addition | 350° C. for 3 hours. |

Following Na addition, the catalysts were calcined at 300° C. for 3 hours, then the catalysts were reduced in-situ at 300° C. for 3 hours in a 10% $H_2/N_2$ feed.

Catalyst Testing Conditions

Catalysts were tested in a fixed bed reactor. Approximately 0.15 g of catalyst was weighed and mixed with an equivalent mass of SiC. The mixture was loaded into a reactor and heated to reaction temperature. Reaction gases were delivered via mass flow controllers (Brooks) with water introduced with a metering pump (Quizix). The composition of the reaction mixture was as follows: $H_2$ 50%, CO 10%, $CO_2$ 10%, and $H_2O$ 30%. The reactant mixture was passed through a preheater before contacting the catalyst bed. Following reaction, the product gases were analyzed using a micro gas chromatograph (Varian Instruments, or Shimadzu). Compositional data on the performance diagram (FIG. 9) is on a dry basis with water removed.

Testing Results

Figure 9:
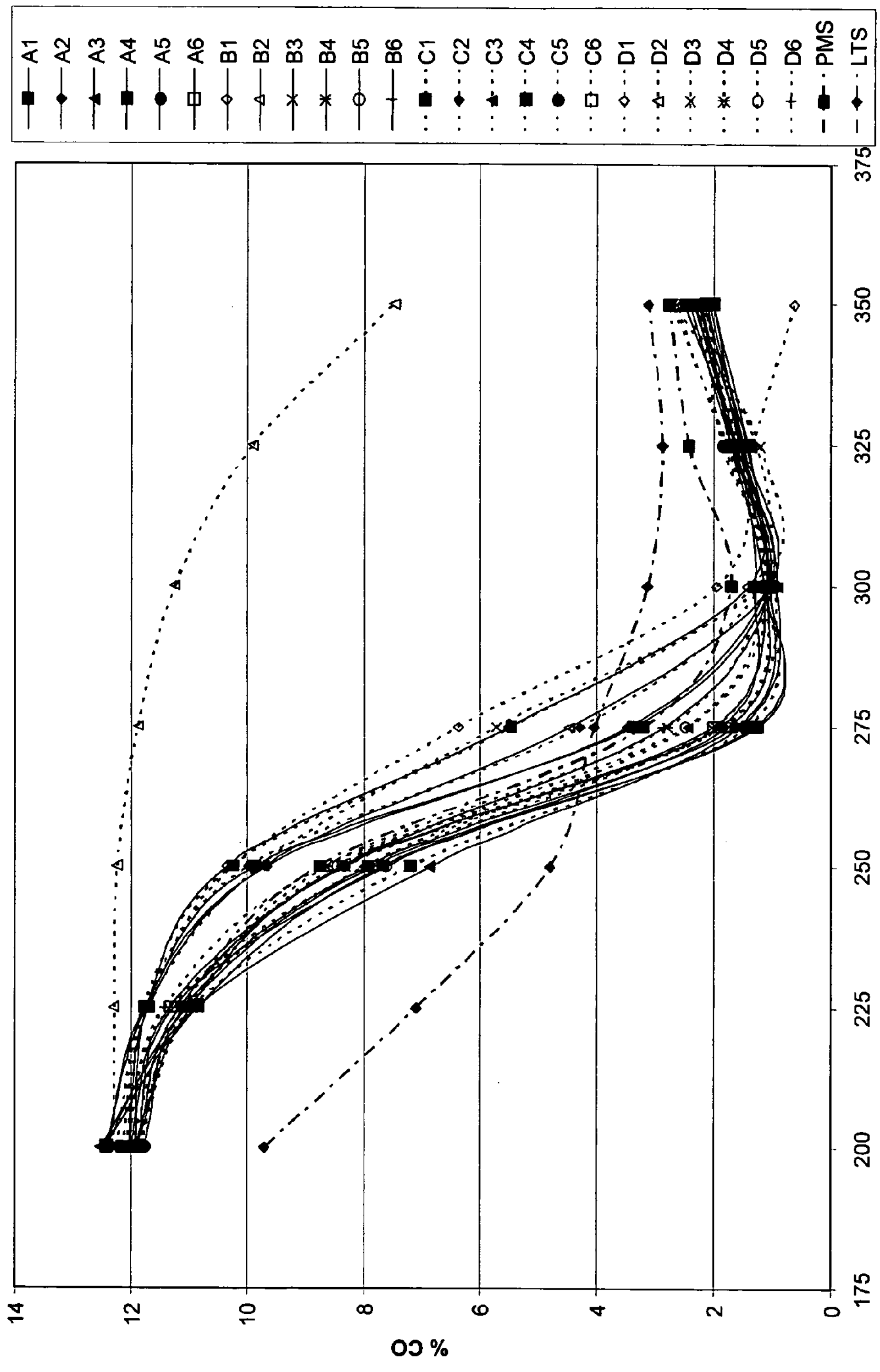
FIG. 9 illustrates plots of CO concentration versus temperature for scaled-up catalyst samples under WGS conditions.
Figure 10:
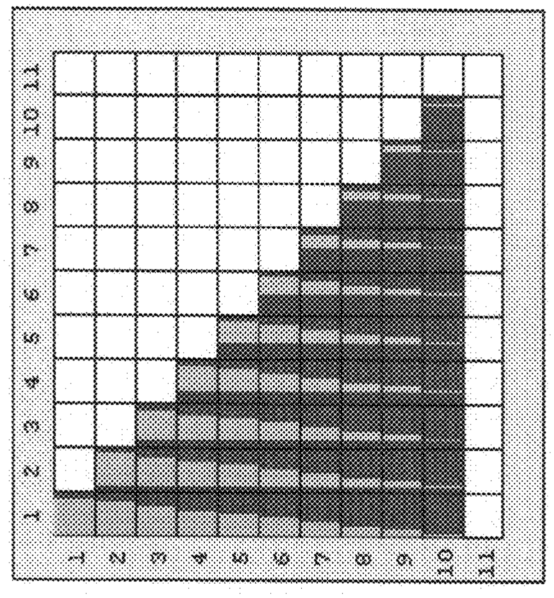
FIGS. 10A-10F, illustrate the compositional make-up of various exemplary library test wafers. The legend for FIGS. 10A-10C applies only to FIGS. 10A-10C. The legend for FIGS. 10D-10F applies only to FIGS. 10D-10F.
Figure 10:
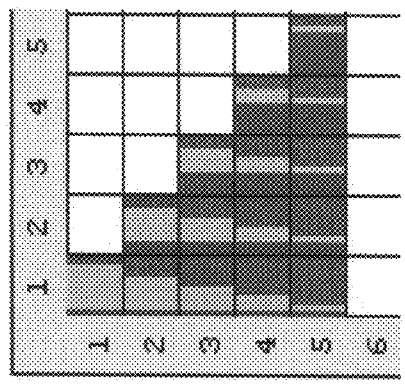
Figure 10:
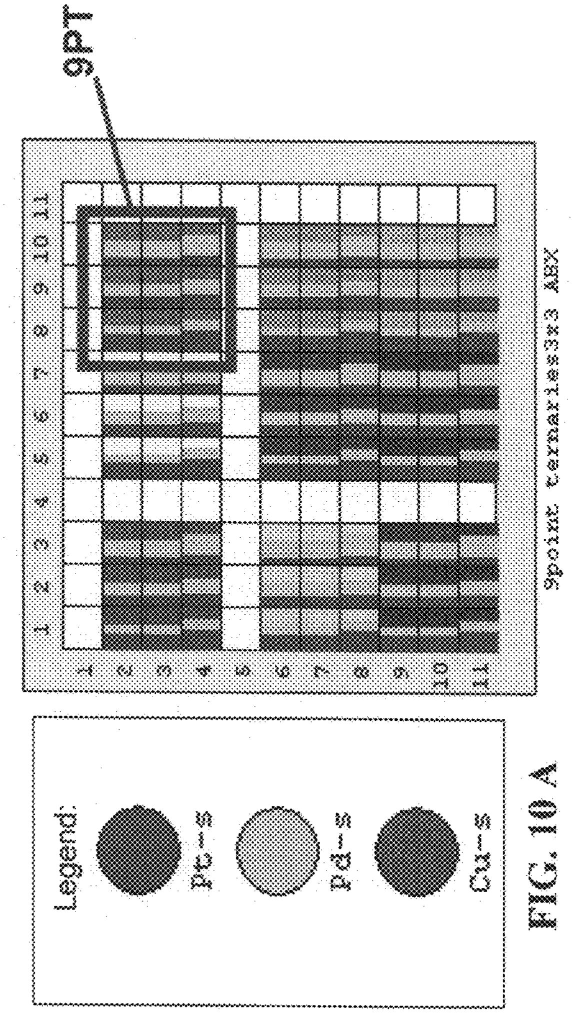

FIG. 9 shows the CO composition in the product stream following the scale-up testing at a gas hour space velocity of 50,000 $h^{-1}$.

TABLE 6

| Catalyst Compositions (mass ratio) | | | | | | | | | |
|---|---|---|---|---|---|---|---|---|---|
| Row | Col | Support | Co | Pt | La | Na | Ce | Mo | V |
| A | 1 | 0.885 | 0.005 | 0.06 | 0.025 | 0.025 | 0 | 0 | 0 |
| A | 2 | 0.885 | 0.005 | 0.06 | 0 | 0.025 | 0.025 | 0 | 0 |
| A | 3 | 0.885 | 0 | 0.06 | 0.025 | 0.025 | 0 | 0.005 | 0 |
| A | 4 | 0.885 | 0 | 0.06 | 0 | 0.025 | 0.025 | 0.005 | 0 |
| A | 5 | 0.88 | 0 | 0.06 | 0.025 | 0.025 | 0 | 0 | 0.01 |
| A | 6 | 0.88 | 0 | 0.06 | 0 | 0.025 | 0.025 | 0 | 0.01 |
| B | 1 | 0.86 | 0.005 | 0.06 | 0.05 | 0.025 | 0 | 0 | 0 |
| B | 2 | 0.86 | 0.005 | 0.06 | 0 | 0.025 | 0.05 | 0 | 0 |
| B | 3 | 0.86 | 0 | 0.06 | 0.05 | 0.025 | 0 | 0.005 | 0 |
| B | 4 | 0.86 | 0 | 0.06 | 0 | 0.025 | 0.05 | 0.005 | 0 |
| B | 5 | 0.855 | 0 | 0.06 | 0.05 | 0.025 | 0 | 0 | 0.01 |
| B | 6 | 0.855 | 0 | 0.06 | 0 | 0.025 | 0.05 | 0 | 0.01 |
| C | 1 | 0.88 | 0.01 | 0.06 | 0.025 | 0.025 | 0 | 0 | 0 |
| C | 2 | 0.88 | 0.01 | 0.06 | 0 | 0.025 | 0.025 | 0 | 0 |
| C | 3 | 0.88 | 0 | 0.06 | 0.025 | 0.025 | 0 | 0.01 | 0 |
| C | 4 | 0.88 | 0 | 0.06 | 0 | 0.025 | 0.025 | 0.01 | 0 |
| C | 5 | 0.87 | 0 | 0.06 | 0.025 | 0.025 | 0 | 0 | 0.02 |
| C | 6 | 0.87 | 0 | 0.06 | 0 | 0.025 | 0.025 | 0 | 0.02 |
| D | 1 | 0.855 | 0.01 | 0.06 | 0.05 | 0.025 | 0 | 0 | 0 |
| D | 2 | 0.855 | 0.01 | 0.06 | 0 | 0.025 | 0.05 | 0 | 0 |
| D | 3 | 0.855 | 0 | 0.06 | 0.05 | 0.025 | 0 | 0.01 | 0 |
| D | 4 | 0.855 | 0 | 0.06 | 0 | 0.025 | 0.05 | 0.01 | 0 |
| D | 5 | 0.845 | 0 | 0.06 | 0.05 | 0.025 | 0 | 0 | 0.02 |
| D | 6 | 0.845 | 0 | 0.06 | 0 | 0.025 | 0.05 | 0 | 0.02 |

Example 10

Scale-up catalyst samples were prepared by using incipient wetness impregnation of 0.75 grams of $ZrO_2$ support (Norton, 80-120 mesh) which had been weighed into a 10-dram vial. Aqueous metal precursor salt solutions were then added in the order: V, Pt, and finally Na. The precursor salt solutions were tetraammineplatinum (II) hydroxide solution (9.09% Pt (w/w)), vanadium citrate (1.0M), and sodium hydroxide (3.0 N). All starting reagents were nominally research grade from Aldrich, Strem, or Alfa. Following each metal addition, the catalysts were dried at 80° C. overnight and then calcined in air as follows:

| | |
|---|---|
| After Pt addition | 300° C. for 3 hours |
| After V addition | 350° C. for 3 hours. |

Following Na addition, the catalysts were calcined at 300° C. for 3 hours, then the catalysts were reduced in-situ at 300° C. for 3 hours in a 10% $H_2/N_2$ feed.

Catalyst Testing Conditions

Catalysts were tested in a fixed bed reactor. Approximately 0.15 g of catalyst was weighed and mixed with an equivalent mass of SiC. The mixture was loaded into a reactor and heated to reaction temperature. Reaction gases were delivered via mass flow controllers (Brooks) with water introduced with a metering pump (Quizix). The composition of the reaction mixture was as follows: $H_2$ 50%, CO 10%, $CO_2$ 10%, and $H_2O$ 30%. The reactant mixture was passed through a preheater before contacting the catalyst bed. Following reaction, the product gases were analyzed using a micro gas chromatograph (Varian Instruments, or Shimadzu). Compositional data on the performance diagram (FIG. 12) is on a dry basis with water removed.

Testing Results

Figure 12:
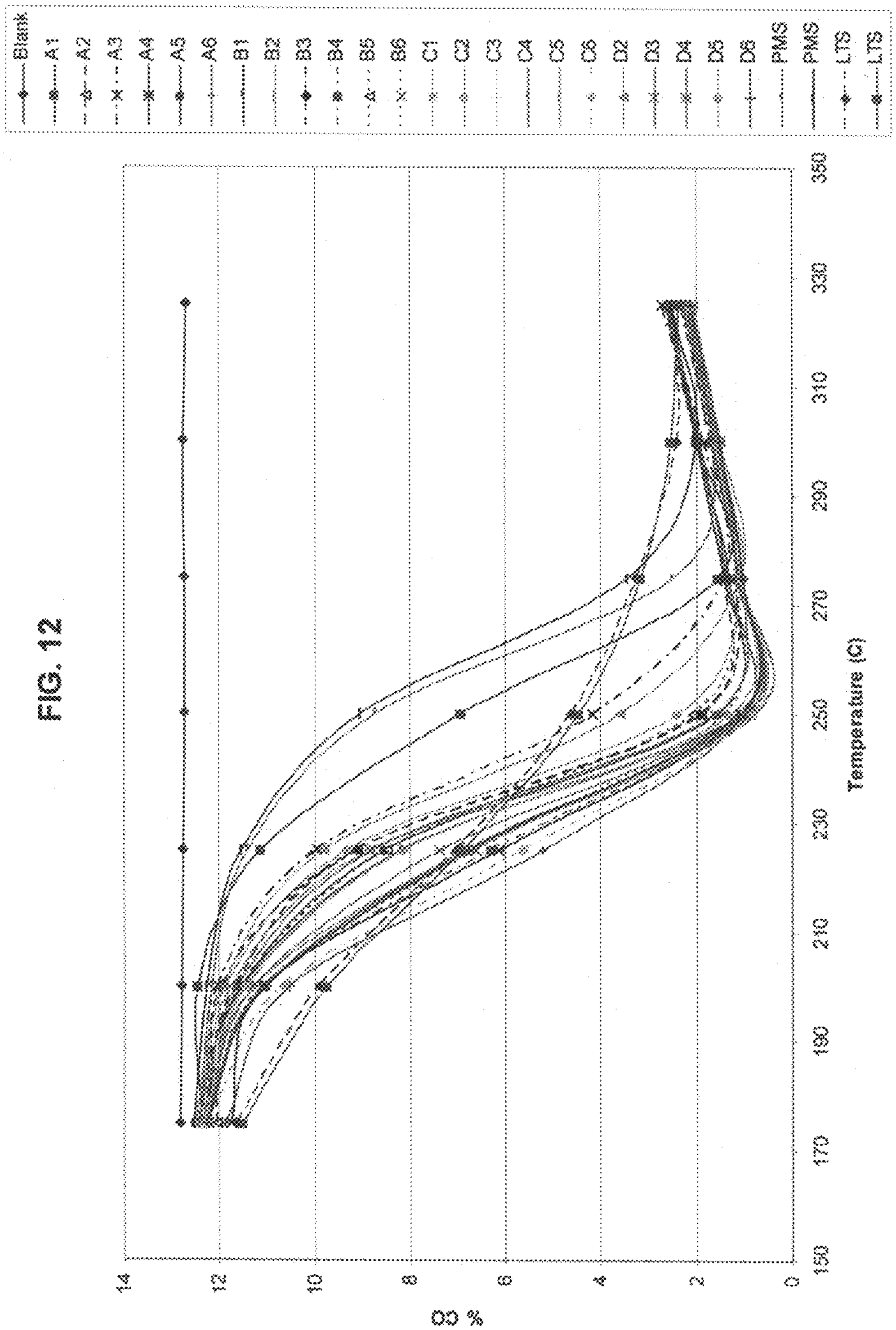
FIG. 12 illustrates plots of CO concentration versus temperature for scaled-up catalyst samples under WGS conditions.

FIG. 12 shows the CO composition in the product stream following the scale-up testing at a gas hour space velocity of 50,000 $h^{-1}$.

TABLE 7

| Catalyst Compositions (mass ratio) | | | | | |
|---|---|---|---|---|---|
| Row | Col | Support | Pt | Na | V |
| A | 1 | 94.00 | 2.00 | 2.50 | 1.5 |
| A | 2 | 91.50 | 2.00 | 5.00 | 1.5 |
| A | 3 | 92.00 | 4.00 | 2.50 | 1.5 |
| A | 4 | 89.50 | 4.00 | 5.00 | 1.5 |
| A | 5 | 90.00 | 6.00 | 2.50 | 1.5 |
| A | 6 | 87.50 | 6.00 | 5.00 | 1.5 |

TABLE 7-continued

| Catalyst Compositions (mass ratio) | | | | | |
|---|---|---|---|---|---|
| Row | Col | Support | Pt | Na | V |
| B | 1 | 92.50 | 2.00 | 2.50 | 3.0 |
| B | 2 | 90.00 | 2.00 | 5.00 | 3.0 |
| B | 3 | 90.50 | 4.00 | 2.50 | 3.0 |
| B | 4 | 88.00 | 4.00 | 5.00 | 3.0 |
| B | 5 | 88.50 | 6.00 | 2.50 | 3.0 |
| B | 6 | 86.00 | 6.00 | 5.00 | 3.0 |
| C | 1 | 91.00 | 2.00 | 2.50 | 4.5 |
| C | 2 | 88.50 | 2.00 | 5.00 | 4.5 |
| C | 3 | 89.00 | 4.00 | 2.50 | 4.5 |
| C | 4 | 86.50 | 4.00 | 5.00 | 4.5 |
| C | 5 | 87.00 | 6.00 | 2.50 | 4.5 |
| C | 6 | 84.50 | 6.00 | 5.00 | 4.5 |
| D | 1 | 89.50 | 2.00 | 2.50 | 6.0 |
| D | 2 | 87.00 | 2.00 | 5.00 | 6.0 |
| D | 3 | 87.50 | 4.00 | 2.50 | 6.0 |
| D | 4 | 85.00 | 4.00 | 5.00 | 6.0 |
| D | 5 | 85.50 | 6.00 | 2.50 | 6.0 |
| D | 6 | 83.00 | 6.00 | 5.00 | 6.0 |

TABLE I

| R real | C real | COCONV real | H2OCONV real | CO2PROD real | CO2PERPROD real | CH4PROD real | Pt1.0%/ ZrO2_std real | CeNO33 real | NH42CeNO36 real | CoNO32 real |
|---|---|---|---|---|---|---|---|---|---|---|
| Temperature 250 C. | | | | | | | | | | |
| 1 | 1 | 29.8402 | 21.1977 | 1.0839 | 39.7897 | 0.1693 | 0.1275 | 0 | 0 | 0 |
| 1 | 2 | −0.8066 | −0.3468 | 0.0199 | 0.7318 | 0.015 | 0 | 0 | 0 | 0 |
| 1 | 3 | −1.342 | −0.8883 | −0.0103 | −0.3788 | 0.0069 | 0 | 0 | 0 | 0 |
| 1 | 4 | −0.4471 | −0.8737 | −0.0209 | −0.7679 | 0.0045 | 0 | 0 | 0 | 0 |
| 1 | 5 | 0.2051 | −0.7078 | 0.0201 | 0.7386 | 0.0086 | 0 | 0 | 0 | 0 |
| 1 | 6 | −0.2701 | −1.1286 | −0.0074 | −0.273 | 0.0008 | 0 | 0 | 0 | 0 |
| 1 | 7 | 28.4296 | 17.0396 | 0.9422 | 34.5858 | 0.1303 | 0.1275 | 0 | 0 | 0 |
| 1 | 8 | 0.3481 | −0.0616 | −0.0199 | −0.7298 | −0.0025 | 0 | 0 | 0 | 0 |
| 1 | 9 | −0.1214 | −1.3018 | −0.0217 | −0.7951 | 0.001 | 0 | 0 | 0 | 0 |
| 1 | 10 | 1.2904 | −0.1752 | −0.0251 | −0.9203 | −0.0045 | 0 | 0 | 0 | 0 |
| 1 | 11 | −0.1983 | −0.4964 | −0.0223 | −0.8192 | 0.0005 | 0 | 0 | 0 | 0 |
| 1 | 12 | −0.0741 | −1.2392 | −0.019 | −0.6989 | 0.0004 | 0 | 0 | 0 | 0 |
| 1 | 13 | 27.9999 | 15.9352 | 0.9526 | 34.9687 | 0.128 | 0.1275 | 0 | 0 | 0 |
| 1 | 14 | 0.6232 | −0.3023 | 0.0112 | 0.4122 | 0.0003 | 0 | 0 | 0 | 0 |
| 1 | 15 | −0.1018 | 0.0336 | −0.0235 | −0.8632 | −0.0047 | 0 | 0 | 0 | 0 |
| 1 | 16 | 27.2351 | 16.5803 | 0.888 | 32.5966 | 0.1185 | 0.1275 | 0 | 0 | 0 |
| 2 | 1 | 25.6429 | 17.9695 | 0.8313 | 30.5152 | 0.0986 | 0 | 0 | 0 | 0.125 |
| 2 | 2 | 29.4104 | 18.6834 | 0.9576 | 35.1519 | 0.1186 | 0 | 0 | 0.5 | 0.125 |
| 2 | 3 | 22.3392 | 8.9723 | 0.6239 | 22.9019 | 0.1378 | 0 | 0 | 0 | 0.125 |
| 2 | 4 | 0.8395 | 0.2708 | 0.0014 | 0.0528 | −0.0013 | 0 | 0 | 0 | 0.125 |
| 2 | 5 | 22.4525 | 13.4385 | 0.672 | 24.6699 | 0.1033 | 0 | 0 | 0 | 0.125 |
| 2 | 6 | 30.6495 | 18.9614 | 1.028 | 37.7387 | 0.136 | 0 | 0 | 0 | 0.125 |
| 2 | 7 | 22.8992 | 14.6855 | 0.7054 | 25.8949 | 0.0994 | 0 | 0 | 0 | 0.125 |
| 2 | 8 | 16.4705 | 11.3025 | 0.4957 | 18.197 | 0.0643 | 0 | 0 | 0 | 0.125 |
| 2 | 9 | 25.2898 | 17.1191 | 0.8418 | 30.903 | 0.1018 | 0 | 0 | 0 | 0.125 |
| 2 | 10 | 27.7651 | 17.855 | 0.9307 | 34.1645 | 0.1134 | 0 | 0.5 | 0 | 0.125 |
| 2 | 11 | 15.2353 | 10.1525 | 0.5062 | 18.5825 | 0.0625 | 0 | 0 | 0 | 0.125 |
| 2 | 12 | 6.6516 | 3.7768 | 0.2027 | 7.4414 | 0.0231 | 0 | 0 | 0 | 0.125 |
| 2 | 13 | 5.6662 | 4.3865 | 0.1536 | 5.6377 | 0.0183 | 0 | 0 | 0 | 0.125 |
| 2 | 14 | 20.5443 | 12.549 | 0.6838 | 25.1023 | 0.0868 | 0 | 0 | 0 | 0.125 |
| 2 | 15 | 2.2164 | 0.1212 | 0.0573 | 2.1049 | 0.0061 | 0 | 0 | 0 | 0.125 |
| 2 | 16 | 0.393 | 1.3011 | −0.0224 | −0.821 | −0.0062 | 0 | 0 | 0 | 0 |
| 3 | 1 | 22.2454 | 15.3754 | 0.7105 | 26.0826 | 0.0816 | 0 | 0 | 0 | 0.2188 |
| 3 | 2 | 28.0083 | 19.5547 | 0.885 | 32.4878 | 0.1083 | 0 | 0 | 0.4063 | 0.2188 |
| 3 | 3 | 23.6895 | 14.2896 | 0.6787 | 24.9136 | 0.1246 | 0 | 0 | 0 | 0.2188 |
| 3 | 4 | 0.9693 | 2.2659 | −0.0302 | −1.1081 | −0.0146 | 0 | 0 | 0 | 0.2188 |
| 3 | 5 | 28.2742 | 16.4476 | 0.8881 | 32.6016 | 0.1315 | 0 | 0 | 0 | 0.2188 |
| 3 | 6 | 40.4567 | 21.9704 | 1.2225 | 44.8759 | 0.2055 | 0 | 0 | 0 | 0.2188 |
| 3 | 7 | 25.2346 | 17.7275 | 0.8079 | 29.6585 | 0.1051 | 0 | 0 | 0 | 0.2188 |
| 3 | 8 | 23.7508 | 16.0999 | 0.736 | 27.0183 | 0.1041 | 0 | 0 | 0 | 0.2188 |
| 3 | 9 | 26.3184 | 19.4909 | 0.8642 | 31.7233 | 0.098 | 0 | 0 | 0 | 0.2188 |
| 3 | 10 | 26.3066 | 17.5553 | 0.8712 | 31.9817 | 0.1009 | 0 | 0.4063 | 0 | 0.2188 |
| 3 | 11 | 16.5069 | 12.0298 | 0.525 | 19.2728 | 0.0577 | 0 | 0 | 0 | 0.2188 |

TABLE I-continued

| | | | | | | | | | | |
|---|---|---|---|---|---|---|---|---|---|---|
| 3 | 12 | 15.7501 | 11.8225 | 0.4936 | 18.1205 | 0.0521 | 0 | 0 | 0 | 0.2188 |
| 3 | 13 | 6.2855 | 5.3787 | 0.1728 | 6.3432 | 0.01 | 0 | 0 | 0 | 0.2188 |
| 3 | 14 | 18.4215 | 14.2445 | 0.619 | 22.7235 | 0.0672 | 0 | 0 | 0 | 0.2188 |
| 3 | 15 | 1.6097 | 3.5749 | 0.0233 | 0.8544 | −0.0089 | 0 | 0 | 0 | 0.2188 |
| 3 | 16 | 1.3509 | 0.7363 | 0.0005 | 0.0168 | −0.0077 | 0 | 0 | 0 | 0 |
| 4 | 1 | 23.1744 | 16.9866 | 0.7784 | 28.5757 | 0.0904 | 0 | 0 | 0 | 0.3125 |
| 4 | 2 | 28.5323 | 20.2685 | 0.9161 | 33.6276 | 0.112 | 0 | 0 | 0.3125 | 0.3125 |
| 4 | 3 | 24.9023 | 16.5852 | 0.7687 | 28.2199 | 0.1184 | 0 | 0 | 0 | 0.3125 |
| 4 | 4 | 8.3484 | 7.4139 | 0.2462 | 9.0365 | 0.0236 | 0 | 0 | 0 | 0.3125 |
| 4 | 5 | 28.2314 | 16.652 | 0.814 | 29.8824 | 0.1533 | 0 | 0 | 0 | 0.3125 |
| 4 | 6 | 39.4798 | 24.09 | 1.1719 | 43.0211 | 0.2026 | 0 | 0 | 0 | 0.3125 |
| 4 | 7 | 25.0657 | 17.1429 | 0.7976 | 29.2776 | 0.105 | 0 | 0 | 0 | 0.3125 |
| 4 | 8 | 20.8684 | 14.4244 | 0.6484 | 23.8022 | 0.0887 | 0 | 0 | 0 | 0.3125 |
| 4 | 9 | 26.476 | 18.4214 | 0.8784 | 32.2449 | 0.1005 | 0 | 0 | 0 | 0.3125 |
| 4 | 10 | 25.3804 | 18.1039 | 0.8522 | 31.2829 | 0.0975 | 0 | 0.3125 | 0 | 0.3125 |
| 4 | 11 | 13.9181 | 9.2274 | 0.4588 | 16.8412 | 0.0498 | 0 | 0 | 0 | 0.3125 |
| 4 | 12 | 13.6987 | 10.4619 | 0.434 | 15.9319 | 0.0459 | 0 | 0 | 0 | 0.3125 |
| 4 | 13 | 8.069 | 7.5589 | 0.2327 | 8.5431 | 0.0185 | 0 | 0 | 0 | 0.3125 |
| 4 | 14 | 21.7048 | 15.5036 | 0.7237 | 26.5651 | 0.0794 | 0 | 0 | 0 | 0.3125 |
| 4 | 15 | 7.1383 | 7.611 | 0.2204 | 8.0914 | 0.0168 | 0 | 0 | 0 | 0.3125 |
| 4 | 16 | 28.2274 | 18.5972 | 0.9383 | 34.4443 | 0.1182 | 0.1275 | 0 | 0 | 0 |
| 5 | 1 | 25.0356 | 17.8739 | 0.8182 | 30.0351 | 0.0996 | 0 | 0 | 0 | 0.4063 |
| 5 | 2 | 29.5211 | 21.5832 | 0.9284 | 34.0807 | 0.1135 | 0 | 0 | 0.2188 | 0.4063 |
| 5 | 3 | 25.5889 | 17.3611 | 0.7957 | 29.211 | 0.1149 | 0 | 0 | 0 | 0.4063 |
| 5 | 4 | 11.1187 | 9.9822 | 0.3389 | 12.4417 | 0.0338 | 0 | 0 | 0 | 0.4063 |
| 5 | 5 | 27.9457 | 16.713 | 0.8317 | 30.5293 | 0.1491 | 0 | 0 | 0 | 0.4063 |
| 5 | 6 | 38.1172 | 21.2674 | 1.1043 | 40.539 | 0.2047 | 0 | 0 | 0 | 0.4063 |
| 5 | 7 | 24.6847 | 17.5415 | 0.8004 | 29.3828 | 0.098 | 0 | 0 | 0 | 0.4063 |
| 5 | 8 | 24.8369 | 17.0456 | 0.7916 | 29.0571 | 0.1039 | 0 | 0 | 0 | 0.4063 |
| 5 | 9 | 25.2684 | 19.1268 | 0.8271 | 30.3624 | 0.0942 | 0 | 0 | 0 | 0.4063 |
| 5 | 10 | 25.9949 | 19.5089 | 0.8585 | 31.5149 | 0.0991 | 0 | 0.2188 | 0 | 0.4063 |
| 5 | 11 | 17.6559 | 13.8567 | 0.5775 | 21.1997 | 0.0635 | 0 | 0 | 0 | 0.4063 |
| 5 | 12 | 19.56 | 14.366 | 0.6131 | 22.5058 | 0.0705 | 0 | 0 | 0 | 0.4063 |
| 5 | 13 | 7.807 | 6.7271 | 0.2181 | 8.005 | 0.021 | 0 | 0 | 0 | 0.4063 |
| 5 | 14 | 22.2026 | 14.967 | 0.748 | 27.4571 | 0.0898 | 0 | 0 | 0 | 0.4063 |
| 5 | 15 | 11.4161 | 8.8494 | 0.3588 | 13.173 | 0.0373 | 0 | 0 | 0 | 0.4063 |
| 5 | 16 | 0.0343 | 0.2746 | −0.0017 | −0.0622 | −0.007 | 0 | 0 | 0 | 0 |
| 6 | 1 | 28.3635 | 19.4266 | 0.9197 | 33.7623 | 0.1222 | 0 | 0 | 0 | 0.5 |
| 6 | 2 | 30.4663 | 20.8458 | 0.9865 | 36.2151 | 0.1288 | 0 | 0 | 0.125 | 0.5 |
| 6 | 3 | 24.5123 | 16.1173 | 0.794 | 29.1455 | 0.1075 | 0 | 0 | 0 | 0.5 |
| 6 | 4 | 20.2767 | 14.6918 | 0.6733 | 24.7161 | 0.0801 | 0 | 0 | 0 | 0.5 |
| 6 | 5 | 33.2496 | 16.76 | 0.9351 | 34.3274 | 0.2217 | 0 | 0 | 0 | 0.5 |
| 6 | 6 | 38.5058 | 19.2941 | 1.0938 | 40.154 | 0.2327 | 0 | 0 | 0 | 0.5 |
| 6 | 7 | 24.1336 | 17.4112 | 0.7994 | 29.3455 | 0.1052 | 0 | 0 | 0 | 0.5 |
| 6 | 8 | 22.6528 | 14.9365 | 0.7653 | 28.0945 | 0.0974 | 0 | 0 | 0 | 0.5 |
| 6 | 9 | 26.9144 | 19.6802 | 0.8845 | 32.4702 | 0.1055 | 0 | 0 | 0 | 0.5 |
| 6 | 10 | 26.6038 | 18.7414 | 0.9208 | 33.8001 | 0.11 | 0 | 0.125 | 0 | 0.5 |
| 6 | 11 | 22.4349 | 14.9258 | 0.7817 | 28.6959 | 0.0944 | 0 | 0 | 0 | 0.5 |
| 6 | 12 | 20.9112 | 14.2122 | 0.6922 | 25.4099 | 0.0817 | 0 | 0 | 0 | 0.5 |
| 6 | 13 | 11.904 | 7.5826 | 0.4014 | 14.7338 | 0.0486 | 0 | 0 | 0 | 0.5 |
| 6 | 14 | 23.5252 | 16.7311 | 0.7707 | 28.2915 | 0.0917 | 0 | 0 | 0 | 0.5 |
| 6 | 15 | 17.2103 | 10.833 | 0.5735 | 21.0513 | 0.067 | 0 | 0 | 0 | 0.5 |
| 6 | 16 | 1.0088 | −0.1805 | 0.0177 | 0.6503 | −0.0041 | 0 | 0 | 0 | 0 |
| 7 | 1 | 29.1091 | 18.3888 | 0.9377 | 34.4238 | 0.1288 | 0 | 0 | 0 | 0 |
| 7 | 2 | 23.4675 | 15.9929 | 0.7993 | 29.3427 | 0.1033 | 0 | 0 | 0 | 0.5 |
| 7 | 3 | 24.4 | 17.9806 | 0.8052 | 29.5583 | 0.0931 | 0 | 0 | 0.5 | 0 |
| 7 | 4 | 23.9259 | 17.6284 | 0.8206 | 30.1251 | 0.0928 | 0 | 0 | 0 | 0 |
| 7 | 5 | 21.9374 | 15.2657 | 0.7495 | 27.5124 | 0.0915 | 0 | 0 | 0 | 0 |
| 7 | 6 | 34.6888 | 23.3528 | 1.131 | 41.5182 | 0.1544 | 0 | 0 | 0 | 0 |
| 7 | 7 | 23.0341 | 16.9495 | 0.7009 | 25.7276 | 0.099 | 0 | 0 | 0 | 0 |
| 7 | 8 | 28.7153 | 15.6433 | 0.8015 | 29.4221 | 0.1671 | 0 | 0 | 0 | 0 |
| 7 | 9 | 21.8886 | 15.6142 | 0.7632 | 28.0152 | 0.0898 | 0 | 0 | 0 | 0 |
| 7 | 10 | 21.9107 | 15.6183 | 0.7745 | 28.4325 | 0.0907 | 0 | 0.5 | 0 | 0 |
| 7 | 11 | 18.5907 | 14.206 | 0.615 | 22.5768 | 0.0714 | 0 | 0 | 0 | 0 |
| 7 | 12 | 24.8013 | 17.9553 | 0.8391 | 30.8011 | 0.1049 | 0 | 0 | 0 | 0 |
| 7 | 13 | 4.148 | 4.5963 | 0.1558 | 5.7193 | 0.01 | 0 | 0 | 0 | 0 |
| 7 | 14 | 25.1707 | 16.9965 | 0.8683 | 31.875 | 0.1033 | 0 | 0 | 0 | 0 |
| 7 | 15 | 10.053 | 7.9852 | 0.3638 | 13.3549 | 0.0383 | 0 | 0 | 0 | 0 |
| 7 | 16 | 27.3338 | 18.6129 | 0.9314 | 34.1925 | 0.1154 | 0.1275 | 0 | 0 | 0 |
| 8 | 1 | 27.8709 | 16.8374 | 0.9039 | 33.1799 | 0.1419 | 0 | 0 | 0 | 0 |
| 8 | 2 | 25.0239 | 16.3557 | 0.8605 | 31.5885 | 0.1186 | 0 | 0 | 0 | 0.4063 |
| 8 | 3 | 23.3124 | 16.5445 | 0.7803 | 28.6442 | 0.1016 | 0 | 0 | 0.4063 | 0 |
| 8 | 4 | 30.4167 | 20.755 | 1.0121 | 37.1518 | 0.1278 | 0 | 0 | 0 | 0 |
| 8 | 5 | 22.4729 | 15.5952 | 0.7556 | 27.7364 | 0.0987 | 0 | 0 | 0 | 0 |
| 8 | 6 | 33.8859 | 22.7736 | 1.1246 | 41.2829 | 0.1534 | 0 | 0 | 0 | 0 |
| 8 | 7 | 23.0982 | 15.007 | 0.72 | 26.4315 | 0.1098 | 0 | 0 | 0 | 0 |
| 8 | 8 | 27.9822 | 13.7786 | 0.811 | 29.7729 | 0.1778 | 0 | 0 | 0 | 0 |
| 8 | 9 | 23.7305 | 17.1175 | 0.8213 | 30.1477 | 0.1059 | 0 | 0 | 0 | 0 |
| 8 | 10 | 24.1435 | 16.057 | 0.8058 | 29.5803 | 0.1029 | 0 | 0.4063 | 0 | 0 |

TABLE I-continued

| | | | | | | | | | | |
|---|---|---|---|---|---|---|---|---|---|---|
| 8 | 11 | 22.7845 | 15.9341 | 0.7662 | 28.126 | 0.1051 | 0 | 0 | 0 | 0 |
| 8 | 12 | 22.5472 | 14.8209 | 0.7762 | 28.4929 | 0.1038 | 0 | 0 | 0 | 0 |
| 8 | 13 | 4.6 | 5.0283 | 0.1611 | 5.9139 | 0.0164 | 0 | 0 | 0 | 0 |
| 8 | 14 | 26.3117 | 17.5568 | 0.8937 | 32.8057 | 0.1158 | 0 | 0 | 0 | 0 |
| 8 | 15 | 19.2935 | 13.6483 | 0.7008 | 25.725 | 0.0827 | 0 | 0 | 0 | 0 |
| 8 | 16 | 0.3501 | 2.3807 | 0.0044 | 0.1601 | −0.0072 | 0 | 0 | 0 | 0 |
| 9 | 1 | 30.2669 | 17.4031 | 0.9382 | 34.439 | 0.1638 | 0 | 0 | 0 | 0 |
| 9 | 2 | 24.7831 | 15.5168 | 0.8133 | 29.856 | 0.1193 | 0 | 0 | 0 | 0.3125 |
| 9 | 3 | 24.8843 | 16.3799 | 0.8144 | 29.8952 | 0.1144 | 0 | 0 | 0.3125 | 0 |
| 9 | 4 | 27.7158 | 18.3043 | 0.9486 | 34.8222 | 0.1209 | 0 | 0 | 0 | 0 |
| 9 | 5 | 22.301 | 14.7031 | 0.7678 | 28.1862 | 0.1077 | 0 | 0 | 0 | 0 |
| 9 | 6 | 31.7529 | 21.8186 | 1.0511 | 38.5834 | 0.1407 | 0 | 0 | 0 | 0 |
| 9 | 7 | 22.4223 | 13.2509 | 0.6914 | 25.3794 | 0.1125 | 0 | 0 | 0 | 0 |
| 9 | 8 | 26.7272 | 10.823 | 0.7966 | 29.2411 | 0.1718 | 0 | 0 | 0 | 0 |
| 9 | 9 | 18.6358 | 11.9972 | 0.6423 | 23.5776 | 0.0893 | 0 | 0 | 0 | 0 |
| 9 | 10 | 21.5732 | 13.0857 | 0.7295 | 26.7785 | 0.0998 | 0 | 0.3125 | 0 | 0 |
| 9 | 11 | 21.8603 | 13.7562 | 0.7383 | 27.1031 | 0.1087 | 0 | 0 | 0 | 0 |
| 9 | 12 | 23.2584 | 14.2339 | 0.7779 | 28.5546 | 0.1092 | 0 | 0 | 0 | 0 |
| 9 | 13 | 6.1089 | 5.8813 | 0.2145 | 7.8737 | 0.0226 | 0 | 0 | 0 | 0 |
| 9 | 14 | 21.796 | 14.0238 | 0.7518 | 27.5966 | 0.1012 | 0 | 0 | 0 | 0 |
| 9 | 15 | 14.7758 | 10.7605 | 0.524 | 19.2341 | 0.0608 | 0 | 0 | 0 | 0 |
| 9 | 16 | 0.0047 | 0.3621 | 0.0345 | 1.268 | 0.0006 | 0 | 0 | 0 | 0 |
| 10 | 1 | 32.2957 | 12.969 | 0.8786 | 32.253 | 0.2259 | 0 | 0 | 0 | 0 |
| 10 | 2 | 22.9073 | 13.5906 | 0.7444 | 27.3268 | 0.1229 | 0 | 0 | 0 | 0.2188 |
| 10 | 3 | 24.02 | 14.4655 | 0.7658 | 28.1101 | 0.1285 | 0 | 0 | 0.2188 | 0 |
| 10 | 4 | 27.4735 | 18.2379 | 0.9287 | 34.0901 | 0.1247 | 0 | 0 | 0 | 0 |
| 10 | 5 | 25.7888 | 14.3222 | 0.7908 | 29.0301 | 0.1508 | 0 | 0 | 0 | 0 |
| 10 | 6 | 28.2681 | 18.4984 | 0.959 | 35.2041 | 0.1403 | 0 | 0 | 0 | 0 |
| 10 | 7 | 26.3335 | 13.7746 | 0.7698 | 28.257 | 0.1587 | 0 | 0 | 0 | 0 |
| 10 | 8 | 27.2793 | 11.6159 | 0.7715 | 28.3222 | 0.181 | 0 | 0 | 0 | 0 |
| 10 | 9 | 23.7532 | 13.9992 | 0.7647 | 28.0727 | 0.1187 | 0 | 0 | 0 | 0 |
| 10 | 10 | 23.0104 | 12.8612 | 0.7501 | 27.5368 | 0.1242 | 0 | 0.2188 | 0 | 0 |
| 10 | 11 | 24.3958 | 13.8516 | 0.7821 | 28.7085 | 0.1283 | 0 | 0 | 0 | 0 |
| 10 | 12 | 24.7178 | 14.4298 | 0.7945 | 29.1648 | 0.1251 | 0 | 0 | 0 | 0 |
| 10 | 13 | 6.2103 | 5.4757 | 0.2329 | 8.5508 | 0.0276 | 0 | 0 | 0 | 0 |
| 10 | 14 | 20.3259 | 13.0573 | 0.6932 | 25.4467 | 0.0987 | 0 | 0 | 0 | 0 |
| 10 | 15 | 18.1743 | 12.8071 | 0.6685 | 24.5392 | 0.0818 | 0 | 0 | 0 | 0 |
| 10 | 16 | 25.148 | 16.3311 | 0.9105 | 33.4226 | 0.1159 | 0.1275 | 0 | 0 | 0 |
| 11 | 1 | 33.2657 | 13.7869 | 0.9096 | 33.389 | 0.2236 | 0 | 0 | 0 | 0 |
| 11 | 2 | 26.3629 | 12.996 | 0.8123 | 29.819 | 0.1618 | 0 | 0 | 0 | 0.125 |
| 11 | 3 | 24.9661 | 13.9343 | 0.8015 | 29.4223 | 0.135 | 0 | 0 | 0.125 | 0 |
| 11 | 4 | 25.749 | 14.2206 | 0.8562 | 31.4286 | 0.1402 | 0 | 0 | 0 | 0 |
| 11 | 5 | 23.3622 | 11.0514 | 0.726 | 26.6504 | 0.1408 | 0 | 0 | 0 | 0 |
| 11 | 6 | 25.4002 | 15.3152 | 0.8622 | 31.652 | 0.1297 | 0 | 0 | 0 | 0 |
| 11 | 7 | 23.7527 | 11.0405 | 0.7081 | 25.9945 | 0.1474 | 0 | 0 | 0 | 0 |
| 11 | 8 | 25.2713 | 10.4518 | 0.7606 | 27.9193 | 0.1663 | 0 | 0 | 0 | 0 |
| 11 | 9 | 22.1004 | 12.2049 | 0.7055 | 25.8981 | 0.1177 | 0 | 0 | 0 | 0 |
| 11 | 10 | 21.8975 | 12.2273 | 0.7148 | 26.2406 | 0.1184 | 0 | 0.125 | 0 | 0 |
| 11 | 11 | 22.2123 | 12.4559 | 0.7208 | 26.4587 | 0.1235 | 0 | 0 | 0 | 0 |
| 11 | 12 | 22.4272 | 13.3655 | 0.7375 | 27.0716 | 0.1141 | 0 | 0 | 0 | 0 |
| 11 | 13 | 10.6819 | 7.0626 | 0.3567 | 13.095 | 0.0525 | 0 | 0 | 0 | 0 |
| 11 | 14 | 22.4528 | 12.9362 | 0.7568 | 27.7801 | 0.1206 | 0 | 0 | 0 | 0 |
| 11 | 15 | 19.7448 | 13.9333 | 0.6951 | 25.5175 | 0.0875 | 0 | 0 | 0 | 0 |
| 11 | 16 | −0.1972 | 1.471 | 0.0237 | 0.8717 | 0.0002 | 0 | 0 | 0 | 0 |
| 12 | 1 | 31.5656 | 21.6797 | 1.0782 | 39.5788 | 0.1397 | 0 | 0 | 0 | 0 |
| 12 | 2 | 19.6043 | 13.572 | 0.6955 | 25.5322 | 0.089 | 0 | 0 | 0 | 0.5 |
| 12 | 3 | 28.1666 | 17.3647 | 0.9244 | 33.9334 | 0.1488 | 0 | 0 | 0 | 0 |
| 12 | 4 | 31.3253 | 21.7961 | 1.0594 | 38.89 | 0.1349 | 0 | 0 | 0.5 | 0 |
| 12 | 5 | 17.3834 | 14.0571 | 0.6238 | 22.8995 | 0.0749 | 0 | 0 | 0 | 0 |
| 12 | 6 | 35.3057 | 24.5521 | 1.1878 | 43.6046 | 0.1566 | 0 | 0 | 0 | 0 |
| 12 | 7 | 23.1431 | 16.6639 | 0.8015 | 29.4211 | 0.1066 | 0 | 0 | 0 | 0 |
| 12 | 8 | 26.6065 | 17.7981 | 0.9318 | 34.2045 | 0.1338 | 0 | 0 | 0 | 0 |
| 12 | 9 | 31.073 | 22.4346 | 1.0697 | 39.269 | 0.1354 | 0 | 0 | 0 | 0 |
| 12 | 10 | 29.9328 | 22.2939 | 1.0514 | 38.5962 | 0.1273 | 0 | 0.5 | 0 | 0 |
| 12 | 11 | 28.5736 | 20.9007 | 1.0125 | 37.1693 | 0.1236 | 0 | 0 | 0 | 0 |
| 12 | 12 | 28.8195 | 19.4676 | 1.0399 | 38.1729 | 0.1274 | 0 | 0 | 0 | 0 |
| 12 | 13 | 2.9218 | 3.3576 | 0.0985 | 3.6155 | 0.0097 | 0 | 0 | 0 | 0 |
| 12 | 14 | 25.7013 | 17.9671 | 0.9023 | 33.1211 | 0.1147 | 0 | 0 | 0 | 0 |
| 12 | 15 | 8.492 | 5.9126 | 0.3308 | 12.1433 | 0.0423 | 0 | 0 | 0 | 0 |
| 12 | 16 | −0.1015 | 0.1618 | 0.0165 | 0.6066 | 0.0023 | 0 | 0 | 0 | 0 |
| 13 | 1 | 32.929 | 23.1662 | 1.1398 | 41.8401 | 0.1451 | 0 | 0 | 0 | 0 |
| 13 | 2 | 12.9188 | 10.5882 | 0.449 | 16.481 | 0.0547 | 0 | 0 | 0 | 0.4063 |
| 13 | 3 | 28.0856 | 18.7043 | 0.9401 | 34.5103 | 0.126 | 0 | 0 | 0 | 0 |
| 13 | 4 | 31.7131 | 22.9009 | 1.054 | 38.6919 | 0.1335 | 0 | 0 | 0.4063 | 0 |
| 13 | 5 | 10.3872 | 8.6629 | 0.3924 | 14.405 | 0.0454 | 0 | 0 | 0 | 0 |
| 13 | 6 | 32.6469 | 22.0266 | 1.0976 | 40.2904 | 0.1422 | 0 | 0 | 0 | 0 |
| 13 | 7 | 26.7979 | 19.1216 | 0.9313 | 34.1868 | 0.1168 | 0 | 0 | 0 | 0 |
| 13 | 8 | 27.1205 | 19.4829 | 0.9549 | 35.0517 | 0.1223 | 0 | 0 | 0 | 0 |
| 13 | 9 | 29.5931 | 21.5231 | 1.038 | 38.1041 | 0.1264 | 0 | 0 | 0 | 0 |

TABLE I-continued

| | | | | | | | | | | |
|---|---|---|---|---|---|---|---|---|---|---|
| 13 | 10 | 28.868 | 20.7843 | 1.0163 | 37.3068 | 0.1254 | 0 | 0.4063 | 0 | 0 |
| 13 | 11 | 19.8455 | 15.1061 | 0.6906 | 25.353 | 0.0865 | 0 | 0 | 0 | 0 |
| 13 | 12 | 28.8191 | 20.6337 | 1.0134 | 37.1994 | 0.1238 | 0 | 0 | 0 | 0 |
| 13 | 13 | 2.6024 | 3.2972 | 0.0961 | 3.526 | 0.0071 | 0 | 0 | 0 | 0 |
| 13 | 14 | 25.0501 | 16.2104 | 0.9126 | 33.5022 | 0.1159 | 0 | 0 | 0 | 0 |
| 13 | 15 | 6.4246 | 5.1337 | 0.2835 | 10.4071 | 0.0349 | 0 | 0 | 0 | 0 |
| 13 | 16 | 24.6043 | 16.341 | 0.9005 | 33.0556 | 0.1142 | 0.1275 | 0 | 0 | 0 |
| 14 | 1 | 31.1905 | 22.5852 | 1.0761 | 39.5045 | 0.1379 | 0 | 0 | 0 | 0 |
| 14 | 2 | 15.3686 | 12.5627 | 0.5534 | 20.3138 | 0.0672 | 0 | 0 | 0 | 0.3125 |
| 14 | 3 | 28.5902 | 21.079 | 0.9573 | 35.1415 | 0.1252 | 0 | 0 | 0 | 0 |
| 14 | 4 | 30.8225 | 21.6996 | 1.0648 | 39.0881 | 0.1372 | 0 | 0 | 0.3125 | 0 |
| 14 | 5 | 10.1619 | 9.3091 | 0.3843 | 14.1078 | 0.0446 | 0 | 0 | 0 | 0 |
| 14 | 6 | 25.9037 | 19.3547 | 0.9378 | 34.425 | 0.1151 | 0 | 0 | 0 | 0 |
| 14 | 7 | 28.9615 | 21.1086 | 0.9966 | 36.5847 | 0.129 | 0 | 0 | 0 | 0 |
| 14 | 8 | 25.3268 | 19.6253 | 0.9096 | 33.392 | 0.1117 | 0 | 0 | 0 | 0 |
| 14 | 9 | 30.5368 | 22.8098 | 1.0517 | 38.6072 | 0.1317 | 0 | 0 | 0 | 0 |
| 14 | 10 | 30.4639 | 21.8604 | 1.0468 | 38.4279 | 0.1319 | 0 | 0.3125 | 0 | 0 |
| 14 | 11 | 28.5368 | 20.5826 | 1.0152 | 37.2667 | 0.1262 | 0 | 0 | 0 | 0 |
| 14 | 12 | 28.9878 | 20.031 | 1.0283 | 37.748 | 0.1277 | 0 | 0 | 0 | 0 |
| 14 | 13 | 1.9405 | 3.4997 | 0.1021 | 3.7493 | 0.0083 | 0 | 0 | 0 | 0 |
| 14 | 14 | 26.2698 | 18.1259 | 0.9407 | 34.5326 | 0.1172 | 0 | 0 | 0 | 0 |
| 14 | 15 | 3.5222 | 3.4456 | 0.1728 | 6.345 | 0.0193 | 0 | 0 | 0 | 0 |
| 14 | 16 | −1.2721 | 0.2876 | 0.0152 | 0.5574 | 0 | 0 | 0 | 0 | 0 |
| 15 | 1 | 21.9285 | 16.5533 | 0.7944 | 29.1616 | 0.0981 | 0 | 0 | 0 | 0 |
| 15 | 2 | 8.5556 | 7.9322 | 0.3176 | 11.6581 | 0.0386 | 0 | 0 | 0 | 0.2188 |
| 15 | 3 | 28.9139 | 19.3873 | 1.0115 | 37.1305 | 0.1329 | 0 | 0 | 0 | 0 |
| 15 | 4 | 29.4947 | 20.5675 | 1.0129 | 37.1816 | 0.1319 | 0 | 0 | 0.2188 | 0 |
| 15 | 5 | 10.3199 | 7.8183 | 0.3758 | 13.7939 | 0.0488 | 0 | 0 | 0 | 0 |
| 15 | 6 | 19.07 | 12.9719 | 0.6822 | 25.0424 | 0.0872 | 0 | 0 | 0 | 0 |
| 15 | 7 | 24.4592 | 16.5438 | 0.8787 | 32.2577 | 0.1122 | 0 | 0 | 0 | 0 |
| 15 | 8 | 26.1966 | 19.0364 | 0.9283 | 34.0753 | 0.1149 | 0 | 0 | 0 | 0 |
| 15 | 9 | 28.805 | 20.399 | 1.0007 | 36.7353 | 0.1231 | 0 | 0 | 0 | 0 |
| 15 | 10 | 27.8671 | 19.9279 | 0.9883 | 36.2797 | 0.1237 | 0 | 0.2188 | 0 | 0 |
| 15 | 11 | 25.9077 | 18.1393 | 0.9238 | 33.9133 | 0.1174 | 0 | 0 | 0 | 0 |
| 15 | 12 | 26.8168 | 19.5131 | 0.9364 | 34.3739 | 0.1198 | 0 | 0 | 0 | 0 |
| 15 | 13 | 3.1831 | 4.1719 | 0.1255 | 4.6087 | 0.0135 | 0 | 0 | 0 | 0 |
| 15 | 14 | 25.6485 | 17.9831 | 0.9073 | 33.3061 | 0.1142 | 0 | 0 | 0 | 0 |
| 15 | 15 | 3.4019 | 2.8501 | 0.1862 | 6.8334 | 0.0252 | 0 | 0 | 0 | 0 |
| 15 | 16 | −0.6764 | 0.6935 | 0.0304 | 1.1161 | 0.0028 | 0 | 0 | 0 | 0 |
| 16 | 1 | 27.2358 | 17.9797 | 0.9948 | 36.5199 | 0.1324 | 0 | 0 | 0 | 0 |
| 16 | 2 | 20.4235 | 13.9408 | 0.7544 | 27.693 | 0.0997 | 0 | 0 | 0 | 0.125 |
| 16 | 3 | 22.1148 | 16.7994 | 0.7919 | 29.0693 | 0.101 | 0 | 0 | 0 | 0 |
| 16 | 4 | 27.8457 | 18.1657 | 0.9706 | 35.6285 | 0.1316 | 0 | 0 | 0.125 | 0 |
| 16 | 5 | 16.0515 | 10.9271 | 0.6032 | 22.1443 | 0.0766 | 0 | 0 | 0 | 0 |
| 16 | 6 | 21.5319 | 16.4412 | 0.8048 | 29.5417 | 0.101 | 0 | 0 | 0 | 0 |
| 16 | 7 | 28.6538 | 19.2213 | 1.0145 | 37.243 | 0.1346 | 0 | 0 | 0 | 0 |
| 16 | 8 | 27.0582 | 20.0777 | 0.9481 | 34.8038 | 0.1218 | 0 | 0 | 0 | 0 |
| 16 | 9 | 28.251 | 19.2368 | 1.0097 | 37.0662 | 0.132 | 0 | 0 | 0 | 0 |
| 16 | 10 | 28.3144 | 19.6597 | 0.9907 | 36.3661 | 0.1282 | 0 | 0.125 | 0 | 0 |
| 16 | 11 | 25.2372 | 17.9227 | 0.9037 | 33.1748 | 0.1146 | 0 | 0 | 0 | 0 |
| 16 | 12 | 27.1113 | 19.9798 | 0.984 | 36.1202 | 0.1221 | 0 | 0 | 0 | 0 |
| 16 | 13 | 7.0222 | 6.86 | 0.2888 | 10.6009 | 0.0359 | 0 | 0 | 0 | 0 |
| 16 | 14 | 24.3113 | 16.5973 | 0.9032 | 33.1567 | 0.1156 | 0 | 0 | 0 | 0 |
| 16 | 15 | 11.0117 | 7.8026 | 0.4408 | 16.1825 | 0.0553 | 0 | 0 | 0 | 0 |
| 16 | 16 | 24.9744 | 15.3136 | 0.9047 | 33.2092 | 0.1182 | 0.1275 | 0 | 0 | 0 |

| R real | CoOAc2 real | Na3CoNO36 real | CuNO32 real | GeOX2 real | H2MoO4 real | KRuO4 real | RuNONO33 real | RuNOOAc3 real | LaNO33 real | NH4ReO4 real | PtNH32NO22 real |
|---|---|---|---|---|---|---|---|---|---|---|---|
| Temperature: 250 C. | | | | | | | | | | | |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |

TABLE I-continued

| | | | | | | | | | | | |
|---|---|---|---|---|---|---|---|---|---|---|---|
| 2 | 0 | 0 | 0 | 0 | 0 | 0 | 0 | 0 | 0 | 0 | 0.1275 |
| 2 | 0 | 0 | 0 | 0 | 0 | 0 | 0 | 0 | 0 | 0 | 0.1275 |
| 2 | 0 | 0 | 0 | 0 | 0 | 0 | 0.0989 | 0 | 0 | 0 | 0.1275 |
| 2 | 0 | 0 | 0 | 0 | 0.5 | 0 | 0 | 0 | 0 | 0 | 0.1275 |
| 2 | 0.5 | 0 | 0 | 0 | 0 | 0 | 0 | 0 | 0 | 0 | 0.1275 |
| 2 | 0 | 0.5 | 0 | 0 | 0 | 0 | 0 | 0 | 0 | 0 | 0.1275 |
| 2 | 0 | 0 | 0 | 0 | 0 | 0.098 | 0 | 0 | 0 | 0 | 0.1275 |
| 2 | 0 | 0 | 0 | 0 | 0 | 0 | 0 | 0.098 | 0 | 0 | 0.1275 |
| 2 | 0 | 0 | 0 | 0 | 0 | 0 | 0 | 0 | 0.5 | 0 | 0.1275 |
| 2 | 0 | 0 | 0 | 0 | 0 | 0 | 0 | 0 | 0 | 0 | 0.1275 |
| 2 | 0 | 0 | 0 | 0 | 0 | 0 | 0 | 0 | 0 | 0 | 0.1275 |
| 2 | 0 | 0 | 0 | 0 | 0 | 0 | 0 | 0 | 0 | 0 | 0.1275 |
| 2 | 0 | 0 | 0.5 | 0 | 0 | 0 | 0 | 0 | 0 | 0 | 0.1275 |
| 2 | 0 | 0 | 0 | 0 | 0 | 0 | 0 | 0 | 0 | 0.1074 | 0.1275 |
| 2 | 0 | 0 | 0 | 0.2 | 0 | 0 | 0 | 0 | 0 | 0 | 0.1275 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0.1275 |
| 3 | 0 | 0 | 0 | 0 | 0 | 0 | 0 | 0 | 0 | 0 | 0.1275 |
| 3 | 0 | 0 | 0 | 0 | 0 | 0 | 0.0804 | 0 | 0 | 0 | 0.1275 |
| 3 | 0 | 0 | 0 | 0 | 0.4063 | 0 | 0 | 0 | 0 | 0 | 0.1275 |
| 3 | 0.4063 | 0 | 0 | 0 | 0 | 0 | 0 | 0 | 0 | 0 | 0.1275 |
| 3 | 0 | 0.4063 | 0 | 0 | 0 | 0 | 0 | 0 | 0 | 0 | 0.1275 |
| 3 | 0 | 0 | 0 | 0 | 0 | 0.796 | 0 | 0 | 0 | 0 | 0.1275 |
| 3 | 0 | 0 | 0 | 0 | 0 | 0 | 0 | 0.0796 | 0 | 0 | 0.1275 |
| 3 | 0 | 0 | 0 | 0 | 0 | 0 | 0 | 0 | 0.4063 | 0 | 0.1275 |
| 3 | 0 | 0 | 0 | 0 | 0 | 0 | 0 | 0 | 0 | 0 | 0.1275 |
| 3 | 0 | 0 | 0 | 0 | 0 | 0 | 0 | 0 | 0 | 0 | 0.1275 |
| 3 | 0 | 0 | 0 | 0 | 0 | 0 | 0 | 0 | 0 | 0 | 0.1275 |
| 3 | 0 | 0 | 0.4063 | 0 | 0 | 0 | 0 | 0 | 0 | 0 | 0.1275 |
| 3 | 0 | 0 | 0 | 0 | 0 | 0 | 0 | 0 | 0 | 0.0873 | 0.1275 |
| 3 | 0 | 0 | 0 | 0.1625 | 0 | 0 | 0 | 0 | 0 | 0 | 0.1275 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0.1275 |
| 4 | 0 | 0 | 0 | 0 | 0 | 0 | 0 | 0 | 0 | 0 | 0.1275 |
| 4 | 0 | 0 | 0 | 0 | 0 | 0 | 0.0618 | 0 | 0 | 0 | 0.1275 |
| 4 | 0 | 0 | 0 | 0 | 0.3125 | 0 | 0 | 0 | 0 | 0 | 0.1275 |
| 4 | 0.3125 | 0 | 0 | 0 | 0 | 0 | 0 | 0 | 0 | 0 | 0.1275 |
| 4 | 0 | 0.3125 | 0 | 0 | 0 | 0 | 0 | 0 | 0 | 0 | 0.1275 |
| 4 | 0 | 0 | 0 | 0 | 0 | 0.0613 | 0 | 0 | 0 | 0 | 0.1275 |
| 4 | 0 | 0 | 0 | 0 | 0 | 0 | 0 | 0.0613 | 0 | 0 | 0.1275 |
| 4 | 0 | 0 | 0 | 0 | 0 | 0 | 0 | 0 | 0.3125 | 0 | 0.1275 |
| 4 | 0 | 0 | 0 | 0 | 0 | 0 | 0 | 0 | 0 | 0 | 0.1275 |
| 4 | 0 | 0 | 0 | 0 | 0 | 0 | 0 | 0 | 0 | 0 | 0.1275 |
| 4 | 0 | 0 | 0 | 0 | 0 | 0 | 0 | 0 | 0 | 0 | 0.1275 |
| 4 | 0 | 0 | 0.3125 | 0 | 0 | 0 | 0 | 0 | 0 | 0 | 0.1275 |
| 4 | 0 | 0 | 0 | 0 | 0 | 0 | 0 | 0 | 0 | 0.0671 | 0.1275 |
| 4 | 0 | 0 | 0 | 0.125 | 0 | 0 | 0 | 0 | 0 | 0 | 0.1275 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0.1275 |
| 5 | 0 | 0 | 0 | 0 | 0 | 0 | 0 | 0 | 0 | 0 | 0.1275 |
| 5 | 0 | 0 | 0 | 0 | 0 | 0 | 0.0433 | 0 | 0 | 0 | 0.1275 |
| 5 | 0 | 0 | 0 | 0 | 0.2188 | 0 | 0 | 0 | 0 | 0 | 0.1275 |
| 5 | 0.2188 | 0 | 0 | 0 | 0 | 0 | 0 | 0 | 0 | 0 | 0.1275 |
| 5 | 0 | 0.2188 | 0 | 0 | 0 | 0 | 0 | 0 | 0 | 0 | 0.1275 |
| 5 | 0 | 0 | 0 | 0 | 0 | 0.0429 | 0 | 0 | 0 | 0 | 0.1275 |
| 5 | 0 | 0 | 0 | 0 | 0 | 0 | 0 | 0.0429 | 0 | 0 | 0.1275 |
| 5 | 0 | 0 | 0 | 0 | 0 | 0 | 0 | 0 | 0.2188 | 0 | 0.1275 |
| 5 | 0 | 0 | 0 | 0 | 0 | 0 | 0 | 0 | 0 | 0 | 0.1275 |
| 5 | 0 | 0 | 0 | 0 | 0 | 0 | 0 | 0 | 0 | 0 | 0.1275 |
| 5 | 0 | 0 | 0 | 0 | 0 | 0 | 0 | 0 | 0 | 0 | 0.1275 |
| 5 | 0 | 0 | 0.2188 | 0 | 0 | 0 | 0 | 0 | 0 | 0 | 0.1275 |
| 5 | 0 | 0 | 0 | 0 | 0 | 0 | 0 | 0 | 0 | 0.047 | 0.1275 |
| 5 | 0 | 0 | 0 | 0.0875 | 0 | 0 | 0 | 0 | 0 | 0 | 0.1275 |
| 5 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0.1275 |
| 6 | 0 | 0 | 0 | 0 | 0 | 0 | 0 | 0 | 0 | 0 | 0.1275 |
| 6 | 0 | 0 | 0 | 0 | 0 | 0 | 0.0247 | 0 | 0 | 0 | 0.1275 |
| 6 | 0 | 0 | 0 | 0 | 0.125 | 0 | 0 | 0 | 0 | 0 | 0.1275 |
| 6 | 0.125 | 0 | 0 | 0 | 0 | 0 | 0 | 0 | 0 | 0 | 0.1275 |
| 6 | 0 | 0.125 | 0 | 0 | 0 | 0 | 0 | 0 | 0 | 0 | 0.1275 |
| 6 | 0 | 0 | 0 | 0 | 0 | 0.0245 | 0 | 0 | 0 | 0 | 0.1275 |
| 6 | 0 | 0 | 0 | 0 | 0 | 0 | 0 | 0.0245 | 0 | 0 | 0.1275 |
| 6 | 0 | 0 | 0 | 0 | 0 | 0 | 0 | 0 | 0.125 | 0 | 0.1275 |
| 6 | 0 | 0 | 0 | 0 | 0 | 0 | 0 | 0 | 0 | 0 | 0.1275 |
| 6 | 0 | 0 | 0 | 0 | 0 | 0 | 0 | 0 | 0 | 0 | 0.1275 |
| 6 | 0 | 0 | 0 | 0 | 0 | 0 | 0 | 0 | 0 | 0 | 0.1275 |
| 6 | 0 | 0 | 0.125 | 0 | 0 | 0 | 0 | 0 | 0 | 0 | 0.1275 |
| 6 | 0 | 0 | 0 | 0 | 0 | 0 | 0 | 0 | 0 | 0.0269 | 0.1275 |
| 6 | 0 | 0 | 0 | 0.05 | 0 | 0 | 0 | 0 | 0 | 0 | 0.1275 |

TABLE I-continued

| | | | | | | | | | | | |
|---|---|---|---|---|---|---|---|---|---|---|---|
| 6 | 0 | 0 | 0 | 0 | 0 | 0 | 0 | 0 | 0 | 0 | 0 |
| 7 | 0 | 0 | 0 | 0 | 0 | 0 | 0.0247 | 0 | 0 | 0 | 0.1275 |
| 7 | 0 | 0 | 0 | 0 | 0 | 0 | 0.0247 | 0 | 0 | 0 | 0.1275 |
| 7 | 0 | 0 | 0 | 0 | 0 | 0 | 0.0247 | 0 | 0 | 0 | 0.1275 |
| 7 | 0 | 0 | 0 | 0 | 0.5 | 0 | 0.0247 | 0 | 0 | 0 | 0.1275 |
| 7 | 0.5 | 0 | 0 | 0 | 0 | 0 | 0.0247 | 0 | 0 | 0 | 0.1275 |
| 7 | 0 | 0.5 | 0 | 0 | 0 | 0 | 0.0247 | 0 | 0 | 0 | 0.1275 |
| 7 | 0 | 0 | 0 | 0 | 0 | 0.098 | 0.0247 | 0 | 0 | 0 | 0.1275 |
| 7 | 0 | 0 | 0 | 0 | 0 | 0 | 0.0247 | 0.098 | 0 | 0 | 0.1275 |
| 7 | 0 | 0 | 0 | 0 | 0 | 0 | 0.0247 | 0 | 0.5 | 0 | 0.1275 |
| 7 | 0 | 0 | 0 | 0 | 0 | 0 | 0.0247 | 0 | 0 | 0 | 0.1275 |
| 7 | 0 | 0 | 0 | 0 | 0 | 0 | 0.0247 | 0 | 0 | 0 | 0.1275 |
| 7 | 0 | 0 | 0 | 0 | 0 | 0 | 0.0247 | 0 | 0 | 0 | 0.1275 |
| 7 | 0 | 0 | 0.5 | 0 | 0 | 0 | 0.0247 | 0 | 0 | 0 | 0.1275 |
| 7 | 0 | 0 | 0 | 0 | 0 | 0 | 0.0247 | 0 | 0 | 0.1074 | 0.1275 |
| 7 | 0 | 0 | 0 | 0.2 | 0 | 0 | 0.0247 | 0 | 0 | 0 | 0.1275 |
| 7 | 0 | 0 | 0 | 0 | 0 | 0 | 0 | 0 | 0 | 0 | 0 |
| 8 | 0 | 0 | 0 | 0 | 0 | 0 | 0.0433 | 0 | 0 | 0 | 0.1275 |
| 8 | 0 | 0 | 0 | 0 | 0 | 0 | 0.0433 | 0 | 0 | 0 | 0.1275 |
| 8 | 0 | 0 | 0 | 0 | 0 | 0 | 0.0433 | 0 | 0 | 0 | 0.1275 |
| 8 | 0 | 0 | 0 | 0 | 0.4063 | 0 | 0.0433 | 0 | 0 | 0 | 0.1275 |
| 8 | 0.4063 | 0 | 0 | 0 | 0 | 0 | 0.0433 | 0 | 0 | 0 | 0.1275 |
| 8 | 0 | 0.4063 | 0 | 0 | 0 | 0 | 0.0433 | 0 | 0 | 0 | 0.1275 |
| 8 | 0 | 0 | 0 | 0 | 0 | 0.0796 | 0.0433 | 0 | 0 | 0 | 0.1275 |
| 8 | 0 | 0 | 0 | 0 | 0 | 0 | 0.0433 | 0.0796 | 0 | 0 | 0.1275 |
| 8 | 0 | 0 | 0 | 0 | 0 | 0 | 0.0433 | 0 | 0.4063 | 0 | 0.1275 |
| 8 | 0 | 0 | 0 | 0 | 0 | 0 | 0.0433 | 0 | 0 | 0 | 0.1275 |
| 8 | 0 | 0 | 0 | 0 | 0 | 0 | 0.0433 | 0 | 0 | 0 | 0.1275 |
| 8 | 0 | 0 | 0 | 0 | 0 | 0 | 0.0433 | 0 | 0 | 0 | 0.1275 |
| 8 | 0 | 0 | 0.4063 | 0 | 0 | 0 | 0.0433 | 0 | 0 | 0 | 0.1275 |
| 8 | 0 | 0 | 0 | 0 | 0 | 0 | 0.0433 | 0 | 0 | 0.0873 | 0.1275 |
| 8 | 0 | 0 | 0 | 0.1625 | 0 | 0 | 0.0433 | 0 | 0 | 0 | 0.1275 |
| 8 | 0 | 0 | 0 | 0 | 0 | 0 | 0 | 0 | 0 | 0 | 0 |
| 9 | 0 | 0 | 0 | 0 | 0 | 0 | 0.0618 | 0 | 0 | 0 | 0.1275 |
| 9 | 0 | 0 | 0 | 0 | 0 | 0 | 0.0618 | 0 | 0 | 0 | 0.1275 |
| 9 | 0 | 0 | 0 | 0 | 0 | 0 | 0.0618 | 0 | 0 | 0 | 0.1275 |
| 9 | 0 | 0 | 0 | 0 | 0.3125 | 0 | 0.0618 | 0 | 0 | 0 | 0.1275 |
| 9 | 0.3125 | 0 | 0 | 0 | 0 | 0 | 0.0618 | 0 | 0 | 0 | 0.1275 |
| 9 | 0 | 0.3125 | 0 | 0 | 0 | 0 | 0.0618 | 0 | 0 | 0 | 0.1275 |
| 9 | 0 | 0 | 0 | 0 | 0 | 0.0613 | 0.0618 | 0 | 0 | 0 | 0.1275 |
| 9 | 0 | 0 | 0 | 0 | 0 | 0 | 0.0618 | 0.0613 | 0 | 0 | 0.1275 |
| 9 | 0 | 0 | 0 | 0 | 0 | 0 | 0.0618 | 0 | 0.3125 | 0 | 0.1275 |
| 9 | 0 | 0 | 0 | 0 | 0 | 0 | 0.0618 | 0 | 0 | 0 | 0.1275 |
| 9 | 0 | 0 | 0 | 0 | 0 | 0 | 0.0618 | 0 | 0 | 0 | 0.1275 |
| 9 | 0 | 0 | 0 | 0 | 0 | 0 | 0.0618 | 0 | 0 | 0 | 0.1275 |
| 9 | 0 | 0 | 0.3125 | 0 | 0 | 0 | 0.0618 | 0 | 0 | 0 | 0.1275 |
| 9 | 0 | 0 | 0 | 0 | 0 | 0 | 0.0618 | 0 | 0 | 0.0671 | 0.1275 |
| 9 | 0 | 0 | 0 | 0.125 | 0 | 0 | 0.0618 | 0 | 0 | 0 | 0.1275 |
| 9 | 0 | 0 | 0 | 0 | 0 | 0 | 0 | 0 | 0 | 0 | 0 |
| 10 | 0 | 0 | 0 | 0 | 0 | 0 | 0.0804 | 0 | 0 | 0 | 0.1275 |
| 10 | 0 | 0 | 0 | 0 | 0 | 0 | 0.0804 | 0 | 0 | 0 | 0.1275 |
| 10 | 0 | 0 | 0 | 0 | 0 | 0 | 0.0804 | 0 | 0 | 0 | 0.1275 |
| 10 | 0 | 0 | 0 | 0 | 0.2188 | 0 | 0.0804 | 0 | 0 | 0 | 0.1275 |
| 10 | 0.2188 | 0 | 0 | 0 | 0 | 0 | 0.0804 | 0 | 0 | 0 | 0.1275 |
| 10 | 0 | 0.2188 | 0 | 0 | 0 | 0 | 0.0804 | 0 | 0 | 0 | 0.1275 |
| 10 | 0 | 0 | 0 | 0 | 0 | 0.0429 | 0.0804 | 0 | 0 | 0 | 0.1275 |
| 10 | 0 | 0 | 0 | 0 | 0 | 0 | 0.0804 | 0.0429 | 0 | 0 | 0.1275 |
| 10 | 0 | 0 | 0 | 0 | 0 | 0 | 0.0804 | 0 | 0.2188 | 0 | 0.1275 |
| 10 | 0 | 0 | 0 | 0 | 0 | 0 | 0.0804 | 0 | 0 | 0 | 0.1275 |
| 10 | 0 | 0 | 0 | 0 | 0 | 0 | 0.0804 | 0 | 0 | 0 | 0.1275 |
| 10 | 0 | 0 | 0 | 0 | 0 | 0 | 0.0804 | 0 | 0 | 0 | 0.1275 |
| 10 | 0 | 0 | 0.2188 | 0 | 0 | 0 | 0.0804 | 0 | 0 | 0 | 0.1275 |
| 10 | 0 | 0 | 0 | 0 | 0 | 0 | 0.0804 | 0 | 0 | 0.047 | 0.1275 |
| 10 | 0 | 0 | 0 | 0.0875 | 0 | 0 | 0.0804 | 0 | 0 | 0 | 0.1275 |
| 10 | 0 | 0 | 0 | 0 | 0 | 0 | 0 | 0 | 0 | 0 | 0 |
| 11 | 0 | 0 | 0 | 0 | 0 | 0 | 0.0989 | 0 | 0 | 0 | 0.1275 |
| 11 | 0 | 0 | 0 | 0 | 0 | 0 | 0.0989 | 0 | 0 | 0 | 0.1275 |
| 11 | 0 | 0 | 0 | 0 | 0 | 0 | 0.0989 | 0 | 0 | 0 | 0.1275 |
| 11 | 0 | 0 | 0 | 0 | 0.125 | 0 | 0.0989 | 0 | 0 | 0 | 0.1275 |
| 11 | 0.125 | 0 | 0 | 0 | 0 | 0 | 0.0989 | 0 | 0 | 0 | 0.1275 |
| 11 | 0 | 0.125 | 0 | 0 | 0 | 0 | 0.0989 | 0 | 0 | 0 | 0.1275 |
| 11 | 0 | 0 | 0 | 0 | 0 | 0.0245 | 0.0989 | 0 | 0 | 0 | 0.1275 |
| 11 | 0 | 0 | 0 | 0 | 0 | 0 | 0.0989 | 0.0245 | 0 | 0 | 0.1275 |
| 11 | 0 | 0 | 0 | 0 | 0 | 0 | 0.0989 | 0 | 0.125 | 0 | 0.1275 |
| 11 | 0 | 0 | 0 | 0 | 0 | 0 | 0.0989 | 0 | 0 | 0 | 0.1275 |
| 11 | 0 | 0 | 0 | 0 | 0 | 0 | 0.0989 | 0 | 0 | 0 | 0.1275 |
| 11 | 0 | 0 | 0 | 0 | 0 | 0 | 0.0989 | 0 | 0 | 0 | 0.1275 |
| 11 | 0 | 0 | 0.125 | 0 | 0 | 0 | 0.0989 | 0 | 0 | 0 | 0.1275 |
| 11 | 0 | 0 | 0 | 0 | 0 | 0 | 0.0989 | 0 | 0 | 0.0269 | 0.1275 |

TABLE I-continued

| | | | | | | | | | | | |
|---|---|---|---|---|---|---|---|---|---|---|---|
| 11 | 0 | 0 | 0 | 0.05 | 0 | 0 | 0.0989 | 0 | 0 | 0 | 0.1275 |
| 11 | 0 | 0 | 0 | 0 | 0 | 0 | 0 | 0 | 0 | 0 | 0 |
| 12 | 0 | 0 | 0 | 0 | 0.125 | 0 | 0 | 0 | 0 | 0 | 0.1275 |
| 12 | 0 | 0 | 0 | 0 | 0.125 | 0 | 0 | 0 | 0 | 0 | 0.1275 |
| 12 | 0 | 0 | 0 | 0 | 0.125 | 0 | 0.0989 | 0 | 0 | 0 | 0.1275 |
| 12 | 0 | 0 | 0 | 0 | 0.125 | 0 | 0 | 0 | 0 | 0 | 0.1275 |
| 12 | 0.5 | 0 | 0 | 0 | 0.125 | 0 | 0 | 0 | 0 | 0 | 0.1275 |
| 12 | 0 | 0.5 | 0 | 0 | 0.125 | 0 | 0 | 0 | 0 | 0 | 0.1275 |
| 12 | 0 | 0 | 0 | 0 | 0.125 | 0.098 | 0 | 0 | 0 | 0 | 0.1275 |
| 12 | 0 | 0 | 0 | 0 | 0.125 | 0 | 0 | 0.098 | 0 | 0 | 0.1275 |
| 12 | 0 | 0 | 0 | 0 | 0.125 | 0 | 0 | 0 | 0.5 | 0 | 0.1275 |
| 12 | 0 | 0 | 0 | 0 | 0.125 | 0 | 0 | 0 | 0 | 0 | 0.1275 |
| 12 | 0 | 0 | 0 | 0 | 0.125 | 0 | 0 | 0 | 0 | 0 | 0.1275 |
| 12 | 0 | 0 | 0 | 0 | 0.125 | 0 | 0 | 0 | 0 | 0 | 0.1275 |
| 12 | 0 | 0 | 0.5 | 0 | 0.125 | 0 | 0 | 0 | 0 | 0 | 0.1275 |
| 12 | 0 | 0 | 0 | 0 | 0.125 | 0 | 0 | 0 | 0 | 0.1074 | 0.1275 |
| 12 | 0 | 0 | 0 | 0.2 | 0.125 | 0 | 0 | 0 | 0 | 0 | 0.1275 |
| 12 | 0 | 0 | 0 | 0 | 0 | 0 | 0 | 0 | 0 | 0 | 0 |
| 13 | 0 | 0 | 0 | 0 | 0.2188 | 0 | 0 | 0 | 0 | 0 | 0.1275 |
| 13 | 0 | 0 | 0 | 0 | 0.2188 | 0 | 0 | 0 | 0 | 0 | 0.1275 |
| 13 | 0 | 0 | 0 | 0 | 0.2188 | 0 | 0.0804 | 0 | 0 | 0 | 0.1275 |
| 13 | 0 | 0 | 0 | 0 | 0.2188 | 0 | 0 | 0 | 0 | 0 | 0.1275 |
| 13 | 0.4063 | 0 | 0 | 0 | 0.2188 | 0 | 0 | 0 | 0 | 0 | 0.1275 |
| 13 | 0 | 0.4063 | 0 | 0 | 0.2188 | 0 | 0 | 0 | 0 | 0 | 0.1275 |
| 13 | 0 | 0 | 0 | 0 | 0.2188 | 0.0796 | 0 | 0 | 0 | 0 | 0.1275 |
| 13 | 0 | 0 | 0 | 0 | 0.2188 | 0 | 0 | 0.0796 | 0 | 0 | 0.1275 |
| 13 | 0 | 0 | 0 | 0 | 0.2188 | 0 | 0 | 0 | 0.4063 | 0 | 0.1275 |
| 13 | 0 | 0 | 0 | 0 | 0.2188 | 0 | 0 | 0 | 0 | 0 | 0.1275 |
| 13 | 0 | 0 | 0 | 0 | 0.2188 | 0 | 0 | 0 | 0 | 0 | 0.1275 |
| 13 | 0 | 0 | 0 | 0 | 0.2188 | 0 | 0 | 0 | 0 | 0 | 0.1275 |
| 13 | 0 | 0 | 0.4063 | 0 | 0.2188 | 0 | 0 | 0 | 0 | 0 | 0.1275 |
| 13 | 0 | 0 | 0 | 0 | 0.2188 | 0 | 0 | 0 | 0 | 0.0873 | 0.1275 |
| 13 | 0 | 0 | 0 | 0.1625 | 0.2188 | 0 | 0 | 0 | 0 | 0 | 0.1275 |
| 13 | 0 | 0 | 0 | 0 | 0 | 0 | 0 | 0 | 0 | 0 | 0 |
| 14 | 0 | 0 | 0 | 0 | 0.3125 | 0 | 0 | 0 | 0 | 0 | 0.1275 |
| 14 | 0 | 0 | 0 | 0 | 0.3125 | 0 | 0 | 0 | 0 | 0 | 0.1275 |
| 14 | 0 | 0 | 0 | 0 | 0.3125 | 0 | 0.0618 | 0 | 0 | 0 | 0.1275 |
| 14 | 0 | 0 | 0 | 0 | 0.3125 | 0 | 0 | 0 | 0 | 0 | 0.1275 |
| 14 | 0.3125 | 0 | 0 | 0 | 0.3125 | 0 | 0 | 0 | 0 | 0 | 0.1275 |
| 14 | 0 | 0.3125 | 0 | 0 | 0.3125 | 0 | 0 | 0 | 0 | 0 | 0.1275 |
| 14 | 0 | 0 | 0 | 0 | 0.3125 | 0.0613 | 0 | 0 | 0 | 0 | 0.1275 |
| 14 | 0 | 0 | 0 | 0 | 0.3125 | 0 | 0 | 0.0613 | 0 | 0 | 0.1275 |
| 14 | 0 | 0 | 0 | 0 | 0.3125 | 0 | 0 | 0 | 0.3125 | 0 | 0.1275 |
| 14 | 0 | 0 | 0 | 0 | 0.3125 | 0 | 0 | 0 | 0 | 0 | 0.1275 |
| 14 | 0 | 0 | 0 | 0 | 0.3125 | 0 | 0 | 0 | 0 | 0 | 0.1275 |
| 14 | 0 | 0 | 0 | 0 | 0.3125 | 0 | 0 | 0 | 0 | 0 | 0.1275 |
| 14 | 0 | 0 | 0.3125 | 0 | 0.3125 | 0 | 0 | 0 | 0 | 0 | 0.1275 |
| 14 | 0 | 0 | 0 | 0 | 0.3125 | 0 | 0 | 0 | 0 | 0.0671 | 0.1275 |
| 14 | 0 | 0 | 0 | 0.125 | 0.3125 | 0 | 0 | 0 | 0 | 0 | 0.1275 |
| 14 | 0 | 0 | 0 | 0 | 0 | 0 | 0 | 0 | 0 | 0 | 0 |
| 15 | 0 | 0 | 0 | 0 | 0.4063 | 0 | 0 | 0 | 0 | 0 | 0.1275 |
| 15 | 0 | 0 | 0 | 0 | 0.4063 | 0 | 0 | 0 | 0 | 0 | 0.1275 |
| 15 | 0 | 0 | 0 | 0 | 0.4063 | 0 | 0.0433 | 0 | 0 | 0 | 0.1275 |
| 15 | 0 | 0 | 0 | 0 | 0.4063 | 0 | 0 | 0 | 0 | 0 | 0.1275 |
| 15 | 0.2188 | 0 | 0 | 0 | 0.4063 | 0 | 0 | 0 | 0 | 0 | 0.1275 |
| 15 | 0 | 0.2188 | 0 | 0 | 0.4063 | 0 | 0 | 0 | 0 | 0 | 0.1275 |
| 15 | 0 | 0 | 0 | 0 | 0.4063 | 0.0429 | 0 | 0 | 0 | 0 | 0.1275 |
| 15 | 0 | 0 | 0 | 0 | 0.4063 | 0 | 0 | 0.0429 | 0 | 0 | 0.1275 |
| 15 | 0 | 0 | 0 | 0 | 0.4063 | 0 | 0 | 0 | 0.2188 | 0 | 0.1275 |
| 15 | 0 | 0 | 0 | 0 | 0.4063 | 0 | 0 | 0 | 0 | 0 | 0.1275 |
| 15 | 0 | 0 | 0 | 0 | 0.4063 | 0 | 0 | 0 | 0 | 0 | 0.1275 |
| 15 | 0 | 0 | 0 | 0 | 0.4063 | 0 | 0 | 0 | 0 | 0 | 0.1275 |
| 15 | 0 | 0 | 0.2188 | 0 | 0.4063 | 0 | 0 | 0 | 0 | 0 | 0.1275 |
| 15 | 0 | 0 | 0 | 0 | 0.4063 | 0 | 0 | 0 | 0 | 0.047 | 0.1275 |
| 15 | 0 | 0 | 0 | 0.0875 | 0.4063 | 0 | 0 | 0 | 0 | 0 | 0.1275 |
| 15 | 0 | 0 | 0 | 0 | 0 | 0 | 0 | 0 | 0 | 0 | 0 |
| 16 | 0 | 0 | 0 | 0 | 0.5 | 0 | 0 | 0 | 0 | 0 | 0.1275 |
| 16 | 0 | 0 | 0 | 0 | 0.5 | 0 | 0 | 0 | 0 | 0 | 0.1275 |
| 16 | 0 | 0 | 0 | 0 | 0.5 | 0 | 0.0247 | 0 | 0 | 0 | 0.1275 |
| 16 | 0 | 0 | 0 | 0 | 0.5 | 0 | 0 | 0 | 0 | 0 | 0.1275 |
| 16 | 0.125 | 0 | 0 | 0 | 0.5 | 0 | 0 | 0 | 0 | 0 | 0.1275 |
| 16 | 0 | 0.125 | 0 | 0 | 0.5 | 0 | 0 | 0 | 0 | 0 | 0.1275 |
| 16 | 0 | 0 | 0 | 0 | 0.5 | 0.0245 | 0 | 0 | 0 | 0 | 0.1275 |
| 16 | 0 | 0 | 0 | 0 | 0.5 | 0 | 0 | 0.0245 | 0 | 0 | 0.1275 |
| 16 | 0 | 0 | 0 | 0 | 0.5 | 0 | 0 | 0 | 0.125 | 0 | 0.1275 |
| 16 | 0 | 0 | 0 | 0 | 0.5 | 0 | 0 | 0 | 0 | 0 | 0.1275 |
| 16 | 0 | 0 | 0 | 0 | 0.5 | 0 | 0 | 0 | 0 | 0 | 0.1275 |
| 16 | 0 | 0 | 0 | 0 | 0.5 | 0 | 0 | 0 | 0 | 0 | 0.1275 |
| 16 | 0 | 0 | 0.125 | 0 | 0.5 | 0 | 0 | 0 | 0 | 0 | 0.1275 |

TABLE I-continued

| | | | | | | | | | | | |
|---|---|---|---|---|---|---|---|---|---|---|---|
| 16 | 0 | 0 | 0 | 0 | 0.5 | 0 | 0 | 0 | 0 | 0.0269 | 0.1275 |
| 16 | 0 | 0 | 0 | 0.05 | 0.5 | 0 | 0 | 0 | 0 | 0 | 0.1275 |
| 16 | 0 | 0 | 0 | 0 | 0 | 0 | 0 | 0 | 0 | 0 | 0 |

| R real | ZrONO32 real | ZrOOAc2 real | SUM__ micromols | mol % Ce | mol % Co | mol % Cu | mol % Ge | mol % Mo | mol % Ru | mol % La | mol % Re | mol % Pt | mol % Zr |
|---|---|---|---|---|---|---|---|---|---|---|---|---|---|
| Temperature: 250 C. | | | | | | | | | | | | | |
| 1 | 0 | 0 | 0.1275 | 0 | 0 | 0 | 0 | 0 | 0 | 0 | 0 | 100 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0.1275 | 0 | 0 | 0 | 0 | 0 | 0 | 0 | 0 | 100 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0.1275 | 0 | 0 | 0 | 0 | 0 | 0 | 0 | 0 | 100 | 0 |
| 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 1 | 0 | 0 | 0.1275 | 0 | 0 | 0 | 0 | 0 | 0 | 0 | 0 | 100 | 0 |
| 2 | 0 | 0 | 0.2525 | 0 | 49.5 | 0 | 0 | 0 | 0 | 0 | 0 | 50.5 | 0 |
| 2 | 0 | 0 | 0.7525 | 66.45 | 16.61 | 0 | 0 | 0 | 0 | 0 | 0 | 16.94 | 0 |
| 2 | 0 | 0 | 0.3514 | 0 | 35.57 | 0 | 0 | 0 | 28.14 | 0 | 0 | 36.28 | 0 |
| 2 | 0 | 0 | 0.7525 | 0 | 16.61 | 0 | 0 | 66.45 | 0 | 0 | 0 | 16.94 | 0 |
| 2 | 0 | 0 | 0.7525 | 0 | 83.06 | 0 | 0 | 0 | 0 | 0 | 0 | 16.94 | 0 |
| 2 | 0 | 0 | 0.7525 | 0 | 83.06 | 0 | 0 | 0 | 0 | 0 | 0 | 16.94 | 0 |
| 2 | 0 | 0 | 0.3505 | 0 | 35.66 | 0 | 0 | 0 | 27.96 | 0 | 0 | 36.38 | 0 |
| 2 | 0 | 0 | 0.3505 | 0 | 35.66 | 0 | 0 | 0 | 27.96 | 0 | 0 | 36.38 | 0 |
| 2 | 0 | 0 | 0.7525 | 0 | 16.61 | 0 | 0 | 0 | 0 | 66.45 | 0 | 16.94 | 0 |
| 2 | 0 | 0 | 0.7525 | 66.45 | 16.61 | 0 | 0 | 0 | 0 | 0 | 0 | 16.94 | 0 |
| 2 | 0.5 | 0 | 0.7525 | 0 | 16.61 | 0 | 0 | 0 | 0 | 0 | 0 | 16.94 | 66.45 |
| 2 | 0 | 0.5 | 0.7525 | 0 | 16.61 | 0 | 0 | 0 | 0 | 0 | 0 | 16.94 | 66.45 |
| 2 | 0 | 0 | 0.7525 | 0 | 16.61 | 66.45 | 0 | 0 | 0 | 0 | 0 | 16.94 | 0 |
| 2 | 0 | 0 | 0.3599 | 0 | 34.73 | 0 | 0 | 0 | 0 | 0 | 29.84 | 35.43 | 0 |
| 2 | 0 | 0 | 0.4525 | 0 | 27.62 | 0 | 44.2 | 0 | 0 | 0 | 0 | 28.18 | 0 |
| 2 | 0 | 0 | 0 | 0 | 0 | 0 | 0 | 0 | 0 | 0 | 0 | 0 | 0 |
| 3 | 0 | 0 | 0.3463 | 0 | 63.18 | 0 | 0 | 0 | 0 | 0 | 0 | 36.82 | 0 |
| 3 | 0 | 0 | 0.7525 | 53.99 | 29.07 | 0 | 0 | 0 | 0 | 0 | 0 | 16.94 | 0 |
| 3 | 0 | 0 | 0.4266 | 0 | 51.28 | 0 | 0 | 0 | 18.84 | 0 | 0 | 29.89 | 0 |
| 3 | 0 | 0 | 0.7525 | 0 | 29.07 | 0 | 0 | 53.99 | 0 | 0 | 0 | 16.94 | 0 |
| 3 | 0 | 0 | 0.7525 | 0 | 83.06 | 0 | 0 | 0 | 0 | 0 | 0 | 16.94 | 0 |
| 3 | 0 | 0 | 0.7525 | 0 | 83.06 | 0 | 0 | 0 | 0 | 0 | 0 | 16.94 | 0 |
| 3 | 0 | 0 | 0.4259 | 0 | 51.36 | 0 | 0 | 0 | 18.7 | 0 | 0 | 29.94 | 0 |
| 3 | 0 | 0 | 0.4259 | 0 | 51.36 | 0 | 0 | 0 | 18.7 | 0 | 0 | 29.94 | 0 |
| 3 | 0 | 0 | 0.7525 | 0 | 29.07 | 0 | 0 | 0 | 0 | 53.99 | 0 | 16.94 | 0 |
| 3 | 0 | 0 | 0.7525 | 53.99 | 29.07 | 0 | 0 | 0 | 0 | 0 | 0 | 16.94 | 0 |
| 3 | 0.4063 | 0 | 0.7525 | 0 | 29.07 | 0 | 0 | 0 | 0 | 0 | 0 | 16.94 | 53.99 |
| 3 | 0 | 0.4063 | 0.7525 | 0 | 29.07 | 0 | 0 | 0 | 0 | 0 | 0 | 16.94 | 53.99 |
| 3 | 0 | 0 | 0.7525 | 0 | 29.07 | 53.99 | 0 | 0 | 0 | 0 | 0 | 16.94 | 0 |
| 3 | 0 | 0 | 0.4335 | 0 | 50.46 | 0 | 0 | 0 | 0 | 0 | 20.13 | 29.41 | 0 |
| 3 | 0 | 0 | 0.5088 | 0 | 43 | 0 | 31.94 | 0 | 0 | 0 | 0 | 25.06 | 0 |
| 3 | 0 | 0 | 0 | 0 | 0 | 0 | 0 | 0 | 0 | 0 | 0 | 0 | 0 |
| 4 | 0 | 0 | 0.44 | 0 | 71.02 | 0 | 0 | 0 | 0 | 0 | 0 | 28.98 | 0 |
| 4 | 0 | 0 | 0.7525 | 41.53 | 41.53 | 0 | 0 | 0 | 0 | 0 | 0 | 16.94 | 0 |
| 4 | 0 | 0 | 0.5018 | 0 | 62.27 | 0 | 0 | 0 | 12.32 | 0 | 0 | 25.41 | 0 |
| 4 | 0 | 0 | 0.7525 | 0 | 41.53 | 0 | 0 | 41.23 | 0 | 0 | 0 | 16.94 | 0 |
| 4 | 0 | 0 | 0.7525 | 0 | 83.06 | 0 | 0 | 0 | 0 | 0 | 0 | 16.94 | 0 |
| 4 | 0 | 0 | 0.7525 | 0 | 83.06 | 0 | 0 | 0 | 0 | 0 | 0 | 16.94 | 0 |
| 4 | 0 | 0 | 0.5013 | 0 | 62.34 | 0 | 0 | 0 | 12.22 | 0 | 0 | 25.44 | 0 |
| 4 | 0 | 0 | 0.5013 | 0 | 62.34 | 0 | 0 | 0 | 12.22 | 0 | 0 | 25.44 | 0 |
| 4 | 0 | 0 | 0.7525 | 0 | 41.53 | 0 | 0 | 0 | 0 | 41.53 | 0 | 16.94 | 0 |
| 4 | 0 | 0 | 0.7525 | 0 | 41.53 | 0 | 0 | 0 | 0 | 0 | 0 | 16.94 | 0 |
| 4 | 0.3125 | 0 | 0.7525 | 41.53 | 41.53 | 0 | 0 | 0 | 0 | 0 | 0 | 16.94 | 41.53 |
| 4 | 0 | 0.3125 | 0.7525 | 0 | 41.53 | 0 | 0 | 0 | 0 | 0 | 0 | 16.94 | 41.53 |
| 4 | 0 | 0 | 0.7525 | 0 | 41.53 | 41.53 | 0 | 0 | 0 | 0 | 0 | 16.94 | 0 |
| 4 | 0 | 0 | 0.5071 | 0 | 61.62 | 0 | 0 | 0 | 0 | 0 | 13.24 | 25.14 | 0 |
| 4 | 0 | 0 | 0.565 | 0 | 55.31 | 0 | 22.12 | 0 | 0 | 0 | 0 | 22.57 | 0 |
| 4 | 0 | 0 | 0.1275 | 0 | 0 | 0 | 0 | 0 | 0 | 0 | 0 | 100 | 0 |
| 5 | 0 | 0 | 0.5338 | 0 | 76.11 | 0 | 0 | 0 | 0 | 0 | 0 | 23.89 | 0 |
| 5 | 0 | 0 | 0.7525 | 29.07 | 53.99 | 0 | 0 | 0 | 0 | 0 | 0 | 16.94 | 0 |
| 5 | 0 | 0 | 0.577 | 0 | 70.4 | 0 | 0 | 0 | 7.5 | 0 | 0 | 22.1 | 0 |
| 5 | 0 | 0 | 0.7525 | 0 | 53.99 | 0 | 0 | 29.07 | 0 | 0 | 0 | 16.94 | 0 |
| 5 | 0 | 0 | 0.7525 | 0 | 83.06 | 0 | 0 | 0 | 0 | 0 | 0 | 16.94 | 0 |

TABLE I-continued

| | | | | | | | | | | | | | |
|---|---|---|---|---|---|---|---|---|---|---|---|---|---|
| 5 | 0 | 0 | 0.7525 | 0 | 83.06 | 0 | 0 | 0 | 0 | 0 | 0 | 16.94 | 0 |
| 5 | 0 | 0 | 0.5766 | 0 | 70.45 | 0 | 0 | 0 | 7.44 | 0 | 0 | 22.11 | 0 |
| 5 | 0 | 0 | 0.5766 | 0 | 70.45 | 0 | 0 | 0 | 7.44 | 0 | 0 | 22.11 | 0 |
| 5 | 0 | 0 | 0.7525 | 0 | 53.99 | 0 | 0 | 0 | 0 | 29.07 | 0 | 16.94 | 0 |
| 5 | 0 | 0 | 0.7525 | 29.07 | 53.99 | 0 | 0 | 0 | 0 | 0 | 0 | 16.94 | 0 |
| 5 | 0.2188 | 0 | 0.7525 | 0 | 53.99 | 0 | 0 | 0 | 0 | 0 | 0 | 16.94 | 29.07 |
| 5 | 0 | 0.2188 | 0.7525 | 0 | 53.99 | 0 | 0 | 0 | 0 | 0 | 0 | 16.94 | 29.07 |
| 5 | 0 | 0 | 0.7525 | 0 | 53.99 | 29.07 | 0 | 0 | 0 | 0 | 0 | 16.94 | 0 |
| 5 | 0 | 0 | 0.5807 | 0 | 69.95 | 0 | 0 | 0 | 0 | 0 | 8.09 | 21.95 | 0 |
| 5 | 0 | 0 | 0.6213 | 0 | 65.39 | 0 | 14.08 | 0 | 0 | 0 | 0 | 20.52 | 0 |
| 5 | 0 | 0 | 0 | 0 | 0 | 0 | 0 | 0 | 0 | 0 | 0 | 0 | 0 |
| 6 | 0 | 0 | 0.6275 | 0 | 79.68 | 0 | 0 | 0 | 0 | 0 | 0 | 20.32 | 0 |
| 6 | 0 | 0 | 0.7525 | 16.61 | 66.45 | 0 | 0 | 0 | 0 | 0 | 0 | 16.94 | 0 |
| 6 | 0 | 0 | 0.6522 | 0 | 76.66 | 0 | 0 | 0 | 3.79 | 0 | 0 | 19.55 | 0 |
| 6 | 0 | 0 | 0.7525 | 0 | 66.45 | 0 | 0 | 16.61 | 0 | 0 | 0 | 16.94 | 0 |
| 6 | 0 | 0 | 0.7525 | 0 | 83.06 | 0 | 0 | 0 | 0 | 0 | 0 | 16.94 | 0 |
| 6 | 0 | 0 | 0.7525 | 0 | 83.06 | 0 | 0 | 0 | 0 | 0 | 0 | 16.94 | 0 |
| 6 | 0 | 0 | 0.652 | 0 | 76.69 | 0 | 0 | 0 | 3.76 | 0 | 0 | 19.56 | 0 |
| 6 | 0 | 0 | 0.652 | 0 | 76.69 | 0 | 0 | 0 | 3.76 | 0 | 0 | 19.56 | 0 |
| 6 | 0 | 0 | 0.7525 | 0 | 66.45 | 0 | 0 | 0 | 0 | 16.61 | 0 | 16.94 | 0 |
| 6 | 0 | 0 | 0.7525 | 16.61 | 66.45 | 0 | 0 | 0 | 0 | 0 | 0 | 16.94 | 0 |
| 6 | 0.125 | 0 | 0.7525 | 0 | 66.45 | 0 | 0 | 0 | 0 | 0 | 0 | 16.94 | 16.61 |
| 6 | 0 | 0.125 | 0.7525 | 0 | 66.45 | 0 | 0 | 0 | 0 | 0 | 0 | 16.94 | 16.61 |
| 6 | 0 | 0 | 0.7525 | 0 | 66.45 | 16.61 | 0 | 0 | 0 | 0 | 0 | 16.94 | 0 |
| 6 | 0 | 0 | 0.6544 | 0 | 76.41 | 0 | 0 | 0 | 0 | 0 | 4.1 | 19.48 | 0 |
| 6 | 0 | 0 | 0.6775 | 0 | 73.8 | 0 | 7.38 | 0 | 0 | 0 | 0 | 18.82 | 0 |
| 6 | 0 | 0 | 0 | 0 | 0 | 0 | 0 | 0 | 0 | 0 | 0 | 0 | 0 |
| 7 | 0 | 0 | 0.1522 | 0 | 0 | 0 | 0 | 0 | 16.24 | 0 | 0 | 83.76 | 0 |
| 7 | 0 | 0 | 0.6522 | 0 | 76.66 | 0 | 0 | 0 | 3.79 | 0 | 0 | 19.55 | 0 |
| 7 | 0 | 0 | 0.6522 | 76.66 | 0 | 0 | 0 | 0 | 3.79 | 0 | 0 | 19.55 | 0 |
| 7 | 0 | 0 | 0.6522 | 0 | 0 | 0 | 0 | 76.66 | 3.79 | 0 | 0 | 19.55 | 0 |
| 7 | 0 | 0 | 0.6522 | 0 | 76.66 | 0 | 0 | 0 | 3.79 | 0 | 0 | 19.55 | 0 |
| 7 | 0 | 0 | 0.6522 | 0 | 76.66 | 0 | 0 | 0 | 3.79 | 0 | 0 | 19.55 | 0 |
| 7 | 0 | 0 | 0.2502 | 0 | 0 | 0 | 0 | 0 | 49.05 | 0 | 0 | 50.95 | 0 |
| 7 | 0 | 0 | 0.2502 | 0 | 0 | 0 | 0 | 0 | 49.05 | 0 | 0 | 50.95 | 0 |
| 7 | 0 | 0 | 0.6522 | 0 | 0 | 0 | 0 | 0 | 3.79 | 76.66 | 0 | 19.55 | 0 |
| 7 | 0 | 0 | 0.6522 | 76.66 | 0 | 0 | 0 | 0 | 3.79 | 0 | 0 | 19.55 | 0 |
| 7 | 0.5 | 0 | 0.6522 | 0 | 0 | 0 | 0 | 0 | 3.79 | 0 | 0 | 19.55 | 76.66 |
| 7 | 0 | 0.5 | 0.6522 | 0 | 0 | 0 | 0 | 0 | 3.79 | 0 | 0 | 19.55 | 76.66 |
| 7 | 0 | 0 | 0.6522 | 0 | 0 | 76.66 | 0 | 0 | 3.79 | 0 | 0 | 19.55 | 0 |
| 7 | 0 | 0 | 0.2596 | 0 | 0 | 0 | 0 | 0 | 9.52 | 0 | 41.37 | 49.11 | 0 |
| 7 | 0 | 0 | 0.3522 | 0 | 0 | 0 | 56.78 | 0 | 7.02 | 0 | 0 | 36.2 | 0 |
| 7 | 0 | 0 | 0.1275 | 0 | 0 | 0 | 0 | 0 | 0 | 0 | 0 | 100 | 0 |
| 8 | 0 | 0 | 0.1708 | 0 | 0 | 0 | 0 | 0 | 25.34 | 0 | 0 | 74.66 | 0 |
| 8 | 0 | 0 | 0.577 | 0 | 70.4 | 0 | 0 | 0 | 7.5 | 0 | 0 | 22.1 | 0 |
| 8 | 0 | 0 | 0.577 | 70.4 | 0 | 0 | 0 | 0 | 7.5 | 0 | 0 | 22.1 | 0 |
| 8 | 0 | 0 | 0.577 | 0 | 0 | 0 | 0 | 70.4 | 7.5 | 0 | 0 | 22.1 | 0 |
| 8 | 0 | 0 | 0.577 | 0 | 70.4 | 0 | 0 | 0 | 7.5 | 0 | 0 | 22.1 | 0 |
| 8 | 0 | 0 | 0.577 | 0 | 70.4 | 0 | 0 | 0 | 7.5 | 0 | 0 | 22.1 | 0 |
| 8 | 0 | 0 | 0.2504 | 0 | 0 | 0 | 0 | 0 | 49.08 | 0 | 0 | 50.92 | 0 |
| 8 | 0 | 0 | 0.2504 | 0 | 0 | 0 | 0 | 0 | 49.08 | 0 | 0 | 50.92 | 0 |
| 8 | 0 | 0 | 0.577 | 0 | 0 | 0 | 0 | 0 | 7.5 | 70.4 | 0 | 22.1 | 0 |
| 8 | 0 | 0 | 0.577 | 70.4 | 0 | 0 | 0 | 0 | 7.5 | 0 | 0 | 22.1 | 0 |
| 8 | 0.4063 | 0 | 0.577 | 0 | 0 | 0 | 0 | 0 | 7.5 | 0 | 0 | 22.1 | 70.4 |
| 8 | 0 | 0.4063 | 0.577 | 0 | 0 | 0 | 0 | 0 | 7.5 | 0 | 0 | 22.1 | 70.4 |
| 8 | 0 | 0 | 0.577 | 0 | 0 | 70.4 | 0 | 0 | 7.5 | 0 | 0 | 22.1 | 0 |
| 8 | 0 | 0 | 0.258 | 0 | 0 | 0 | 0 | 0 | 16.77 | 0 | 33.82 | 49.41 | 0 |
| 8 | 0 | 0 | 0.333 | 0 | 0 | 0 | 48.76 | 0 | 12.98 | 0 | 0 | 38.26 | 0 |
| 8 | 0 | 0 | 0 | 0 | 0 | 0 | 0 | 0 | 0 | 0 | 0 | 0 | 0 |
| 9 | 0 | 0 | 0.1893 | 0 | 0 | 0 | 0 | 0 | 32.65 | 0 | 0 | 67.35 | 0 |
| 9 | 0 | 0 | 0.5018 | 0 | 62.27 | 0 | 0 | 0 | 12.32 | 0 | 0 | 25.41 | 0 |
| 9 | 0 | 0 | 0.5018 | 62.27 | 0 | 0 | 0 | 0 | 12.32 | 0 | 0 | 25.41 | 0 |
| 9 | 0 | 0 | 0.5018 | 0 | 0 | 0 | 0 | 62.27 | 12.32 | 0 | 0 | 25.41 | 0 |
| 9 | 0 | 0 | 0.5018 | 0 | 62.27 | 0 | 0 | 0 | 12.32 | 0 | 0 | 25.41 | 0 |
| 9 | 0 | 0 | 0.5018 | 0 | 62.27 | 0 | 0 | 0 | 12.32 | 0 | 0 | 25.41 | 0 |
| 9 | 0 | 0 | 0.2506 | 0 | 0 | 0 | 0 | 0 | 49.11 | 0 | 0 | 50.89 | 0 |
| 9 | 0 | 0 | 0.2506 | 0 | 0 | 0 | 0 | 0 | 49.11 | 0 | 0 | 50.89 | 0 |
| 9 | 0 | 0 | 0.5018 | 0 | 0 | 0 | 0 | 0 | 12.32 | 62.27 | 0 | 25.41 | 0 |
| 9 | 0 | 0 | 0.5018 | 62.27 | 0 | 0 | 0 | 0 | 12.32 | 0 | 0 | 25.41 | 0 |
| 9 | 0.3125 | 0 | 0.5018 | 0 | 0 | 0 | 0 | 0 | 12.32 | 0 | 0 | 25.41 | 62.27 |
| 9 | 0 | 0.3125 | 0.5018 | 0 | 0 | 0 | 0 | 0 | 12.32 | 0 | 0 | 25.41 | 62.27 |
| 9 | 0 | 0 | 0.5018 | 0 | 0 | 62.27 | 0 | 0 | 12.32 | 0 | 0 | 25.41 | 0 |
| 9 | 0 | 0 | 0.2564 | 0 | 0 | 0 | 0 | 0 | 24.1 | 0 | 26.18 | 49.72 | 0 |
| 9 | 0 | 0 | 0.3143 | 0 | 0 | 0 | 39.77 | 0 | 19.67 | 0 | 0 | 40.56 | 0 |
| 9 | 0 | 0 | 0 | 0 | 0 | 0 | 0 | 0 | 0 | 0 | 0 | 0 | 0 |
| 10 | 0 | 0 | 0.2079 | 0 | 0 | 0 | 0 | 0 | 38.66 | 0 | 0 | 61.34 | 0 |
| 10 | 0 | 0 | 0.4266 | 0 | 51.28 | 0 | 0 | 0 | 18.84 | 0 | 0 | 29.89 | 0 |
| 10 | 0 | 0 | 0.4266 | 51.28 | 0 | 0 | 0 | 0 | 18.84 | 0 | 0 | 29.89 | 0 |
| 10 | 0 | 0 | 0.4266 | 0 | 0 | 0 | 0 | 51.28 | 18.84 | 0 | 0 | 29.89 | 0 |

TABLE I-continued

| | | | | | | | | | | | | | |
|---|---|---|---|---|---|---|---|---|---|---|---|---|---|
| 10 | 0 | 0 | 0.4266 | 0 | 51.28 | 0 | 0 | 0 | 18.84 | 0 | 0 | 29.89 | 0 |
| 10 | 0 | 0 | 0.4266 | 0 | 51.28 | 0 | 0 | 0 | 18.84 | 0 | 0 | 29.89 | 0 |
| 10 | 0 | 0 | 0.2507 | 0 | 0 | 0 | 0 | 0 | 49.15 | 0 | 0 | 50.85 | 0 |
| 10 | 0 | 0 | 0.2507 | 0 | 0 | 0 | 0 | 0 | 49.15 | 0 | 0 | 50.85 | 0 |
| 10 | 0 | 0 | 0.4266 | 0 | 0 | 0 | 0 | 0 | 18.84 | 51.28 | 0 | 29.89 | 0 |
| 10 | 0 | 0 | 0.4266 | 51.28 | 0 | 0 | 0 | 0 | 18.84 | 0 | 0 | 29.89 | 0 |
| 10 | 0.2188 | 0 | 0.4266 | 0 | 0 | 0 | 0 | 0 | 18.84 | 0 | 0 | 29.89 | 51.28 |
| 10 | 0 | 0.2188 | 0.4266 | 0 | 0 | 0 | 0 | 0 | 18.84 | 0 | 0 | 29.89 | 51.28 |
| 10 | 0 | 0 | 0.4266 | 0 | 0 | 51.28 | 0 | 0 | 18.84 | 0 | 0 | 29.89 | 0 |
| 10 | 0 | 0 | 0.2548 | 0 | 0 | 0 | 0 | 0 | 31.53 | 0 | 18.44 | 50.03 | 0 |
| 10 | 0 | 0 | 0.2954 | 0 | 0 | 0 | 29.63 | 0 | 27.21 | 0 | 0 | 43.17 | 0 |
| 10 | 0 | 0 | 0.1275 | 0 | 0 | 0 | 0 | 0 | 0 | 0 | 0 | 100 | 0 |
| 11 | 0 | 0 | 0.2264 | 0 | 0 | 0 | 0 | 0 | 43.68 | 0 | 0 | 56.32 | 0 |
| 11 | 0 | 0 | 0.3514 | 0 | 35.57 | 0 | 0 | 0 | 28.14 | 0 | 0 | 36.28 | 0 |
| 11 | 0 | 0 | 0.3514 | 35.57 | 0 | 0 | 0 | 0 | 28.14 | 0 | 0 | 36.28 | 0 |
| 11 | 0 | 0 | 0.3514 | 0 | 0 | 0 | 0 | 35.57 | 28.14 | 0 | 0 | 36.28 | 0 |
| 11 | 0 | 0 | 0.3514 | 0 | 35.57 | 0 | 0 | 0 | 28.14 | 0 | 0 | 36.28 | 0 |
| 11 | 0 | 0 | 0.3514 | 0 | 35.57 | 0 | 0 | 0 | 28.14 | 0 | 0 | 36.28 | 0 |
| 11 | 0 | 0 | 0.2509 | 0 | 0 | 0 | 0 | 0 | 49.18 | 0 | 0 | 50.82 | 0 |
| 11 | 0 | 0 | 0.2509 | 0 | 0 | 0 | 0 | 0 | 49.18 | 0 | 0 | 50.82 | 0 |
| 11 | 0 | 0 | 0.3514 | 0 | 0 | 0 | 0 | 0 | 28.14 | 35.57 | 0 | 36.28 | 0 |
| 11 | 0 | 0 | 0.3514 | 35.57 | 0 | 0 | 0 | 0 | 28.14 | 0 | 0 | 36.28 | 0 |
| 11 | 0.125 | 0 | 0.3514 | 0 | 0 | 0 | 0 | 0 | 28.14 | 0 | 0 | 36.28 | 35.57 |
| 11 | 0 | 0.125 | 0.3514 | 0 | 0 | 0 | 0 | 0 | 28.14 | 0 | 0 | 36.28 | 35.57 |
| 11 | 0 | 0 | 0.3514 | 0 | 0 | 35.57 | 0 | 0 | 28.14 | 0 | 0 | 36.28 | 0 |
| 11 | 0 | 0 | 0.2533 | 0 | 0 | 0 | 0 | 0 | 39.05 | 0 | 10.6 | 50.35 | 0 |
| 11 | 0 | 0 | 0.2764 | 0 | 0 | 0 | 18.09 | 0 | 35.78 | 0 | 0 | 46.13 | 0 |
| 11 | 0 | 0 | 0 | 0 | 0 | 0 | 0 | 0 | 0 | 0 | 0 | 0 | 0 |
| 12 | 0 | 0 | 0.2525 | 0 | 0 | 0 | 0 | 49.5 | 0 | 0 | 0 | 50.5 | 0 |
| 12 | 0 | 0 | 0.7525 | 0 | 66.45 | 0 | 0 | 16.61 | 0 | 0 | 0 | 16.94 | 0 |
| 12 | 0 | 0 | 0.3514 | 0 | 0 | 0 | 0 | 35.57 | 28.14 | 0 | 0 | 36.28 | 0 |
| 12 | 0 | 0 | 0.7525 | 66.45 | 0 | 0 | 0 | 16.61 | 0 | 0 | 0 | 16.94 | 0 |
| 12 | 0 | 0 | 0.7525 | 0 | 66.45 | 0 | 0 | 16.61 | 0 | 0 | 0 | 16.94 | 0 |
| 12 | 0 | 0 | 0.7525 | 0 | 66.45 | 0 | 0 | 16.61 | 0 | 0 | 0 | 16.94 | 0 |
| 12 | 0 | 0 | 0.3505 | 0 | 0 | 0 | 0 | 35.66 | 27.96 | 0 | 0 | 36.38 | 0 |
| 12 | 0 | 0 | 0.3505 | 0 | 0 | 0 | 0 | 35.66 | 27.96 | 0 | 0 | 36.38 | 0 |
| 12 | 0 | 0 | 0.7525 | 0 | 0 | 0 | 0 | 16.61 | 0 | 66.45 | 0 | 16.94 | 0 |
| 12 | 0 | 0 | 0.7525 | 66.45 | 0 | 0 | 0 | 16.61 | 0 | 0 | 0 | 16.94 | 0 |
| 12 | 0.5 | 0 | 0.7525 | 0 | 0 | 0 | 0 | 16.61 | 0 | 0 | 0 | 16.94 | 66.45 |
| 12 | 0 | 0.5 | 0.7525 | 0 | 0 | 0 | 0 | 16.61 | 0 | 0 | 0 | 16.94 | 66.45 |
| 12 | 0 | 0 | 0.7525 | 0 | 0 | 66.45 | 0 | 16.61 | 5 | 0 | 0 | 16.94 | 0 |
| 12 | 0 | 0 | 0.3599 | 0 | 0 | 0 | 0 | 34.73 | 0 | 0 | 29.84 | 35.43 | 0 |
| 12 | 0 | 0 | 0.4525 | 0 | 0 | 0 | 44.2 | 27.62 | 0 | 0 | 0 | 28.18 | 0 |
| 12 | 0 | 0 | 0 | 0 | 0 | 0 | 0 | 0 | 0 | 0 | 0 | 0 | 0 |
| 13 | 0 | 0 | 0.3463 | 0 | 0 | 0 | 0 | 63.18 | 0 | 0 | 0 | 36.82 | 0 |
| 13 | 0 | 0 | 0.7525 | 0 | 53.99 | 0 | 0 | 29.07 | 0 | 0 | 0 | 16.94 | 0 |
| 13 | 0 | 0 | 0.4266 | 0 | 0 | 0 | 0 | 51.28 | 18.84 | 0 | 0 | 29.89 | 0 |
| 13 | 0 | 0 | 0.7525 | 53.99 | 0 | 0 | 0 | 29.07 | 0 | 0 | 0 | 16.94 | 0 |
| 13 | 0 | 0 | 0.7525 | 0 | 53.99 | 0 | 0 | 29.07 | 0 | 0 | 0 | 16.94 | 0 |
| 13 | 0 | 0 | 0.7525 | 0 | 53.99 | 0 | 0 | 29.07 | 0 | 0 | 0 | 16.94 | 0 |
| 13 | 0 | 0 | 0.4259 | 0 | 0 | 0 | 0 | 51.36 | 18.7 | 0 | 0 | 29.94 | 0 |
| 13 | 0 | 0 | 0.4259 | 0 | 0 | 0 | 0 | 51.36 | 18.7 | 0 | 0 | 29.94 | 0 |
| 13 | 0 | 0 | 0.7525 | 0 | 0 | 0 | 0 | 29.07 | 0 | 53.99 | 0 | 16.94 | 0 |
| 13 | 0 | 0 | 0.7525 | 53.99 | 0 | 0 | 0 | 29.07 | 0 | 0 | 0 | 16.94 | 0 |
| 13 | 0.4063 | 0 | 0.7525 | 0 | 0 | 0 | 0 | 29.07 | 0 | 0 | 0 | 16.94 | 53.99 |
| 13 | 0 | 0.4063 | 0.7525 | 0 | 0 | 0 | 0 | 29.07 | 0 | 0 | 0 | 16.94 | 53.99 |
| 13 | 0 | 0 | 0.7525 | 0 | 0 | 53.99 | 0 | 29.07 | 0 | 0 | 0 | 16.94 | 0 |
| 13 | 0 | 0 | 0.4335 | 0 | 0 | 0 | 0 | 50.46 | 0 | 0 | 20.13 | 29.41 | 0 |
| 13 | 0 | 0 | 0.5088 | 0 | 0 | 0 | 31.94 | 43 | 0 | 0 | 0 | 25.06 | 0 |
| 13 | 0 | 0 | 0.1275 | 0 | 0 | 0 | 0 | 0 | 0 | 0 | 0 | 100 | 0 |
| 14 | 0 | 0 | 0.44 | 0 | 0 | 0 | 0 | 71.02 | 0 | 0 | 0 | 28.98 | 0 |
| 14 | 0 | 0 | 0.7525 | 0 | 41.53 | 0 | 0 | 41.53 | 0 | 0 | 0 | 16.94 | 0 |
| 14 | 0 | 0 | 0.5018 | 0 | 0 | 0 | 0 | 62.27 | 12.32 | 0 | 0 | 25.41 | 0 |
| 14 | 0 | 0 | 0.7525 | 41.53 | 0 | 0 | 0 | 41.53 | 0 | 0 | 0 | 16.94 | 0 |
| 14 | 0 | 0 | 0.7525 | 0 | 41.53 | 0 | 0 | 41.53 | 0 | 0 | 0 | 16.94 | 0 |
| 14 | 0 | 0 | 0.7525 | 0 | 41.53 | 0 | 0 | 41.53 | 0 | 0 | 0 | 16.94 | 0 |
| 14 | 0 | 0 | 0.5013 | 0 | 0 | 0 | 0 | 62.34 | 12.22 | 0 | 0 | 25.44 | 0 |
| 14 | 0 | 0 | 0.5013 | 0 | 0 | 0 | 0 | 62.34 | 12.22 | 0 | 0 | 25.44 | 0 |
| 14 | 0 | 0 | 0.7525 | 0 | 0 | 0 | 0 | 41.53 | 0 | 41.53 | 0 | 16.94 | 0 |
| 14 | 0 | 0 | 0.7525 | 41.53 | 0 | 0 | 0 | 41.53 | 0 | 0 | 0 | 16.94 | 0 |
| 14 | 0.3125 | 0 | 0.7525 | 0 | 0 | 0 | 0 | 41.53 | 0 | 0 | 0 | 16.94 | 41.53 |
| 14 | 0 | 0.3125 | 0.7525 | 0 | 0 | 0 | 0 | 41.53 | 0 | 0 | 0 | 16.94 | 41.53 |
| 14 | 0 | 0 | 0.7525 | 0 | 0 | 41.53 | 0 | 41.53 | 0 | 0 | 0 | 16.94 | 0 |
| 14 | 0 | 0 | 0.5071 | 0 | 0 | 0 | 0 | 61.62 | 0 | 0 | 13.24 | 25.14 | 0 |
| 14 | 0 | 0 | 0.565 | 0 | 0 | 0 | 22.12 | 55.31 | 0 | 0 | 0 | 22.57 | 0 |
| 14 | 0 | 0 | 0 | 0 | 0 | 0 | 0 | 0 | 0 | 0 | 0 | 0 | 0 |
| 15 | 0 | 0 | 0.5338 | 0 | 0 | 0 | 0 | 76.11 | 0 | 0 | 0 | 23.89 | 0 |
| 15 | 0 | 0 | 0.7525 | 0 | 29.07 | 0 | 0 | 53.99 | 0 | 0 | 0 | 16.94 | 0 |
| 15 | 0 | 0 | 0.577 | 0 | 0 | 0 | 0 | 70.4 | 7.5 | 0 | 0 | 22.1 | 0 |

TABLE I-continued

| | | | | | | | | | | | | | |
|---|---|---|---|---|---|---|---|---|---|---|---|---|---|
| 15 | 0 | 0 | 0.7525 | 29.07 | 0 | 0 | 0 | 53.99 | 0 | 0 | 0 | 16.94 | 0 |
| 15 | 0 | 0 | 0.7525 | 0 | 29.07 | 0 | 0 | 53.99 | 0 | 0 | 0 | 16.94 | 0 |
| 15 | 0 | 0 | 0.7525 | 0 | 29.07 | 0 | 0 | 53.99 | 0 | 0 | 0 | 16.94 | 0 |
| 15 | 0 | 0 | 0.5766 | 0 | 0 | 0 | 0 | 70.45 | 7.44 | 0 | 0 | 22.11 | 0 |
| 15 | 0 | 0 | 0.5766 | 0 | 0 | 0 | 0 | 70.45 | 7.44 | 0 | 0 | 22.11 | 0 |
| 15 | 0 | 0 | 0.7525 | 0 | 0 | 0 | 0 | 53.99 | 0 | 29.07 | 0 | 16.94 | 0 |
| 15 | 0 | 0 | 0.7525 | 29.07 | 0 | 0 | 0 | 53.99 | 0 | 0 | 0 | 16.94 | 0 |
| 15 | 0.2188 | 0 | 0.7525 | 0 | 0 | 0 | 0 | 53.99 | 0 | 0 | 0 | 16.94 | 29.07 |
| 15 | 0 | 0.2188 | 0.7525 | 0 | 0 | 0 | 0 | 53.99 | 0 | 0 | 0 | 16.94 | 29.07 |
| 15 | 0 | 0 | 0.7525 | 0 | 0 | 29.07 | 0 | 53.99 | 0 | 0 | 0 | 16.94 | 0 |
| 15 | 0 | 0 | 0.5807 | 0 | 0 | 0 | 0 | 69.95 | 0 | 0 | 8.09 | 21.95 | 0 |
| 15 | 0 | 0 | 0.6213 | 0 | 0 | 0 | 14.08 | 65.39 | 0 | 0 | 0 | 20.52 | 0 |
| 15 | 0 | 0 | 0 | 0 | 0 | 0 | 0 | 0 | 0 | 0 | 0 | 0 | 0 |
| 16 | 0 | 0 | 0.6275 | 0 | 0 | 0 | 0 | 79.68 | 0 | 0 | 0 | 20.32 | 0 |
| 16 | 0 | 0 | 0.7525 | 0 | 16.61 | 0 | 0 | 66.45 | 0 | 0 | 0 | 16.94 | 0 |
| 16 | 0 | 0 | 0.6522 | 0 | 0 | 0 | 0 | 76.66 | 3.79 | 0 | 0 | 19.55 | 0 |
| 16 | 0 | 0 | 0.7525 | 16.61 | 0 | 0 | 0 | 66.45 | 0 | 0 | 0 | 16.94 | 0 |
| 16 | 0 | 0 | 0.7525 | 0 | 16.61 | 0 | 0 | 66.45 | 0 | 0 | 0 | 16.94 | 0 |
| 16 | 0 | 0 | 0.7525 | 0 | 16.61 | 0 | 0 | 66.45 | 0 | 0 | 0 | 16.94 | 0 |
| 16 | 0 | 0 | 0.652 | 0 | 0 | 0 | 0 | 76.69 | 3.76 | 0 | 0 | 19.56 | 0 |
| 16 | 0 | 0 | 0.652 | 0 | 0 | 0 | 0 | 76.69 | 3.76 | 0 | 0 | 19.56 | 0 |
| 16 | 0 | 0 | 0.7525 | 0 | 0 | 0 | 0 | 66.45 | 0 | 16.61 | 0 | 16.94 | 0 |
| 16 | 0 | 0 | 0.7525 | 16.61 | 0 | 0 | 0 | 66.45 | 0 | 0 | 0 | 16.94 | 0 |
| 16 | 0.125 | 0 | 0.7525 | 0 | 0 | 0 | 0 | 66.45 | 0 | 0 | 0 | 16.94 | 16.61 |
| 16 | 0 | 0.125 | 0.7525 | 0 | 0 | 0 | 0 | 66.45 | 0 | 0 | 0 | 16.94 | 16.61 |
| 16 | 0 | 0 | 0.7525 | 0 | 0 | 16.61 | 0 | 66.45 | 0 | 0 | 0 | 16.94 | 0 |
| 16 | 0 | 0 | 0.6544 | 0 | 0 | 0 | 0 | 76.41 | 0 | 0 | 4.1 | 19.48 | 0 |
| 16 | 0 | 0 | 0.6775 | 0 | 0 | 0 | 7.38 | 73.8 | 0 | 0 | 0 | 18.82 | 0 |
| 16 | 0 | 0 | 0.1275 | 0 | 0 | 0 | 0 | 0 | 0 | 0 | 0 | 100 | 0 |

TABLE II

| R real | C real | COCONV real | H2OCONV real | CO2PROD real | CO2PERPROD real | CH4PROD real | Pt2.5%/ ZrO2_std real | PtNH32NO22 real | shift2_ std real |
|---|---|---|---|---|---|---|---|---|---|
| Temperature: 200 C. | | | | | | | | | |
| 1 | 1 | 5.8854 | 7.1324 | 0.334 | 12.4611 | 0.0591 | 0.384 | 0 | 0 |
| 1 | 2 | −0.6933 | 1.7113 | 0.0121 | 0.4524 | 0.0112 | 0 | 0 | 0 |
| 1 | 3 | −1.0879 | −0.033 | 0.0156 | 0.5835 | 0.0099 | 0 | 0 | 0 |
| 1 | 4 | 8.4959 | 6.4002 | 0.3047 | 11.3709 | 0.0443 | 0 | 0 | 0.768 |
| 1 | 5 | −0.2835 | 0.6389 | 0.0083 | 0.3103 | 0.0042 | 0 | 0 | 0 |
| 1 | 6 | −0.0255 | 1.131 | −0.0073 | −0.2728 | 0.0001 | 0 | 0 | 0 |
| 1 | 7 | 16.8595 | 11.8588 | 0.5807 | 21.6685 | 0.0759 | 0.384 | 0 | 0 |
| 1 | 8 | 0.5792 | 1.6555 | −0.0166 | −0.6207 | −0.0015 | 0 | 0 | 0 |
| 1 | 9 | 0.5058 | −0.1249 | −0.0251 | −0.9379 | −0.0006 | 0 | 0 | 0 |
| 1 | 10 | 2.462 | 0.2771 | 0.0413 | 1.541 | 0.0092 | 0 | 0 | 0.768 |
| 1 | 11 | 0.0019 | −1.3951 | −0.0192 | −0.7182 | 0.0002 | 0 | 0 | 0 |
| 1 | 12 | 0.2469 | −0.1814 | −0.0266 | −0.9942 | −0.0021 | 0 | 0 | 0 |
| 1 | 13 | 11.9953 | 8.0254 | 0.352 | 13.1329 | 0.044 | 0.384 | 0 | 0 |
| 1 | 14 | −0.2562 | −2.7011 | −0.0114 | −0.4265 | 0.0037 | 0 | 0 | 0 |
| 1 | 15 | 0.6886 | −0.0929 | −0.0235 | −0.8767 | −0.0026 | 0 | 0 | 0 |
| 1 | 16 | 2.2755 | −0.5365 | 0.0631 | 2.3544 | 0.0118 | 0 | 0 | 0.768 |
| 2 | 1 | 1.6292 | 1.7918 | 0.0235 | 0.8778 | 0.0007 | 0 | 0.1275 | 0 |
| 2 | 2 | 1.0595 | 0.9687 | −0.0202 | −0.752 | −0.0051 | 0 | 0.1275 | 0 |
| 2 | 3 | 3.1871 | 2.0235 | 0.0769 | 2.8696 | 0.0072 | 0 | 0.1275 | 0 |
| 2 | 4 | 11.3379 | 8.344 | 0.3126 | 11.6649 | 0.0345 | 0 | 0.1275 | 0 |
| 2 | 5 | 7.334 | 4.6193 | 0.1933 | 7.2111 | 0.0233 | 0 | 0.1275 | 0 |
| 2 | 6 | 16.1807 | 10.5884 | 0.5103 | 19.0429 | 0.0638 | 0 | 0.1275 | 0 |
| 2 | 7 | 13.3218 | 8.6946 | 0.3821 | 14.2574 | 0.0468 | 0 | 0.1275 | 0 |
| 2 | 8 | 13.8451 | 8.4363 | 0.4407 | 16.4438 | 0.0555 | 0 | 0.1275 | 0 |
| 2 | 9 | 3.7336 | 1.8779 | 0.076 | 2.8349 | 0.0082 | 0 | 0.1275 | 0 |
| 2 | 10 | 3.7611 | 2.5358 | 0.0642 | 2.3968 | 0.0066 | 0 | 0.1275 | 0 |
| 2 | 11 | 9.6508 | 6.4773 | 0.2773 | 10.347 | 0.035 | 0 | 0.1275 | 0 |
| 2 | 12 | 9.1424 | 6.1475 | 0.2521 | 9.4059 | 0.0294 | 0 | 0.1275 | 0 |
| 2 | 13 | 5.5133 | 3.6401 | 0.155 | 5.7829 | 0.0203 | 0 | 0.1275 | 0 |
| 2 | 14 | 4.9192 | 2.3616 | 0.1071 | 3.9974 | 0.014 | 0 | 0.1275 | 0 |
| 2 | 15 | 3.2245 | 1.7666 | 0.0897 | 3.3488 | 0.0134 | 0 | 0.1275 | 0 |
| 2 | 16 | 0.0898 | −0.5096 | −0.0063 | −0.2341 | 0.001 | 0 | 0 | 0 |

TABLE II-continued

| | | | | | | | | | |
|---|---|---|---|---|---|---|---|---|---|
| 3 | 1 | 6.9984 | 4.7277 | 0.1921 | 7.1687 | 0.0208 | 0 | 0.1148 | 0 |
| 3 | 2 | 1.7067 | 0.9785 | 0.0029 | 0.108 | −0.0017 | 0 | 0.1148 | 0 |
| 3 | 3 | 2.6544 | 1.9617 | 0.0481 | 1.7934 | 0.0045 | 0 | 0.1148 | 0 |
| 3 | 4 | 12.8291 | 8.3823 | 0.3884 | 14.4943 | 0.0479 | 0 | 0.1148 | 0 |
| 3 | 5 | 7.3563 | 5.392 | 0.2102 | 7.8432 | 0.025 | 0 | 0.1148 | 0 |
| 3 | 6 | 16.2779 | 11.5339 | 0.4914 | 18.3342 | 0.0591 | 0 | 0.1148 | 0 |
| 3 | 7 | 14.8045 | 9.8506 | 0.4449 | 16.6026 | 0.0553 | 0 | 0.1148 | 0 |
| 3 | 8 | 11.2329 | 7.7728 | 0.3309 | 12.3461 | 0.0385 | 0 | 0.1148 | 0 |
| 3 | 9 | 2.866 | 2.3243 | 0.048 | 1.7899 | 0.0045 | 0 | 0.1148 | 0 |
| 3 | 10 | 4.7888 | 4.0416 | 0.0856 | 3.1937 | 0.0072 | 0 | 0.1148 | 0 |
| 3 | 11 | 7.5704 | 6.3606 | 0.2386 | 8.9027 | 0.0272 | 0 | 0.1148 | 0 |
| 3 | 12 | 8.8338 | 8.1131 | 0.241 | 8.9937 | 0.0242 | 0 | 0.1148 | 0 |
| 3 | 13 | 5.5254 | 3.9512 | 0.1376 | 5.1339 | 0.0154 | 0 | 0.1148 | 0 |
| 3 | 14 | 6.1987 | 4.2911 | 0.1741 | 6.4953 | 0.0195 | 0 | 0.1148 | 0 |
| 3 | 15 | 3.654 | 2.1732 | 0.0701 | 2.6141 | 0.0056 | 0 | 0.1148 | 0 |
| 3 | 16 | 0.3139 | −0.4382 | −0.0103 | −0.3839 | −0.002 | 0 | 0 | 0 |
| 4 | 1 | 8.1372 | 6.051 | 0.2684 | 10.0162 | 0.0285 | 0 | 0.102 | 0 |
| 4 | 2 | 1.4135 | −1.0921 | −0.0019 | −0.0694 | 0.0006 | 0 | 0.102 | 0 |
| 4 | 3 | 2.3694 | 2.3665 | 0.05 | 1.8672 | 0.0016 | 0 | 0.102 | 0 |
| 4 | 4 | 12.8778 | 10.2102 | 0.3982 | 14.858 | 0.0416 | 0 | 0.102 | 0 |
| 4 | 5 | 6.8789 | 5.4193 | 0.218 | 8.1354 | 0.0221 | 0 | 0.102 | 0 |
| 4 | 6 | 17.1121 | 11.1844 | 0.5742 | 21.4257 | 0.0656 | 0 | 0.102 | 0 |
| 4 | 7 | 15.2253 | 7.4374 | 0.5006 | 18.6802 | 0.0634 | 0 | 0.102 | 0 |
| 4 | 8 | 12.1072 | 6.9574 | 0.3621 | 13.5097 | 0.0421 | 0 | 0.102 | 0 |
| 4 | 9 | 3.0168 | 2.3445 | 0.0559 | 2.0868 | 0.0029 | 0 | 0.102 | 0 |
| 4 | 10 | 3.4366 | 2.6695 | 0.0827 | 3.0869 | 0.0059 | 0 | 0.102 | 0 |
| 4 | 11 | 9.3273 | 8.1068 | 0.2694 | 10.0512 | 0.0274 | 0 | 0.102 | 0 |
| 4 | 12 | 8.2623 | 5.7824 | 0.2401 | 8.9601 | 0.0264 | 0 | 0.102 | 0 |
| 4 | 13 | 6.4459 | 5.7408 | 0.1696 | 6.3286 | 0.0159 | 0 | 0.102 | 0 |
| 4 | 14 | 7.5269 | 4.4391 | 0.2096 | 7.8207 | 0.0229 | 0 | 0.102 | 0 |
| 4 | 15 | 2.3665 | 3.2131 | 0.1135 | 4.2368 | 0.0107 | 0 | 0.102 | 0 |
| 4 | 16 | 14.955 | 9.0888 | 0.4741 | 17.6909 | 0.0576 | 0.384 | 0 | 0 |
| 5 | 1 | 7.255 | 5.6173 | 0.2393 | 8.929 | 0.0219 | 0 | 0.0893 | 0 |
| 5 | 2 | 1.2894 | 1.2279 | −0.0083 | −0.3084 | −0.0072 | 0 | 0.0893 | 0 |
| 5 | 3 | 2.7038 | 3.3448 | 0.0437 | 1.6316 | −0.0003 | 0 | 0.0893 | 0 |
| 5 | 4 | 11.707 | 8.2569 | 0.3623 | 13.517 | 0.0367 | 0 | 0.0893 | 0 |
| 5 | 5 | 7.6925 | 6.1121 | 0.2125 | 7.9274 | 0.0185 | 0 | 0.0893 | 0 |
| 5 | 6 | 17.0142 | 12.7392 | 0.5131 | 19.1465 | 0.0602 | 0 | 0.0893 | 0 |
| 5 | 7 | 14.8949 | 11.3697 | 0.4646 | 17.3347 | 0.0527 | 0 | 0.0893 | 0 |
| 5 | 8 | 9.7274 | 5.9642 | 0.3049 | 11.3767 | 0.0342 | 0 | 0.0893 | 0 |
| 5 | 9 | 3.4389 | 3.1002 | 0.0582 | 2.1723 | 0.0038 | 0 | 0.0893 | 0 |
| 5 | 10 | 3.1194 | 2.1123 | 0.0777 | 2.8988 | 0.007 | 0 | 0.0893 | 0 |
| 5 | 11 | 9.8621 | 7.5832 | 0.2728 | 10.1805 | 0.0278 | 0 | 0.0893 | 0 |
| 5 | 12 | 7.0266 | 5.2932 | 0.1915 | 7.1464 | 0.0207 | 0 | 0.0893 | 0 |
| 5 | 13 | 5.7354 | 4.6583 | 0.155 | 5.7842 | 0.0157 | 0 | 0.0893 | 0 |
| 5 | 14 | 5.5119 | 4.962 | 0.1327 | 4.952 | 0.0106 | 0 | 0.0893 | 0 |
| 5 | 15 | 2.8173 | 1.2279 | 0.0802 | 2.993 | 0.004 | 0 | 0.0893 | 0 |
| 5 | 16 | 0.8239 | 1.9962 | 0.0239 | 0.8909 | −0.0001 | 0 | 0 | 0 |
| 6 | 1 | 4.7196 | 3.0755 | 0.1686 | 6.2918 | 0.018 | 0 | 0.0765 | 0 |
| 6 | 2 | 0.6723 | 0.5379 | 0.0114 | 0.4248 | −0.001 | 0 | 0.0765 | 0 |
| 6 | 3 | 1.5179 | 1.911 | 0.0258 | 0.9622 | −0.0024 | 0 | 0.0765 | 0 |
| 6 | 4 | 11.4899 | 6.8245 | 0.3774 | 14.0835 | 0.0427 | 0 | 0.0765 | 0 |
| 6 | 5 | 7.2343 | 5.5992 | 0.2075 | 7.7439 | 0.0214 | 0 | 0.0765 | 0 |
| 6 | 6 | 16.1946 | 11.0902 | 0.5277 | 19.6917 | 0.062 | 0 | 0.0765 | 0 |
| 6 | 7 | 14.3055 | 10.2177 | 0.4469 | 16.6766 | 0.0505 | 0 | 0.0765 | 0 |
| 6 | 8 | 8.3454 | 6.6475 | 0.2423 | 9.0418 | 0.0238 | 0 | 0.0765 | 0 |
| 6 | 9 | 4.5897 | 2.8387 | 0.0804 | 3.0009 | 0.0145 | 0 | 0.0765 | 0 |
| 6 | 10 | 3.5258 | 2.9589 | 0.0899 | 3.3528 | 0.0069 | 0 | 0.0765 | 0 |
| 6 | 11 | 9.6292 | 7.4338 | 0.3058 | 11.4104 | 0.0348 | 0 | 0.0765 | 0 |
| 6 | 12 | 5.4461 | 4.774 | 0.14 | 5.2242 | 0.0095 | 0 | 0.0765 | 0 |
| 6 | 13 | 5.2789 | 3.9957 | 0.1742 | 6.4996 | 0.0198 | 0 | 0.0765 | 0 |
| 6 | 14 | 6.0234 | 3.1388 | 0.208 | 7.7595 | 0.023 | 0 | 0.0765 | 0 |
| 6 | 15 | 2.7153 | 2.6186 | 0.0572 | 2.1344 | 0.0026 | 0 | 0.0765 | 0 |
| 6 | 16 | 0.6172 | 0.881 | −0.0048 | −0.1782 | −0.006 | 0 | 0 | 0 |
| 7 | 1 | 3.6058 | 2.8177 | 0.1122 | 4.1848 | 0.0114 | 0 | 0.0638 | 0 |
| 7 | 2 | 1.5457 | 1.1415 | −0.0046 | −0.1727 | −0.0077 | 0 | 0.0638 | 0 |
| 7 | 3 | 1.1265 | 1.8421 | 0.0513 | 1.9154 | 0.0017 | 0 | 0.0638 | 0 |
| 7 | 4 | 10.9458 | 6.7214 | 0.3327 | 12.4157 | 0.0389 | 0 | 0.0638 | 0 |
| 7 | 5 | 7.3704 | 6.6413 | 0.2192 | 8.18 | 0.0202 | 0 | 0.0638 | 0 |
| 7 | 6 | 16.5168 | 12.5524 | 0.5112 | 19.0738 | 0.0567 | 0 | 0.0638 | 0 |
| 7 | 7 | 14.124 | 9.8009 | 0.4529 | 16.8982 | 0.0533 | 0 | 0.0638 | 0 |
| 7 | 8 | 8.0466 | 6.418 | 0.2665 | 9.9439 | 0.0279 | 0 | 0.0638 | 0 |
| 7 | 9 | 4.9159 | 1.9763 | 0.102 | 3.8056 | 0.021 | 0 | 0.0638 | 0 |
| 7 | 10 | 3.921 | 1.5095 | 0.0817 | 3.0486 | 0.0055 | 0 | 0.0638 | 0 |
| 7 | 11 | 9.7833 | 6.8289 | 0.3095 | 11.5499 | 0.0353 | 0 | 0.0638 | 0 |

TABLE II-continued

| | | | | | | | | | |
|---|---|---|---|---|---|---|---|---|---|
| 7 | 12 | 5.7437 | 4.0574 | 0.1866 | 6.9609 | 0.0216 | 0 | 0.0638 | 0 |
| 7 | 13 | 5.4086 | 4.6319 | 0.1686 | 6.2897 | 0.0153 | 0 | 0.0638 | 0 |
| 7 | 14 | 4.7264 | 2.9579 | 0.1463 | 5.4578 | 0.0098 | 0 | 0.0638 | 0 |
| 7 | 15 | 2.2359 | 1.425 | 0.0541 | 2.0176 | 0.003 | 0 | 0.0638 | 0 |
| 7 | 16 | 1.905 | −0.5369 | 0.0559 | 2.0863 | 0.0028 | 0 | 0 | 0.768 |
| 8 | 1 | 1.8516 | 1.7327 | 0.0497 | 1.8541 | −0.001 | 0 | 0.051 | 0 |
| 8 | 2 | 0.7246 | −0.2854 | 0.0085 | 0.3172 | −0.0044 | 0 | 0.051 | 0 |
| 8 | 3 | 2.2172 | 1.0419 | 0.0055 | 0.2056 | −0.0051 | 0 | 0.051 | 0 |
| 8 | 4 | 8.5881 | 6.1691 | 0.2633 | 9.8264 | 0.031 | 0 | 0.051 | 0 |
| 8 | 5 | 6.9155 | 5.1078 | 0.1919 | 7.1608 | 0.0186 | 0 | 0.051 | 0 |
| 8 | 6 | 13.6231 | 8.8606 | 0.4319 | 16.1142 | 0.0489 | 0 | 0.051 | 0 |
| 8 | 7 | 12.7013 | 7.6084 | 0.3755 | 14.013 | 0.0421 | 0 | 0.051 | 0 |
| 8 | 8 | 5.7321 | 3.3144 | 0.1554 | 5.7994 | 0.0148 | 0 | 0.051 | 0 |
| 8 | 9 | 6.1461 | 1.113 | 0.0847 | 3.1618 | 0.0264 | 0 | 0.051 | 0 |
| 8 | 10 | 3.0168 | 1.2432 | 0.0668 | 2.491 | 0.003 | 0 | 0.051 | 0 |
| 8 | 11 | 7.9516 | 3.9932 | 0.2353 | 8.7787 | 0.0247 | 0 | 0.051 | 0 |
| 8 | 12 | 4.5547 | 2.22 | 0.1059 | 3.9517 | 0.0094 | 0 | 0.051 | 0 |
| 8 | 13 | 5.4421 | 2.2227 | 0.1712 | 6.3866 | 0.0179 | 0 | 0.051 | 0 |
| 8 | 14 | 2.9709 | 1.2529 | 0.0884 | 3.2997 | 0.0058 | 0 | 0.051 | 0 |
| 8 | 15 | 2.0502 | 0.6577 | 0.053 | 1.9778 | 0.0016 | 0 | 0.051 | 0 |
| 8 | 16 | 1.0942 | −0.5602 | −0.0087 | −0.3263 | −0.0082 | 0 | 0 | 0 |
| 9 | 1 | 3.6525 | 0.857 | 0.0654 | 2.4413 | 0.0008 | 0 | 0.0383 | 0 |
| 9 | 2 | 0.9979 | 0.3153 | 0.0037 | 0.1389 | −0.0052 | 0 | 0.0383 | 0 |
| 9 | 3 | 1.7466 | −0.0553 | 0.0132 | 0.492 | −0.004 | 0 | 0.0383 | 0 |
| 9 | 4 | 8.1388 | 6.6606 | 0.2396 | 8.9397 | 0.0239 | 0 | 0.0383 | 0 |
| 9 | 5 | 6.3048 | 3.5229 | 0.1519 | 5.6663 | 0.0115 | 0 | 0.0383 | 0 |
| 9 | 6 | 11.8358 | 7.3317 | 0.3738 | 13.9486 | 0.044 | 0 | 0.0383 | 0 |
| 9 | 7 | 12.0946 | 6.9223 | 0.3836 | 14.3153 | 0.0431 | 0 | 0.0383 | 0 |
| 9 | 8 | 4.5013 | 2.4933 | 0.127 | 4.7393 | 0.0114 | 0 | 0.0383 | 0 |
| 9 | 9 | 5.5653 | −1.5672 | 0.0994 | 3.7081 | 0.0371 | 0 | 0.0383 | 0 |
| 9 | 10 | 2.0973 | −0.2551 | 0.0556 | 2.0746 | 0.0051 | 0 | 0.0383 | 0 |
| 9 | 11 | 6.2072 | 3.3304 | 0.1879 | 7.0119 | 0.0196 | 0 | 0.0383 | 0 |
| 9 | 12 | 3.6564 | 2.9811 | 0.0776 | 2.8969 | 0.004 | 0 | 0.0383 | 0 |
| 9 | 13 | 5.2299 | 1.9964 | 0.1531 | 5.7131 | 0.0156 | 0 | 0.0383 | 0 |
| 9 | 14 | 1.9393 | 0.5427 | 0.0483 | 1.8011 | 0.0018 | 0 | 0.0383 | 0 |
| 9 | 15 | 1.6602 | 0.2685 | 0.0303 | 1.1291 | 0.0009 | 0 | 0.0383 | 0 |
| 9 | 16 | −0.3094 | −1.3702 | 0.0051 | 0.1919 | −0.0023 | 0 | 0 | 0 |
| 10 | 1 | 1.2902 | −0.2919 | −0.0046 | −0.1733 | −0.005 | 0 | 0.1275 | 0 |
| 10 | 2 | 0.5013 | −0.0646 | 0.0015 | 0.055 | −0.0023 | 0 | 0.1275 | 0 |
| 10 | 3 | 6.4947 | 3.5233 | 0.2062 | 7.6942 | 0.0238 | 0 | 0.1275 | 0 |
| 10 | 4 | 4.8095 | 1.6288 | 0.1367 | 5.0991 | 0.0131 | 0 | 0.1275 | 0 |
| 10 | 5 | 11.2766 | 6.8521 | 0.3728 | 13.9092 | 0.04 | 0 | 0.1275 | 0 |
| 10 | 6 | 6.4291 | 3.2734 | 0.2109 | 7.8701 | 0.0235 | 0 | 0.1275 | 0 |
| 10 | 7 | 5.8614 | 3.204 | 0.1874 | 6.9938 | 0.0213 | 0 | 0.1275 | 0 |
| 10 | 8 | 3.9022 | −0.0952 | 0.1469 | 5.4801 | 0.0167 | 0 | 0.1275 | 0 |
| 10 | 9 | 5.9845 | 3.8381 | 0.1724 | 6.4326 | 0.0186 | 0 | 0.1275 | 0 |
| 10 | 10 | 6.3544 | 3.1325 | 0.1996 | 7.4459 | 0.0201 | 0 | 0.1275 | 0 |
| 10 | 11 | 4.2593 | 1.9552 | 0.1068 | 3.9844 | 0.009 | 0 | 0.1275 | 0 |
| 10 | 12 | 11.8549 | 4.3493 | 0.4371 | 16.3114 | 0.0553 | 0 | 0.1275 | 0 |
| 10 | 13 | 3.4944 | 1.347 | 0.0565 | 2.1073 | 0.0007 | 0 | 0.1275 | 0 |
| 10 | 14 | 1.6799 | −1.1032 | 0.0339 | 1.2643 | 0.0015 | 0 | 0.1275 | 0 |
| 10 | 15 | 1.2201 | 0.118 | 0.0146 | 0.5448 | −0.0033 | 0 | 0.1275 | 0 |
| 10 | 16 | 13.1891 | 7.744 | 0.4607 | 17.19 | 0.0567 | 0.384 | 0 | 0 |
| 11 | 1 | 0.4697 | −0.9386 | 0.0209 | 0.7815 | −0.0002 | 0 | 0.1126 | 0 |
| 11 | 2 | 0.3137 | −0.3079 | 0.0152 | 0.5655 | −0.0038 | 0 | 0.1126 | 0 |
| 11 | 3 | 3.7312 | 3.0925 | 0.1295 | 4.8339 | 0.0116 | 0 | 0.1126 | 0 |
| 11 | 4 | 4.2947 | 4.1725 | 0.1258 | 4.6927 | 0.0118 | 0 | 0.1126 | 0 |
| 11 | 5 | 8.2513 | 4.6606 | 0.2639 | 9.848 | 0.0294 | 0 | 0.1126 | 0 |
| 11 | 6 | 7.7794 | 6.0534 | 0.2575 | 9.6078 | 0.0255 | 0 | 0.1126 | 0 |
| 11 | 7 | 7.1211 | 4.9645 | 0.2168 | 8.0891 | 0.0217 | 0 | 0.1126 | 0 |
| 11 | 8 | 6.6894 | 3.5982 | 0.2513 | 9.3781 | 0.0253 | 0 | 0.1126 | 0 |
| 11 | 9 | 5.7623 | 1.227 | 0.1774 | 6.6189 | 0.0215 | 0 | 0.1126 | 0 |
| 11 | 10 | 3.9535 | 3.5594 | 0.1199 | 4.4725 | 0.0085 | 0 | 0.1126 | 0 |
| 11 | 11 | 2.9585 | 1.468 | 0.1075 | 4.0128 | 0.0071 | 0 | 0.1126 | 0 |
| 11 | 12 | 10.8769 | 7.5198 | 0.371 | 13.8434 | 0.0424 | 0 | 0.1126 | 0 |
| 11 | 13 | 2.5558 | 1.6142 | 0.0798 | 2.9792 | 0.0034 | 0 | 0.1126 | 0 |
| 11 | 14 | 0.9894 | 0.2057 | 0.0325 | 1.2133 | 0.0006 | 0 | 0.1126 | 0 |
| 11 | 15 | −0.1651 | −0.5824 | 0.0225 | 0.8396 | 0.0003 | 0 | 0.1126 | 0 |
| 11 | 16 | 0.2312 | −0.1398 | 0.0419 | 1.5619 | 0.0035 | 0 | 0 | 0 |
| 12 | 1 | 0.1745 | −0.7789 | 0.0282 | 1.0504 | −0.0007 | 0 | 0.0978 | 0 |
| 12 | 2 | 0.1358 | −0.938 | 0.0123 | 0.4577 | −0.0028 | 0 | 0.0978 | 0 |
| 12 | 3 | 2.687 | 2.3049 | 0.1171 | 4.3697 | 0.0094 | 0 | 0.0978 | 0 |
| 12 | 4 | 2.7011 | 2.3219 | 0.0919 | 3.43 | 0.0055 | 0 | 0.0978 | 0 |
| 12 | 5 | 7.2214 | 3.1868 | 0.2524 | 9.4194 | 0.0269 | 0 | 0.0978 | 0 |
| 12 | 6 | 5.2931 | 1.7052 | 0.2034 | 7.5887 | 0.0227 | 0 | 0.0978 | 0 |

TABLE II-continued

| | | | | | | | | | |
|---|---|---|---|---|---|---|---|---|---|
| 12 | 7 | 5.7915 | 3.2059 | 0.1832 | 6.8371 | 0.015 | 0 | 0.0978 | 0 |
| 12 | 8 | 1.223 | −0.5999 | 0.053 | 1.9777 | 0.0048 | 0 | 0.0978 | 0 |
| 12 | 9 | 4.3277 | 1.446 | 0.1789 | 6.6748 | 0.0204 | 0 | 0.0978 | 0 |
| 12 | 10 | 2.3611 | −1.6069 | 0.0943 | 3.5182 | 0.0118 | 0 | 0.0978 | 0 |
| 12 | 11 | 1.217 | 1.2973 | 0.0636 | 2.3728 | 0.0026 | 0 | 0.0978 | 0 |
| 12 | 12 | 9.4921 | 6.357 | 0.3144 | 11.7329 | 0.0336 | 0 | 0.0978 | 0 |
| 12 | 13 | 1.1195 | −0.1983 | 0.051 | 1.9028 | 0.0019 | 0 | 0.0978 | 0 |
| 12 | 14 | −0.4284 | −1.8025 | 0.0316 | 1.1789 | 0.004 | 0 | 0.0978 | 0 |
| 12 | 15 | −0.3772 | −1.2476 | 0.0263 | 0.9816 | −0.0008 | 0 | 0.0978 | 0 |
| 12 | 16 | −0.6263 | −0.7525 | 0.0219 | 0.8183 | −0.0027 | 0 | 0 | 0 |
| 13 | 1 | −0.2044 | −0.3108 | 0.0233 | 0.869 | −0.001 | 0 | 0.0829 | 0 |
| 13 | 2 | −0.0357 | −1.5987 | 0.0196 | 0.731 | −0.0015 | 0 | 0.0829 | 0 |
| 13 | 3 | 2.5404 | 2.3681 | 0.0759 | 2.8308 | 0.0035 | 0 | 0.0829 | 0 |
| 13 | 4 | 2.9681 | 1.1781 | 0.1095 | 4.0842 | 0.009 | 0 | 0.0829 | 0 |
| 13 | 5 | 4.7412 | 2.8854 | 0.1519 | 5.6697 | 0.0123 | 0 | 0.0829 | 0 |
| 13 | 6 | 4.056 | 3.1404 | 0.1425 | 5.3155 | 0.0122 | 0 | 0.0829 | 0 |
| 13 | 7 | 3.445 | 3.976 | 0.1125 | 4.1961 | 0.0064 | 0 | 0.0829 | 0 |
| 13 | 8 | 2.1923 | 2.6039 | 0.0689 | 2.5713 | 0.0029 | 0 | 0.0829 | 0 |
| 13 | 9 | 3.6921 | 2.839 | 0.1493 | 5.5723 | 0.0156 | 0 | 0.0829 | 0 |
| 13 | 10 | 1.9985 | 1.0455 | 0.0943 | 3.5184 | 0.0065 | 0 | 0.0829 | 0 |
| 13 | 11 | 1.8485 | 1.7993 | 0.0648 | 2.4165 | 0.001 | 0 | 0.0829 | 0 |
| 13 | 12 | 7.3772 | 4.858 | 0.2612 | 9.7459 | 0.0272 | 0 | 0.0829 | 0 |
| 13 | 13 | 0.67 | −0.7364 | 0.0509 | 1.8995 | 0.0036 | 0 | 0.0829 | 0 |
| 13 | 14 | −0.1545 | −0.1684 | 0.04 | 1.4918 | 0.0027 | 0 | 0.0829 | 0 |
| 13 | 15 | −0.2342 | −1.9441 | 0.0301 | 1.1244 | 0.0022 | 0 | 0.0829 | 0 |
| 13 | 16 | 1.0182 | −0.222 | 0.0635 | 2.3688 | 0.0043 | 0 | 0 | 0.768 |
| 14 | 1 | 0.0925 | 0.2319 | 0.0233 | 0.8681 | −0.0031 | 0 | 0.068 | 0 |
| 14 | 2 | −0.3296 | 1.4585 | 0.019 | 0.7088 | −0.0031 | 0 | 0.068 | 0 |
| 14 | 3 | 1.1002 | 0.2941 | 0.0694 | 2.5909 | 0.0068 | 0 | 0.068 | 0 |
| 14 | 4 | 0.2831 | 0.151 | 0.054 | 2.0157 | 0.0033 | 0 | 0.068 | 0 |
| 14 | 5 | 3.0444 | 2.2158 | 0.1301 | 4.8563 | 0.0105 | 0 | 0.068 | 0 |
| 14 | 6 | 0.0907 | −1.4912 | 0.0607 | 2.2642 | 0.0081 | 0 | 0.068 | 0 |
| 14 | 7 | 1.4092 | 0.7998 | 0.0648 | 2.4188 | 0.0046 | 0 | 0.068 | 0 |
| 14 | 8 | 0.6786 | 0.7924 | 0.041 | 1.5316 | 0.0021 | 0 | 0.068 | 0 |
| 14 | 9 | 2.5503 | 0.8249 | 0.1115 | 4.1607 | 0.0105 | 0 | 0.068 | 0 |
| 14 | 10 | 0.8956 | −0.2159 | 0.066 | 2.4626 | 0.0059 | 0 | 0.068 | 0 |
| 14 | 11 | 0.524 | 0.8305 | 0.0497 | 1.8557 | 0.0015 | 0 | 0.068 | 0 |
| 14 | 12 | 2.3834 | 0.0805 | 0.1461 | 5.4498 | 0.0132 | 0 | 0.068 | 0 |
| 14 | 13 | 0.7037 | −0.6285 | 0.0416 | 1.5519 | 0.0023 | 0 | 0.068 | 0 |
| 14 | 14 | −0.8416 | −2.9099 | 0.0431 | 1.6083 | 0.0049 | 0 | 0.068 | 0 |
| 14 | 15 | −0.5009 | −2.4335 | 0.0188 | 0.7005 | 0.0002 | 0 | 0.068 | 0 |
| 14 | 16 | −0.5344 | 1.0228 | 0.0124 | 0.4625 | −0.0053 | 0 | 0 | 0 |
| 15 | 1 | −0.7531 | −0.171 | 0.0264 | 0.9837 | 0.0003 | 0 | 0.0531 | 0 |
| 15 | 2 | −0.0408 | 0.6254 | 0.0184 | 0.6852 | −0.0028 | 0 | 0.0531 | 0 |
| 15 | 3 | 0.8082 | 0.4025 | 0.0618 | 2.3061 | 0.0107 | 0 | 0.0531 | 0 |
| 15 | 4 | 1.2594 | 1.0454 | 0.0358 | 1.3359 | −0.001 | 0 | 0.0531 | 0 |
| 15 | 5 | 2.5885 | 0.4231 | 0.0623 | 2.3251 | 0.0048 | 0 | 0.0531 | 0 |
| 15 | 6 | 2.0805 | 1.313 | 0.0715 | 2.6661 | 0.0026 | 0 | 0.0531 | 0 |
| 15 | 7 | 1.2853 | −0.982 | 0.0166 | 0.619 | −0.0002 | 0 | 0.0531 | 0 |
| 15 | 8 | 1.379 | 0.7764 | 0.051 | 1.9016 | −0.0004 | 0 | 0.0531 | 0 |
| 15 | 9 | 2.5418 | 1.2534 | 0.1081 | 4.0346 | 0.0103 | 0 | 0.0531 | 0 |
| 15 | 10 | 1.0685 | −0.8601 | 0.0743 | 2.7741 | 0.0064 | 0 | 0.0531 | 0 |
| 15 | 11 | 1.164 | −0.8841 | 0.0493 | 1.838 | 0.0024 | 0 | 0.0531 | 0 |
| 15 | 12 | 3.2541 | 0.4687 | 0.0978 | 3.6488 | 0.0107 | 0 | 0.0531 | 0 |
| 15 | 13 | 0.7229 | −1.7297 | 0.0427 | 1.5935 | 0.0043 | 0 | 0.0531 | 0 |
| 15 | 14 | −0.147 | −2.0863 | 0.0308 | 1.1508 | 0.0011 | 0 | 0.0531 | 0 |
| 15 | 15 | −0.4081 | −1.1644 | 0.0228 | 0.8506 | −0.0018 | 0 | 0.0531 | 0 |
| 15 | 16 | −1.3762 | −0.7377 | 0.0187 | 0.6978 | −0.0005 | 0 | 0 | 0 |
| 16 | 1 | −0.3238 | −1.8866 | 0.0223 | 0.8307 | 0.0022 | 0 | 0.0383 | 0 |
| 16 | 2 | −0.737 | −2.0712 | 0.0255 | 0.9531 | 0.0029 | 0 | 0.0383 | 0 |
| 16 | 3 | 0.5162 | −0.8854 | 0.0618 | 2.3044 | 0.0068 | 0 | 0.0383 | 0 |
| 16 | 4 | −0.2988 | −2.786 | 0.0518 | 1.9344 | 0.0068 | 0 | 0.0383 | 0 |
| 16 | 5 | 0.2181 | −2.0545 | 0.046 | 1.7167 | 0.0031 | 0 | 0.0383 | 0 |
| 16 | 6 | 1.0602 | −0.8314 | 0.0728 | 2.7146 | 0.0079 | 0 | 0.0383 | 0 |
| 16 | 7 | 0.0957 | −0.6392 | 0.0297 | 1.1082 | 0 | 0 | 0.0383 | 0 |
| 16 | 8 | 0.0204 | 1.6265 | 0.035 | 1.3063 | 0.0005 | 0 | 0.0383 | 0 |
| 16 | 9 | 1.0716 | −0.778 | 0.1026 | 3.827 | 0.012 | 0 | 0.0383 | 0 |
| 16 | 10 | 0.8362 | −0.3843 | 0.0627 | 2.3403 | 0.0051 | 0 | 0.0383 | 0 |
| 16 | 11 | −0.1288 | −1.9691 | 0.0497 | 1.8532 | 0.002 | 0 | 0.0383 | 0 |
| 16 | 12 | 0.1343 | −1.5044 | 0.055 | 2.0541 | 0.0049 | 0 | 0.0383 | 0 |
| 16 | 13 | 0.429 | −2.01 | 0.0785 | 2.9277 | 0.0085 | 0 | 0.0383 | 0 |
| 16 | 14 | −1.0174 | −1.6418 | 0.0537 | 2.005 | 0.0049 | 0 | 0.0383 | 0 |
| 16 | 15 | 1.8432 | 0.7481 | 0.122 | 4.5536 | 0.0109 | 0 | 0.0383 | 0 |
| 16 | 16 | 2.6729 | 0.281 | 0.1635 | 6.1005 | 0.0213 | 0.384 | 0 | 0 |

TABLE II-continued

| Temperature: 230 C. | | | | | | | | | |
|---|---|---|---|---|---|---|---|---|---|
| 1 | 1 | 20.5122 | 11.752 | 0.7383 | 27.1989 | 0.0999 | 0.384 | 0 | 0 |
| 1 | 2 | −0.5534 | −1.2706 | 0.0115 | 0.4228 | 0.0074 | 0 | 0 | 0 |
| 1 | 3 | −0.3862 | −1.1153 | −0.0091 | −0.3362 | 0.0007 | 0 | 0 | 0 |
| 1 | 4 | 20.3694 | 11.7741 | 0.7182 | 26.4567 | 0.0968 | 0 | 0 | 0.768 |
| 1 | 5 | 0.5126 | 0.9775 | 0.0005 | 0.0193 | −0.0007 | 0 | 0 | 0 |
| 1 | 6 | 0.538 | −0.273 | −0.0138 | −0.5092 | −0.002 | 0 | 0 | 0 |
| 1 | 7 | 30.5533 | 19.0026 | 1.0333 | 38.0659 | 0.1385 | 0.384 | 0 | 0 |
| 1 | 8 | −0.0401 | −0.0595 | 0.0032 | 0.1164 | 0.0012 | 0 | 0 | 0 |
| 1 | 9 | −0.1373 | −0.8776 | −0.024 | −0.8845 | −0.001 | 0 | 0 | 0 |
| 1 | 10 | 6.5067 | 3.4452 | 0.1909 | 7.0333 | 0.0238 | 0 | 0 | 0.768 |
| 1 | 11 | 0.077 | −0.4121 | −0.0292 | −1.0749 | −0.0048 | 0 | 0 | 0 |
| 1 | 12 | −0.3715 | −0.8872 | −0.0219 | −0.8077 | −0.004 | 0 | 0 | 0 |
| 1 | 13 | 26.1724 | 16.1062 | 0.8511 | 31.3551 | 0.1126 | 0.384 | 0 | 0 |
| 1 | 14 | 0.0813 | 0.1564 | −0.0053 | −0.1965 | 0.0013 | 0 | 0 | 0 |
| 1 | 15 | −0.6823 | 0.1234 | −0.0145 | −0.5342 | −0.0002 | 0 | 0 | 0 |
| 1 | 16 | 6.0422 | 3.4535 | 0.1841 | 6.7836 | 0.0224 | 0 | 0 | 0.768 |
| 2 | 1 | 3.4848 | 2.1816 | 0.1088 | 4.009 | 0.0136 | 0 | 0.1275 | 0 |
| 2 | 2 | 0.5403 | 2.0682 | 0.0138 | 0.507 | −0.0002 | 0 | 0.1275 | 0 |
| 2 | 3 | 10.2899 | 7.8458 | 0.3465 | 12.7641 | 0.0425 | 0 | 0.1275 | 0 |
| 2 | 4 | 21.3326 | 14.5433 | 0.7146 | 26.3272 | 0.0931 | 0 | 0.1275 | 0 |
| 2 | 5 | 13.0906 | 9.73 | 0.4281 | 15.7709 | 0.0531 | 0 | 0.1275 | 0 |
| 2 | 6 | 25.9089 | 17.7979 | 0.8414 | 30.9982 | 0.1067 | 0 | 0.1275 | 0 |
| 2 | 7 | 19.5485 | 14.2096 | 0.6102 | 22.4782 | 0.08 | 0 | 0.1275 | 0 |
| 2 | 8 | 27.4426 | 18.9183 | 0.8632 | 31.7987 | 0.1139 | 0 | 0.1275 | 0 |
| 2 | 9 | 11.071 | 7.6374 | 0.3388 | 12.4807 | 0.0416 | 0 | 0.1275 | 0 |
| 2 | 10 | 7.8063 | 6.711 | 0.2101 | 7.7386 | 0.0232 | 0 | 0.1275 | 0 |
| 2 | 11 | 21.9836 | 15.8925 | 0.7133 | 26.2767 | 0.0923 | 0 | 0.1275 | 0 |
| 2 | 12 | 21.4248 | 14.9353 | 0.6819 | 25.1197 | 0.088 | 0 | 0.1275 | 0 |
| 2 | 13 | 13.9332 | 10.1621 | 0.4422 | 16.2904 | 0.0516 | 0 | 0.1275 | 0 |
| 2 | 14 | 12.1357 | 9.0183 | 0.403 | 14.8477 | 0.0497 | 0 | 0.1275 | 0 |
| 2 | 15 | 10.1205 | 7.3514 | 0.3359 | 12.3746 | 0.0422 | 0 | 0.1275 | 0 |
| 2 | 16 | −0.1813 | −0.1996 | −0.0083 | −0.3052 | −0.0008 | 0 | 0 | 0 |
| 3 | 1 | 14.6192 | 9.6539 | 0.477 | 17.5727 | 0.0598 | 0 | 0.1148 | 0 |
| 3 | 2 | 3.5237 | 1.6063 | 0.1056 | 3.8917 | 0.0137 | 0 | 0.1148 | 0 |
| 3 | 3 | 7.5414 | 5.7472 | 0.2505 | 9.2275 | 0.0293 | 0 | 0.1148 | 0 |
| 3 | 4 | 25.6608 | 16.2436 | 0.8269 | 30.4612 | 0.1087 | 0 | 0.1148 | 0 |
| 3 | 5 | 13.2052 | 9.4936 | 0.4538 | 16.7197 | 0.0568 | 0 | 0.1148 | 0 |
| 3 | 6 | 25.3315 | 16.7131 | 0.8179 | 30.1312 | 0.1061 | 0 | 0.1148 | 0 |
| 3 | 7 | 21.3268 | 13.9191 | 0.682 | 25.1235 | 0.0887 | 0 | 0.1148 | 0 |
| 3 | 8 | 24.7757 | 17.4515 | 0.7954 | 29.301 | 0.1012 | 0 | 0.1148 | 0 |
| 3 | 9 | 8.4714 | 6.7116 | 0.2707 | 9.9741 | 0.032 | 0 | 0.1148 | 0 |
| 3 | 10 | 11.8838 | 8.5049 | 0.3571 | 13.1539 | 0.0407 | 0 | 0.1148 | 0 |
| 3 | 11 | 20.031 | 14.4004 | 0.6352 | 23.402 | 0.0805 | 0 | 0.1148 | 0 |
| 3 | 12 | 19.8788 | 14.2811 | 0.6381 | 23.5091 | 0.0788 | 0 | 0.1148 | 0 |
| 3 | 13 | 12.9699 | 9.8171 | 0.4046 | 14.9042 | 0.0477 | 0 | 0.1148 | 0 |
| 3 | 14 | 17.4726 | 12.8596 | 0.582 | 21.4404 | 0.0711 | 0 | 0.1148 | 0 |
| 3 | 15 | 9.2964 | 6.3491 | 0.287 | 10.574 | 0.0339 | 0 | 0.1148 | 0 |
| 3 | 16 | 0.0039 | 0.2785 | −0.0092 | −0.3384 | −0.0048 | 0 | 0 | 0 |
| 4 | 1 | 17.3609 | 12.5782 | 0.6049 | 22.2858 | 0.072 | 0 | 0.102 | 0 |
| 4 | 2 | 3.8887 | 3.9128 | 0.0902 | 3.3222 | 0.0077 | 0 | 0.102 | 0 |
| 4 | 3 | 7.8741 | 7.2509 | 0.2413 | 8.8886 | 0.0267 | 0 | 0.102 | 0 |
| 4 | 4 | 24.9061 | 17.8056 | 0.7889 | 29.0621 | 0.0992 | 0 | 0.102 | 0 |
| 4 | 5 | 13.5943 | 11.0916 | 0.4332 | 15.9588 | 0.05 | 0 | 0.102 | 0 |
| 4 | 6 | 25.7929 | 19.6971 | 0.8186 | 30.1556 | 0.1001 | 0 | 0.102 | 0 |
| 4 | 7 | 21.072 | 14.4215 | 0.6748 | 24.8609 | 0.0869 | 0 | 0.102 | 0 |
| 4 | 8 | 26.0921 | 18.743 | 0.8103 | 29.8516 | 0.1023 | 0 | 0.102 | 0 |
| 4 | 9 | 9.0667 | 6.8545 | 0.3023 | 11.1355 | 0.0361 | 0 | 0.102 | 0 |
| 4 | 10 | 9.9682 | 9.0867 | 0.3095 | 11.4025 | 0.0375 | 0 | 0.102 | 0 |
| 4 | 11 | 22.5703 | 17.6942 | 0.7028 | 25.892 | 0.0881 | 0 | 0.102 | 0 |
| 4 | 12 | 17.6725 | 13.6191 | 0.5819 | 21.4383 | 0.072 | 0 | 0.102 | 0 |
| 4 | 13 | 13.3204 | 11.7478 | 0.4371 | 16.1046 | 0.0501 | 0 | 0.102 | 0 |
| 4 | 14 | 18.8588 | 14.1349 | 0.626 | 23.0617 | 0.0749 | 0 | 0.102 | 0 |
| 4 | 15 | 10.9773 | 9.4417 | 0.3661 | 13.4881 | 0.0434 | 0 | 0.102 | 0 |
| 4 | 16 | 25.5043 | 16.3074 | 0.8602 | 31.6906 | 0.1124 | 0.384 | 0 | 0 |
| 5 | 1 | 15.726 | 10.879 | 0.5349 | 19.706 | 0.0654 | 0 | 0.0893 | 0 |
| 5 | 2 | 1.2361 | 2.1554 | 0.0379 | 1.395 | 0.0012 | 0 | 0.0893 | 0 |
| 5 | 3 | 8.2732 | 7.1702 | 0.2632 | 9.6977 | 0.0305 | 0 | 0.0893 | 0 |
| 5 | 4 | 23.479 | 17.3054 | 0.7815 | 28.7895 | 0.0978 | 0 | 0.0893 | 0 |
| 5 | 5 | 13.4611 | 8.7548 | 0.4398 | 16.2013 | 0.0532 | 0 | 0.0893 | 0 |
| 5 | 6 | 24.6516 | 18.1881 | 0.8117 | 29.9015 | 0.1024 | 0 | 0.0893 | 0 |
| 5 | 7 | 20.6256 | 15.1295 | 0.6933 | 25.5417 | 0.0834 | 0 | 0.0893 | 0 |
| 5 | 8 | 22.0706 | 16.9093 | 0.728 | 26.8185 | 0.0934 | 0 | 0.0893 | 0 |

TABLE II-continued

| | | | | | | | | | |
|---|---|---|---|---|---|---|---|---|---|
| 5 | 9 | 9.5062 | 8.3409 | 0.2942 | 10.8373 | 0.036 | 0 | 0.0893 | 0 |
| 5 | 10 | 9.7534 | 6.8249 | 0.3242 | 11.9447 | 0.0406 | 0 | 0.0893 | 0 |
| 5 | 11 | 23.0838 | 17.321 | 0.7228 | 26.6283 | 0.0902 | 0 | 0.0893 | 0 |
| 5 | 12 | 13.0683 | 10.718 | 0.4431 | 16.3235 | 0.0529 | 0 | 0.0893 | 0 |
| 5 | 13 | 12.4403 | 9.1189 | 0.408 | 15.0297 | 0.0501 | 0 | 0.0893 | 0 |
| 5 | 14 | 15.6144 | 11.8708 | 0.5015 | 18.4747 | 0.0598 | 0 | 0.0893 | 0 |
| 5 | 15 | 8.013 | 6.9957 | 0.2667 | 9.8269 | 0.0321 | 0 | 0.0893 | 0 |
| 5 | 16 | 1.5841 | 3.1393 | 0.0592 | 2.1826 | 0.0038 | 0 | 0 | 0 |
| 6 | 1 | 11.9181 | 7.529 | 0.4121 | 15.1809 | 0.0515 | 0 | 0.0765 | 0 |
| 6 | 2 | 2.6337 | 2.1059 | 0.0447 | 1.6457 | 0.0033 | 0 | 0.0765 | 0 |
| 6 | 3 | 5.4951 | 5.1434 | 0.1607 | 5.9193 | 0.0161 | 0 | 0.0765 | 0 |
| 6 | 4 | 23.8763 | 15.5411 | 0.7888 | 29.0607 | 0.0966 | 0 | 0.0765 | 0 |
| 6 | 5 | 12.93 | 10.1219 | 0.3818 | 14.0649 | 0.045 | 0 | 0.0765 | 0 |
| 6 | 6 | 23.5796 | 15.9125 | 0.7649 | 28.1784 | 0.0973 | 0 | 0.0765 | 0 |
| 6 | 7 | 18.9005 | 15.2143 | 0.6468 | 23.829 | 0.077 | 0 | 0.0765 | 0 |
| 6 | 8 | 20.3497 | 13.5583 | 0.6825 | 25.1424 | 0.0825 | 0 | 0.0765 | 0 |
| 6 | 9 | 11.2224 | 6.8155 | 0.3486 | 12.8407 | 0.0488 | 0 | 0.0765 | 0 |
| 6 | 10 | 10.2035 | 7.9968 | 0.3412 | 12.5707 | 0.0409 | 0 | 0.0765 | 0 |
| 6 | 11 | 23.4001 | 17.0529 | 0.7491 | 27.5961 | 0.0963 | 0 | 0.0765 | 0 |
| 6 | 12 | 9.7991 | 8.2616 | 0.3252 | 11.9814 | 0.0374 | 0 | 0.0765 | 0 |
| 6 | 13 | 11.7581 | 8.3105 | 0.4047 | 14.9078 | 0.0515 | 0 | 0.0765 | 0 |
| 6 | 14 | 18.0336 | 13.0945 | 0.6005 | 22.1227 | 0.0726 | 0 | 0.0765 | 0 |
| 6 | 15 | 7.911 | 4.3785 | 0.2682 | 9.8789 | 0.0312 | 0 | 0.0765 | 0 |
| 6 | 16 | −0.6688 | 1.4355 | −0.0035 | −0.1305 | −0.0019 | 0 | 0 | 0 |
| 7 | 1 | 8.2588 | 5.3884 | 0.2833 | 10.4355 | 0.0335 | 0 | 0.0638 | 0 |
| 7 | 2 | 0.8857 | 1.2193 | 0.0252 | 0.9302 | 0.0016 | 0 | 0.0638 | 0 |
| 7 | 3 | 6.6639 | 4.2553 | 0.2108 | 7.7677 | 0.0263 | 0 | 0.0638 | 0 |
| 7 | 4 | 22.5348 | 14.4689 | 0.7837 | 28.8734 | 0.0978 | 0 | 0.0638 | 0 |
| 7 | 5 | 12.3747 | 10.2625 | 0.4082 | 15.037 | 0.0518 | 0 | 0.0638 | 0 |
| 7 | 6 | 24.0886 | 16.8609 | 0.7789 | 28.6964 | 0.0959 | 0 | 0.0638 | 0 |
| 7 | 7 | 19.4243 | 13.7709 | 0.6285 | 23.1531 | 0.076 | 0 | 0.0638 | 0 |
| 7 | 8 | 20.9167 | 14.354 | 0.6951 | 25.6082 | 0.0874 | 0 | 0.0638 | 0 |
| 7 | 9 | 11.0085 | 7.0474 | 0.3181 | 11.7196 | 0.0506 | 0 | 0.0638 | 0 |
| 7 | 10 | 9.8927 | 8.1601 | 0.2841 | 10.4662 | 0.0307 | 0 | 0.0638 | 0 |
| 7 | 11 | 22.9498 | 15.5482 | 0.7494 | 27.6082 | 0.0971 | 0 | 0.0638 | 0 |
| 7 | 12 | 10.8518 | 7.6716 | 0.3566 | 13.1386 | 0.0428 | 0 | 0.0638 | 0 |
| 7 | 13 | 11.1438 | 7.8195 | 0.3629 | 13.3706 | 0.0434 | 0 | 0.0638 | 0 |
| 7 | 14 | 13.8746 | 9.9693 | 0.4684 | 17.2575 | 0.0579 | 0 | 0.0638 | 0 |
| 7 | 15 | 6.983 | 6.1175 | 0.2213 | 8.1545 | 0.0244 | 0 | 0.0638 | 0 |
| 7 | 16 | 5.3562 | 3.5355 | 0.2036 | 7.5023 | 0.025 | 0 | 0 | 0.768 |
| 8 | 1 | 5.1472 | 4.2085 | 0.1241 | 4.5708 | 0.0114 | 0 | 0.051 | 0 |
| 8 | 2 | 2.6812 | 0.6825 | 0.0185 | 0.6825 | −0.0028 | 0 | 0.051 | 0 |
| 8 | 3 | 4.8568 | 3.4396 | 0.1483 | 5.4617 | 0.0157 | 0 | 0.051 | 0 |
| 8 | 4 | 19.2612 | 15.3513 | 0.6197 | 22.8294 | 0.0741 | 0 | 0.051 | 0 |
| 8 | 5 | 11.2913 | 10.0059 | 0.3626 | 13.3581 | 0.0399 | 0 | 0.051 | 0 |
| 8 | 6 | 20.5183 | 14.6059 | 0.6588 | 24.2717 | 0.0798 | 0 | 0.051 | 0 |
| 8 | 7 | 16.4533 | 12.6987 | 0.5352 | 19.7185 | 0.0653 | 0 | 0.051 | 0 |
| 8 | 8 | 15.0048 | 11.2762 | 0.4823 | 17.7662 | 0.0569 | 0 | 0.051 | 0 |
| 8 | 9 | 13.9254 | 8.7784 | 0.3288 | 12.1131 | 0.0683 | 0 | 0.051 | 0 |
| 8 | 10 | 7.8726 | 7.4388 | 0.2396 | 8.8259 | 0.0244 | 0 | 0.051 | 0 |
| 8 | 11 | 19.82 | 15.1827 | 0.6372 | 23.4739 | 0.0765 | 0 | 0.051 | 0 |
| 8 | 12 | 7.605 | 6.8751 | 0.2285 | 8.4184 | 0.0281 | 0 | 0.051 | 0 |
| 8 | 13 | 10.7449 | 8.7771 | 0.3532 | 13.0108 | 0.0437 | 0 | 0.051 | 0 |
| 8 | 14 | 9.4537 | 7.0641 | 0.335 | 12.3405 | 0.0432 | 0 | 0.051 | 0 |
| 8 | 15 | 4.9948 | 4.1176 | 0.165 | 6.0799 | 0.0191 | 0 | 0.051 | 0 |
| 8 | 16 | 0.039 | 1.3054 | 0.0022 | 0.0814 | −0.0018 | 0 | 0 | 0 |
| 9 | 1 | 5.4948 | 5.2568 | 0.1619 | 5.9632 | 0.0172 | 0 | 0.0383 | 0 |
| 9 | 2 | 1.2957 | 1.792 | 0.0246 | 0.9071 | 0.0007 | 0 | 0.0383 | 0 |
| 9 | 3 | 4.561 | 3.4219 | 0.1167 | 4.3001 | 0.0112 | 0 | 0.0383 | 0 |
| 9 | 4 | 18.1494 | 12.2628 | 0.6027 | 22.2032 | 0.0759 | 0 | 0.0383 | 0 |
| 9 | 5 | 9.3792 | 7.0297 | 0.3096 | 11.4063 | 0.0375 | 0 | 0.0383 | 0 |
| 9 | 6 | 18.4118 | 12.8378 | 0.6302 | 23.2159 | 0.0763 | 0 | 0.0383 | 0 |
| 9 | 7 | 16.3053 | 13.3828 | 0.5228 | 19.2604 | 0.0596 | 0 | 0.0383 | 0 |
| 9 | 8 | 11.9275 | 10.3345 | 0.3942 | 14.5228 | 0.0464 | 0 | 0.0383 | 0 |
| 9 | 9 | 13.8245 | 7.7844 | 0.3136 | 11.5513 | 0.0738 | 0 | 0.0383 | 0 |
| 9 | 10 | 5.9945 | 6.2382 | 0.161 | 5.9323 | 0.0148 | 0 | 0.0383 | 0 |
| 9 | 11 | 16.467 | 12.1554 | 0.5233 | 19.2796 | 0.0638 | 0 | 0.0383 | 0 |
| 9 | 12 | 4.8586 | 6.0202 | 0.1535 | 5.6534 | 0.0137 | 0 | 0.0383 | 0 |
| 9 | 13 | 8.9256 | 6.8906 | 0.3084 | 11.3617 | 0.0373 | 0 | 0.0383 | 0 |
| 9 | 14 | 6.5689 | 5.4424 | 0.1857 | 6.8397 | 0.02 | 0 | 0.0383 | 0 |
| 9 | 15 | 4.0595 | 3.9488 | 0.1149 | 4.2325 | 0.012 | 0 | 0.0383 | 0 |
| 9 | 16 | 0.1737 | −0.0654 | −0.0123 | −0.4528 | −0.0033 | 0 | 0 | 0 |
| 10 | 1 | 1.5477 | 2.4162 | 0.0571 | 2.1025 | 0.0057 | 0 | 0.1275 | 0 |
| 10 | 2 | 0.7481 | 0.278 | 0.0266 | 0.9802 | 0.0042 | 0 | 0.1275 | 0 |
| 10 | 3 | 17.9789 | 12.2101 | 0.6266 | 23.0845 | 0.0773 | 0 | 0.1275 | 0 |
| 10 | 4 | 15.7177 | 12.2677 | 0.4832 | 17.8 | 0.0563 | 0 | 0.1275 | 0 |
| 10 | 5 | 23.4232 | 17.8043 | 0.7802 | 28.7411 | 0.0932 | 0 | 0.1275 | 0 |
| 10 | 6 | 18.8559 | 14.0032 | 0.644 | 23.7233 | 0.0803 | 0 | 0.1275 | 0 |
| 10 | 7 | 16.6936 | 12.534 | 0.5444 | 20.0565 | 0.0655 | 0 | 0.1275 | 0 |

TABLE II-continued

| | | | | | | | | | |
|---|---|---|---|---|---|---|---|---|---|
| 10 | 8 | 15.7358 | 12.1987 | 0.5156 | 18.9943 | 0.0626 | 0 | 0.1275 | 0 |
| 10 | 9 | 19.5604 | 13.1002 | 0.7006 | 25.8091 | 0.0879 | 0 | 0.1275 | 0 |
| 10 | 10 | 18.0579 | 13.0064 | 0.5957 | 21.9464 | 0.074 | 0 | 0.1275 | 0 |
| 10 | 11 | 14.3925 | 10.1347 | 0.4699 | 17.3093 | 0.0581 | 0 | 0.1275 | 0 |
| 10 | 12 | 23.9347 | 15.9894 | 0.8104 | 29.854 | 0.1014 | 0 | 0.1275 | 0 |
| 10 | 13 | 9.5428 | 6.0585 | 0.3205 | 11.8074 | 0.0415 | 0 | 0.1275 | 0 |
| 10 | 14 | 6.0412 | 4.3478 | 0.216 | 7.9578 | 0.0244 | 0 | 0.1275 | 0 |
| 10 | 15 | 2.0188 | 2.7553 | 0.0713 | 2.6262 | 0.0092 | 0 | 0.1275 | 0 |
| 10 | 16 | 23.9818 | 15.3099 | 0.8173 | 30.1102 | 0.1051 | 0.384 | 0 | 0 |
| 11 | 1 | 1.6265 | −0.4393 | 0.0572 | 2.1077 | 0.0082 | 0 | 0.1126 | 0 |
| 11 | 2 | 0.7512 | 0.0655 | 0.0158 | 0.5811 | −0.0006 | 0 | 0.1126 | 0 |
| 11 | 3 | 11.6267 | 7.1062 | 0.4011 | 14.7754 | 0.0508 | 0 | 0.1126 | 0 |
| 11 | 4 | 14.9632 | 10.2139 | 0.512 | 18.8615 | 0.0629 | 0 | 0.1126 | 0 |
| 11 | 5 | 20.7287 | 14.0712 | 0.6984 | 25.728 | 0.0888 | 0 | 0.1126 | 0 |
| 11 | 6 | 22.2788 | 15.4473 | 0.7325 | 26.9837 | 0.0899 | 0 | 0.1126 | 0 |
| 11 | 7 | 18.3124 | 13.0396 | 0.6421 | 23.6548 | 0.0789 | 0 | 0.1126 | 0 |
| 11 | 8 | 22.0934 | 15.6671 | 0.7274 | 26.7979 | 0.0885 | 0 | 0.1126 | 0 |
| 11 | 9 | 22.0321 | 14.1023 | 0.7675 | 28.2737 | 0.1001 | 0 | 0.1126 | 0 |
| 11 | 10 | 13.3746 | 7.6722 | 0.473 | 17.424 | 0.0603 | 0 | 0.1126 | 0 |
| 11 | 11 | 11.8485 | 8.1997 | 0.4037 | 14.8713 | 0.0501 | 0 | 0.1126 | 0 |
| 11 | 12 | 21.6762 | 14.7974 | 0.7674 | 28.2709 | 0.095 | 0 | 0.1126 | 0 |
| 11 | 13 | 9.6066 | 6.771 | 0.3198 | 11.7825 | 0.041 | 0 | 0.1126 | 0 |
| 11 | 14 | 5.2261 | 3.1774 | 0.1451 | 5.3441 | 0.0182 | 0 | 0.1126 | 0 |
| 11 | 15 | 1.1397 | 1.4718 | 0.029 | 1.068 | 0.0045 | 0 | 0.1126 | 0 |
| 11 | 16 | 1.7146 | −0.1881 | 0.06 | 2.2093 | 0.007 | 0 | 0 | 0 |
| 12 | 1 | 0.7424 | −0.8795 | 0.0693 | 2.5545 | 0.0111 | 0 | 0.0978 | 0 |
| 12 | 2 | 0.3751 | 0.6279 | 0.0316 | 1.1642 | 0.0022 | 0 | 0.0978 | 0 |
| 12 | 3 | 10.7908 | 6.692 | 0.3558 | 13.1083 | 0.0449 | 0 | 0.0978 | 0 |
| 12 | 4 | 9.0282 | 8.0275 | 0.3374 | 12.4281 | 0.0429 | 0 | 0.0978 | 0 |
| 12 | 5 | 17.5272 | 11.6688 | 0.6128 | 22.5774 | 0.0768 | 0 | 0.0978 | 0 |
| 12 | 6 | 16.7422 | 11.3782 | 0.5685 | 20.9454 | 0.0738 | 0 | 0.0978 | 0 |
| 12 | 7 | 15.061 | 11.2786 | 0.5101 | 18.7911 | 0.0642 | 0 | 0.0978 | 0 |
| 12 | 8 | 7.3694 | 5.1322 | 0.2558 | 9.4242 | 0.0332 | 0 | 0.0978 | 0 |
| 12 | 9 | 21.793 | 14.3754 | 0.7334 | 27.018 | 0.0954 | 0 | 0.0978 | 0 |
| 12 | 10 | 8.735 | 5.3347 | 0.3294 | 12.1334 | 0.0442 | 0 | 0.0978 | 0 |
| 12 | 11 | 6.8362 | 3.8479 | 0.2586 | 9.5255 | 0.0346 | 0 | 0.0978 | 0 |
| 12 | 12 | 19.758 | 12.0896 | 0.6949 | 25.5986 | 0.0882 | 0 | 0.0978 | 0 |
| 12 | 13 | 4.91 | 2.0226 | 0.1761 | 6.4864 | 0.0235 | 0 | 0.0978 | 0 |
| 12 | 14 | 2.3397 | 1.3074 | 0.074 | 2.7266 | 0.0117 | 0 | 0.0978 | 0 |
| 12 | 15 | −0.0988 | −1.055 | 0.028 | 1.0331 | 0.0057 | 0 | 0.0978 | 0 |
| 12 | 16 | −0.6493 | −1.8142 | 0.0031 | 0.1125 | 0.0042 | 0 | 0 | 0 |
| 13 | 1 | 0.4429 | 0.1915 | 0.0431 | 1.5867 | 0.0084 | 0 | 0.0829 | 0 |
| 13 | 2 | 0.7285 | −0.4527 | 0.0242 | 0.8909 | 0.0045 | 0 | 0.0829 | 0 |
| 13 | 3 | 7.4333 | 3.9871 | 0.2548 | 9.3868 | 0.0323 | 0 | 0.0829 | 0 |
| 13 | 4 | 10.9401 | 6.7321 | 0.404 | 14.883 | 0.0536 | 0 | 0.0829 | 0 |
| 13 | 5 | 14.4732 | 9.4042 | 0.4872 | 17.9486 | 0.0633 | 0 | 0.0829 | 0 |
| 13 | 6 | 14.7593 | 9.7152 | 0.4959 | 18.27 | 0.0626 | 0 | 0.0829 | 0 |
| 13 | 7 | 11.6134 | 5.9928 | 0.4019 | 14.8073 | 0.0498 | 0 | 0.0829 | 0 |
| 13 | 8 | 9.8226 | 7.3952 | 0.3336 | 12.2913 | 0.0402 | 0 | 0.0829 | 0 |
| 13 | 9 | 19.1421 | 12.2144 | 0.6691 | 24.6503 | 0.0908 | 0 | 0.0829 | 0 |
| 13 | 10 | 8.7276 | 5.9972 | 0.2896 | 10.6673 | 0.0366 | 0 | 0.0829 | 0 |
| 13 | 11 | 6.8431 | 3.0277 | 0.2592 | 9.5503 | 0.0335 | 0 | 0.0829 | 0 |
| 13 | 12 | 16.1712 | 11.1574 | 0.5535 | 20.3907 | 0.0686 | 0 | 0.0829 | 0 |
| 13 | 13 | 4.6027 | 2.533 | 0.1557 | 5.7347 | 0.0213 | 0 | 0.0829 | 0 |
| 13 | 14 | 2.6175 | 2.1368 | 0.109 | 4.0151 | 0.0134 | 0 | 0.0829 | 0 |
| 13 | 15 | 0.1712 | 0.1937 | 0.0256 | 0.9427 | 0.0015 | 0 | 0.0829 | 0 |
| 13 | 16 | 5.2254 | 3.6667 | 0.2167 | 7.9825 | 0.026 | 0 | 0 | 0.768 |
| 14 | 1 | −0.6129 | −0.7022 | 0.0256 | 0.943 | 0.0061 | 0 | 0.068 | 0 |
| 14 | 2 | −0.0825 | 0.1999 | 0.017 | 0.6261 | 0.0049 | 0 | 0.068 | 0 |
| 14 | 3 | 5.4052 | 6.7553 | 0.1725 | 6.3547 | 0.0192 | 0 | 0.068 | 0 |
| 14 | 4 | 4.5583 | 2.1299 | 0.158 | 5.8214 | 0.0202 | 0 | 0.068 | 0 |
| 14 | 5 | 10.1192 | 7.5886 | 0.3644 | 13.4249 | 0.0467 | 0 | 0.068 | 0 |
| 14 | 6 | 4.2773 | 4.269 | 0.1697 | 6.2535 | 0.0232 | 0 | 0.068 | 0 |
| 14 | 7 | 5.8243 | 4.2454 | 0.206 | 7.5899 | 0.0279 | 0 | 0.068 | 0 |
| 14 | 8 | 4.5156 | 3.7194 | 0.166 | 6.1153 | 0.0207 | 0 | 0.068 | 0 |
| 14 | 9 | 15.8111 | 11.2165 | 0.5256 | 19.3644 | 0.0737 | 0 | 0.068 | 0 |
| 14 | 10 | 5.4062 | 3.196 | 0.1896 | 6.985 | 0.0244 | 0 | 0.068 | 0 |
| 14 | 11 | 3.7866 | 1.825 | 0.1438 | 5.2965 | 0.0222 | 0 | 0.068 | 0 |
| 14 | 12 | 7.7545 | 4.1296 | 0.2784 | 10.2559 | 0.0368 | 0 | 0.068 | 0 |
| 14 | 13 | 2.8508 | 2.631 | 0.1214 | 4.4727 | 0.0154 | 0 | 0.068 | 0 |
| 14 | 14 | 0.5309 | −1.0896 | 0.0675 | 2.4849 | 0.0099 | 0 | 0.068 | 0 |
| 14 | 15 | 0.1398 | −1.9674 | 0.0158 | 0.5813 | 0.0012 | 0 | 0.068 | 0 |
| 14 | 16 | −0.3316 | 0.0358 | 0.01 | 0.3687 | 0.0004 | 0 | 0 | 0 |
| 15 | 1 | −0.1148 | 0.1922 | 0.0092 | 0.3376 | 0.0008 | 0 | 0.0531 | 0 |
| 15 | 2 | 0.1079 | 0.1039 | 0.0042 | 0.1541 | 0.0032 | 0 | 0.0531 | 0 |
| 15 | 3 | 3.5717 | 2.2496 | 0.1406 | 5.1802 | 0.0221 | 0 | 0.0531 | 0 |
| 15 | 4 | 4.6567 | 1.8374 | 0.1474 | 5.4311 | 0.0196 | 0 | 0.0531 | 0 |
| 15 | 5 | 6.8308 | 3.9469 | 0.2744 | 10.1092 | 0.0376 | 0 | 0.0531 | 0 |
| 15 | 6 | 7.5086 | 3.6352 | 0.2419 | 8.911 | 0.0314 | 0 | 0.0531 | 0 |

TABLE II-continued

| | | | | | | | | | |
|---|---|---|---|---|---|---|---|---|---|
| 15 | 7 | 3.6177 | 2.7378 | 0.0881 | 3.2446 | 0.0122 | 0 | 0.0531 | 0 |
| 15 | 8 | 6.3617 | 3.1726 | 0.1952 | 7.1899 | 0.0269 | 0 | 0.0531 | 0 |
| 15 | 9 | 13.9802 | 8.5923 | 0.4839 | 17.826 | 0.0689 | 0 | 0.0531 | 0 |
| 15 | 10 | 4.8923 | 3.9039 | 0.1737 | 6.4005 | 0.023 | 0 | 0.0531 | 0 |
| 15 | 11 | 5.59 | 3.4292 | 0.1956 | 7.2047 | 0.0283 | 0 | 0.0531 | 0 |
| 15 | 12 | 6.8024 | 5.5785 | 0.2192 | 8.0763 | 0.0294 | 0 | 0.0531 | 0 |
| 15 | 13 | 3.7607 | 2.3756 | 0.121 | 4.4593 | 0.0166 | 0 | 0.0531 | 0 |
| 15 | 14 | 0.937 | 1.5442 | 0.0699 | 2.5762 | 0.0097 | 0 | 0.0531 | 0 |
| 15 | 15 | 0.2832 | 0.3246 | 0.02 | 0.7379 | 0.0033 | 0 | 0.0531 | 0 |
| 15 | 16 | −0.7225 | −0.2893 | 0.0016 | 0.0571 | −0.0006 | 0 | 0 | 0 |
| 16 | 1 | −0.0142 | −1.1024 | 0.0215 | 0.7913 | 0.0057 | 0 | 0.0383 | 0 |
| 16 | 2 | 0.4952 | −0.4098 | 0.0194 | 0.7148 | 0.0058 | 0 | 0.0383 | 0 |
| 16 | 3 | 3.2579 | 1.3122 | 0.1477 | 5.4418 | 0.0221 | 0 | 0.0383 | 0 |
| 16 | 4 | 1.625 | −0.1101 | 0.1214 | 4.4707 | 0.0211 | 0 | 0.0383 | 0 |
| 16 | 5 | 1.8652 | 0.6067 | 0.0939 | 3.4593 | 0.0153 | 0 | 0.0383 | 0 |
| 16 | 6 | 4.8965 | 3.555 | 0.1734 | 6.3862 | 0.0233 | 0 | 0.0383 | 0 |
| 16 | 7 | 0.5706 | −0.0127 | 0.0426 | 1.5679 | 0.0079 | 0 | 0.0383 | 0 |
| 16 | 8 | 1.5788 | 1.8244 | 0.0682 | 2.5118 | 0.0091 | 0 | 0.0383 | 0 |
| 16 | 9 | 7.3237 | 3.5992 | 0.2614 | 9.63 | 0.0399 | 0 | 0.0383 | 0 |
| 16 | 10 | 3.4023 | 0.894 | 0.1499 | 5.5241 | 0.0224 | 0 | 0.0383 | 0 |
| 16 | 11 | 1.8143 | −0.758 | 0.0668 | 2.4619 | 0.0101 | 0 | 0.0383 | 0 |
| 16 | 12 | 0.8507 | 0.6985 | 0.052 | 1.9172 | 0.0098 | 0 | 0.0383 | 0 |
| 16 | 13 | 3.0836 | 3.6579 | 0.1369 | 5.0426 | 0.0179 | 0 | 0.0383 | 0 |
| 16 | 14 | 0.8053 | −0.2459 | 0.0311 | 1.1471 | 0.0073 | 0 | 0.0383 | 0 |
| 16 | 15 | 5.3415 | 3.7713 | 0.2488 | 9.1666 | 0.0341 | 0 | 0.0383 | 0 |
| 16 | 16 | 9.4755 | 5.5863 | 0.3659 | 13.4784 | 0.0487 | 0.384 | 0 | 0 |
| Temperature: 260 C. | | | | | | | | | |
| 1 | 1 | 23.9548 | 12.5586 | 0.792 | 28.945 | 0.1185 | 0.384 | 0 | 0 |
| 1 | 2 | −0.1251 | −1.1682 | 0.0079 | 0.2905 | 0.0029 | 0 | 0 | 0 |
| 1 | 3 | −0.2445 | −1.2984 | −0.0091 | −0.3313 | 0.0016 | 0 | 0 | 0 |
| 1 | 4 | 26.223 | 16.8044 | 0.8614 | 31.4805 | 0.1117 | 0 | 0 | 0.768 |
| 1 | 5 | 0.5935 | 1.5609 | 0.0111 | 0.4048 | 0.0008 | 0 | 0 | 0 |
| 1 | 6 | 0.3452 | −0.5656 | −0.0202 | −0.7401 | −0.002 | 0 | 0 | 0 |
| 1 | 7 | 33.6381 | 20.613 | 1.115 | 40.751 | 0.161 | 0.384 | 0 | 0 |
| 1 | 8 | 0.3663 | 0.721 | 0.0118 | 0.4304 | 0.0043 | 0 | 0 | 0 |
| 1 | 9 | −0.3414 | 0.3286 | −0.0389 | −1.4226 | −0.0089 | 0 | 0 | 0 |
| 1 | 10 | 16.1672 | 9.9936 | 0.5479 | 20.0238 | 0.0714 | 0 | 0 | 0.768 |
| 1 | 11 | −0.1542 | −0.1519 | −0.03 | −1.095 | −0.0036 | 0 | 0 | 0 |
| 1 | 12 | −0.706 | −0.9411 | −0.0392 | −1.4334 | −0.0032 | 0 | 0 | 0 |
| 1 | 13 | 31.908 | 19.6537 | 1.0424 | 38.0961 | 0.1437 | 0.384 | 0 | 0 |
| 1 | 14 | 0.5711 | −0.2625 | −0.0125 | −0.4566 | −0.0012 | 0 | 0 | 0 |
| 1 | 15 | −0.5994 | −1.1609 | −0.025 | −0.9131 | −0.0045 | 0 | 0 | 0 |
| 1 | 16 | 13.0157 | 7.0184 | 0.4715 | 17.2323 | 0.0599 | 0 | 0 | 0.768 |
| 2 | 1 | 7.6165 | 4.4571 | 0.249 | 9.0986 | 0.0316 | 0 | 0.1275 | 0 |
| 2 | 2 | 2.04 | 1.7045 | 0.0513 | 1.8735 | 0.0074 | 0 | 0.1275 | 0 |
| 2 | 3 | 19.8301 | 14.357 | 0.6798 | 24.8446 | 0.0858 | 0 | 0.1275 | 0 |
| 2 | 4 | 25.5767 | 16.9766 | 0.8497 | 31.0534 | 0.1122 | 0 | 0.1275 | 0 |
| 2 | 5 | 19.6461 | 12.5711 | 0.6752 | 24.6783 | 0.0908 | 0 | 0.1275 | 0 |
| 2 | 6 | 29.3737 | 20.6255 | 0.9524 | 34.8088 | 0.1251 | 0 | 0.1275 | 0 |
| 2 | 7 | 25.3081 | 17.3872 | 0.7934 | 28.9974 | 0.1065 | 0 | 0.1275 | 0 |
| 2 | 8 | 31.2784 | 20.4979 | 0.9823 | 35.9021 | 0.1389 | 0 | 0.1275 | 0 |
| 2 | 9 | 19.8631 | 13.7444 | 0.6352 | 23.2152 | 0.0763 | 0 | 0.1275 | 0 |
| 2 | 10 | 10.4121 | 7.8726 | 0.3241 | 11.845 | 0.0384 | 0 | 0.1275 | 0 |
| 2 | 11 | 28.2753 | 19.8643 | 0.8954 | 32.7261 | 0.116 | 0 | 0.1275 | 0 |
| 2 | 12 | 28.388 | 19.6094 | 0.888 | 32.4551 | 0.1133 | 0 | 0.1275 | 0 |
| 2 | 13 | 21.9441 | 15.5641 | 0.6867 | 25.0976 | 0.0849 | 0 | 0.1275 | 0 |
| 2 | 14 | 21.0969 | 15.4875 | 0.6762 | 24.712 | 0.0815 | 0 | 0.1275 | 0 |
| 2 | 15 | 17.2387 | 11.7114 | 0.5678 | 20.7519 | 0.0707 | 0 | 0.1275 | 0 |
| 2 | 16 | 0.3495 | −0.3711 | 0.005 | 0.1841 | 0.0007 | 0 | 0 | 0 |
| 3 | 1 | 20.2367 | 13.2497 | 0.6915 | 25.2741 | 0.0869 | 0 | 0.1148 | 0 |
| 3 | 2 | 8.9669 | 5.9386 | 0.2877 | 10.5137 | 0.0347 | 0 | 0.1148 | 0 |
| 3 | 3 | 16.7768 | 10.897 | 0.565 | 20.6503 | 0.0706 | 0 | 0.1148 | 0 |
| 3 | 4 | 27.777 | 18.2759 | 0.9351 | 34.1766 | 0.1287 | 0 | 0.1148 | 0 |
| 3 | 5 | 20.3263 | 13.9316 | 0.6648 | 24.2965 | 0.0839 | 0 | 0.1148 | 0 |
| 3 | 6 | 28.7316 | 18.8028 | 0.9427 | 34.4528 | 0.1245 | 0 | 0.1148 | 0 |
| 3 | 7 | 25.4654 | 18.4277 | 0.8264 | 30.2015 | 0.1095 | 0 | 0.1148 | 0 |
| 3 | 8 | 29.6117 | 21.6329 | 0.9545 | 34.8833 | 0.126 | 0 | 0.1148 | 0 |
| 3 | 9 | 17.2418 | 12.6896 | 0.5857 | 21.4042 | 0.0712 | 0 | 0.1148 | 0 |
| 3 | 10 | 19.8929 | 14.3675 | 0.6554 | 23.9547 | 0.081 | 0 | 0.1148 | 0 |
| 3 | 11 | 28.1629 | 17.7133 | 0.9147 | 33.4316 | 0.1189 | 0 | 0.1148 | 0 |
| 3 | 12 | 25.2171 | 16.6791 | 0.7977 | 29.1554 | 0.102 | 0 | 0.1148 | 0 |
| 3 | 13 | 19.4575 | 14.7466 | 0.6586 | 24.0702 | 0.0828 | 0 | 0.1148 | 0 |
| 3 | 14 | 26.4424 | 17.3168 | 0.8888 | 32.4841 | 0.1138 | 0 | 0.1148 | 0 |
| 3 | 15 | 16.101 | 11.3039 | 0.5812 | 21.2404 | 0.0742 | 0 | 0.1148 | 0 |
| 3 | 16 | −0.023 | 1.4313 | −0.0247 | −0.9042 | −0.0064 | 0 | 0 | 0 |
| 4 | 1 | 21.7975 | 15.4921 | 0.7711 | 28.1812 | 0.0932 | 0 | 0.102 | 0 |
| 4 | 2 | 10.7163 | 8.3886 | 0.3262 | 11.9235 | 0.0386 | 0 | 0.102 | 0 |

TABLE II-continued

| | | | | | | | | | |
|---|---|---|---|---|---|---|---|---|---|
| 4 | 3 | 17.1487 | 14.3548 | 0.5793 | 21.1714 | 0.07 | 0 | 0.102 | 0 |
| 4 | 4 | 27.6901 | 18.0677 | 0.9147 | 33.4286 | 0.1231 | 0 | 0.102 | 0 |
| 4 | 5 | 19.834 | 14.4675 | 0.6659 | 24.3388 | 0.0858 | 0 | 0.102 | 0 |
| 4 | 6 | 28.4061 | 20.4494 | 0.9351 | 34.1766 | 0.1216 | 0 | 0.102 | 0 |
| 4 | 7 | 25.0251 | 19.0757 | 0.8051 | 29.4259 | 0.1044 | 0 | 0.102 | 0 |
| 4 | 8 | 30.1323 | 21.8658 | 0.9545 | 34.8849 | 0.1285 | 0 | 0.102 | 0 |
| 4 | 9 | 17.4353 | 13.7445 | 0.5888 | 21.5204 | 0.0724 | 0 | 0.102 | 0 |
| 4 | 10 | 18.5879 | 14.8039 | 0.6274 | 22.9309 | 0.0756 | 0 | 0.102 | 0 |
| 4 | 11 | 28.8642 | 21.4484 | 0.9293 | 33.9638 | 0.122 | 0 | 0.102 | 0 |
| 4 | 12 | 21.4072 | 15.6073 | 0.7437 | 27.1816 | 0.0938 | 0 | 0.102 | 0 |
| 4 | 13 | 20.4004 | 15.2176 | 0.6641 | 24.2712 | 0.084 | 0 | 0.102 | 0 |
| 4 | 14 | 26.9082 | 18.8 | 0.8724 | 31.8854 | 0.1143 | 0 | 0.102 | 0 |
| 4 | 15 | 19.1005 | 13.9277 | 0.6384 | 23.3336 | 0.0811 | 0 | 0.102 | 0 |
| 4 | 16 | 29.0091 | 17.9895 | 0.9619 | 35.1545 | 0.142 | 0.384 | 0 | 0 |
| 5 | 1 | 19.6008 | 14.7724 | 0.6977 | 25.4997 | 0.0863 | 0 | 0.0893 | 0 |
| 5 | 2 | 4.4591 | 5.8398 | 0.1267 | 4.6297 | 0.0115 | 0 | 0.0893 | 0 |
| 5 | 3 | 17.4615 | 13.2093 | 0.5716 | 20.8904 | 0.0684 | 0 | 0.0893 | 0 |
| 5 | 4 | 27.191 | 17.9075 | 0.9098 | 33.2513 | 0.121 | 0 | 0.0893 | 0 |
| 5 | 5 | 19.0595 | 15.5605 | 0.6287 | 22.9776 | 0.0753 | 0 | 0.0893 | 0 |
| 5 | 6 | 27.8708 | 19.2272 | 0.8978 | 32.8131 | 0.1167 | 0 | 0.0893 | 0 |
| 5 | 7 | 24.4016 | 19.1467 | 0.8152 | 29.7949 | 0.1021 | 0 | 0.0893 | 0 |
| 5 | 8 | 27.9965 | 21.5105 | 0.9029 | 32.9989 | 0.1173 | 0 | 0.0893 | 0 |
| 5 | 9 | 17.2513 | 13.7436 | 0.5629 | 20.5717 | 0.0705 | 0 | 0.0893 | 0 |
| 5 | 10 | 18.4671 | 13.4843 | 0.6255 | 22.8613 | 0.0758 | 0 | 0.0893 | 0 |
| 5 | 11 | 29.3804 | 21.3425 | 0.9532 | 34.8381 | 0.1229 | 0 | 0.0893 | 0 |
| 5 | 12 | 16.4671 | 14.1712 | 0.5223 | 19.0903 | 0.0603 | 0 | 0.0893 | 0 |
| 5 | 13 | 18.5408 | 14.4036 | 0.6009 | 21.9625 | 0.074 | 0 | 0.0893 | 0 |
| 5 | 14 | 25.0803 | 18.6587 | 0.8426 | 30.7933 | 0.1019 | 0 | 0.0893 | 0 |
| 5 | 15 | 16.054 | 10.8572 | 0.5467 | 19.9812 | 0.0675 | 0 | 0.0893 | 0 |
| 5 | 16 | 2.21 | 2.6719 | 0.0893 | 3.2654 | 0.0093 | 0 | 0 | 0 |
| 6 | 1 | 17.2143 | 10.5925 | 0.5785 | 21.1428 | 0.0704 | 0 | 0.0765 | 0 |
| 6 | 2 | 6.5615 | 3.8939 | 0.2245 | 8.204 | 0.0283 | 0 | 0.0765 | 0 |
| 6 | 3 | 14.665 | 10.1505 | 0.4705 | 17.1975 | 0.0571 | 0 | 0.0765 | 0 |
| 6 | 4 | 26.914 | 18.4424 | 0.9031 | 33.008 | 0.1147 | 0 | 0.0765 | 0 |
| 6 | 5 | 18.3107 | 13.344 | 0.6235 | 22.7882 | 0.0779 | 0 | 0.0765 | 0 |
| 6 | 6 | 26.6766 | 18.1581 | 0.9136 | 33.3883 | 0.1139 | 0 | 0.0765 | 0 |
| 6 | 7 | 23.7003 | 15.7944 | 0.8064 | 29.4712 | 0.1026 | 0 | 0.0765 | 0 |
| 6 | 8 | 26.7761 | 17.0647 | 0.8747 | 31.9669 | 0.1173 | 0 | 0.0765 | 0 |
| 6 | 9 | 16.1131 | 11.9414 | 0.5207 | 19.0297 | 0.0642 | 0 | 0.0765 | 0 |
| 6 | 10 | 18.9129 | 14.7068 | 0.6221 | 22.7361 | 0.0735 | 0 | 0.0765 | 0 |
| 6 | 11 | 29.0675 | 19.5103 | 0.9635 | 35.2139 | 0.129 | 0 | 0.0765 | 0 |
| 6 | 12 | 11.7426 | 10.2734 | 0.3717 | 13.5833 | 0.0422 | 0 | 0.0765 | 0 |
| 6 | 13 | 16.8626 | 11.5965 | 0.5855 | 21.3985 | 0.0773 | 0 | 0.0765 | 0 |
| 6 | 14 | 26.4065 | 19.0014 | 0.8963 | 32.7585 | 0.1118 | 0 | 0.0765 | 0 |
| 6 | 15 | 14.603 | 10.4082 | 0.4617 | 16.8728 | 0.0553 | 0 | 0.0765 | 0 |
| 6 | 16 | −0.7718 | −0.9228 | −0.0099 | −0.3607 | 0.0007 | 0 | 0 | 0 |
| 7 | 1 | 13.0412 | 9.5302 | 0.4162 | 15.2125 | 0.0503 | 0 | 0.0638 | 0 |
| 7 | 2 | 3.8611 | 2.4286 | 0.0928 | 3.392 | 0.0105 | 0 | 0.0638 | 0 |
| 7 | 3 | 15.3005 | 10.0224 | 0.5176 | 18.9172 | 0.0635 | 0 | 0.0638 | 0 |
| 7 | 4 | 25.9965 | 17.958 | 0.8622 | 31.5124 | 0.1085 | 0 | 0.0638 | 0 |
| 7 | 5 | 18.203 | 14.3266 | 0.6071 | 22.1899 | 0.0739 | 0 | 0.0638 | 0 |
| 7 | 6 | 26.4572 | 19.5242 | 0.898 | 32.8198 | 0.1116 | 0 | 0.0638 | 0 |
| 7 | 7 | 22.8328 | 16.0377 | 0.7813 | 28.5553 | 0.0978 | 0 | 0.0638 | 0 |
| 7 | 8 | 26.6147 | 20.0129 | 0.8716 | 31.8557 | 0.1132 | 0 | 0.0638 | 0 |
| 7 | 9 | 14.1961 | 12.1463 | 0.4578 | 16.7301 | 0.0582 | 0 | 0.0638 | 0 |
| 7 | 10 | 17.8887 | 13.1344 | 0.6076 | 22.2047 | 0.0718 | 0 | 0.0638 | 0 |
| 7 | 11 | 29.3 | 20.7004 | 0.9421 | 34.4302 | 0.1256 | 0 | 0.0638 | 0 |
| 7 | 12 | 12.7912 | 9.683 | 0.3949 | 14.434 | 0.0473 | 0 | 0.0638 | 0 |
| 7 | 13 | 16.1059 | 10.337 | 0.5525 | 20.1938 | 0.0715 | 0 | 0.0638 | 0 |
| 7 | 14 | 23.9848 | 17.1651 | 0.7971 | 29.1323 | 0.0995 | 0 | 0.0638 | 0 |
| 7 | 15 | 10.2355 | 6.3735 | 0.355 | 12.9727 | 0.0462 | 0 | 0.0638 | 0 |
| 7 | 16 | 13.7951 | 9.0124 | 0.478 | 17.4709 | 0.0607 | 0 | 0 | 0.768 |
| 8 | 1 | 8.7108 | 7.6478 | 0.278 | 10.1604 | 0.0318 | 0 | 0.051 | 0 |
| 8 | 2 | 5.6619 | 3.0544 | 0.1607 | 5.8731 | 0.0182 | 0 | 0.051 | 0 |
| 8 | 3 | 12.7243 | 8.2404 | 0.4297 | 15.7034 | 0.0548 | 0 | 0.051 | 0 |
| 8 | 4 | 23.1824 | 15.3102 | 0.7818 | 28.5718 | 0.1032 | 0 | 0.051 | 0 |
| 8 | 5 | 16.8934 | 12.5464 | 0.5477 | 20.0177 | 0.0693 | 0 | 0.051 | 0 |
| 8 | 6 | 23.0844 | 16.8013 | 0.786 | 28.7276 | 0.0972 | 0 | 0.051 | 0 |
| 8 | 7 | 21.1268 | 13.7292 | 0.7006 | 25.6053 | 0.0886 | 0 | 0.051 | 0 |
| 8 | 8 | 21.8373 | 14.2275 | 0.7572 | 27.6751 | 0.096 | 0 | 0.051 | 0 |
| 8 | 9 | 13.5928 | 9.6006 | 0.4328 | 15.8191 | 0.058 | 0 | 0.051 | 0 |
| 8 | 10 | 14.5523 | 10.281 | 0.4839 | 17.6837 | 0.0618 | 0 | 0.051 | 0 |
| 8 | 11 | 26.6525 | 18.3392 | 0.9016 | 32.9501 | 0.1139 | 0 | 0.051 | 0 |
| 8 | 12 | 8.5309 | 7.1825 | 0.2649 | 9.683 | 0.0303 | 0 | 0.051 | 0 |
| 8 | 13 | 15.3085 | 10.76 | 0.5211 | 19.0435 | 0.0676 | 0 | 0.051 | 0 |
| 8 | 14 | 18.6343 | 14.2101 | 0.616 | 22.5118 | 0.0767 | 0 | 0.051 | 0 |
| 8 | 15 | 8.4219 | 5.8283 | 0.2782 | 10.1692 | 0.0344 | 0 | 0.051 | 0 |
| 8 | 16 | −0.0515 | 0.4898 | 0.0128 | 0.4665 | 0.0006 | 0 | 0 | 0 |
| 9 | 1 | 7.3166 | 5.319 | 0.2691 | 9.8339 | 0.0316 | 0 | 0.0383 | 0 |

TABLE II-continued

| | | | | | | | | | |
|---|---|---|---|---|---|---|---|---|---|
| 9 | 2 | 4.4987 | 1.546 | 0.1044 | 3.8148 | 0.0146 | 0 | 0.0383 | 0 |
| 9 | 3 | 10.2033 | 7.0123 | 0.3423 | 12.51 | 0.0448 | 0 | 0.0383 | 0 |
| 9 | 4 | 21.9197 | 15.8941 | 0.7279 | 26.6038 | 0.0945 | 0 | 0.0383 | 0 |
| 9 | 5 | 13.7404 | 10.7958 | 0.4389 | 16.0401 | 0.0523 | 0 | 0.0383 | 0 |
| 9 | 6 | 22.0391 | 16.325 | 0.7157 | 26.1572 | 0.0859 | 0 | 0.0383 | 0 |
| 9 | 7 | 19.6992 | 14.7156 | 0.6399 | 23.3875 | 0.0796 | 0 | 0.0383 | 0 |
| 9 | 8 | 18.8782 | 13.41 | 0.6389 | 23.3487 | 0.0825 | 0 | 0.0383 | 0 |
| 9 | 9 | 11.5326 | 8.0541 | 0.3741 | 13.6723 | 0.0512 | 0 | 0.0383 | 0 |
| 9 | 10 | 11.4588 | 7.9653 | 0.3912 | 14.2987 | 0.0499 | 0 | 0.0383 | 0 |
| 9 | 11 | 24.0261 | 16.4691 | 0.8098 | 29.5975 | 0.1024 | 0 | 0.0383 | 0 |
| 9 | 12 | 5.2417 | 5.2691 | 0.138 | 5.0443 | 0.0148 | 0 | 0.0383 | 0 |
| 9 | 13 | 13.6632 | 9.0008 | 0.4457 | 16.2885 | 0.0596 | 0 | 0.0383 | 0 |
| 9 | 14 | 13.958 | 10.1125 | 0.4726 | 17.2727 | 0.0588 | 0 | 0.0383 | 0 |
| 9 | 15 | 7.3577 | 5.1203 | 0.2531 | 9.2493 | 0.0314 | 0 | 0.0383 | 0 |
| 9 | 16 | −0.6656 | −0.3365 | −0.0192 | −0.7029 | −0.0013 | 0 | 0 | 0 |
| 10 | 1 | 4.1613 | 3.3032 | 0.1544 | 5.6446 | 0.0193 | 0 | 0.1275 | 0 |
| 10 | 2 | 2.503 | 1.9852 | 0.0794 | 2.9011 | 0.0086 | 0 | 0.1275 | 0 |
| 10 | 3 | 22.5185 | 16.2252 | 0.777 | 28.3968 | 0.0938 | 0 | 0.1275 | 0 |
| 10 | 4 | 21.9249 | 17.4869 | 0.7138 | 26.0883 | 0.0819 | 0 | 0.1275 | 0 |
| 10 | 5 | 25.2635 | 18.8907 | 0.8754 | 31.9941 | 0.1044 | 0 | 0.1275 | 0 |
| 10 | 6 | 25.3786 | 19.7077 | 0.8305 | 30.3522 | 0.0992 | 0 | 0.1275 | 0 |
| 10 | 7 | 23.279 | 18.1733 | 0.7584 | 27.7191 | 0.0891 | 0 | 0.1275 | 0 |
| 10 | 8 | 23.9911 | 18.2144 | 0.795 | 29.0572 | 0.0985 | 0 | 0.1275 | 0 |
| 10 | 9 | 27.1738 | 19.0835 | 0.9247 | 33.7964 | 0.1169 | 0 | 0.1275 | 0 |
| 10 | 10 | 24.9585 | 18.3458 | 0.8669 | 31.6823 | 0.1061 | 0 | 0.1275 | 0 |
| 10 | 11 | 23.4382 | 17.1163 | 0.7984 | 29.1814 | 0.1007 | 0 | 0.1275 | 0 |
| 10 | 12 | 27.0826 | 19.1195 | 0.8924 | 32.6135 | 0.1125 | 0 | 0.1275 | 0 |
| 10 | 13 | 18.4256 | 12.7535 | 0.6262 | 22.8872 | 0.0811 | 0 | 0.1275 | 0 |
| 10 | 14 | 15.4756 | 10.6861 | 0.5085 | 18.5857 | 0.0641 | 0 | 0.1275 | 0 |
| 10 | 15 | 5.8605 | 5.3508 | 0.2013 | 7.3589 | 0.0255 | 0 | 0.1275 | 0 |
| 10 | 16 | 26.4434 | 15.6699 | 0.9053 | 33.0873 | 0.1296 | 0.384 | 0 | 0 |
| 11 | 1 | 3.3631 | 2.4086 | 0.1301 | 4.755 | 0.0163 | 0 | 0.1126 | 0 |
| 11 | 2 | 1.1385 | 1.5047 | 0.0639 | 2.3355 | 0.0058 | 0 | 0.1126 | 0 |
| 11 | 3 | 18.1923 | 12.056 | 0.6322 | 23.1046 | 0.0768 | 0 | 0.1126 | 0 |
| 11 | 4 | 20.8536 | 14.0326 | 0.7301 | 26.6842 | 0.0894 | 0 | 0.1126 | 0 |
| 11 | 5 | 25.2787 | 19.0321 | 0.8169 | 29.8542 | 0.0984 | 0 | 0.1126 | 0 |
| 11 | 6 | 26.5724 | 19.0476 | 0.8949 | 32.7054 | 0.1104 | 0 | 0.1126 | 0 |
| 11 | 7 | 23.8679 | 17.1511 | 0.8261 | 30.1927 | 0.1024 | 0 | 0.1126 | 0 |
| 11 | 8 | 27.0578 | 20.7184 | 0.9008 | 32.9204 | 0.1104 | 0 | 0.1126 | 0 |
| 11 | 9 | 28.3897 | 19.3393 | 0.9733 | 35.5716 | 0.1218 | 0 | 0.1126 | 0 |
| 11 | 10 | 21.8095 | 15.8474 | 0.7866 | 28.7469 | 0.0975 | 0 | 0.1126 | 0 |
| 11 | 11 | 21.1677 | 16.0245 | 0.7546 | 27.5785 | 0.0913 | 0 | 0.1126 | 0 |
| 11 | 12 | 26.6583 | 19.4333 | 0.9012 | 32.9382 | 0.1129 | 0 | 0.1126 | 0 |
| 11 | 13 | 19.2461 | 13.9305 | 0.6446 | 23.5598 | 0.0791 | 0 | 0.1126 | 0 |
| 11 | 14 | 13.3117 | 9.1142 | 0.4767 | 17.4229 | 0.0596 | 0 | 0.1126 | 0 |
| 11 | 15 | 3.338 | 4.4882 | 0.1241 | 4.5368 | 0.0112 | 0 | 0.1126 | 0 |
| 11 | 16 | 1.6855 | 2.0504 | 0.0688 | 2.5135 | 0.006 | 0 | 0 | 0 |
| 12 | 1 | 2.9708 | 2.5243 | 0.1413 | 5.1644 | 0.0173 | 0 | 0.0978 | 0 |
| 12 | 2 | 2.1159 | 3.2147 | 0.0729 | 2.6644 | 0.006 | 0 | 0.0978 | 0 |
| 12 | 3 | 16.9197 | 12.3294 | 0.5601 | 20.4707 | 0.0661 | 0 | 0.0978 | 0 |
| 12 | 4 | 16.8097 | 12.7361 | 0.5719 | 20.901 | 0.0701 | 0 | 0.0978 | 0 |
| 12 | 5 | 20.7869 | 17.0843 | 0.7264 | 26.5499 | 0.0844 | 0 | 0.0978 | 0 |
| 12 | 6 | 22.5089 | 17.2645 | 0.7643 | 27.9321 | 0.0911 | 0 | 0.0978 | 0 |
| 12 | 7 | 20.3063 | 13.5884 | 0.7135 | 26.0775 | 0.0877 | 0 | 0.0978 | 0 |
| 12 | 8 | 16.2687 | 11.1505 | 0.5577 | 20.3839 | 0.0703 | 0 | 0.0978 | 0 |
| 12 | 9 | 26.0301 | 16.9468 | 0.8731 | 31.9104 | 0.1108 | 0 | 0.0978 | 0 |
| 12 | 10 | 17.4285 | 11.5132 | 0.607 | 22.186 | 0.0766 | 0 | 0.0978 | 0 |
| 12 | 11 | 15.8306 | 10.5339 | 0.5491 | 20.0671 | 0.069 | 0 | 0.0978 | 0 |
| 12 | 12 | 22.7247 | 14.7061 | 0.7955 | 29.074 | 0.0971 | 0 | 0.0978 | 0 |
| 12 | 13 | 11.2534 | 7.305 | 0.4058 | 14.8324 | 0.051 | 0 | 0.0978 | 0 |
| 12 | 14 | 7.4166 | 3.4671 | 0.2736 | 9.9978 | 0.0337 | 0 | 0.0978 | 0 |
| 12 | 15 | 1.307 | 0.3938 | 0.0689 | 2.5194 | 0.0082 | 0 | 0.0978 | 0 |
| 12 | 16 | −1.2094 | −1.9329 | −0.0041 | −0.1501 | −0.0003 | 0 | 0 | 0 |
| 13 | 1 | 2.9967 | 3.7384 | 0.0553 | 2.0203 | 0.0022 | 0 | 0.0829 | 0 |
| 13 | 2 | 1.7052 | 1.3563 | 0.0398 | 1.4543 | 0.0027 | 0 | 0.0829 | 0 |
| 13 | 3 | 13.0887 | 9.6959 | 0.4612 | 16.8547 | 0.0549 | 0 | 0.0829 | 0 |
| 13 | 4 | 17.0868 | 13.3998 | 0.5915 | 21.6191 | 0.0696 | 0 | 0.0829 | 0 |
| 13 | 5 | 19.7818 | 15.0495 | 0.6769 | 24.7406 | 0.0833 | 0 | 0.0829 | 0 |
| 13 | 6 | 21.0147 | 15.0505 | 0.716 | 26.168 | 0.0861 | 0 | 0.0829 | 0 |
| 13 | 7 | 18.0319 | 14.6478 | 0.6107 | 22.3182 | 0.0712 | 0 | 0.0829 | 0 |
| 13 | 8 | 18.7202 | 14.921 | 0.6192 | 22.63 | 0.0741 | 0 | 0.0829 | 0 |
| 13 | 9 | 24.5564 | 17.2349 | 0.8727 | 31.8947 | 0.1135 | 0 | 0.0829 | 0 |
| 13 | 10 | 16.4168 | 13.0312 | 0.5761 | 21.0552 | 0.068 | 0 | 0.0829 | 0 |
| 13 | 11 | 16.6658 | 11.451 | 0.5704 | 20.8485 | 0.0687 | 0 | 0.0829 | 0 |
| 13 | 12 | 19.9683 | 13.87 | 0.7112 | 25.9917 | 0.0867 | 0 | 0.0829 | 0 |
| 13 | 13 | 10.9425 | 8.5671 | 0.4247 | 15.5217 | 0.0556 | 0 | 0.0829 | 0 |
| 13 | 14 | 9.7737 | 8.0718 | 0.3096 | 11.3139 | 0.036 | 0 | 0.0829 | 0 |
| 13 | 15 | 1.7288 | 1.0718 | 0.0759 | 2.7725 | 0.0082 | 0 | 0.0829 | 0 |
| 13 | 16 | 10.952 | 6.7668 | 0.393 | 14.3637 | 0.0488 | 0 | 0 | 0.768 |

TABLE II-continued

| | | | | | | | | | |
|---|---|---|---|---|---|---|---|---|---|
| 14 | 1 | 0.859 | 0.8081 | 0.0661 | 2.4145 | 0.0076 | 0 | 0.068 | 0 |
| 14 | 2 | 1.2176 | 2.4624 | 0.0396 | 1.4476 | 0.0025 | 0 | 0.068 | 0 |
| 14 | 3 | 10.267 | 8.591 | 0.3654 | 13.3559 | 0.0408 | 0 | 0.068 | 0 |
| 14 | 4 | 10.9361 | 8.2471 | 0.3609 | 13.1888 | 0.0394 | 0 | 0.068 | 0 |
| 14 | 5 | 15.763 | 12.2528 | 0.5463 | 19.9672 | 0.0631 | 0 | 0.068 | 0 |
| 14 | 6 | 12.2511 | 9.7701 | 0.4074 | 14.8894 | 0.0458 | 0 | 0.068 | 0 |
| 14 | 7 | 12.7569 | 8.9769 | 0.4403 | 16.0909 | 0.0523 | 0 | 0.068 | 0 |
| 14 | 8 | 11.771 | 10.0769 | 0.4011 | 14.6594 | 0.0473 | 0 | 0.068 | 0 |
| 14 | 9 | 20.4667 | 13.9256 | 0.7145 | 26.1126 | 0.0934 | 0 | 0.068 | 0 |
| 14 | 10 | 11.2785 | 7.3023 | 0.4152 | 15.1763 | 0.0536 | 0 | 0.068 | 0 |
| 14 | 11 | 10.3127 | 6.1338 | 0.3609 | 13.1915 | 0.0461 | 0 | 0.068 | 0 |
| 14 | 12 | 10.1414 | 8.3737 | 0.3548 | 12.9684 | 0.0414 | 0 | 0.068 | 0 |
| 14 | 13 | 7.4485 | 5.7711 | 0.2732 | 9.9858 | 0.0317 | 0 | 0.068 | 0 |
| 14 | 14 | 4.6897 | 3.6728 | 0.1896 | 6.9291 | 0.0206 | 0 | 0.068 | 0 |
| 14 | 15 | 0.4469 | 0.4157 | 0.0425 | 1.5524 | 0.0066 | 0 | 0.068 | 0 |
| 14 | 16 | 0.0205 | 0.2191 | 0.0325 | 1.1895 | 0.0045 | 0 | 0 | 0 |
| 15 | 1 | 0.1326 | 1.2014 | 0.0213 | 0.7772 | −0.0014 | 0 | 0.0531 | 0 |
| 15 | 2 | 0.5446 | 2.0595 | 0.029 | 1.0596 | −0.0016 | 0 | 0.0531 | 0 |
| 15 | 3 | 6.4394 | 4.0672 | 0.2646 | 9.6705 | 0.0317 | 0 | 0.0531 | 0 |
| 15 | 4 | 8.7498 | 6.8198 | 0.3376 | 12.3395 | 0.0412 | 0 | 0.0531 | 0 |
| 15 | 5 | 12.8715 | 8.7415 | 0.4617 | 16.8745 | 0.0557 | 0 | 0.0531 | 0 |
| 15 | 6 | 13.4066 | 9.3322 | 0.4526 | 16.5409 | 0.0568 | 0 | 0.0531 | 0 |
| 15 | 7 | 8.1085 | 6.4379 | 0.237 | 8.6612 | 0.0266 | 0 | 0.0531 | 0 |
| 15 | 8 | 12.9214 | 9.0713 | 0.4624 | 16.9008 | 0.0559 | 0 | 0.0531 | 0 |
| 15 | 9 | 19.1264 | 13.1011 | 0.6567 | 23.9995 | 0.0828 | 0 | 0.0531 | 0 |
| 15 | 10 | 10.2178 | 8.3832 | 0.3465 | 12.6635 | 0.0409 | 0 | 0.0531 | 0 |
| 15 | 11 | 12.0399 | 9.5234 | 0.4507 | 16.4738 | 0.0536 | 0 | 0.0531 | 0 |
| 15 | 12 | 9.1992 | 6.9676 | 0.3338 | 12.1989 | 0.0394 | 0 | 0.0531 | 0 |
| 15 | 13 | 7.5413 | 6.3157 | 0.2885 | 10.544 | 0.0368 | 0 | 0.0531 | 0 |
| 15 | 14 | 4.7466 | 3.9707 | 0.2032 | 7.4265 | 0.0238 | 0 | 0.0531 | 0 |
| 15 | 15 | 1.2498 | 1.3505 | 0.0593 | 2.1676 | 0.0065 | 0 | 0.0531 | 0 |
| 15 | 16 | −1.2496 | −0.3611 | −0.0064 | −0.2348 | 0.0003 | 0 | 0 | 0 |
| 16 | 1 | 0.2469 | 0.431 | 0.0311 | 1.1382 | 0.0048 | 0 | 0.0383 | 0 |
| 16 | 2 | 1.1204 | 2.4401 | 0.0624 | 2.2793 | 0.0026 | 0 | 0.0383 | 0 |
| 16 | 3 | 5.6729 | 3.8623 | 0.2177 | 7.9579 | 0.0269 | 0 | 0.0383 | 0 |
| 16 | 4 | 5.1165 | 3.5211 | 0.2607 | 9.5268 | 0.0327 | 0 | 0.0383 | 0 |
| 16 | 5 | 6.9249 | 4.6954 | 0.2462 | 8.9973 | 0.0286 | 0 | 0.0383 | 0 |
| 16 | 6 | 9.5123 | 6.7076 | 0.3377 | 12.3415 | 0.0392 | 0 | 0.0383 | 0 |
| 16 | 7 | 3.3103 | 3.062 | 0.1141 | 4.169 | 0.015 | 0 | 0.0383 | 0 |
| 16 | 8 | 5.5678 | 4.0843 | 0.2158 | 7.8876 | 0.0249 | 0 | 0.0383 | 0 |
| 16 | 9 | 13.2231 | 9.6653 | 0.4812 | 17.5857 | 0.0603 | 0 | 0.0383 | 0 |
| 16 | 10 | 6.6341 | 4.1143 | 0.2436 | 8.9035 | 0.029 | 0 | 0.0383 | 0 |
| 16 | 11 | 4.5017 | 2.0396 | 0.1675 | 6.1202 | 0.0201 | 0 | 0.0383 | 0 |
| 16 | 12 | 0.5165 | 1.8075 | 0.0714 | 2.6096 | 0.0084 | 0 | 0.0383 | 0 |
| 16 | 13 | 5.834 | 2.5756 | 0.2576 | 9.4154 | 0.0338 | 0 | 0.0383 | 0 |
| 16 | 14 | 1.9456 | 0.638 | 0.1291 | 4.7172 | 0.0188 | 0 | 0.0383 | 0 |
| 16 | 15 | 8.6195 | 6.634 | 0.3572 | 13.0562 | 0.0472 | 0 | 0.0383 | 0 |
| 16 | 16 | 14.4734 | 8.8212 | 0.5143 | 18.7981 | 0.0652 | 0.384 | 0 | 0 |

| R | CeNO33 real | CoNO32 real | FeNO33 real | HAuNO34 real | LaNO33 real | NH42MoO4 real | NaOH real | PdNH32NO22 real | SUM-micromols |
|---|---|---|---|---|---|---|---|---|---|
| Temperature 200 C. | | | | | | | | | |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |

TABLE II-continued

| | | | | | | | | | |
|---|---|---|---|---|---|---|---|---|---|
| 2 | 0 | 0.125 | 0 | 0 | 0 | 0 | 0 | 0 | 0.2525 |
| 2 | 0 | 0 | 0.125 | 0 | 0 | 0 | 0 | 0 | 0.2525 |
| 2 | 0.125 | 0 | 0 | 0 | 0 | 0 | 0 | 0 | 0.2525 |
| 2 | 0 | 0 | 0 | 0 | 0 | 0.125 | 0 | 0 | 0.2525 |
| 2 | 0 | 0 | 0 | 0 | 0 | 0 | 0 | 0.0235 | 0.151 |
| 2 | 0 | 0 | 0 | 0 | 0.125 | 0 | 0 | 0 | 0.2525 |
| 2 | 0 | 0 | 0 | 0.2 | 0 | 0 | 0 | 0 | 0.3275 |
| 2 | 0 | 0 | 0 | 0 | 0 | 0 | 0 | 0 | 0 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0.1964 | 0 | 0 | 0 | 0 | 0 | 0 | 0.3112 |
| 3 | 0 | 0 | 0.1964 | 0 | 0 | 0 | 0 | 0 | 0.3112 |
| 3 | 0.1964 | 0 | 0 | 0 | 0 | 0 | 0 | 0 | 0.3112 |
| 3 | 0 | 0 | 0 | 0 | 0 | 0.1964 | 0 | 0 | 0.3112 |
| 3 | 0 | 0 | 0 | 0 | 0 | 0 | 0 | 0.0369 | 0.1517 |
| 3 | 0 | 0 | 0 | 0 | 0.1964 | 0 | 0 | 0 | 0.3112 |
| 3 | 0 | 0 | 0 | 0.2 | 0 | 0 | 0 | 0 | 0.3148 |
| 3 | 0 | 0 | 0 | 0 | 0 | 0 | 0 | 0 | 0 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0.2679 | 0 | 0 | 0 | 0 | 0 | 0 | 0.3699 |
| 4 | 0 | 0 | 0.2679 | 0 | 0 | 0 | 0 | 0 | 0.3699 |
| 4 | 0.2679 | 0 | 0 | 0 | 0 | 0 | 0 | 0 | 0.3699 |
| 4 | 0 | 0 | 0 | 0 | 0 | 0.2679 | 0 | 0 | 0.3699 |
| 4 | 0 | 0 | 0 | 0 | 0 | 0 | 0 | 0.0504 | 0.1524 |
| 4 | 0 | 0 | 0 | 0 | 0.2679 | 0 | 0 | 0 | 0.3699 |
| 4 | 0 | 0 | 0 | 0.2 | 0 | 0 | 0 | 0 | 0.302 |
| 4 | 0 | 0 | 0 | 0 | 0 | 0 | 0 | 0 | 0.384 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0.3393 | 0 | 0 | 0 | 0 | 0 | 0 | 0.4285 |
| 5 | 0 | 0 | 0.3393 | 0 | 0 | 0 | 0 | 0 | 0.4285 |
| 5 | 0.3393 | 0 | 0 | 0 | 0 | 0 | 0 | 0 | 0.4285 |
| 5 | 0 | 0 | 0 | 0 | 0 | 0.3393 | 0 | 0 | 0.4285 |
| 5 | 0 | 0 | 0 | 0 | 0 | 0 | 0 | 0.0638 | 0.153 |
| 5 | 0 | 0 | 0 | 0 | 0.3393 | 0 | 0 | 0 | 0.4285 |
| 5 | 0 | 0 | 0 | 0.2 | 0 | 0 | 0 | 0 | 0.2893 |
| 5 | 0 | 0 | 0 | 0 | 0 | 0 | 0 | 0 | 0 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0.4107 | 0 | 0 | 0 | 0 | 0 | 0 | 0.4872 |
| 6 | 0 | 0 | 0.4107 | 0 | 0 | 0 | 0 | 0 | 0.4872 |
| 6 | 0.4107 | 0 | 0 | 0 | 0 | 0 | 0 | 0 | 0.4872 |
| 6 | 0 | 0 | 0 | 0 | 0 | 0.4107 | 0 | 0 | 0.4872 |
| 6 | 0 | 0 | 0 | 0 | 0 | 0 | 0 | 0.0772 | 0.1537 |
| 6 | 0 | 0 | 0 | 0 | 0.4107 | 0 | 0 | 0 | 0.4872 |
| 6 | 0 | 0 | 0 | 0.2 | 0 | 0 | 0 | 0 | 0.2765 |
| 6 | 0 | 0 | 0 | 0 | 0 | 0 | 0 | 0 | 0 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |

TABLE II-continued

| | | | | | | | | | | |
|---|---|---|---|---|---|---|---|---|---|---|
| 7 | 0 | 0 | 0 | 0 | 0 | 0 | 0 | 0 | 0.0638 |
| 7 | 0 | 0.4821 | 0 | 0 | 0 | 0 | 0 | 0 | 0.5459 |
| 7 | 0 | 0 | 0.4821 | 0 | 0 | 0 | 0 | 0 | 0.5459 |
| 7 | 0.4821 | 0 | 0 | 0 | 0 | 0 | 0 | 0 | 0.5459 |
| 7 | 0 | 0 | 0 | 0 | 0 | 0.4821 | 0 | 0 | 0.5459 |
| 7 | 0 | 0 | 0 | 0 | 0 | 0 | 0 | 0.0906 | 0.1544 |
| 7 | 0 | 0 | 0 | 0 | 0.4821 | 0 | 0 | 0 | 0.5459 |
| 7 | 0 | 0 | 0 | 0.2 | 0 | 0 | 0 | 0 | 0.2638 |
| 7 | 0 | 0 | 0 | 0 | 0 | 0 | 0 | 0 | 0.768 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0.5536 | 0 | 0 | 0 | 0 | 0 | 0 | 0.6046 |
| 8 | 0 | 0 | 0.5536 | 0 | 0 | 0 | 0 | 0 | 0.6046 |
| 8 | 0.5536 | 0 | 0 | 0 | 0 | 0 | 0 | 0 | 0.6046 |
| 8 | 0 | 0 | 0 | 0 | 0 | 0.5536 | 0 | 0 | 0.6046 |
| 8 | 0 | 0 | 0 | 0 | 0 | 0 | 0 | 0.1041 | 0.1551 |
| 8 | 0 | 0 | 0 | 0 | 0.5536 | 0 | 0 | 0 | 0.6046 |
| 8 | 0 | 0 | 0 | 0.2 | 0 | 0 | 0 | 0 | 0.251 |
| 8 | 0 | 0 | 0 | 0 | 0 | 0 | 0 | 0 | 0 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0.625 | 0 | 0 | 0 | 0 | 0 | 0 | 0.6633 |
| 9 | 0 | 0 | 0.625 | 0 | 0 | 0 | 0 | 0 | 0.6633 |
| 9 | 0.625 | 0 | 0 | 0 | 0 | 0 | 0 | 0 | 0.6633 |
| 9 | 0 | 0 | 0 | 0 | 0 | 0.625 | 0 | 0 | 0.6633 |
| 9 | 0 | 0 | 0 | 0 | 0 | 0 | 0 | 0.1175 | 0.1558 |
| 9 | 0 | 0 | 0 | 0 | 0.625 | 0 | 0 | 0 | 0.6633 |
| 9 | 0 | 0 | 0 | 0.2 | 0 | 0 | 0 | 0 | 0.2383 |
| 9 | 0 | 0 | 0 | 0 | 0 | 0 | 0 | 0 | 0 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0.125 | 0 | 0 | 0 | 0 | 1.25 | 0 | 1.5025 |
| 10 | 0 | 0 | 0.125 | 0 | 0 | 0 | 1.25 | 0 | 1.5025 |
| 10 | 0.125 | 0 | 0 | 0 | 0 | 0 | 1.25 | 0 | 1.5025 |
| 10 | 0 | 0 | 0 | 0 | 0 | 0.125 | 1.25 | 0 | 1.5025 |
| 10 | 0 | 0 | 0 | 0 | 0 | 0 | 1.25 | 0.0235 | 1.401 |
| 10 | 0 | 0 | 0 | 0 | 0.125 | 0 | 1.25 | 0 | 1.5025 |
| 10 | 0 | 0 | 0 | 0.2 | 0 | 0 | 1.25 | 0 | 1.5775 |
| 10 | 0 | 0 | 0 | 0 | 0 | 0 | 0 | 0 | 0.384 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0.2083 | 0 | 0 | 0 | 0 | 1.25 | 0 | 1.571 |
| 11 | 0 | 0 | 0.2083 | 0 | 0 | 0 | 1.25 | 0 | 1.571 |
| 11 | 0.2083 | 0 | 0 | 0 | 0 | 0 | 1.25 | 0 | 1.571 |
| 11 | 0 | 0 | 0 | 0 | 0 | 0.2083 | 1.25 | 0 | 1.571 |
| 11 | 0 | 0 | 0 | 0 | 0 | 0 | 1.25 | 0.0392 | 1.4018 |
| 11 | 0 | 0 | 0 | 0 | 0.2083 | 0 | 1.25 | 0 | 1.571 |
| 11 | 0 | 0 | 0 | 0.2 | 0 | 0 | 1.25 | 0 | 1.5626 |
| 11 | 0 | 0 | 0 | 0 | 0 | 0 | 0 | 0 | 0 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |

TABLE II-continued

| | | | | | | | | | |
|---|---|---|---|---|---|---|---|---|---|
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0.2917 | 0 | 0 | 0 | 0 | 1.25 | 0 | 1.6394 |
| 12 | 0 | 0 | 0.2917 | 0 | 0 | 0 | 1.25 | 0 | 1.6394 |
| 12 | 0.2917 | 0 | 0 | 0 | 0 | 0 | 1.25 | 0 | 1.6394 |
| 12 | 0 | 0 | 0 | 0 | 0 | 0.2917 | 1.25 | 0 | 1.6394 |
| 12 | 0 | 0 | 0 | 0 | 0 | 0 | 1.25 | 0.0548 | 1.4026 |
| 12 | 0 | 0 | 0 | 0 | 0.2917 | 0 | 1.25 | 0 | 1.6394 |
| 12 | 0 | 0 | 0 | 0.2 | 0 | 0 | 1.25 | 0 | 1.5478 |
| 12 | 0 | 0 | 0 | 0 | 0 | 0 | 0 | 0 | 0 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0.375 | 0 | 0 | 0 | 0 | 1.25 | 0 | 1.7079 |
| 13 | 0 | 0 | 0.375 | 0 | 0 | 0 | 1.25 | 0 | 1.7079 |
| 13 | 0.375 | 0 | 0 | 0 | 0 | 0 | 1.25 | 0 | 1.7079 |
| 13 | 0 | 0 | 0 | 0 | 0 | 0.375 | 1.25 | 0 | 1.7079 |
| 13 | 0 | 0 | 0 | 0 | 0 | 0 | 1.25 | 0.0705 | 1.4034 |
| 13 | 0 | 0 | 0 | 0 | 0.375 | 0 | 1.25 | 0 | 1.7079 |
| 13 | 0 | 0 | 0 | 0.2 | 0 | 0 | 1.25 | 0 | 1.5329 |
| 13 | 0 | 0 | 0 | 0 | 0 | 0 | 0 | 0 | 0.768 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0.4583 | 0 | 0 | 0 | 0 | 1.25 | 0 | 1.7763 |
| 14 | 0 | 0 | 0.4583 | 0 | 0 | 0 | 1.25 | 0 | 1.7763 |
| 14 | 0.4583 | 0 | 0 | 0 | 0 | 0 | 1.25 | 0 | 1.7763 |
| 14 | 0 | 0 | 0 | 0 | 0 | 0.4583 | 1.25 | 0 | 1.7763 |
| 14 | 0 | 0 | 0 | 0 | 0 | 0 | 1.25 | 0.0862 | 1.4042 |
| 14 | 0 | 0 | 0 | 0 | 0.4583 | 0 | 1.25 | 0 | 1.7763 |
| 14 | 0 | 0 | 0 | 0.2 | 0 | 0 | 1.25 | 0 | 1.518 |
| 14 | 0 | 0 | 0 | 0 | 0 | 0 | 0 | 0 | 0 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0.5417 | 0 | 0 | 0 | 0 | 1.25 | 0 | 1.8448 |
| 15 | 0 | 0 | 0.5417 | 0 | 0 | 0 | 1.25 | 0 | 1.8448 |
| 15 | 0.5417 | 0 | 0 | 0 | 0 | 0 | 1.25 | 0 | 1.8448 |
| 15 | 0 | 0 | 0 | 0 | 0 | 0.5417 | 1.25 | 0 | 1.8448 |
| 15 | 0 | 0 | 0 | 0 | 0 | 0 | 1.25 | 0.1018 | 1.405 |
| 15 | 0 | 0 | 0 | 0 | 0.5417 | 0 | 1.25 | 0 | 1.8448 |
| 15 | 0 | 0 | 0 | 0.2 | 0 | 0 | 1.25 | 0 | 1.5031 |
| 15 | 0 | 0 | 0 | 0 | 0 | 0 | 0 | 0 | 0 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0.625 | 0 | 0 | 0 | 0 | 1.25 | 0 | 1.9133 |
| 16 | 0 | 0 | 0.625 | 0 | 0 | 0 | 1.25 | 0 | 1.9133 |
| 16 | 0.625 | 0 | 0 | 0 | 0 | 0 | 1.25 | 0 | 1.9133 |
| 16 | 0 | 0 | 0 | 0 | 0 | 0.625 | 1.25 | 0 | 1.9133 |
| 16 | 0 | 0 | 0 | 0 | 0 | 0 | 1.25 | 0.1175 | 1.4058 |
| 16 | 0 | 0 | 0 | 0 | 0.625 | 0 | 1.25 | 0 | 1.9133 |
| 16 | 0 | 0 | 0 | 0.2 | 0 | 0 | 1.25 | 0 | 1.4883 |
| 16 | 0 | 0 | 0 | 0 | 0 | 0 | 0 | 0 | 0.384 |
| Temperature 230 C. | | | | | | | | | |
| 1 | 0 | 0 | 0 | 0 | 0 | 0 | 0 | 0 | 0.384 |
| 1 | 0 | 0 | 0 | 0 | 0 | 0 | 0 | 0 | 0 |

TABLE II-continued

| | | | | | | | | | |
|---|---|---|---|---|---|---|---|---|---|
| 1 | 0 | 0 | 0 | 0 | 0 | 0 | 0 | 0 | 0 |
| 1 | 0 | 0 | 0 | 0 | 0 | 0 | 0 | 0 | 0.768 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0.125 | 0 | 0 | 0 | 0 | 0 | 0 | 0.2525 |
| 2 | 0 | 0 | 0.125 | 0 | 0 | 0 | 0 | 0 | 0.2525 |
| 2 | 0.125 | 0 | 0 | 0 | 0 | 0 | 0 | 0 | 0.2525 |
| 2 | 0 | 0 | 0 | 0 | 0 | 0.125 | 0 | 0 | 0.2525 |
| 2 | 0 | 0 | 0 | 0 | 0 | 0 | 0 | 0.0235 | 0.151 |
| 2 | 0 | 0 | 0 | 0 | 0.125 | 0 | 0 | 0 | 0.2525 |
| 2 | 0 | 0 | 0 | 0.2 | 0 | 0 | 0 | 0 | 0.3275 |
| 2 | 0 | 0 | 0 | 0 | 0 | 0 | 0 | 0 | 0 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0.1964 | 0 | 0 | 0 | 0 | 0 | 0 | 0.3112 |
| 3 | 0 | 0 | 0.1964 | 0 | 0 | 0 | 0 | 0 | 0.3112 |
| 3 | 0.1964 | 0 | 0 | 0 | 0 | 0 | 0 | 0 | 0.3112 |
| 3 | 0 | 0 | 0 | 0 | 0 | 0.1964 | 0 | 0 | 0.3112 |
| 3 | 0 | 0 | 0 | 0 | 0 | 0 | 0 | 0.0369 | 0.1517 |
| 3 | 0 | 0 | 0 | 0 | 0.1964 | 0 | 0 | 0 | 0.3112 |
| 3 | 0 | 0 | 0 | 0.2 | 0 | 0 | 0 | 0 | 0.3148 |
| 3 | 0 | 0 | 0 | 0 | 0 | 0 | 0 | 0 | 0 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0.2679 | 0 | 0 | 0 | 0 | 0 | 0 | 0.3699 |
| 4 | 0 | 0 | 0.2679 | 0 | 0 | 0 | 0 | 0 | 0.3699 |
| 4 | 0.2679 | 0 | 0 | 0 | 0 | 0 | 0 | 0 | 0.3699 |
| 4 | 0 | 0 | 0 | 0 | 0 | 0.2679 | 0 | 0 | 0.3699 |
| 4 | 0 | 0 | 0 | 0 | 0 | 0 | 0 | 0.0504 | 0.1524 |
| 4 | 0 | 0 | 0 | 0 | 0.2679 | 0 | 0 | 0 | 0.3699 |
| 4 | 0 | 0 | 0 | 0.2 | 0 | 0 | 0 | 0 | 0.302 |
| 4 | 0 | 0 | 0 | 0 | 0 | 0 | 0 | 0 | 0.384 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0.3393 | 0 | 0 | 0 | 0 | 0 | 0 | 0.4285 |
| 5 | 0 | 0 | 0.3393 | 0 | 0 | 0 | 0 | 0 | 0.4285 |
| 5 | 0.3393 | 0 | 0 | 0 | 0 | 0 | 0 | 0 | 0.4285 |
| 5 | 0 | 0 | 0 | 0 | 0 | 0.3393 | 0 | 0 | 0.4285 |
| 5 | 0 | 0 | 0 | 0 | 0 | 0 | 0 | 0.0638 | 0.153 |
| 5 | 0 | 0 | 0 | 0 | 0.3393 | 0 | 0 | 0 | 0.4285 |
| 5 | 0 | 0 | 0 | 0.2 | 0 | 0 | 0 | 0 | 0.2893 |
| 5 | 0 | 0 | 0 | 0 | 0 | 0 | 0 | 0 | 0 |
| 6 | 0 | 0 | 0 | 0 | 0 | 0 | 0 | 0 | 0.0765 |

TABLE II-continued

| | | | | | | | | | |
|---|---|---|---|---|---|---|---|---|---|
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0.4107 | 0 | 0 | 0 | 0 | 0 | 0 | 0.4872 |
| 6 | 0 | 0 | 0.4107 | 0 | 0 | 0 | 0 | 0 | 0.4872 |
| 6 | 0.4107 | 0 | 0 | 0 | 0 | 0 | 0 | 0 | 0.4872 |
| 6 | 0 | 0 | 0 | 0 | 0 | 0.4107 | 0 | 0 | 0.4872 |
| 6 | 0 | 0 | 0 | 0 | 0 | 0 | 0 | 0.0772 | 0.1537 |
| 6 | 0 | 0 | 0 | 0 | 0.4107 | 0 | 0 | 0 | 0.4872 |
| 6 | 0 | 0 | 0 | 0.2 | 0 | 0 | 0 | 0 | 0.2765 |
| 6 | 0 | 0 | 0 | 0 | 0 | 0 | 0 | 0 | 0 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0.4821 | 0 | 0 | 0 | 0 | 0 | 0 | 0.5459 |
| 7 | 0 | 0 | 0.4821 | 0 | 0 | 0 | 0 | 0 | 0.5459 |
| 7 | 0.4821 | 0 | 0 | 0 | 0 | 0 | 0 | 0 | 0.5459 |
| 7 | 0 | 0 | 0 | 0 | 0 | 0.4821 | 0 | 0 | 0.5459 |
| 7 | 0 | 0 | 0 | 0 | 0 | 0 | 0 | 0.0906 | 0.1544 |
| 7 | 0 | 0 | 0 | 0 | 0.4821 | 0 | 0 | 0 | 0.5459 |
| 7 | 0 | 0 | 0 | 0.2 | 0 | 0 | 0 | 0 | 0.2638 |
| 7 | 0 | 0 | 0 | 0 | 0 | 0 | 0 | 0 | 0.768 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0.5536 | 0 | 0 | 0 | 0 | 0 | 0 | 0.6046 |
| 8 | 0 | 0 | 0.5536 | 0 | 0 | 0 | 0 | 0 | 0.6046 |
| 8 | 0.5536 | 0 | 0 | 0 | 0 | 0 | 0 | 0 | 0.6046 |
| 8 | 0 | 0 | 0 | 0 | 0 | 0.5536 | 0 | 0 | 0.6046 |
| 8 | 0 | 0 | 0 | 0 | 0 | 0 | 0 | 0.1041 | 0.1551 |
| 8 | 0 | 0 | 0 | 0 | 0.5536 | 0 | 0 | 0 | 0.6046 |
| 8 | 0 | 0 | 0 | 0.2 | 0 | 0 | 0 | 0 | 0.251 |
| 8 | 0 | 0 | 0 | 0 | 0 | 0 | 0 | 0 | 0 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0.625 | 0 | 0 | 0 | 0 | 0 | 0 | 0.6633 |
| 9 | 0 | 0 | 0.625 | 0 | 0 | 0 | 0 | 0 | 0.6633 |
| 9 | 0.625 | 0 | 0 | 0 | 0 | 0 | 0 | 0 | 0.6633 |
| 9 | 0 | 0 | 0 | 0 | 0 | 0.625 | 0 | 0 | 0.6633 |
| 9 | 0 | 0 | 0 | 0 | 0 | 0 | 0 | 0.1175 | 0.1558 |
| 9 | 0 | 0 | 0 | 0 | 0.625 | 0 | 0 | 0 | 0.6633 |
| 9 | 0 | 0 | 0 | 0.2 | 0 | 0 | 0 | 0 | 0.2383 |
| 9 | 0 | 0 | 0 | 0 | 0 | 0 | 0 | 0 | 0 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0.125 | 0 | 0 | 0 | 0 | 1.25 | 0 | 1.5025 |
| 10 | 0 | 0 | 0.125 | 0 | 0 | 0 | 1.25 | 0 | 1.5025 |
| 10 | 0.125 | 0 | 0 | 0 | 0 | 0 | 1.25 | 0 | 1.5025 |
| 10 | 0 | 0 | 0 | 0 | 0 | 0.125 | 1.25 | 0 | 1.5025 |
| 10 | 0 | 0 | 0 | 0 | 0 | 0 | 1.25 | 0.0235 | 1.401 |
| 10 | 0 | 0 | 0 | 0 | 0.125 | 0 | 1.25 | 0 | 1.5025 |
| 10 | 0 | 0 | 0 | 0.2 | 0 | 0 | 1.25 | 0 | 1.5775 |
| 10 | 0 | 0 | 0 | 0 | 0 | 0 | 0 | 0 | 0.384 |

TABLE II-continued

| | | | | | | | | | |
|---|---|---|---|---|---|---|---|---|---|
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0.2083 | 0 | 0 | 0 | 0 | 1.25 | 0 | 1.571 |
| 11 | 0 | 0 | 0.2083 | 0 | 0 | 0 | 1.25 | 0 | 1.571 |
| 11 | 0.2083 | 0 | 0 | 0 | 0 | 0 | 1.25 | 0 | 1.571 |
| 11 | 0 | 0 | 0 | 0 | 0 | 0.2083 | 1.25 | 0 | 1.571 |
| 11 | 0 | 0 | 0 | 0 | 0 | 0 | 1.25 | 0.0392 | 1.4018 |
| 11 | 0 | 0 | 0 | 0 | 0.2083 | 0 | 1.25 | 0 | 1.571 |
| 11 | 0 | 0 | 0 | 0.2 | 0 | 0 | 1.25 | 0 | 1.5626 |
| 11 | 0 | 0 | 0 | 0 | 0 | 0 | 0 | 0 | 0 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0.2917 | 0 | 0 | 0 | 0 | 1.25 | 0 | 1.6394 |
| 12 | 0 | 0 | 0.2917 | 0 | 0 | 0 | 1.25 | 0 | 1.6394 |
| 12 | 0.2917 | 0 | 0 | 0 | 0 | 0 | 1.25 | 0 | 1.6394 |
| 12 | 0 | 0 | 0 | 0 | 0 | 0.2917 | 1.25 | 0 | 1.6394 |
| 12 | 0 | 0 | 0 | 0 | 0 | 0 | 1.25 | 0.0548 | 1.4026 |
| 12 | 0 | 0 | 0 | 0 | 0.2917 | 0 | 1.25 | 0 | 1.6394 |
| 12 | 0 | 0 | 0 | 0.2 | 0 | 0 | 1.25 | 0 | 1.5478 |
| 12 | 0 | 0 | 0 | 0 | 0 | 0 | 0 | 0 | 0 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0.375 | 0 | 0 | 0 | 0 | 1.25 | 0 | 1.7079 |
| 13 | 0 | 0 | 0.375 | 0 | 0 | 0 | 1.25 | 0 | 1.7079 |
| 13 | 0.375 | 0 | 0 | 0 | 0 | 0 | 1.25 | 0 | 1.7079 |
| 13 | 0 | 0 | 0 | 0 | 0 | 0.375 | 1.25 | 0 | 1.7079 |
| 13 | 0 | 0 | 0 | 0 | 0 | 0 | 1.25 | 0.0705 | 1.4034 |
| 13 | 0 | 0 | 0 | 0 | 0.375 | 0 | 1.25 | 0 | 1.7079 |
| 13 | 0 | 0 | 0 | 0.2 | 0 | 0 | 1.25 | 0 | 1.5329 |
| 13 | 0 | 0 | 0 | 0 | 0 | 0 | 0 | 0 | 0.768 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0.4583 | 0 | 0 | 0 | 0 | 1.25 | 0 | 1.7763 |
| 14 | 0 | 0 | 0.4583 | 0 | 0 | 0 | 1.25 | 0 | 1.7763 |
| 14 | 0.4583 | 0 | 0 | 0 | 0 | 0 | 1.25 | 0 | 1.7763 |
| 14 | 0 | 0 | 0 | 0 | 0 | 0.4583 | 1.25 | 0 | 1.7763 |
| 14 | 0 | 0 | 0 | 0 | 0 | 0 | 1.25 | 0.0862 | 1.4042 |
| 14 | 0 | 0 | 0 | 0 | 0.4583 | 0 | 1.25 | 0 | 1.7763 |
| 14 | 0 | 0 | 0 | 0.2 | 0 | 0 | 1.25 | 0 | 1.518 |
| 14 | 0 | 0 | 0 | 0 | 0 | 0 | 0 | 0 | 0 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0.5417 | 0 | 0 | 0 | 0 | 1.25 | 0 | 1.8448 |
| 15 | 0 | 0 | 0.5417 | 0 | 0 | 0 | 1.25 | 0 | 1.8448 |
| 15 | 0.5417 | 0 | 0 | 0 | 0 | 0 | 1.25 | 0 | 1.8448 |
| 15 | 0 | 0 | 0 | 0 | 0 | 0.5417 | 1.25 | 0 | 1.8448 |
| 15 | 0 | 0 | 0 | 0 | 0 | 0 | 1.25 | 0.1018 | 1.405 |
| 15 | 0 | 0 | 0 | 0 | 0.5417 | 0 | 1.25 | 0 | 1.8448 |
| 15 | 0 | 0 | 0 | 0.2 | 0 | 0 | 1.25 | 0 | 1.5031 |

TABLE II-continued

| | | | | | | | | | |
|---|---|---|---|---|---|---|---|---|---|
| 15 | 0 | 0 | 0 | 0 | 0 | 0 | 0 | 0 | 0 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0.625 | 0 | 0 | 0 | 0 | 1.25 | 0 | 1.9133 |
| 16 | 0 | 0 | 0.625 | 0 | 0 | 0 | 1.25 | 0 | 1.9133 |
| 16 | 0.625 | 0 | 0 | 0 | 0 | 0 | 1.25 | 0 | 1.9133 |
| 16 | 0 | 0 | 0 | 0 | 0 | 0.625 | 1.25 | 0 | 1.9133 |
| 16 | 0 | 0 | 0 | 0 | 0 | 0 | 1.25 | 0.1175 | 1.4058 |
| 16 | 0 | 0 | 0 | 0 | 0.625 | 0 | 1.25 | 0 | 1.9133 |
| 16 | 0 | 0 | 0 | 0.2 | 0 | 0 | 1.25 | 0 | 1.4883 |
| 16 | 0 | 0 | 0 | 0 | 0 | 0 | 0 | 0 | 0.384 |
| Temperature 260 C. | | | | | | | | | |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.384 |
| 1 | 0 | 0 | 0 | 0 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 0 | 0 | 0.768 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0 | 0 | 0 | 0 | 0 | 0 | 0 | 0.1275 |
| 2 | 0 | 0.125 | 0 | 0 | 0 | 0 | 0 | 0 | 0.2525 |
| 2 | 0 | 0 | 0.125 | 0 | 0 | 0 | 0 | 0 | 0.2525 |
| 2 | 0.125 | 0 | 0 | 0 | 0 | 0 | 0 | 0 | 0.2525 |
| 2 | 0 | 0 | 0 | 0 | 0 | 0.125 | 0 | 0 | 0.2525 |
| 2 | 0 | 0 | 0 | 0 | 0 | 0 | 0 | 0.0235 | 0.151 |
| 2 | 0 | 0 | 0 | 0 | 0.125 | 0 | 0 | 0 | 0.2525 |
| 2 | 0 | 0 | 0 | 0.2 | 0 | 0 | 0 | 0 | 0.3275 |
| 2 | 0 | 0 | 0 | 0 | 0 | 0 | 0 | 0 | 0 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0 | 0 | 0 | 0 | 0 | 0 | 0 | 0.1148 |
| 3 | 0 | 0.1964 | 0 | 0 | 0 | 0 | 0 | 0 | 0.3112 |
| 3 | 0 | 0 | 0.1964 | 0 | 0 | 0 | 0 | 0 | 0.3112 |
| 3 | 0.1964 | 0 | 0 | 0 | 0 | 0 | 0 | 0 | 0.3112 |
| 3 | 0 | 0 | 0 | 0 | 0 | 0.1964 | 0 | 0 | 0.3112 |
| 3 | 0 | 0 | 0 | 0 | 0 | 0 | 0 | 0.0369 | 0.1517 |
| 3 | 0 | 0 | 0 | 0 | 0.1964 | 0 | 0 | 0 | 0.3112 |
| 3 | 0 | 0 | 0 | 0.2 | 0 | 0 | 0 | 0 | 0.3148 |
| 3 | 0 | 0 | 0 | 0 | 0 | 0 | 0 | 0 | 0 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0 | 0 | 0 | 0 | 0 | 0 | 0 | 0.102 |
| 4 | 0 | 0.2679 | 0 | 0 | 0 | 0 | 0 | 0 | 0.3699 |
| 4 | 0 | 0 | 0.2679 | 0 | 0 | 0 | 0 | 0 | 0.3699 |
| 4 | 0.2679 | 0 | 0 | 0 | 0 | 0 | 0 | 0 | 0.3699 |

TABLE II-continued

| | | | | | | | | | |
|---|---|---|---|---|---|---|---|---|---|
| 4 | 0 | 0 | 0 | 0 | 0 | 0.2679 | 0 | 0 | 0.3699 |
| 4 | 0 | 0 | 0 | 0 | 0 | 0 | 0 | 0.0504 | 0.1524 |
| 4 | 0 | 0 | 0 | 0 | 0.2679 | 0 | 0 | 0 | 0.3699 |
| 4 | 0 | 0 | 0 | 0.2 | 0 | 0 | 0 | 0 | 0.302 |
| 4 | 0 | 0 | 0 | 0 | 0 | 0 | 0 | 0 | 0.384 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0 | 0 | 0 | 0 | 0 | 0 | 0 | 0.0893 |
| 5 | 0 | 0.3393 | 0 | 0 | 0 | 0 | 0 | 0 | 0.4285 |
| 5 | 0 | 0 | 0.3393 | 0 | 0 | 0 | 0 | 0 | 0.4285 |
| 5 | 0.3393 | 0 | 0 | 0 | 0 | 0 | 0 | 0 | 0.4285 |
| 5 | 0 | 0 | 0 | 0 | 0 | 0.3393 | 0 | 0 | 0.4285 |
| 5 | 0 | 0 | 0 | 0 | 0 | 0 | 0 | 0.0638 | 0.153 |
| 5 | 0 | 0 | 0 | 0 | 0.3393 | 0 | 0 | 0 | 0.4285 |
| 5 | 0 | 0 | 0 | 0.2 | 0 | 0 | 0 | 0 | 0.2893 |
| 5 | 0 | 0 | 0 | 0 | 0 | 0 | 0 | 0 | 0 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0 | 0 | 0 | 0 | 0 | 0 | 0 | 0.0765 |
| 6 | 0 | 0.4107 | 0 | 0 | 0 | 0 | 0 | 0 | 0.4872 |
| 6 | 0 | 0 | 0.4107 | 0 | 0 | 0 | 0 | 0 | 0.4872 |
| 6 | 0.4107 | 0 | 0 | 0 | 0 | 0 | 0 | 0 | 0.4872 |
| 6 | 0 | 0 | 0 | 0 | 0 | 0.4107 | 0 | 0 | 0.4872 |
| 6 | 0 | 0 | 0 | 0 | 0 | 0 | 0 | 0.0772 | 0.1537 |
| 6 | 0 | 0 | 0 | 0 | 0.4107 | 0 | 0 | 0 | 0.4872 |
| 6 | 0 | 0 | 0 | 0.2 | 0 | 0 | 0 | 0 | 0.2765 |
| 6 | 0 | 0 | 0 | 0 | 0 | 0 | 0 | 0 | 0 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0 | 0 | 0 | 0 | 0 | 0 | 0 | 0.0638 |
| 7 | 0 | 0.4821 | 0 | 0 | 0 | 0 | 0 | 0 | 0.5459 |
| 7 | 0 | 0 | 0.4821 | 0 | 0 | 0 | 0 | 0 | 0.5459 |
| 7 | 0.4821 | 0 | 0 | 0 | 0 | 0 | 0 | 0 | 0.5459 |
| 7 | 0 | 0 | 0 | 0 | 0 | 0.4821 | 0 | 0 | 0.5459 |
| 7 | 0 | 0 | 0 | 0 | 0 | 0 | 0 | 0.0906 | 0.1544 |
| 7 | 0 | 0 | 0 | 0 | 0.4821 | 0 | 0 | 0 | 0.5459 |
| 7 | 0 | 0 | 0 | 0.2 | 0 | 0 | 0 | 0 | 0.2638 |
| 7 | 0 | 0 | 0 | 0 | 0 | 0 | 0 | 0 | 0.768 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0 | 0 | 0 | 0 | 0 | 0 | 0 | 0.051 |
| 8 | 0 | 0.5536 | 0 | 0 | 0 | 0 | 0 | 0 | 0.6046 |
| 8 | 0 | 0 | 0.5536 | 0 | 0 | 0 | 0 | 0 | 0.6046 |
| 8 | 0.5536 | 0 | 0 | 0 | 0 | 0 | 0 | 0 | 0.6046 |
| 8 | 0 | 0 | 0 | 0 | 0 | 0.5536 | 0 | 0 | 0.6046 |
| 8 | 0 | 0 | 0 | 0 | 0 | 0 | 0 | 0.1041 | 0.1551 |
| 8 | 0 | 0 | 0 | 0 | 0.5536 | 0 | 0 | 0 | 0.6046 |
| 8 | 0 | 0 | 0 | 0.2 | 0 | 0 | 0 | 0 | 0.251 |
| 8 | 0 | 0 | 0 | 0 | 0 | 0 | 0 | 0 | 0 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0 | 0 | 0 | 0 | 0 | 0 | 0 | 0.0383 |
| 9 | 0 | 0.625 | 0 | 0 | 0 | 0 | 0 | 0 | 0.6633 |
| 9 | 0 | 0 | 0.625 | 0 | 0 | 0 | 0 | 0 | 0.6633 |

TABLE II-continued

| | | | | | | | | | |
|---|---|---|---|---|---|---|---|---|---|
| 9 | 0.625 | 0 | 0 | 0 | 0 | 0 | 0 | 0 | 0.6633 |
| 9 | 0 | 0 | 0 | 0 | 0 | 0.625 | 0 | 0 | 0.6633 |
| 9 | 0 | 0 | 0 | 0 | 0 | 0 | 0 | 0.1175 | 0.1558 |
| 9 | 0 | 0 | 0 | 0 | 0.625 | 0 | 0 | 0 | 0.6633 |
| 9 | 0 | 0 | 0 | 0.2 | 0 | 0 | 0 | 0 | 0.2383 |
| 9 | 0 | 0 | 0 | 0 | 0 | 0 | 0 | 0 | 0 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0 | 0 | 0 | 0 | 0 | 1.25 | 0 | 1.3775 |
| 10 | 0 | 0.125 | 0 | 0 | 0 | 0 | 1.25 | 0 | 1.5025 |
| 10 | 0 | 0 | 0.125 | 0 | 0 | 0 | 1.25 | 0 | 1.5025 |
| 10 | 0.125 | 0 | 0 | 0 | 0 | 0 | 1.25 | 0 | 1.5025 |
| 10 | 0 | 0 | 0 | 0 | 0 | 0.125 | 1.25 | 0 | 1.5025 |
| 10 | 0 | 0 | 0 | 0 | 0 | 0 | 1.25 | 0.0235 | 1.401 |
| 10 | 0 | 0 | 0 | 0 | 0.125 | 0 | 1.25 | 0 | 1.5025 |
| 10 | 0 | 0 | 0 | 0.2 | 0 | 0 | 1.25 | 0 | 1.5775 |
| 10 | 0 | 0 | 0 | 0 | 0 | 0 | 0 | 0 | 0.384 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0 | 0 | 0 | 0 | 0 | 1.25 | 0 | 1.3626 |
| 11 | 0 | 0.2083 | 0 | 0 | 0 | 0 | 1.25 | 0 | 1.571 |
| 11 | 0 | 0 | 0.2083 | 0 | 0 | 0 | 1.25 | 0 | 1.571 |
| 11 | 0.2083 | 0 | 0 | 0 | 0 | 0 | 1.25 | 0 | 1.571 |
| 11 | 0 | 0 | 0 | 0 | 0 | 0.2083 | 1.25 | 0 | 1.571 |
| 11 | 0 | 0 | 0 | 0 | 0 | 0 | 1.25 | 0.0392 | 1.4018 |
| 11 | 0 | 0 | 0 | 0 | 0.2083 | 0 | 1.25 | 0 | 1.571 |
| 11 | 0 | 0 | 0 | 0.2 | 0 | 0 | 1.25 | 0 | 1.5626 |
| 11 | 0 | 0 | 0 | 0 | 0 | 0 | 0 | 0 | 0 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0 | 0 | 0 | 0 | 0 | 1.25 | 0 | 1.3478 |
| 12 | 0 | 0.2917 | 0 | 0 | 0 | 0 | 1.25 | 0 | 1.6394 |
| 12 | 0 | 0 | 0.2917 | 0 | 0 | 0 | 1.25 | 0 | 1.6394 |
| 12 | 0.2917 | 0 | 0 | 0 | 0 | 0 | 1.25 | 0 | 1.6394 |
| 12 | 0 | 0 | 0 | 0 | 0 | 0.2917 | 1.25 | 0 | 1.6394 |
| 12 | 0 | 0 | 0 | 0 | 0 | 0 | 1.25 | 0.0548 | 1.4026 |
| 12 | 0 | 0 | 0 | 0 | 0.2917 | 0 | 1.25 | 0 | 1.6394 |
| 12 | 0 | 0 | 0 | 0.2 | 0 | 0 | 1.25 | 0 | 1.5478 |
| 12 | 0 | 0 | 0 | 0 | 0 | 0 | 0 | 0 | 0 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0 | 0 | 0 | 0 | 0 | 1.25 | 0 | 1.3329 |
| 13 | 0 | 0.375 | 0 | 0 | 0 | 0 | 1.25 | 0 | 1.7079 |
| 13 | 0 | 0 | 0.375 | 0 | 0 | 0 | 1.25 | 0 | 1.7079 |
| 13 | 0.375 | 0 | 0 | 0 | 0 | 0 | 1.25 | 0 | 1.7079 |
| 13 | 0 | 0 | 0 | 0 | 0 | 0.375 | 1.25 | 0 | 1.7079 |
| 13 | 0 | 0 | 0 | 0 | 0 | 0 | 1.25 | 0.0705 | 1.4034 |
| 13 | 0 | 0 | 0 | 0 | 0.375 | 0 | 1.25 | 0 | 1.7079 |
| 13 | 0 | 0 | 0 | 0.2 | 0 | 0 | 1.25 | 0 | 1.5329 |
| 13 | 0 | 0 | 0 | 0 | 0 | 0 | 0 | 0 | 0.768 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0 | 0 | 0 | 0 | 0 | 1.25 | 0 | 1.318 |
| 14 | 0 | 0.4583 | 0 | 0 | 0 | 0 | 1.25 | 0 | 1.7763 |

TABLE II-continued

| | | | | | | | | | |
|---|---|---|---|---|---|---|---|---|---|
| 14 | 0 | 0 | 0.4583 | 0 | 0 | 0 | 1.25 | 0 | 1.7763 |
| 14 | 0.4583 | 0 | 0 | 0 | 0 | 0 | 1.25 | 0 | 1.7763 |
| 14 | 0 | 0 | 0 | 0 | 0 | 0.4583 | 1.25 | 0 | 1.7763 |
| 14 | 0 | 0 | 0 | 0 | 0 | 0 | 1.25 | 0.0862 | 1.4042 |
| 14 | 0 | 0 | 0 | 0 | 0.4583 | 0 | 1.25 | 0 | 1.7763 |
| 14 | 0 | 0 | 0 | 0.2 | 0 | 0 | 1.25 | 0 | 1.518 |
| 14 | 0 | 0 | 0 | 0 | 0 | 0 | 0 | 0 | 0 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0 | 0 | 0 | 0 | 0 | 1.25 | 0 | 1.3031 |
| 15 | 0 | 0.5417 | 0 | 0 | 0 | 0 | 1.25 | 0 | 1.8448 |
| 15 | 0 | 0 | 0.5417 | 0 | 0 | 0 | 1.25 | 0 | 1.8448 |
| 15 | 0.5417 | 0 | 0 | 0 | 0 | 0 | 1.25 | 0 | 1.8448 |
| 15 | 0 | 0 | 0 | 0 | 0 | 0.5417 | 1.25 | 0 | 1.8448 |
| 15 | 0 | 0 | 0 | 0 | 0 | 0 | 1.25 | 0.1018 | 1.405 |
| 15 | 0 | 0 | 0 | 0 | 0.5417 | 0 | 1.25 | 0 | 1.8448 |
| 15 | 0 | 0 | 0 | 0.2 | 0 | 0 | 1.25 | 0 | 1.5031 |
| 15 | 0 | 0 | 0 | 0 | 0 | 0 | 0 | 0 | 0 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0 | 0 | 0 | 0 | 0 | 1.25 | 0 | 1.2883 |
| 16 | 0 | 0.625 | 0 | 0 | 0 | 0 | 1.25 | 0 | 1.9133 |
| 16 | 0 | 0 | 0.625 | 0 | 0 | 0 | 1.25 | 0 | 1.9133 |
| 16 | 0.625 | 0 | 0 | 0 | 0 | 0 | 1.25 | 0 | 1.9133 |
| 16 | 0 | 0 | 0 | 0 | 0 | 0.625 | 1.25 | 0 | 1.9133 |
| 16 | 0 | 0 | 0 | 0 | 0 | 0 | 1.25 | 0.1175 | 1.4058 |
| 16 | 0 | 0 | 0 | 0 | 0.625 | 0 | 1.25 | 0 | 1.9133 |
| 16 | 0 | 0 | 0 | 0.2 | 0 | 0 | 1.25 | 0 | 1.4883 |
| 16 | 0 | 0 | 0 | 0 | 0 | 0 | 0 | 0 | 0.384 |

| R | mol % Pt | mol % shift | mol % Ce | mol % Co | mol % Fe | mol % Au | mol % La | mol % Mo | mol % Na | mol % Pd |
|---|---|---|---|---|---|---|---|---|---|---|
| Temperature 200 C. | | | | | | | | | | |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 50.5 | 0 | 0 | 49.5 | 0 | 0 | 0 | 0 | 0 | 0 |
| 2 | 50.5 | 0 | 0 | 0 | 49.5 | 0 | 0 | 0 | 0 | 0 |
| 2 | 50.5 | 0 | 49.5 | 0 | 0 | 0 | 0 | 0 | 0 | 0 |
| 2 | 50.5 | 0 | 0 | 0 | 0 | 0 | 0 | 49.5 | 0 | 0 |
| 2 | 84.44 | 0 | 0 | 0 | 0 | 0 | 0 | 0 | 0 | 15.56 |
| 2 | 50.5 | 0 | 0 | 0 | 0 | 0 | 49.5 | 0 | 0 | 0 |
| 2 | 38.93 | 0 | 0 | 0 | 0 | 61.07 | 0 | 0 | 0 | 0 |
| 2 | 0 | 0 | 0 | 0 | 0 | 0 | 0 | 0 | 0 | 0 |
| 3 | 100 | 0 | 0 | 0 | 0 | 0 | 0 | 0 | 0 | 0 |

TABLE II-continued

| | | | | | | | | | | |
|---|---|---|---|---|---|---|---|---|---|---|
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 36.88 | 0 | 0 | 63.12 | 0 | 0 | 0 | 0 | 0 | 0 |
| 3 | 36.88 | 0 | 0 | 0 | 63.12 | 0 | 0 | 0 | 0 | 0 |
| 3 | 36.88 | 0 | 63.12 | 0 | 0 | 0 | 0 | 0 | 0 | 0 |
| 3 | 36.88 | 0 | 0 | 0 | 0 | 0 | 0 | 63.12 | 0 | 0 |
| 3 | 75.65 | 0 | 0 | 0 | 0 | 0 | 0 | 0 | 0 | 24.35 |
| 3 | 36.88 | 0 | 0 | 0 | 0 | 0 | 63.12 | 0 | 0 | 0 |
| 3 | 36.46 | 0 | 0 | 0 | 0 | 63.54 | 0 | 0 | 0 | 0 |
| 3 | 0 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 27.58 | 0 | 0 | 72.42 | 0 | 0 | 0 | 0 | 0 | 0 |
| 4 | 27.58 | 0 | 0 | 0 | 72.42 | 0 | 0 | 0 | 0 | 0 |
| 4 | 27.58 | 0 | 72.42 | 0 | 0 | 0 | 0 | 0 | 0 | 0 |
| 4 | 27.58 | 0 | 0 | 0 | 0 | 0 | 0 | 72.42 | 0 | 0 |
| 4 | 66.95 | 0 | 0 | 0 | 0 | 0 | 0 | 0 | 0 | 33.05 |
| 4 | 27.58 | 0 | 0 | 0 | 0 | 0 | 72.42 | 0 | 0 | 0 |
| 4 | 33.77 | 0 | 0 | 0 | 0 | 66.23 | 0 | 0 | 0 | 0 |
| 4 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 20.83 | 0 | 0 | 79.17 | 0 | 0 | 0 | 0 | 0 | 0 |
| 5 | 20.83 | 0 | 0 | 0 | 79.17 | 0 | 0 | 0 | 0 | 0 |
| 5 | 20.83 | 0 | 79.17 | 0 | 0 | 0 | 0 | 0 | 0 | 0 |
| 5 | 20.83 | 0 | 0 | 0 | 0 | 0 | 0 | 79.17 | 0 | 0 |
| 5 | 58.32 | 0 | 0 | 0 | 0 | 0 | 0 | 0 | 0 | 41.68 |
| 5 | 20.83 | 0 | 0 | 0 | 0 | 0 | 79.17 | 0 | 0 | 0 |
| 5 | 30.86 | 0 | 0 | 0 | 0 | 69.14 | 0 | 0 | 0 | 0 |
| 5 | 0 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 15.7 | 0 | 0 | 84.3 | 0 | 0 | 0 | 0 | 0 | 0 |
| 6 | 15.7 | 0 | 0 | 0 | 84.3 | 0 | 0 | 0 | 0 | 0 |
| 6 | 15.7 | 0 | 84.3 | 0 | 0 | 0 | 0 | 0 | 0 | 0 |
| 6 | 15.7 | 0 | 0 | 0 | 0 | 0 | 0 | 84.3 | 0 | 0 |
| 6 | 49.77 | 0 | 0 | 0 | 0 | 0 | 0 | 0 | 0 | 50.23 |
| 6 | 15.7 | 0 | 0 | 0 | 0 | 0 | 84.3 | 0 | 0 | 0 |
| 6 | 27.67 | 0 | 0 | 0 | 0 | 72.33 | 0 | 0 | 0 | 0 |
| 6 | 0 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 11.68 | 0 | 0 | 88.32 | 0 | 0 | 0 | 0 | 0 | 0 |
| 7 | 11.68 | 0 | 0 | 0 | 88.32 | 0 | 0 | 0 | 0 | 0 |
| 7 | 11.68 | 0 | 88.32 | 0 | 0 | 0 | 0 | 0 | 0 | 0 |
| 7 | 11.68 | 0 | 0 | 0 | 0 | 0 | 0 | 88.32 | 0 | 0 |
| 7 | 41.29 | 0 | 0 | 0 | 0 | 0 | 0 | 0 | 0 | 58.71 |
| 7 | 11.68 | 0 | 0 | 0 | 0 | 0 | 88.32 | 0 | 0 | 0 |
| 7 | 24.17 | 0 | 0 | 0 | 0 | 75.83 | 0 | 0 | 0 | 0 |
| 7 | 0 | 100 | 0 | 0 | 0 | 0 | 0 | 0 | 0 | 0 |

TABLE II-continued

| | | | | | | | | | | |
|---|---|---|---|---|---|---|---|---|---|---|
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 8.44 | 0 | 0 | 91.56 | 0 | 0 | 0 | 0 | 0 | 0 |
| 8 | 8.44 | 0 | 0 | 0 | 91.56 | 0 | 0 | 0 | 0 | 0 |
| 8 | 8.44 | 0 | 91.56 | 0 | 0 | 0 | 0 | 0 | 0 | 0 |
| 8 | 8.44 | 0 | 0 | 0 | 0 | 0 | 0 | 91.56 | 0 | 0 |
| 8 | 32.89 | 0 | 0 | 0 | 0 | 0 | 0 | 0 | 0 | 67.11 |
| 8 | 8.44 | 0 | 0 | 0 | 0 | 0 | 91.56 | 0 | 0 | 0 |
| 8 | 20.32 | 0 | 0 | 0 | 0 | 79.68 | 0 | 0 | 0 | 0 |
| 8 | 0 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 5.77 | 0 | 0 | 94.23 | 0 | 0 | 0 | 0 | 0 | 0 |
| 9 | 5.77 | 0 | 0 | 0 | 94.23 | 0 | 0 | 0 | 0 | 0 |
| 9 | 5.77 | 0 | 94.23 | 0 | 0 | 0 | 0 | 0 | 0 | 0 |
| 9 | 5.77 | 0 | 0 | 0 | 0 | 0 | 0 | 94.23 | 0 | 0 |
| 9 | 24.56 | 0 | 0 | 0 | 0 | 0 | 0 | 0 | 0 | 75.44 |
| 9 | 5.77 | 0 | 0 | 0 | 0 | 0 | 94.23 | 0 | 0 | 0 |
| 9 | 16.05 | 0 | 0 | 0 | 0 | 83.95 | 0 | 0 | 0 | 0 |
| 9 | 0 | 0 | 0 | 0 | 0 | 0 | 0 | 0 | 0 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 8.49 | 0 | 0 | 8.32 | 0 | 0 | 0 | 0 | 83.19 | 0 |
| 10 | 8.49 | 0 | 0 | 0 | 8.32 | 0 | 0 | 0 | 83.19 | 0 |
| 10 | 8.49 | 0 | 8.32 | 0 | 0 | 0 | 0 | 0 | 83.19 | 0 |
| 10 | 8.49 | 0 | 0 | 0 | 0 | 0 | 0 | 8.32 | 83.19 | 0 |
| 10 | 9.1 | 0 | 0 | 0 | 0 | 0 | 0 | 0 | 89.22 | 1.68 |
| 10 | 8.49 | 0 | 0 | 0 | 0 | 0 | 8.32 | 0 | 83.19 | 0 |
| 10 | 8.08 | 0 | 0 | 0 | 0 | 12.68 | 0 | 0 | 79.24 | 0 |
| 10 | 100 | 0 | 0 | 0 | 0 | 0 | 0 | 0 | 0 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 7.17 | 0 | 0 | 13.26 | 0 | 0 | 0 | 0 | 79.57 | 0 |
| 11 | 7.17 | 0 | 0 | 0 | 13.26 | 0 | 0 | 0 | 79.57 | 0 |
| 11 | 7.17 | 0 | 13.26 | 0 | 0 | 0 | 0 | 0 | 79.57 | 0 |
| 11 | 7.17 | 0 | 0 | 0 | 0 | 0 | 0 | 13.26 | 79.57 | 0 |
| 11 | 8.03 | 0 | 0 | 0 | 0 | 0 | 0 | 0 | 89.17 | 2.79 |
| 11 | 7.17 | 0 | 0 | 0 | 0 | 0 | 13.26 | 0 | 79.57 | 0 |
| 11 | 7.21 | 0 | 0 | 0 | 0 | 12.8 | 0 | 0 | 79.99 | 0 |
| 11 | 0 | 0 | 0 | 0 | 0 | 0 | 0 | 0 | 0 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 5.96 | 0 | 0 | 17.79 | 0 | 0 | 0 | 0 | 76.25 | 0 |
| 12 | 5.96 | 0 | 0 | 0 | 17.79 | 0 | 0 | 0 | 76.25 | 0 |
| 12 | 5.96 | 0 | 17.79 | 0 | 0 | 0 | 0 | 0 | 76.25 | 0 |
| 12 | 5.96 | 0 | 0 | 0 | 0 | 0 | 0 | 17.79 | 76.25 | 0 |
| 12 | 6.97 | 0 | 0 | 0 | 0 | 0 | 0 | 0 | 89.12 | 3.91 |
| 12 | 5.96 | 0 | 0 | 0 | 0 | 0 | 17.79 | 0 | 76.25 | 0 |
| 12 | 6.32 | 0 | 0 | 0 | 0 | 12.92 | 0 | 0 | 80.76 | 0 |

TABLE II-continued

| | | | | | | | | | | |
|---|---|---|---|---|---|---|---|---|---|---|
| 12 | 0 | 0 | 0 | 0 | 0 | 0 | 0 | 0 | 0 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 4.85 | 0 | 0 | 21.96 | 0 | 0 | 0 | 0 | 73.19 | 0 |
| 13 | 4.85 | 0 | 0 | 0 | 21.96 | 0 | 0 | 0 | 73.19 | 0 |
| 13 | 4.85 | 0 | 21.96 | 0 | 0 | 0 | 0 | 0 | 73.19 | 0 |
| 13 | 4.85 | 0 | 0 | 0 | 0 | 0 | 0 | 21.96 | 73.19 | 0 |
| 13 | 5.91 | 0 | 0 | 0 | 0 | 0 | 0 | 0 | 89.07 | 5.02 |
| 13 | 4.85 | 0 | 0 | 0 | 0 | 0 | 21.96 | 0 | 73.19 | 0 |
| 13 | 5.41 | 0 | 0 | 0 | 0 | 13.05 | 0 | 0 | 81.55 | 0 |
| 13 | 0 | 100 | 0 | 0 | 0 | 0 | 0 | 0 | 0 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 3.83 | 0 | 0 | 25.8 | 0 | 0 | 0 | 0 | 70.37 | 0 |
| 14 | 3.83 | 0 | 0 | 0 | 25.8 | 0 | 0 | 0 | 70.37 | 0 |
| 14 | 3.83 | 0 | 25.8 | 0 | 0 | 0 | 0 | 0 | 70.37 | 0 |
| 14 | 3.83 | 0 | 0 | 0 | 0 | 0 | 0 | 25.8 | 70.37 | 0 |
| 14 | 4.84 | 0 | 0 | 0 | 0 | 0 | 0 | 0 | 89.02 | 6.14 |
| 14 | 3.83 | 0 | 0 | 0 | 0 | 0 | 25.8 | 0 | 70.37 | 0 |
| 14 | 4.48 | 0 | 0 | 0 | 0 | 13.18 | 0 | 0 | 82.35 | 0 |
| 14 | 0 | 0 | 0 | 0 | 0 | 0 | 0 | 0 | 0 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 2.88 | 0 | 0 | 29.36 | 0 | 0 | 0 | 0 | 67.76 | 0 |
| 15 | 2.88 | 0 | 0 | 0 | 29.36 | 0 | 0 | 0 | 67.76 | 0 |
| 15 | 2.88 | 0 | 29.36 | 0 | 0 | 0 | 0 | 0 | 67.76 | 0 |
| 15 | 2.88 | 0 | 0 | 0 | 0 | 0 | 0 | 29.36 | 67.76 | 0 |
| 15 | 3.78 | 0 | 0 | 0 | 0 | 0 | 0 | 0 | 88.97 | 7.25 |
| 15 | 2.88 | 0 | 0 | 0 | 0 | 0 | 29.36 | 0 | 67.76 | 0 |
| 15 | 3.53 | 0 | 0 | 0 | 0 | 13.31 | 0 | 0 | 83.16 | 0 |
| 15 | 0 | 0 | 0 | 0 | 0 | 0 | 0 | 0 | 0 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2 | 0 | 0 | 32.67 | 0 | 0 | 0 | 0 | 65.33 | 0 |
| 16 | 2 | 0 | 0 | 0 | 32.67 | 0 | 0 | 0 | 65.33 | 0 |
| 16 | 2 | 0 | 32.67 | 0 | 0 | 0 | 0 | 0 | 65.33 | 0 |
| 16 | 2 | 0 | 0 | 0 | 0 | 0 | 0 | 32.67 | 65.33 | 0 |
| 16 | 2.72 | 0 | 0 | 0 | 0 | 0 | 0 | 0 | 88.92 | 8.36 |
| 16 | 2 | 0 | 0 | 0 | 0 | 0 | 32.67 | 0 | 65.33 | 0 |
| 16 | 2.57 | 0 | 0 | 0 | 0 | 13.44 | 0 | 0 | 83.99 | 0 |
| 16 | 100 | 0 | 0 | 0 | 0 | 0 | 0 | 0 | 0 | 0 |
| Temperature 230 C. | | | | | | | | | | |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 1 | 0 | 0 | 0 | 0 | 0 | 0 | 0 | 0 | 0 | 0 |

TABLE II-continued

| | | | | | | | | | | |
|---|---|---|---|---|---|---|---|---|---|---|
| 1 | 0 | 0 | 0 | 0 | 0 | 0 | 0 | 0 | 0 | 0 |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 50.5 | 0 | 0 | 49.5 | 0 | 0 | 0 | 0 | 0 | 0 |
| 2 | 50.5 | 0 | 0 | 0 | 49.5 | 0 | 0 | 0 | 0 | 0 |
| 2 | 50.5 | 0 | 49.5 | 0 | 0 | 0 | 0 | 0 | 0 | 0 |
| 2 | 50.5 | 0 | 0 | 0 | 0 | 0 | 0 | 49.5 | 0 | 0 |
| 2 | 84.44 | 0 | 0 | 0 | 0 | 0 | 0 | 0 | 0 | 15.56 |
| 2 | 50.5 | 0 | 0 | 0 | 0 | 0 | 49.5 | 0 | 0 | 0 |
| 2 | 38.93 | 0 | 0 | 0 | 0 | 61.07 | 0 | 0 | 0 | 0 |
| 2 | 0 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 36.88 | 0 | 0 | 63.12 | 0 | 0 | 0 | 0 | 0 | 0 |
| 3 | 36.88 | 0 | 0 | 0 | 63.12 | 0 | 0 | 0 | 0 | 0 |
| 3 | 36.88 | 0 | 63.12 | 0 | 0 | 0 | 0 | 0 | 0 | 0 |
| 3 | 36.88 | 0 | 0 | 0 | 0 | 0 | 0 | 63.12 | 0 | 0 |
| 3 | 75.65 | 0 | 0 | 0 | 0 | 0 | 0 | 0 | 0 | 24.35 |
| 3 | 36.88 | 0 | 0 | 0 | 0 | 0 | 63.12 | 0 | 0 | 0 |
| 3 | 36.46 | 0 | 0 | 0 | 0 | 63.54 | 0 | 0 | 0 | 0 |
| 3 | 0 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 27.58 | 0 | 0 | 72.42 | 0 | 0 | 0 | 0 | 0 | 0 |
| 4 | 27.58 | 0 | 0 | 0 | 72.42 | 0 | 0 | 0 | 0 | 0 |
| 4 | 27.58 | 0 | 72.42 | 0 | 0 | 0 | 0 | 0 | 0 | 0 |
| 4 | 27.58 | 0 | 0 | 0 | 0 | 0 | 0 | 72.42 | 0 | 0 |
| 4 | 66.95 | 0 | 0 | 0 | 0 | 0 | 0 | 0 | 0 | 33.05 |
| 4 | 27.58 | 0 | 0 | 0 | 0 | 0 | 72.42 | 0 | 0 | 0 |
| 4 | 33.77 | 0 | 0 | 0 | 0 | 66.23 | 0 | 0 | 0 | 0 |
| 4 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 20.83 | 0 | 0 | 79.17 | 0 | 0 | 0 | 0 | 0 | 0 |
| 5 | 20.83 | 0 | 0 | 0 | 79.17 | 0 | 0 | 0 | 0 | 0 |
| 5 | 20.83 | 0 | 79.17 | 0 | 0 | 0 | 0 | 0 | 0 | 0 |
| 5 | 20.83 | 0 | 0 | 0 | 0 | 0 | 0 | 79.17 | 0 | 0 |
| 5 | 58.32 | 0 | 0 | 0 | 0 | 0 | 0 | 0 | 0 | 41.68 |
| 5 | 20.83 | 0 | 0 | 0 | 0 | 0 | 79.17 | 0 | 0 | 0 |
| 5 | 30.86 | 0 | 0 | 0 | 0 | 69.14 | 0 | 0 | 0 | 0 |
| 5 | 0 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 15.7 | 0 | 0 | 84.3 | 0 | 0 | 0 | 0 | 0 | 0 |
| 6 | 15.7 | 0 | 0 | 0 | 84.3 | 0 | 0 | 0 | 0 | 0 |

TABLE II-continued

| | | | | | | | | | | |
|---|---|---|---|---|---|---|---|---|---|---|
| 6 | 15.7 | 0 | 84.3 | 0 | 0 | 0 | 0 | 0 | 0 | 0 |
| 6 | 15.7 | 0 | 0 | 0 | 0 | 0 | 0 | 84.3 | 0 | 0 |
| 6 | 49.77 | 0 | 0 | 0 | 0 | 0 | 0 | 0 | 0 | 50.23 |
| 6 | 15.7 | 0 | 0 | 0 | 0 | 0 | 84.3 | 0 | 0 | 0 |
| 6 | 27.67 | 0 | 0 | 0 | 0 | 72.33 | 0 | 0 | 0 | 0 |
| 6 | 0 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 11.68 | 0 | 0 | 88.32 | 0 | 0 | 0 | 0 | 0 | 0 |
| 7 | 11.68 | 0 | 0 | 0 | 88.32 | 0 | 0 | 0 | 0 | 0 |
| 7 | 11.68 | 0 | 88.32 | 0 | 0 | 0 | 0 | 0 | 0 | 0 |
| 7 | 11.68 | 0 | 0 | 0 | 0 | 0 | 0 | 88.32 | 0 | 0 |
| 7 | 41.29 | 0 | 0 | 0 | 0 | 0 | 0 | 0 | 0 | 58.71 |
| 7 | 11.68 | 0 | 0 | 0 | 0 | 0 | 88.32 | 0 | 0 | 0 |
| 7 | 24.17 | 0 | 0 | 0 | 0 | 75.83 | 0 | 0 | 0 | 0 |
| 7 | 0 | 100 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 8.44 | 0 | 0 | 91.56 | 0 | 0 | 0 | 0 | 0 | 0 |
| 8 | 8.44 | 0 | 0 | 0 | 91.56 | 0 | 0 | 0 | 0 | 0 |
| 8 | 8.44 | 0 | 91.56 | 0 | 0 | 0 | 0 | 0 | 0 | 0 |
| 8 | 8.44 | 0 | 0 | 0 | 0 | 0 | 0 | 91.56 | 0 | 0 |
| 8 | 32.89 | 0 | 0 | 0 | 0 | 0 | 0 | 0 | 0 | 67.11 |
| 8 | 8.44 | 0 | 0 | 0 | 0 | 0 | 91.56 | 0 | 0 | 0 |
| 8 | 20.32 | 0 | 0 | 0 | 0 | 79.68 | 0 | 0 | 0 | 0 |
| 8 | 0 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 5.77 | 0 | 0 | 94.23 | 0 | 0 | 0 | 0 | 0 | 0 |
| 9 | 5.77 | 0 | 0 | 0 | 94.23 | 0 | 0 | 0 | 0 | 0 |
| 9 | 5.77 | 0 | 94.23 | 0 | 0 | 0 | 0 | 0 | 0 | 0 |
| 9 | 5.77 | 0 | 0 | 0 | 0 | 0 | 0 | 94.23 | 0 | 0 |
| 9 | 24.56 | 0 | 0 | 0 | 0 | 0 | 0 | 0 | 0 | 75.44 |
| 9 | 5.77 | 0 | 0 | 0 | 0 | 0 | 94.23 | 0 | 0 | 0 |
| 9 | 16.05 | 0 | 0 | 0 | 0 | 83.95 | 0 | 0 | 0 | 0 |
| 9 | 0 | 0 | 0 | 0 | 0 | 0 | 0 | 0 | 0 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 8.49 | 0 | 0 | 8.32 | 0 | 0 | 0 | 0 | 83.19 | 0 |
| 10 | 8.49 | 0 | 0 | 0 | 8.32 | 0 | 0 | 0 | 83.19 | 0 |
| 10 | 8.49 | 0 | 8.32 | 0 | 0 | 0 | 0 | 0 | 83.19 | 0 |
| 10 | 8.49 | 0 | 0 | 0 | 0 | 0 | 0 | 8.32 | 83.19 | 0 |
| 10 | 9.1 | 0 | 0 | 0 | 0 | 0 | 0 | 0 | 89.22 | 1.68 |
| 10 | 8.49 | 0 | 0 | 0 | 0 | 0 | 8.32 | 0 | 83.19 | 0 |
| 10 | 8.08 | 0 | 0 | 0 | 0 | 12.68 | 0 | 0 | 79.24 | 0 |
| 10 | 100 | 0 | 0 | 0 | 0 | 0 | 0 | 0 | 0 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 7.17 | 0 | 0 | 13.26 | 0 | 0 | 0 | 0 | 79.57 | 0 |

TABLE II-continued

| | | | | | | | | | | |
|---|---|---|---|---|---|---|---|---|---|---|
| 11 | 7.17 | 0 | 0 | 0 | 13.26 | 0 | 0 | 0 | 79.57 | 0 |
| 11 | 7.17 | 0 | 13.26 | 0 | 0 | 0 | 0 | 0 | 79.57 | 0 |
| 11 | 7.17 | 0 | 0 | 0 | 0 | 0 | 0 | 13.26 | 79.57 | 0 |
| 11 | 8.03 | 0 | 0 | 0 | 0 | 0 | 0 | 0 | 89.17 | 2.79 |
| 11 | 7.17 | 0 | 0 | 0 | 0 | 0 | 13.26 | 0 | 79.57 | 0 |
| 11 | 7.21 | 0 | 0 | 0 | 0 | 12.8 | 0 | 0 | 79.99 | 0 |
| 11 | 0 | 0 | 0 | 0 | 0 | 0 | 0 | 0 | 0 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 5.96 | 0 | 0 | 17.79 | 0 | 0 | 0 | 0 | 76.25 | 0 |
| 12 | 5.96 | 0 | 0 | 0 | 17.79 | 0 | 0 | 0 | 76.25 | 0 |
| 12 | 5.96 | 0 | 17.79 | 0 | 0 | 0 | 0 | 0 | 76.25 | 0 |
| 12 | 5.96 | 0 | 0 | 0 | 0 | 0 | 0 | 17.79 | 76.25 | 0 |
| 12 | 6.97 | 0 | 0 | 0 | 0 | 0 | 0 | 0 | 89.12 | 3.91 |
| 12 | 5.96 | 0 | 0 | 0 | 0 | 0 | 17.79 | 0 | 76.25 | 0 |
| 12 | 6.32 | 0 | 0 | 0 | 0 | 12.92 | 0 | 0 | 80.76 | 0 |
| 12 | 0 | 0 | 0 | 0 | 0 | 0 | 0 | 0 | 0 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 4.85 | 0 | 0 | 21.96 | 0 | 0 | 0 | 0 | 73.19 | 0 |
| 13 | 4.85 | 0 | 0 | 0 | 21.96 | 0 | 0 | 0 | 73.19 | 0 |
| 13 | 4.85 | 0 | 21.96 | 0 | 0 | 0 | 0 | 0 | 73.19 | 0 |
| 13 | 4.85 | 0 | 0 | 0 | 0 | 0 | 0 | 21.96 | 73.19 | 0 |
| 13 | 5.91 | 0 | 0 | 0 | 0 | 0 | 0 | 0 | 89.07 | 5.02 |
| 13 | 4.85 | 0 | 0 | 0 | 0 | 0 | 21.96 | 0 | 73.19 | 0 |
| 13 | 5.41 | 0 | 0 | 0 | 0 | 13.05 | 0 | 0 | 81.55 | 0 |
| 13 | 0 | 100 | 0 | 0 | 0 | 0 | 0 | 0 | 0 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 3.83 | 0 | 0 | 25.8 | 0 | 0 | 0 | 0 | 70.37 | 0 |
| 14 | 3.83 | 0 | 0 | 0 | 25.8 | 0 | 0 | 0 | 70.37 | 0 |
| 14 | 3.83 | 0 | 25.8 | 0 | 0 | 0 | 0 | 0 | 70.37 | 0 |
| 14 | 3.83 | 0 | 0 | 0 | 0 | 0 | 0 | 25.8 | 70.37 | 0 |
| 14 | 4.84 | 0 | 0 | 0 | 0 | 0 | 0 | 0 | 89.02 | 6.14 |
| 14 | 3.83 | 0 | 0 | 0 | 0 | 0 | 25.8 | 0 | 70.37 | 0 |
| 14 | 4.48 | 0 | 0 | 0 | 0 | 13.18 | 0 | 0 | 82.35 | 0 |
| 14 | 0 | 0 | 0 | 0 | 0 | 0 | 0 | 0 | 0 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 2.88 | 0 | 0 | 29.36 | 0 | 0 | 0 | 0 | 67.76 | 0 |
| 15 | 2.88 | 0 | 0 | 0 | 29.36 | 0 | 0 | 0 | 67.76 | 0 |
| 15 | 2.88 | 0 | 29.36 | 0 | 0 | 0 | 0 | 0 | 67.76 | 0 |
| 15 | 2.88 | 0 | 0 | 0 | 0 | 0 | 0 | 29.36 | 67.76 | 0 |
| 15 | 3.78 | 0 | 0 | 0 | 0 | 0 | 0 | 0 | 88.97 | 7.25 |
| 15 | 2.88 | 0 | 0 | 0 | 0 | 0 | 29.36 | 0 | 67.76 | 0 |
| 15 | 3.53 | 0 | 0 | 0 | 0 | 13.31 | 0 | 0 | 83.16 | 0 |
| 15 | 0 | 0 | 0 | 0 | 0 | 0 | 0 | 0 | 0 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |

TABLE II-continued

| | | | | | | | | | | |
|---|---|---|---|---|---|---|---|---|---|---|
| 16 | 2 | 0 | 0 | 32.67 | 0 | 0 | 0 | 0 | 65.33 | 0 |
| 16 | 2 | 0 | 0 | 0 | 32.67 | 0 | 0 | 0 | 65.33 | 0 |
| 16 | 2 | 0 | 32.67 | 0 | 0 | 0 | 0 | 0 | 65.33 | 0 |
| 16 | 2 | 0 | 0 | 0 | 0 | 0 | 0 | 32.67 | 65.33 | 0 |
| 16 | 2.72 | 0 | 0 | 0 | 0 | 0 | 0 | 0 | 88.92 | 8.36 |
| 16 | 2 | 0 | 0 | 0 | 0 | 0 | 32.67 | 0 | 65.33 | 0 |
| 16 | 2.57 | 0 | 0 | 0 | 0 | 13.44 | 0 | 0 | 83.99 | 0 |
| 16 | 100 | 0 | 0 | 0 | 0 | 0 | 0 | 0 | 0 | 0 |
| Temperature 260 C. | | | | | | | | | | |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 100 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 0 | 100 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 100 | 0 | 0 | 0 | 0 | 0 | 0 | 0 | 0 | 0 |
| 2 | 50.5 | 0 | 0 | 49.5 | 0 | 0 | 0 | 0 | 0 | 0 |
| 2 | 50.5 | 0 | 0 | 0 | 49.5 | 0 | 0 | 0 | 0 | 0 |
| 2 | 50.5 | 0 | 49.5 | 0 | 0 | 0 | 0 | 0 | 0 | 0 |
| 2 | 50.5 | 0 | 0 | 0 | 0 | 0 | 0 | 49.5 | 0 | 0 |
| 2 | 84.44 | 0 | 0 | 0 | 0 | 0 | 0 | 0 | 0 | 15.56 |
| 2 | 50.5 | 0 | 0 | 0 | 0 | 0 | 49.5 | 0 | 0 | 0 |
| 2 | 38.93 | 0 | 0 | 0 | 0 | 61.07 | 0 | 0 | 0 | 0 |
| 2 | 0 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 100 | 0 | 0 | 0 | 0 | 0 | 0 | 0 | 0 | 0 |
| 3 | 36.88 | 0 | 0 | 63.12 | 0 | 0 | 0 | 0 | 0 | 0 |
| 3 | 36.88 | 0 | 0 | 0 | 63.12 | 0 | 0 | 0 | 0 | 0 |
| 3 | 36.88 | 0 | 63.12 | 0 | 0 | 0 | 0 | 0 | 0 | 0 |
| 3 | 36.88 | 0 | 0 | 0 | 0 | 0 | 0 | 63.12 | 0 | 0 |
| 3 | 75.65 | 0 | 0 | 0 | 0 | 0 | 0 | 0 | 0 | 24.35 |
| 3 | 36.88 | 0 | 0 | 0 | 0 | 0 | 63.12 | 0 | 0 | 0 |
| 3 | 36.46 | 0 | 0 | 0 | 0 | 63.54 | 0 | 0 | 0 | 0 |
| 3 | 0 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 100 | 0 | 0 | 0 | 0 | 0 | 0 | 0 | 0 | 0 |
| 4 | 27.58 | 0 | 0 | 72.42 | 0 | 0 | 0 | 0 | 0 | 0 |
| 4 | 27.58 | 0 | 0 | 0 | 72.42 | 0 | 0 | 0 | 0 | 0 |
| 4 | 27.58 | 0 | 72.42 | 0 | 0 | 0 | 0 | 0 | 0 | 0 |
| 4 | 27.58 | 0 | 0 | 0 | 0 | 0 | 0 | 72.42 | 0 | 0 |
| 4 | 66.95 | 0 | 0 | 0 | 0 | 0 | 0 | 0 | 0 | 33.05 |
| 4 | 27.58 | 0 | 0 | 0 | 0 | 0 | 72.42 | 0 | 0 | 0 |
| 4 | 33.77 | 0 | 0 | 0 | 0 | 66.23 | 0 | 0 | 0 | 0 |
| 4 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |

TABLE II-continued

| | | | | | | | | | | |
|---|---|---|---|---|---|---|---|---|---|---|
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 100 | 0 | 0 | 0 | 0 | 0 | 0 | 0 | 0 | 0 |
| 5 | 20.83 | 0 | 0 | 79.17 | 0 | 0 | 0 | 0 | 0 | 0 |
| 5 | 20.83 | 0 | 0 | 0 | 79.17 | 0 | 0 | 0 | 0 | 0 |
| 5 | 20.83 | 0 | 79.17 | 0 | 0 | 0 | 0 | 0 | 0 | 0 |
| 5 | 20.83 | 0 | 0 | 0 | 0 | 0 | 0 | 79.17 | 0 | 0 |
| 5 | 58.32 | 0 | 0 | 0 | 0 | 0 | 0 | 0 | 0 | 41.68 |
| 5 | 20.83 | 0 | 0 | 0 | 0 | 0 | 79.17 | 0 | 0 | 0 |
| 5 | 30.86 | 0 | 0 | 0 | 0 | 69.14 | 0 | 0 | 0 | 0 |
| 5 | 0 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 100 | 0 | 0 | 0 | 0 | 0 | 0 | 0 | 0 | 0 |
| 6 | 15.7 | 0 | 0 | 84.3 | 0 | 0 | 0 | 0 | 0 | 0 |
| 6 | 15.7 | 0 | 0 | 0 | 84.3 | 0 | 0 | 0 | 0 | 0 |
| 6 | 15.7 | 0 | 84.3 | 0 | 0 | 0 | 0 | 0 | 0 | 0 |
| 6 | 15.7 | 0 | 0 | 0 | 0 | 0 | 0 | 84.3 | 0 | 0 |
| 6 | 49.77 | 0 | 0 | 0 | 0 | 0 | 0 | 0 | 0 | 50.23 |
| 6 | 15.7 | 0 | 0 | 0 | 0 | 0 | 84.3 | 0 | 0 | 0 |
| 6 | 27.67 | 0 | 0 | 0 | 0 | 72.33 | 0 | 0 | 0 | 0 |
| 6 | 0 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 100 | 0 | 0 | 0 | 0 | 0 | 0 | 0 | 0 | 0 |
| 7 | 11.68 | 0 | 0 | 88.32 | 0 | 0 | 0 | 0 | 0 | 0 |
| 7 | 11.68 | 0 | 0 | 0 | 88.32 | 0 | 0 | 0 | 0 | 0 |
| 7 | 11.68 | 0 | 88.32 | 0 | 0 | 0 | 0 | 0 | 0 | 0 |
| 7 | 11.68 | 0 | 0 | 0 | 0 | 0 | 0 | 88.32 | 0 | 0 |
| 7 | 41.29 | 0 | 0 | 0 | 0 | 0 | 0 | 0 | 0 | 58.71 |
| 7 | 11.68 | 0 | 0 | 0 | 0 | 0 | 88.32 | 0 | 0 | 0 |
| 7 | 24.17 | 0 | 0 | 0 | 0 | 75.83 | 0 | 0 | 0 | 0 |
| 7 | 0 | 100 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 100 | 0 | 0 | 0 | 0 | 0 | 0 | 0 | 0 | 0 |
| 8 | 8.44 | 0 | 0 | 91.56 | 0 | 0 | 0 | 0 | 0 | 0 |
| 8 | 8.44 | 0 | 0 | 0 | 91.56 | 0 | 0 | 0 | 0 | 0 |
| 8 | 8.44 | 0 | 91.56 | 0 | 0 | 0 | 0 | 0 | 0 | 0 |
| 8 | 8.44 | 0 | 0 | 0 | 0 | 0 | 0 | 91.56 | 0 | 0 |
| 8 | 32.89 | 0 | 0 | 0 | 0 | 0 | 0 | 0 | 0 | 67.11 |
| 8 | 8.44 | 0 | 0 | 0 | 0 | 0 | 91.56 | 0 | 0 | 0 |
| 8 | 20.32 | 0 | 0 | 0 | 0 | 79.68 | 0 | 0 | 0 | 0 |
| 8 | 0 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 100 | 0 | 0 | 0 | 0 | 0 | 0 | 0 | 0 | 0 |
| 9 | 5.77 | 0 | 0 | 94.23 | 0 | 0 | 0 | 0 | 0 | 0 |
| 9 | 5.77 | 0 | 0 | 0 | 94.23 | 0 | 0 | 0 | 0 | 0 |
| 9 | 5.77 | 0 | 94.23 | 0 | 0 | 0 | 0 | 0 | 0 | 0 |
| 9 | 5.77 | 0 | 0 | 0 | 0 | 0 | 0 | 94.23 | 0 | 0 |
| 9 | 24.56 | 0 | 0 | 0 | 0 | 0 | 0 | 0 | 0 | 75.44 |
| 9 | 5.77 | 0 | 0 | 0 | 0 | 0 | 94.23 | 0 | 0 | 0 |
| 9 | 16.05 | 0 | 0 | 0 | 0 | 83.95 | 0 | 0 | 0 | 0 |
| 9 | 0 | 0 | 0 | 0 | 0 | 0 | 0 | 0 | 0 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |

TABLE II-continued

| | | | | | | | | | | |
|---|---|---|---|---|---|---|---|---|---|---|
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 9.26 | 0 | 0 | 0 | 0 | 0 | 0 | 0 | 90.74 | 0 |
| 10 | 8.49 | 0 | 0 | 8.32 | 0 | 0 | 0 | 0 | 83.19 | 0 |
| 10 | 8.49 | 0 | 0 | 0 | 8.32 | 0 | 0 | 0 | 83.19 | 0 |
| 10 | 8.49 | 0 | 8.32 | 0 | 0 | 0 | 0 | 0 | 83.19 | 0 |
| 10 | 8.49 | 0 | 0 | 0 | 0 | 0 | 0 | 8.32 | 83.19 | 0 |
| 10 | 9.1 | 0 | 0 | 0 | 0 | 0 | 0 | 0 | 89.22 | 1.68 |
| 10 | 8.49 | 0 | 0 | 0 | 0 | 0 | 8.32 | 0 | 83.19 | 0 |
| 10 | 8.08 | 0 | 0 | 0 | 0 | 12.68 | 0 | 0 | 79.24 | 0 |
| 10 | 100 | 0 | 0 | 0 | 0 | 0 | 0 | 0 | 0 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 8.27 | 0 | 0 | 0 | 0 | 0 | 0 | 0 | 91.73 | 0 |
| 11 | 7.17 | 0 | 0 | 13.26 | 0 | 0 | 0 | 0 | 79.57 | 0 |
| 11 | 7.17 | 0 | 0 | 0 | 13.26 | 0 | 0 | 0 | 79.57 | 0 |
| 11 | 7.17 | 0 | 13.26 | 0 | 0 | 0 | 0 | 0 | 79.57 | 0 |
| 11 | 7.17 | 0 | 0 | 0 | 0 | 0 | 0 | 13.26 | 79.57 | 0 |
| 11 | 8.03 | 0 | 0 | 0 | 0 | 0 | 0 | 0 | 89.17 | 2.79 |
| 11 | 7.17 | 0 | 0 | 0 | 0 | 0 | 13.26 | 0 | 79.57 | 0 |
| 11 | 7.21 | 0 | 0 | 0 | 0 | 12.8 | 0 | 0 | 79.99 | 0 |
| 11 | 0 | 0 | 0 | 0 | 0 | 0 | 0 | 0 | 0 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 7.25 | 0 | 0 | 0 | 0 | 0 | 0 | 0 | 92.75 | 0 |
| 12 | 5.96 | 0 | 0 | 17.79 | 0 | 0 | 0 | 0 | 76.25 | 0 |
| 12 | 5.96 | 0 | 0 | 0 | 17.79 | 0 | 0 | 0 | 76.25 | 0 |
| 12 | 5.96 | 0 | 17.79 | 0 | 0 | 0 | 0 | 0 | 76.25 | 0 |
| 12 | 5.96 | 0 | 0 | 0 | 0 | 0 | 0 | 17.79 | 76.25 | 0 |
| 12 | 6.97 | 0 | 0 | 0 | 0 | 0 | 0 | 0 | 89.12 | 3.91 |
| 12 | 5.96 | 0 | 0 | 0 | 0 | 0 | 17.79 | 0 | 76.25 | 0 |
| 12 | 6.32 | 0 | 0 | 0 | 0 | 12.92 | 0 | 0 | 80.76 | 0 |
| 12 | 0 | 0 | 0 | 0 | 0 | 0 | 0 | 0 | 0 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 6.22 | 0 | 0 | 0 | 0 | 0 | 0 | 0 | 93.78 | 0 |
| 13 | 4.85 | 0 | 0 | 21.96 | 0 | 0 | 0 | 0 | 73.19 | 0 |
| 13 | 4.85 | 0 | 0 | 0 | 21.96 | 0 | 0 | 0 | 73.19 | 0 |
| 13 | 4.85 | 0 | 21.96 | 0 | 0 | 0 | 0 | 0 | 73.19 | 0 |
| 13 | 4.85 | 0 | 0 | 0 | 0 | 0 | 0 | 21.96 | 73.19 | 0 |
| 13 | 5.91 | 0 | 0 | 0 | 0 | 0 | 0 | 0 | 89.07 | 5.02 |
| 13 | 4.85 | 0 | 0 | 0 | 0 | 0 | 21.96 | 0 | 73.19 | 0 |
| 13 | 5.41 | 0 | 0 | 0 | 0 | 13.05 | 0 | 0 | 81.55 | 0 |
| 13 | 0 | 100 | 0 | 0 | 0 | 0 | 0 | 0 | 0 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 5.16 | 0 | 0 | 0 | 0 | 0 | 0 | 0 | 94.84 | 0 |
| 14 | 3.83 | 0 | 0 | 25.8 | 0 | 0 | 0 | 0 | 70.37 | 0 |
| 14 | 3.83 | 0 | 0 | 0 | 25.8 | 0 | 0 | 0 | 70.37 | 0 |
| 14 | 3.83 | 0 | 25.8 | 0 | 0 | 0 | 0 | 0 | 70.37 | 0 |
| 14 | 3.83 | 0 | 0 | 0 | 0 | 0 | 0 | 25.8 | 70.37 | 0 |
| 14 | 4.84 | 0 | 0 | 0 | 0 | 0 | 0 | 0 | 89.02 | 6.14 |
| 14 | 3.83 | 0 | 0 | 0 | 0 | 0 | 25.8 | 0 | 70.37 | 0 |
| 14 | 4.48 | 0 | 0 | 0 | 0 | 13.18 | 0 | 0 | 82.35 | 0 |
| 14 | 0 | 0 | 0 | 0 | 0 | 0 | 0 | 0 | 0 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |

TABLE II-continued

| | | | | | | | | | | |
|---|---|---|---|---|---|---|---|---|---|---|
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 4.08 | 0 | 0 | 0 | 0 | 0 | 0 | 0 | 95.92 | 0 |
| 15 | 2.88 | 0 | 0 | 29.36 | 0 | 0 | 0 | 0 | 67.76 | 0 |
| 15 | 2.88 | 0 | 0 | 0 | 29.36 | 0 | 0 | 0 | 67.76 | 0 |
| 15 | 2.88 | 0 | 29.36 | 0 | 0 | 0 | 0 | 0 | 67.76 | 0 |
| 15 | 2.88 | 0 | 0 | 0 | 0 | 0 | 0 | 29.36 | 67.76 | 0 |
| 15 | 3.78 | 0 | 0 | 0 | 0 | 0 | 0 | 0 | 88.97 | 7.25 |
| 15 | 2.88 | 0 | 0 | 0 | 0 | 0 | 29.36 | 0 | 67.76 | 0 |
| 15 | 3.53 | 0 | 0 | 0 | 0 | 13.31 | 0 | 0 | 83.16 | 0 |
| 15 | 0 | 0 | 0 | 0 | 0 | 0 | 0 | 0 | 0 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2.97 | 0 | 0 | 0 | 0 | 0 | 0 | 0 | 97.03 | 0 |
| 16 | 2 | 0 | 0 | 32.67 | 0 | 0 | 0 | 0 | 65.33 | 0 |
| 16 | 2 | 0 | 0 | 0 | 32.67 | 0 | 0 | 0 | 65.33 | 0 |
| 16 | 2 | 0 | 32.67 | 0 | 0 | 0 | 0 | 0 | 65.33 | 0 |
| 16 | 2 | 0 | 0 | 0 | 0 | 0 | 0 | 32.67 | 65.33 | 0 |
| 16 | 2.72 | 0 | 0 | 0 | 0 | 0 | 0 | 0 | 88.92 | 8.36 |
| 16 | 2 | 0 | 0 | 0 | 0 | 0 | 32.67 | 0 | 65.33 | 0 |
| 16 | 2.57 | 0 | 0 | 0 | 0 | 13.44 | 0 | 0 | 83.99 | 0 |
| 16 | 100 | 0 | 0 | 0 | 0 | 0 | 0 | 0 | 0 | 0 |

TABLE III

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM__micromols | mol % La | mol % Pt | mol % Zr |
|---|---|---|---|---|---|---|---|---|---|---|---|---|---|---|
| Temperature: 250 C. | | | | | | | | | | | | | | |
| 1 | 1 | 24.0554 | 20.3567 | 1.0059 | 36.8713 | 0.1785 | 0.1275 | 0 | 0 | 0 | 0.1275 | 0 | 100 | 0 |
| 1 | 2 | −1.7201 | 3.3539 | 0.049 | 1.7972 | 0.0067 | 0 | 0 | 0 | 0 | 0 | 0 | 0 | 0 |
| 1 | 3 | −1.3278 | 2.2499 | 0.0009 | 0.0315 | −0.0026 | 0 | 0 | 0 | 0 | 0 | 0 | 0 | 0 |
| 1 | 4 | −1.208 | 2.4958 | 0.005 | 0.1823 | −0.0038 | 0 | 0 | 0 | 0 | 0 | 0 | 0 | 0 |
| 1 | 5 | −1.3966 | −0.6647 | 0.0138 | 0.5067 | −0.0024 | 0 | 0 | 0 | 0 | 0 | 0 | 0 | 0 |
| 1 | 6 | −0.857 | −0.806 | 0.0089 | 0.3249 | −0.0058 | 0 | 0 | 0 | 0 | 0 | 0 | 0 | 0 |
| 1 | 7 | 26.8747 | 16.7142 | 0.9416 | 34.513 | 0.151 | 0.1275 | 0 | 0 | 0 | 0.1275 | 0 | 100 | 0 |
| 1 | 8 | −0.1762 | 0.0001 | 0.0106 | 0.3868 | −0.0076 | 0 | 0 | 0 | 0 | 0 | 0 | 0 | 0 |
| 1 | 9 | −0.605 | −1.4054 | 0.0016 | 0.0598 | −0.0081 | 0 | 0 | 0 | 0 | 0 | 0 | 0 | 0 |
| 1 | 10 | −0.1705 | 5.1803 | −0.0005 | −0.0171 | −0.0108 | 0 | 0 | 0 | 0 | 0 | 0 | 0 | 0 |
| 1 | 11 | 0.0287 | −2.3403 | −0.0261 | −0.9568 | −0.0134 | 0 | 0 | 0 | 0 | 0 | 0 | 0 | 0 |
| 1 | 12 | −0.3619 | −2.3753 | −0.0191 | −0.6997 | −0.0107 | 0 | 0 | 0 | 0 | 0 | 0 | 0 | 0 |
| 1 | 13 | 26.9134 | 15.6985 | 0.9206 | 33.7449 | 0.1456 | 0.1275 | 0 | 0 | 0 | 0.1275 | 0 | 100 | 0 |
| 1 | 14 | 0.2866 | −1.4436 | 0.0104 | 0.3794 | −0.0009 | 0 | 0 | 0 | 0 | 0 | 0 | 0 | 0 |
| 1 | 15 | −0.2691 | −2.5021 | −0.0098 | −0.3592 | −0.0125 | 0 | 0 | 0 | 0 | 0 | 0 | 0 | 0 |
| 1 | 16 | 26.3015 | 15.0776 | 0.9071 | 33.2485 | 0.1422 | 0.1275 | 0 | 0 | 0 | 0.1275 | 0 | 100 | 0 |
| 2 | 1 | 10.3797 | 7.5635 | 0.2714 | 9.9469 | 0.0465 | 0 | 0 | 0.0319 | 0 | 0.0319 | 0 | 100 | 0 |
| 2 | 2 | 22.2742 | 13.6256 | 0.7038 | 25.7961 | 0.1014 | 0 | 0 | 0.0319 | 0 | 0.0319 | 0 | 100 | 0 |
| 2 | 3 | 20.1518 | 11.8043 | 0.6181 | 22.6557 | 0.0925 | 0 | 0 | 0.0319 | 0 | 0.0319 | 0 | 100 | 0 |
| 2 | 4 | 14.7068 | 7.5278 | 0.4396 | 16.1127 | 0.074 | 0 | 0 | 0.0319 | 0 | 0.0319 | 0 | 100 | 0 |
| 2 | 5 | 12.5748 | 6.9812 | 0.3538 | 12.9691 | 0.0619 | 0 | 0 | 0.0319 | 0 | 0.0319 | 0 | 100 | 0 |
| 2 | 6 | 12.5733 | 7.5902 | 0.3721 | 13.6375 | 0.065 | 0 | 0 | 0.0319 | 0 | 0.0319 | 0 | 100 | 0 |
| 2 | 7 | 3.9682 | 1.1157 | 0.1053 | 3.861 | 0.0291 | 0 | 0 | 0.0319 | 0 | 0.0319 | 0 | 100 | 0 |
| 2 | 8 | 4.2902 | 1.5276 | 0.1017 | 3.728 | 0.0316 | 0 | 0 | 0.0319 | 0 | 0.0319 | 0 | 100 | 0 |
| 2 | 9 | 17.5859 | 9.8527 | 0.5611 | 20.5685 | 0.0868 | 0 | 0 | 0.0319 | 0 | 0.0319 | 0 | 100 | 0 |
| 2 | 10 | 4.0056 | 0.7967 | 0.1073 | 3.9343 | 0.0337 | 0 | 0 | 0.0319 | 0 | 0.0319 | 0 | 100 | 0 |
| 2 | 11 | 0.4511 | −1.4852 | −0.0262 | −0.9611 | 0.0142 | 0 | 0 | 0.0319 | 0 | 0.0319 | 0 | 100 | 0 |
| 2 | 12 | 8.7515 | 3.1358 | 0.2704 | 9.9096 | 0.0534 | 0 | 0 | 0.0319 | 0 | 0.0319 | 0 | 100 | 0 |
| 2 | 13 | 1.1667 | −0.4291 | 0.0028 | 0.1022 | 0.0172 | 0 | 0 | 0.0319 | 0 | 0.0319 | 0 | 100 | 0 |
| 2 | 14 | 5.3788 | 3.039 | 0.1661 | 6.0891 | 0.0402 | 0 | 0 | 0.0319 | 0.625 | 0.6569 | 0 | 4.85 | 95.15 |
| 2 | 15 | 13.8175 | 7.9862 | 0.4538 | 16.6329 | 0.0753 | 0 | 0.625 | 0.0319 | 0 | 0.6569 | 95.15 | 4.85 | 0 |
| 2 | 16 | 0.5892 | 0.0397 | −0.0171 | −0.6274 | −0.0021 | 0 | 0 | 0 | 0 | 0 | 0 | 0 | 0 |
| 3 | 1 | 23.0341 | 14.9411 | 0.7335 | 26.8867 | 0.1082 | 0 | 0 | 0.0387 | 0 | 0.0387 | 0 | 100 | 0 |
| 3 | 2 | 24.8268 | 16.0912 | 0.7611 | 27.8973 | 0.108 | 0 | 0 | 0.0387 | 0 | 0.0387 | 0 | 100 | 0 |
| 3 | 3 | 21.0312 | 12.2163 | 0.6617 | 24.2545 | 0.0974 | 0 | 0 | 0.0387 | 0 | 0.0387 | 0 | 100 | 0 |
| 3 | 4 | 15.3062 | 8.5994 | 0.4563 | 16.7247 | 0.0714 | 0 | 0 | 0.0387 | 0 | 0.0387 | 0 | 100 | 0 |
| 3 | 5 | 13.1818 | 6.4699 | 0.3775 | 13.8381 | 0.0651 | 0 | 0 | 0.0387 | 0 | 0.0387 | 0 | 100 | 0 |
| 3 | 6 | 14.4778 | 9.2713 | 0.4241 | 15.5437 | 0.0643 | 0 | 0 | 0.0387 | 0 | 0.0387 | 0 | 100 | 0 |
| 3 | 7 | 5.5717 | 3.3425 | 0.1029 | 3.772 | 0.0251 | 0 | 0 | 0.0387 | 0 | 0.0387 | 0 | 100 | 0 |
| 3 | 8 | 6.8228 | 1.6923 | 0.1521 | 5.5733 | 0.0283 | 0 | 0 | 0.0387 | 0 | 0.0387 | 0 | 100 | 0 |
| 3 | 9 | 18.2423 | 12.1678 | 0.5606 | 20.5468 | 0.0831 | 0 | 0 | 0.0387 | 0 | 0.0387 | 0 | 100 | 0 |
| 3 | 10 | 6.7011 | 5.5857 | 0.1612 | 5.907 | 0.033 | 0 | 0 | 0.0387 | 0 | 0.0387 | 0 | 100 | 0 |
| 3 | 11 | 1.3529 | 1.3312 | −0.0328 | −1.2024 | 0.0065 | 0 | 0 | 0.0387 | 0 | 0.0387 | 0 | 100 | 0 |
| 3 | 12 | 8.988 | 6.9454 | 0.2544 | 9.3233 | 0.0421 | 0 | 0 | 0.0387 | 0 | 0.0387 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM__micromols | mol % La | mol % Pt | mol % Zr |
|---|---|---|---|---|---|---|---|---|---|---|---|---|---|---|
| 3 | 13 | 1.9882 | 1.6201 | −0.0124 | −0.4561 | 0.0102 | 0 | 0 | 0.0387 | 0 | 0.0387 | 0 | 100 | 0 |
| 3 | 14 | 6.7207 | 4.8802 | 0.1283 | 4.7036 | 0.0288 | 0 | 0 | 0.0387 | 0.625 | 0.6637 | 0 | 5.83 | 94.17 |
| 3 | 15 | 13.1254 | 7.8413 | 0.4144 | 15.1912 | 0.0623 | 0 | 0.625 | 0.0387 | 0 | 0.6637 | 94.17 | 5.83 | 0 |
| 3 | 16 | 1.6968 | −0.6116 | −0.0065 | −0.238 | 0.007 | 0 | 0 | 0 | 0 | 0 | 0 | 0 | 0 |
| 4 | 1 | 25.6701 | 19.5197 | 0.7514 | 27.5411 | 0.0986 | 0 | 0 | 0.0455 | 0 | 0.0455 | 0 | 100 | 0 |
| 4 | 2 | 23.653 | 16.9227 | 0.7928 | 29.0607 | 0.0984 | 0 | 0 | 0.0455 | 0 | 0.0455 | 0 | 100 | 0 |
| 4 | 3 | 22.8118 | 16.1844 | 0.6593 | 24.168 | 0.0919 | 0 | 0 | 0.0455 | 0 | 0.0455 | 0 | 100 | 0 |
| 4 | 4 | 16.4182 | 10.7873 | 0.4837 | 17.731 | 0.0754 | 0 | 0 | 0.0455 | 0 | 0.0455 | 0 | 100 | 0 |
| 4 | 5 | 14.5564 | 7.5137 | 0.4146 | 15.1965 | 0.0579 | 0 | 0 | 0.0455 | 0 | 0.0455 | 0 | 100 | 0 |
| 4 | 6 | 15.7933 | 9.8273 | 0.453 | 16.6027 | 0.0657 | 0 | 0 | 0.0455 | 0 | 0.0455 | 0 | 100 | 0 |
| 4 | 7 | 6.1716 | 5.3192 | 0.1362 | 4.9935 | 0.0244 | 0 | 0 | 0.0455 | 0 | 0.0455 | 0 | 100 | 0 |
| 4 | 8 | 7.1386 | 3.6867 | 0.1822 | 6.6787 | 0.0338 | 0 | 0 | 0.0455 | 0 | 0.0455 | 0 | 100 | 0 |
| 4 | 9 | 20.7303 | 13.3734 | 0.6248 | 22.9033 | 0.0886 | 0 | 0 | 0.0455 | 0 | 0.0455 | 0 | 100 | 0 |
| 4 | 10 | 8.9131 | 3.194 | 0.1982 | 7.2642 | 0.0334 | 0 | 0 | 0.0455 | 0 | 0.0455 | 0 | 100 | 0 |
| 4 | 11 | 1.6189 | 1.2404 | −0.0525 | −1.926 | −0.0002 | 0 | 0 | 0.0455 | 0 | 0.0455 | 0 | 100 | 0 |
| 4 | 12 | 10.7432 | 5.782 | 0.2838 | 10.4022 | 0.045 | 0 | 0 | 0.0455 | 0 | 0.0455 | 0 | 100 | 0 |
| 4 | 13 | 1.5884 | 0.8166 | −0.0105 | −0.3833 | 0.0101 | 0 | 0 | 0.0455 | 0 | 0.0455 | 0 | 100 | 0 |
| 4 | 14 | 6.4031 | 3.2336 | 0.1734 | 6.3554 | 0.0362 | 0 | 0 | 0.0455 | 0.625 | 0.6705 | 0 | 6.79 | 93.21 |
| 4 | 15 | 15.6125 | 10.3811 | 0.4713 | 17.2763 | 0.0703 | 0 | 0.625 | 0.0455 | 0 | 0.6705 | 93.21 | 6.79 | 0 |
| 4 | 16 | 27.9195 | 15.9998 | 0.8541 | 31.3081 | 0.1277 | 0.1275 | 0 | 0 | 0 | 0.1275 | 0 | 100 | 0 |
| 5 | 1 | 23.5648 | 16.7387 | 0.7605 | 27.8743 | 0.1008 | 0 | 0 | 0.0524 | 0 | 0.0524 | 0 | 100 | 0 |
| 5 | 2 | 24.3053 | 17.3486 | 0.7802 | 28.5962 | 0.1046 | 0 | 0 | 0.0524 | 0 | 0.0524 | 0 | 100 | 0 |
| 5 | 3 | 22.341 | 15.7024 | 0.7107 | 26.0515 | 0.1019 | 0 | 0 | 0.0524 | 0 | 0.0524 | 0 | 100 | 0 |
| 5 | 4 | 17.6158 | 11.8733 | 0.5469 | 20.0479 | 0.0791 | 0 | 0 | 0.0524 | 0 | 0.0524 | 0 | 100 | 0 |
| 5 | 5 | 14.2387 | 10.1452 | 0.4049 | 14.8406 | 0.0574 | 0 | 0 | 0.0524 | 0 | 0.0524 | 0 | 100 | 0 |
| 5 | 6 | 15.1152 | 10.7747 | 0.4328 | 15.8622 | 0.0615 | 0 | 0 | 0.0524 | 0 | 0.0524 | 0 | 100 | 0 |
| 5 | 7 | 6.2094 | 5.1538 | 0.1363 | 4.9969 | 0.0249 | 0 | 0 | 0.0524 | 0 | 0.0524 | 0 | 100 | 0 |
| 5 | 8 | 7.6993 | 4.4249 | 0.2079 | 7.6192 | 0.0348 | 0 | 0 | 0.0524 | 0 | 0.0524 | 0 | 100 | 0 |
| 5 | 9 | 20.3032 | 12.9878 | 0.6687 | 24.5092 | 0.091 | 0 | 0 | 0.0524 | 0 | 0.0524 | 0 | 100 | 0 |
| 5 | 10 | 10.467 | 7.0359 | 0.2642 | 9.6824 | 0.0427 | 0 | 0 | 0.0524 | 0 | 0.0524 | 0 | 100 | 0 |
| 5 | 11 | 2.8488 | 0.9928 | −0.0496 | −1.8191 | −0.0034 | 0 | 0 | 0.0524 | 0 | 0.0524 | 0 | 100 | 0 |
| 5 | 12 | 8.6081 | 4.7427 | 0.2975 | 10.9032 | 0.0379 | 0 | 0 | 0.0524 | 0 | 0.0524 | 0 | 100 | 0 |
| 5 | 13 | 2.4786 | 0.2441 | −0.0353 | −1.2925 | 0.0105 | 0 | 0 | 0.0524 | 0 | 0.0524 | 0 | 100 | 0 |
| 5 | 14 | 5.1083 | 3.0311 | 0.1416 | 5.192 | 0.0285 | 0 | 0 | 0.0524 | 0.625 | 0.6774 | 0 | 7.73 | 92.27 |
| 5 | 15 | 11.8585 | 7.5495 | 0.3716 | 13.62 | 0.0576 | 0 | 0.625 | 0.0524 | 0 | 0.6774 | 92.27 | 7.73 | 0 |
| 5 | 16 | 0.172 | 0.0674 | −0.0092 | −0.3389 | 0.01 | 0 | 0 | 0 | 0 | 0 | 0 | 0 | 0 |
| 6 | 1 | 22.8548 | 15.2481 | 0.7655 | 28.0601 | 0.1096 | 0 | 0 | 0.0592 | 0 | 0.0592 | 0 | 100 | 0 |
| 6 | 2 | 25.4205 | 16.425 | 0.8006 | 29.3446 | 0.11 | 0 | 0 | 0.0592 | 0 | 0.0592 | 0 | 100 | 0 |
| 6 | 3 | 25.0359 | 16.7118 | 0.7742 | 28.379 | 0.1081 | 0 | 0 | 0.0592 | 0 | 0.0592 | 0 | 100 | 0 |
| 6 | 4 | 19.8242 | 13.56 | 0.6037 | 22.1285 | 0.0864 | 0 | 0 | 0.0592 | 0 | 0.0592 | 0 | 100 | 0 |
| 6 | 5 | 15.5667 | 10.9252 | 0.4506 | 16.5181 | 0.0668 | 0 | 0 | 0.0592 | 0 | 0.0592 | 0 | 100 | 0 |
| 6 | 6 | 14.9248 | 9.1668 | 0.4848 | 17.7684 | 0.0716 | 0 | 0 | 0.0592 | 0 | 0.0592 | 0 | 100 | 0 |
| 6 | 7 | 6.2748 | 4.0969 | 0.1824 | 6.6868 | 0.0317 | 0 | 0 | 0.0592 | 0 | 0.0592 | 0 | 100 | 0 |
| 6 | 8 | 8.4858 | 5.8883 | 0.251 | 9.2019 | 0.0404 | 0 | 0 | 0.0592 | 0 | 0.0592 | 0 | 100 | 0 |
| 6 | 9 | 21.0027 | 12.7923 | 0.7581 | 27.7862 | 0.1015 | 0 | 0 | 0.0592 | 0 | 0.0592 | 0 | 100 | 0 |
| 6 | 10 | 4.1864 | 1.0991 | 0.2231 | 8.177 | 0.044 | 0 | 0 | 0.0592 | 0 | 0.0592 | 0 | 100 | 0 |
| 6 | 11 | −1.2373 | −1.4393 | 0.0135 | 0.4931 | 0.0092 | 0 | 0 | 0.0592 | 0 | 0.0592 | 0 | 100 | 0 |
| 6 | 12 | 10.6286 | 6.8786 | 0.3149 | 11.5433 | 0.0492 | 0 | 0 | 0.0592 | 0 | 0.0592 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM_micromols | mol % La | mol % Pt | mol % Zr |
|---|---|---|---|---|---|---|---|---|---|---|---|---|---|---|
| 6 | 13 | 1.0716 | 0.1767 | 0.0081 | 0.2959 | 0.0131 | 0 | 0 | 0.0592 | 0 | 0.0592 | 0 | 100 | 0 |
| 6 | 14 | 6.6959 | 4.4786 | 0.1742 | 6.3849 | 0.0291 | 0 | 0 | 0.0592 | 0.625 | 0.6842 | 0 | 8.65 | 91.35 |
| 6 | 15 | 14.9263 | 8.9373 | 0.4504 | 16.5076 | 0.0691 | 0 | 0.625 | 0.0592 | 0 | 0.6842 | 91.35 | 8.65 | 0 |
| 6 | 16 | 0.9734 | 0.524 | −0.0068 | −0.2476 | 0.0095 | 0 | 0 | 0 | 0 | 0 | 0 | 0 | 0 |
| 7 | 1 | 22.5418 | 15.4759 | 0.726 | 26.6121 | 0.0978 | 0 | 0 | 0.066 | 0 | 0.066 | 0 | 100 | 0 |
| 7 | 2 | 25.3352 | 17.1813 | 0.8109 | 29.7233 | 0.1123 | 0 | 0 | 0.066 | 0 | 0.066 | 0 | 100 | 0 |
| 7 | 3 | 25.4575 | 17.3091 | 0.7912 | 29.0012 | 0.1094 | 0 | 0 | 0.066 | 0 | 0.066 | 0 | 100 | 0 |
| 7 | 4 | 20.6572 | 14.3391 | 0.6313 | 23.1392 | 0.0896 | 0 | 0 | 0.066 | 0 | 0.066 | 0 | 100 | 0 |
| 7 | 5 | 15.932 | 11.3449 | 0.4504 | 16.51 | 0.0654 | 0 | 0 | 0.066 | 0 | 0.066 | 0 | 100 | 0 |
| 7 | 6 | 15.7862 | 11.3444 | 0.4701 | 17.2316 | 0.0672 | 0 | 0 | 0.066 | 0 | 0.066 | 0 | 100 | 0 |
| 7 | 7 | 6.5518 | 5.4328 | 0.1609 | 5.8983 | 0.0264 | 0 | 0 | 0.066 | 0 | 0.066 | 0 | 100 | 0 |
| 7 | 8 | 8.798 | 5.7477 | 0.2274 | 8.3369 | 0.0394 | 0 | 0 | 0.066 | 0 | 0.066 | 0 | 100 | 0 |
| 7 | 9 | 23.0075 | 15.3925 | 0.6659 | 24.4074 | 0.0863 | 0 | 0 | 0.066 | 0 | 0.066 | 0 | 100 | 0 |
| 7 | 10 | 9.2334 | 7.3996 | 0.2983 | 10.934 | 0.0356 | 0 | 0 | 0.066 | 0 | 0.066 | 0 | 100 | 0 |
| 7 | 11 | 0.7033 | 0.897 | −0.0323 | −1.1825 | 0.0007 | 0 | 0 | 0.066 | 0 | 0.066 | 0 | 100 | 0 |
| 7 | 12 | 9.8812 | 6.9932 | 0.3106 | 11.3832 | 0.047 | 0 | 0 | 0.066 | 0 | 0.066 | 0 | 100 | 0 |
| 7 | 13 | 1.8315 | 1.5281 | −0.0004 | −0.0142 | 0.0064 | 0 | 0 | 0.066 | 0 | 0.066 | 0 | 100 | 0 |
| 7 | 14 | 5.9233 | 4.0164 | 0.1346 | 4.9347 | 0.024 | 0 | 0 | 0.066 | 0.625 | 0.691 | 0 | 9.55 | 90.45 |
| 7 | 15 | 11.3981 | 7.0352 | 0.3499 | 12.8255 | 0.0508 | 0 | 0.625 | 0.066 | 0 | 0.691 | 90.45 | 9.55 | 0 |
| 7 | 16 | 26.5669 | 16.7815 | 0.8474 | 31.0624 | 0.1182 | 0.1275 | 0 | 0 | 0 | 0.1275 | 0 | 100 | 0 |
| 8 | 1 | 22.7201 | 15.0948 | 0.694 | 25.4388 | 0.0942 | 0 | 0 | 0.0729 | 0 | 0.0729 | 0 | 100 | 0 |
| 8 | 2 | 25.5968 | 16.5345 | 0.8165 | 29.9286 | 0.1106 | 0 | 0 | 0.0729 | 0 | 0.0729 | 0 | 100 | 0 |
| 8 | 3 | 26.9015 | 16.5093 | 0.8118 | 29.7556 | 0.1132 | 0 | 0 | 0.0729 | 0 | 0.0729 | 0 | 100 | 0 |
| 8 | 4 | 22.6912 | 14.399 | 0.6735 | 24.6849 | 0.0922 | 0 | 0 | 0.0729 | 0 | 0.0729 | 0 | 100 | 0 |
| 8 | 5 | 16.1513 | 10.0868 | 0.4873 | 17.8622 | 0.0711 | 0 | 0 | 0.0729 | 0 | 0.0729 | 0 | 100 | 0 |
| 8 | 6 | 14.9604 | 9.3549 | 0.5104 | 18.7093 | 0.0788 | 0 | 0 | 0.0729 | 0 | 0.0729 | 0 | 100 | 0 |
| 8 | 7 | 9.1106 | 4.8845 | 0.1351 | 4.9537 | 0.0227 | 0 | 0 | 0.0729 | 0 | 0.0729 | 0 | 100 | 0 |
| 8 | 8 | 11.6445 | 4.2759 | 0.265 | 9.7129 | 0.0431 | 0 | 0 | 0.0729 | 0 | 0.0729 | 0 | 100 | 0 |
| 8 | 9 | 22.1496 | 13.0101 | 0.7517 | 27.5537 | 0.103 | 0 | 0 | 0.0729 | 0 | 0.0729 | 0 | 100 | 0 |
| 8 | 10 | 10.7574 | 7.0805 | 0.323 | 11.8395 | 0.0477 | 0 | 0 | 0.0729 | 0 | 0.0729 | 0 | 100 | 0 |
| 8 | 11 | 3.6004 | 0.9577 | 0.0383 | 1.4029 | 0.0094 | 0 | 0 | 0.0729 | 0 | 0.0729 | 0 | 100 | 0 |
| 8 | 12 | 11.534 | 7.8883 | 0.3533 | 12.9484 | 0.0508 | 0 | 0 | 0.0729 | 0 | 0.0729 | 0 | 100 | 0 |
| 8 | 13 | 1.3464 | 0.5169 | −0.0012 | −0.0457 | 0.0054 | 0 | 0 | 0.0729 | 0 | 0.0729 | 0 | 100 | 0 |
| 8 | 14 | 6.4094 | 3.371 | 0.1695 | 6.2144 | 0.0276 | 0 | 0 | 0.0729 | 0.625 | 0.6979 | 0 | 10.44 | 89.56 |
| 8 | 15 | 12.8137 | 8.3353 | 0.3838 | 14.067 | 0.054 | 0 | 0.625 | 0.0729 | 0 | 0.6979 | 89.56 | 10.44 | 0 |
| 8 | 16 | 0.6005 | 0.7618 | −0.0245 | −0.8983 | 0.0023 | 0 | 0 | 0 | 0 | 0 | 0 | 0 | 0 |
| 9 | 1 | 22.4957 | 14.7378 | 0.6826 | 25.0193 | 0.0926 | 0 | 0 | 0.0797 | 0 | 0.0797 | 0 | 100 | 0 |
| 9 | 2 | 25.986 | 17.2218 | 0.8042 | 29.4787 | 0.1075 | 0 | 0 | 0.0797 | 0 | 0.0797 | 0 | 100 | 0 |
| 9 | 3 | 26.7278 | 17.0659 | 0.8299 | 30.4191 | 0.1155 | 0 | 0 | 0.0797 | 0 | 0.0797 | 0 | 100 | 0 |
| 9 | 4 | 21.7825 | 14.3953 | 0.6911 | 25.3306 | 0.0965 | 0 | 0 | 0.0797 | 0 | 0.0797 | 0 | 100 | 0 |
| 9 | 5 | 17.2508 | 11.3087 | 0.5012 | 18.3711 | 0.0717 | 0 | 0 | 0.0797 | 0 | 0.0797 | 0 | 100 | 0 |
| 9 | 6 | 16.9581 | 10.5872 | 0.4639 | 17.0022 | 0.0651 | 0 | 0 | 0.0797 | 0 | 0.0797 | 0 | 100 | 0 |
| 9 | 7 | 6.3335 | 4.0566 | 0.1665 | 6.1027 | 0.0326 | 0 | 0 | 0.0797 | 0 | 0.0797 | 0 | 100 | 0 |
| 9 | 8 | 11.9448 | 6.8015 | 0.2794 | 10.2426 | 0.0347 | 0 | 0 | 0.0797 | 0 | 0.0797 | 0 | 100 | 0 |
| 9 | 9 | 22.3682 | 14.3068 | 0.6953 | 25.4874 | 0.0927 | 0 | 0 | 0.0797 | 0 | 0.0797 | 0 | 100 | 0 |
| 9 | 10 | 10.6395 | 6.5727 | 0.3015 | 11.0498 | 0.0426 | 0 | 0 | 0.0797 | 0 | 0.0797 | 0 | 100 | 0 |
| 9 | 11 | 0.7463 | −0.5268 | −0.0297 | −1.0885 | 0.0037 | 0 | 0 | 0.0797 | 0 | 0.0797 | 0 | 100 | 0 |
| 9 | 12 | 11.6436 | 6.9032 | 0.3308 | 12.1271 | 0.0465 | 0 | 0 | 0.0797 | 0 | 0.0797 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM__micromols | mol % La | mol % Pt | mol % Zr |
|---|---|---|---|---|---|---|---|---|---|---|---|---|---|---|
| 9 | 13 | 2.2734 | 1.3731 | −0.0036 | −0.1307 | 0.0063 | 0 | 0 | 0.0797 | 0 | 0.0797 | 0 | 100 | 0 |
| 9 | 14 | 5.2473 | 2.3383 | 0.133 | 4.8766 | 0.0256 | 0 | 0 | 0.0797 | 0.625 | 0.7047 | 0 | 11.31 | 88.69 |
| 9 | 15 | 14.1744 | 8.1484 | 0.4386 | 16.0753 | 0.0629 | 0 | 0.625 | 0.0797 | 0 | 0.7047 | 88.69 | 11.31 | 0 |
| 9 | 16 | 1.1167 | 0.6406 | −0.0074 | −0.2708 | 0.0074 | 0 | 0 | 0 | 0 | 0 | 0 | 0 | 0 |
| 10 | 1 | 21.0706 | 14.7112 | 0.6846 | 25.0928 | 0.0968 | 0 | 0 | 0.0865 | 0 | 0.0865 | 0 | 100 | 0 |
| 10 | 2 | 26.8869 | 17.9825 | 0.8859 | 32.4724 | 0.1184 | 0 | 0 | 0.0865 | 0 | 0.0865 | 0 | 100 | 0 |
| 10 | 3 | 26.6813 | 16.9521 | 0.9023 | 33.0744 | 0.1263 | 0 | 0 | 0.0865 | 0 | 0.0865 | 0 | 100 | 0 |
| 10 | 4 | 22.8526 | 14.0275 | 0.7543 | 27.65 | 0.106 | 0 | 0 | 0.0865 | 0 | 0.0865 | 0 | 100 | 0 |
| 10 | 5 | 16.4643 | 9.638 | 0.5121 | 18.772 | 0.0768 | 0 | 0 | 0.0865 | 0 | 0.0865 | 0 | 100 | 0 |
| 10 | 6 | 16.974 | 10.2305 | 0.4989 | 18.2853 | 0.0738 | 0 | 0 | 0.0865 | 0 | 0.0865 | 0 | 100 | 0 |
| 10 | 7 | 7.0764 | 3.7892 | 0.217 | 7.954 | 0.0367 | 0 | 0 | 0.0865 | 0 | 0.0865 | 0 | 100 | 0 |
| 10 | 8 | 10.3301 | 7.0156 | 0.3079 | 11.2846 | 0.0444 | 0 | 0 | 0.0865 | 0 | 0.0865 | 0 | 100 | 0 |
| 10 | 9 | 22.9265 | 14.8712 | 0.7519 | 27.5603 | 0.1024 | 0 | 0 | 0.0865 | 0 | 0.0865 | 0 | 100 | 0 |
| 10 | 10 | 12.4677 | 6.9963 | 0.3574 | 13.1014 | 0.0529 | 0 | 0 | 0.0865 | 0 | 0.0865 | 0 | 100 | 0 |
| 10 | 11 | 0.5969 | −0.5299 | −0.0215 | −0.7876 | 0.0033 | 0 | 0 | 0.0865 | 0 | 0.0865 | 0 | 100 | 0 |
| 10 | 12 | 13.3324 | 8.0107 | 0.3981 | 14.593 | 0.0579 | 0 | 0 | 0.0865 | 0 | 0.0865 | 0 | 100 | 0 |
| 10 | 13 | 1.9031 | 0.5698 | 0.0129 | 0.4715 | 0.0076 | 0 | 0 | 0.0865 | 0 | 0.0865 | 0 | 100 | 0 |
| 10 | 14 | 6.4847 | 3.7801 | 0.156 | 5.7172 | 0.0292 | 0 | 0 | 0.0865 | 0.625 | 0.7115 | 0 | 12.16 | 87.84 |
| 10 | 15 | 13.3979 | 8.7146 | 0.4385 | 16.0738 | 0.0621 | 0 | 0.625 | 0.0865 | 0 | 0.7115 | 87.84 | 12.16 | 0 |
| 10 | 16 | 25.4495 | 16.0477 | 0.8342 | 30.5766 | 0.1176 | 0.1275 | 0 | 0 | 0 | 0.1275 | 0 | 100 | 0 |
| 11 | 1 | 20.1375 | 13.3902 | 0.695 | 25.4752 | 0.0941 | 0 | 0 | 0.0933 | 0 | 0.0933 | 0 | 100 | 0 |
| 11 | 2 | 27.139 | 17.1786 | 0.8841 | 32.4048 | 0.1236 | 0 | 0 | 0.0933 | 0 | 0.0933 | 0 | 100 | 0 |
| 11 | 3 | 26.9388 | 16.683 | 0.9125 | 33.4483 | 0.127 | 0 | 0 | 0.0933 | 0 | 0.0933 | 0 | 100 | 0 |
| 11 | 4 | 24.5762 | 15.8875 | 0.789 | 28.9207 | 0.1089 | 0 | 0 | 0.0933 | 0 | 0.0933 | 0 | 100 | 0 |
| 11 | 5 | 15.1923 | 9.882 | 0.4773 | 17.4944 | 0.0718 | 0 | 0 | 0.0933 | 0 | 0.0933 | 0 | 100 | 0 |
| 11 | 6 | 15.7362 | 10.517 | 0.4959 | 18.1782 | 0.0704 | 0 | 0 | 0.0933 | 0 | 0.0933 | 0 | 100 | 0 |
| 11 | 7 | 6.9524 | 4.547 | 0.2149 | 7.8771 | 0.0338 | 0 | 0 | 0.0933 | 0 | 0.0933 | 0 | 100 | 0 |
| 11 | 8 | 10.7228 | 5.8543 | 0.3063 | 11.2265 | 0.0473 | 0 | 0 | 0.0933 | 0 | 0.0933 | 0 | 100 | 0 |
| 11 | 9 | 21.6871 | 13.7234 | 0.7381 | 27.0563 | 0.1017 | 0 | 0 | 0.0933 | 0 | 0.0933 | 0 | 100 | 0 |
| 11 | 10 | 10.2552 | 6.749 | 0.3273 | 11.9961 | 0.0462 | 0 | 0 | 0.0933 | 0 | 0.0933 | 0 | 100 | 0 |
| 11 | 11 | 0.1751 | −0.8137 | −0.0162 | −0.5948 | 0.0093 | 0 | 0 | 0.0933 | 0 | 0.0933 | 0 | 100 | 0 |
| 11 | 12 | 12.9233 | 7.3461 | 0.3959 | 14.5118 | 0.058 | 0 | 0 | 0.0933 | 0 | 0.0933 | 0 | 100 | 0 |
| 11 | 13 | 2.1161 | −0.0461 | 0.0196 | 0.7173 | 0.0121 | 0 | 0 | 0.0933 | 0 | 0.0933 | 0 | 100 | 0 |
| 11 | 14 | 5.318 | 2.5839 | 0.1421 | 5.2076 | 0.028 | 0 | 0 | 0.0933 | 0.625 | 0.7183 | 0 | 12.99 | 87.01 |
| 11 | 15 | 12.7569 | 6.3017 | 0.3941 | 14.4456 | 0.0579 | 0 | 0.625 | 0.0933 | 0 | 0.7183 | 87.01 | 12.99 | 0 |
| 11 | 16 | 0.8455 | −1.3583 | 0.0027 | 0.0985 | 0.0084 | 0 | 0 | 0 | 0 | 0 | 0 | 0 | 0 |
| 12 | 1 | 15.9884 | 10.3576 | 0.5209 | 19.0939 | 0.0763 | 0 | 0 | 0.1002 | 0 | 0.1002 | 0 | 100 | 0 |
| 12 | 2 | 27.3984 | 16.7714 | 0.9241 | 33.8719 | 0.128 | 0 | 0 | 0.1002 | 0 | 0.1002 | 0 | 100 | 0 |
| 12 | 3 | 28.1625 | 17.4315 | 0.9325 | 34.1804 | 0.1313 | 0 | 0 | 0.1002 | 0 | 0.1002 | 0 | 100 | 0 |
| 12 | 4 | 24.8213 | 15.2594 | 0.851 | 31.1941 | 0.1246 | 0 | 0 | 0.1002 | 0 | 0.1002 | 0 | 100 | 0 |
| 12 | 5 | 16.5105 | 9.4519 | 0.5715 | 20.9463 | 0.089 | 0 | 0 | 0.1002 | 0 | 0.1002 | 0 | 100 | 0 |
| 12 | 6 | 16.2367 | 8.6629 | 0.5246 | 19.229 | 0.0791 | 0 | 0 | 0.1002 | 0 | 0.1002 | 0 | 100 | 0 |
| 12 | 7 | 7.0822 | 2.7268 | 0.2494 | 9.143 | 0.0433 | 0 | 0 | 0.1002 | 0 | 0.1002 | 0 | 100 | 0 |
| 12 | 8 | 11.1025 | 6.1665 | 0.3763 | 13.7941 | 0.056 | 0 | 0 | 0.1002 | 0 | 0.1002 | 0 | 100 | 0 |
| 12 | 9 | 23.5429 | 14.4559 | 0.8026 | 29.419 | 0.1129 | 0 | 0 | 0.1002 | 0 | 0.1002 | 0 | 100 | 0 |
| 12 | 10 | 12.4169 | 7.2141 | 0.384 | 14.0754 | 0.0576 | 0 | 0 | 0.1002 | 0 | 0.1002 | 0 | 100 | 0 |
| 12 | 11 | −0.2192 | −1.5288 | −0.0114 | −0.4195 | 0.0063 | 0 | 0 | 0.1002 | 0 | 0.1002 | 0 | 100 | 0 |
| 12 | 12 | 13.2567 | 7.0496 | 0.4182 | 15.3281 | 0.0611 | 0 | 0 | 0.1002 | 0 | 0.1002 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM_micromols | mol % La | mol % Pt | mol % Zr |
|---|---|---|---|---|---|---|---|---|---|---|---|---|---|---|
| 12 | 13 | 1.2187 | −0.6308 | 0.0286 | 1.0496 | 0.0116 | 0 | 0 | 0.1002 | 0 | 0.1002 | 0 | 100 | 0 |
| 12 | 14 | 5.5276 | 1.9229 | 0.1649 | 6.0426 | 0.0328 | 0 | 0 | 0.1002 | 0.625 | 0.7252 | 0 | 13.81 | 86.19 |
| 12 | 15 | 13.3469 | 6.2659 | 0.4232 | 15.5137 | 0.0634 | 0 | 0.625 | 0.1002 | 0 | 0.7252 | 86.19 | 13.81 | 0 |
| 12 | 16 | 1.0083 | −0.586 | 0.011 | 0.4039 | 0.0096 | 0 | 0 | 0 | 0 | 0 | 0 | 0 | 0 |
| 13 | 1 | 18.6644 | 11.2964 | 0.6506 | 23.8458 | 0.0932 | 0 | 0 | 0.107 | 0 | 0.107 | 0 | 100 | 0 |
| 13 | 2 | 27.845 | 15.9413 | 0.9392 | 34.4261 | 0.1308 | 0 | 0 | 0.107 | 0 | 0.107 | 0 | 100 | 0 |
| 13 | 3 | 27.3697 | 17.3186 | 0.9442 | 34.6097 | 0.1337 | 0 | 0 | 0.107 | 0 | 0.107 | 0 | 100 | 0 |
| 13 | 4 | 25.678 | 15.9207 | 0.8401 | 30.7915 | 0.1183 | 0 | 0 | 0.107 | 0 | 0.107 | 0 | 100 | 0 |
| 13 | 5 | 15.7945 | 10.0005 | 0.5228 | 19.164 | 0.0793 | 0 | 0 | 0.107 | 0 | 0.107 | 0 | 100 | 0 |
| 13 | 6 | 15.3463 | 9.2398 | 0.5087 | 18.6471 | 0.0765 | 0 | 0 | 0.107 | 0 | 0.107 | 0 | 100 | 0 |
| 13 | 7 | 6.7754 | 3.6609 | 0.2308 | 8.459 | 0.0396 | 0 | 0 | 0.107 | 0 | 0.107 | 0 | 100 | 0 |
| 13 | 8 | 11.692 | 6.4553 | 0.3752 | 13.7513 | 0.0561 | 0 | 0 | 0.107 | 0 | 0.107 | 0 | 100 | 0 |
| 13 | 9 | 23.2809 | 13.521 | 0.8112 | 29.7353 | 0.1124 | 0 | 0 | 0.107 | 0 | 0.107 | 0 | 100 | 0 |
| 13 | 10 | 13.5562 | 7.5286 | 0.4302 | 15.7676 | 0.0624 | 0 | 0 | 0.107 | 0 | 0.107 | 0 | 100 | 0 |
| 13 | 11 | 1.1357 | −1.0497 | −0.0258 | −0.9457 | 0.0072 | 0 | 0 | 0.107 | 0 | 0.107 | 0 | 100 | 0 |
| 13 | 12 | 14.0892 | 7.0847 | 0.4404 | 16.1411 | 0.0683 | 0 | 0 | 0.107 | 0 | 0.107 | 0 | 100 | 0 |
| 13 | 13 | 1.2307 | −0.0972 | 0.0411 | 1.5048 | 0.0161 | 0 | 0 | 0.107 | 0 | 0.107 | 0 | 100 | 0 |
| 13 | 14 | 5.0473 | 1.1814 | 0.1519 | 5.5685 | 0.0306 | 0 | 0 | 0.107 | 0.625 | 0.732 | 0 | 14.62 | 85.38 |
| 13 | 15 | 12.8894 | 6.9657 | 0.3932 | 14.413 | 0.0574 | 0 | 0.625 | 0.107 | 0 | 0.732 | 85.38 | 14.62 | 0 |
| 13 | 16 | 27.0196 | 15.8321 | 0.9126 | 33.449 | 0.1349 | 0.1275 | 0 | 0 | 0 | 0.1275 | 0 | 100 | 0 |
| 14 | 1 | 21.6824 | 14.5808 | 0.7642 | 28.0108 | 0.1054 | 0 | 0 | 0.1138 | 0 | 0.1138 | 0 | 100 | 0 |
| 14 | 2 | 27.9534 | 18.5673 | 0.9122 | 33.4357 | 0.1269 | 0 | 0 | 0.1138 | 0 | 0.1138 | 0 | 100 | 0 |
| 14 | 3 | 28.3871 | 17.6025 | 0.9506 | 34.8433 | 0.1361 | 0 | 0 | 0.1138 | 0 | 0.1138 | 0 | 100 | 0 |
| 14 | 4 | 26.5322 | 15.1329 | 0.8627 | 31.6204 | 0.1283 | 0 | 0 | 0.1138 | 0 | 0.1138 | 0 | 100 | 0 |
| 14 | 5 | 17.27 | 10.4633 | 0.5486 | 20.1091 | 0.0846 | 0 | 0 | 0.1138 | 0 | 0.1138 | 0 | 100 | 0 |
| 14 | 6 | 16.6826 | 9.6418 | 0.5721 | 20.9704 | 0.0848 | 0 | 0 | 0.1138 | 0 | 0.1138 | 0 | 100 | 0 |
| 14 | 7 | 7.7667 | 4.5307 | 0.2694 | 9.8752 | 0.0433 | 0 | 0 | 0.1138 | 0 | 0.1138 | 0 | 100 | 0 |
| 14 | 8 | 13.2575 | 8.5866 | 0.4374 | 16.0317 | 0.064 | 0 | 0 | 0.1138 | 0 | 0.1138 | 0 | 100 | 0 |
| 14 | 9 | 24.5972 | 16.2327 | 0.8255 | 30.2566 | 0.1118 | 0 | 0 | 0.1138 | 0 | 0.1138 | 0 | 100 | 0 |
| 14 | 10 | 14.1237 | 8.1483 | 0.478 | 17.5191 | 0.0713 | 0 | 0 | 0.1138 | 0 | 0.1138 | 0 | 100 | 0 |
| 14 | 11 | −0.172 | −1.5106 | −0.0204 | −0.7482 | 0.0089 | 0 | 0 | 0.1138 | 0 | 0.1138 | 0 | 100 | 0 |
| 14 | 12 | 15.8277 | 8.9664 | 0.5076 | 18.6043 | 0.0706 | 0 | 0 | 0.1138 | 0 | 0.1138 | 0 | 100 | 0 |
| 14 | 13 | 1.0637 | −1.0104 | 0.0444 | 1.6268 | 0.0139 | 0 | 0 | 0.1138 | 0 | 0.1138 | 0 | 100 | 0 |
| 14 | 14 | 4.6635 | 2.3532 | 0.1677 | 6.1462 | 0.0296 | 0 | 0 | 0.1138 | 0.625 | 0.7388 | 0 | 15.41 | 84.59 |
| 14 | 15 | 12.9488 | 7.3298 | 0.4296 | 15.7453 | 0.0651 | 0 | 0.625 | 0.1138 | 0 | 0.7388 | 84.59 | 15.41 | 0 |
| 14 | 16 | 0.3061 | −0.5069 | −0.0065 | −0.2391 | 0.0099 | 0 | 0 | 0 | 0 | 0 | 0 | 0 | 0 |
| 15 | 1 | 17.1998 | 12.0104 | 0.5755 | 21.0955 | 0.0799 | 0 | 0 | 0.1207 | 0 | 0.1207 | 0 | 100 | 0 |
| 15 | 2 | 27.4482 | 17.526 | 0.933 | 34.1967 | 0.1316 | 0 | 0 | 0.1207 | 0 | 0.1207 | 0 | 100 | 0 |
| 15 | 3 | 28.1178 | 18.8556 | 0.9242 | 33.8763 | 0.1324 | 0 | 0 | 0.1207 | 0 | 0.1207 | 0 | 100 | 0 |
| 15 | 4 | 26.8701 | 17.1463 | 0.856 | 31.3778 | 0.1258 | 0 | 0 | 0.1207 | 0 | 0.1207 | 0 | 100 | 0 |
| 15 | 5 | 17.6631 | 10.9667 | 0.5845 | 21.4248 | 0.0858 | 0 | 0 | 0.1207 | 0 | 0.1207 | 0 | 100 | 0 |
| 15 | 6 | 17.1402 | 10.8854 | 0.5425 | 19.8853 | 0.0798 | 0 | 0 | 0.1207 | 0 | 0.1207 | 0 | 100 | 0 |
| 15 | 7 | 8.2663 | 5.3027 | 0.2441 | 8.9487 | 0.0387 | 0 | 0 | 0.1207 | 0 | 0.1207 | 0 | 100 | 0 |
| 15 | 8 | 11.9892 | 6.7241 | 0.3904 | 14.3081 | 0.0566 | 0 | 0 | 0.1207 | 0 | 0.1207 | 0 | 100 | 0 |
| 15 | 9 | 24.1606 | 15.639 | 0.8291 | 30.3902 | 0.1118 | 0 | 0 | 0.1207 | 0 | 0.1207 | 0 | 100 | 0 |
| 15 | 10 | 15.0377 | 10.3936 | 0.4614 | 16.9136 | 0.0638 | 0 | 0 | 0.1207 | 0 | 0.1207 | 0 | 100 | 0 |
| 15 | 11 | 0.2191 | −0.9933 | −0.0152 | −0.558 | 0.0074 | 0 | 0 | 0.1207 | 0 | 0.1207 | 0 | 100 | 0 |
| 15 | 12 | 16.1138 | 9.1228 | 0.5094 | 18.6707 | 0.0732 | 0 | 0 | 0.1207 | 0 | 0.1207 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM__micromols | mol % La | mol % Pt | mol % Zr |
|---|---|---|---|---|---|---|---|---|---|---|---|---|---|---|
| 15 | 13 | 2.4821 | 0.3422 | 0.0309 | 1.1317 | 0.0144 | 0 | 0 | 0.1207 | 0 | 0.1207 | 0 | 100 | 0 |
| 15 | 14 | 5.4454 | 0.6463 | 0.189 | 6.9276 | 0.035 | 0 | 0 | 0.1207 | 0.625 | 0.7457 | 0 | 16.18 | 83.82 |
| 15 | 15 | 14.0229 | 7.8558 | 0.4492 | 16.4654 | 0.0681 | 0 | 0.625 | 0.1207 | 0 | 0.7457 | 83.82 | 16.18 | 0 |
| 15 | 16 | 0.4686 | −0.7131 | 0.0197 | 0.7216 | 0.01 | 0 | 0 | 0 | 0 | 0 | 0 | 0 | 0 |
| 16 | 1 | 7.4861 | 4.4402 | 0.2493 | 9.1386 | 0.0401 | 0 | 0 | 0.1275 | 0 | 0.1275 | 0 | 100 | 0 |
| 16 | 2 | 29.0506 | 17.8613 | 0.9483 | 34.7579 | 0.1412 | 0 | 0 | 0.1275 | 0 | 0.1275 | 0 | 100 | 0 |
| 16 | 3 | 29.4694 | 17.4993 | 0.9236 | 33.8554 | 0.1479 | 0 | 0 | 0.1275 | 0 | 0.1275 | 0 | 100 | 0 |
| 16 | 4 | 28.4749 | 16.4322 | 0.9104 | 33.3693 | 0.1531 | 0 | 0 | 0.1275 | 0 | 0.1275 | 0 | 100 | 0 |
| 16 | 5 | 22.0326 | 12.6858 | 0.7055 | 25.8606 | 0.1115 | 0 | 0 | 0.1275 | 0 | 0.1275 | 0 | 100 | 0 |
| 16 | 6 | 20.0805 | 12.1402 | 0.6291 | 23.0594 | 0.0943 | 0 | 0 | 0.1275 | 0 | 0.1275 | 0 | 100 | 0 |
| 16 | 7 | 9.0587 | 5.2161 | 0.2666 | 9.7703 | 0.0461 | 0 | 0 | 0.1275 | 0 | 0.1275 | 0 | 100 | 0 |
| 16 | 8 | 13.983 | 9.3075 | 0.4391 | 16.0948 | 0.0636 | 0 | 0 | 0.1275 | 0 | 0.1275 | 0 | 100 | 0 |
| 16 | 9 | 26.9905 | 17.0719 | 0.877 | 32.1456 | 0.1198 | 0 | 0 | 0.1275 | 0 | 0.1275 | 0 | 100 | 0 |
| 16 | 10 | 14.704 | 8.6762 | 0.4886 | 17.9102 | 0.073 | 0 | 0 | 0.1275 | 0 | 0.1275 | 0 | 100 | 0 |
| 16 | 11 | 0.7191 | −1.4742 | −0.0041 | −0.1519 | 0.0077 | 0 | 0 | 0.1275 | 0 | 0.1275 | 0 | 100 | 0 |
| 16 | 12 | 19.314 | 11.1355 | 0.6495 | 23.808 | 0.0899 | 0 | 0 | 0.1275 | 0 | 0.1275 | 0 | 100 | 0 |
| 16 | 13 | 2.4636 | 0.033 | 0.0679 | 2.4886 | 0.0206 | 0 | 0 | 0.1275 | 0 | 0.1275 | 0 | 100 | 0 |
| 16 | 14 | 11.4461 | 6.8975 | 0.3856 | 14.134 | 0.0639 | 0 | 0 | 0.1275 | 0.625 | 0.7525 | 0 | 16.94 | 83.06 |
| 16 | 15 | 20.8264 | 13.1623 | 0.7 | 25.6595 | 0.0961 | 0 | 0.625 | 0.1275 | 0 | 0.7525 | 83.06 | 16.94 | 0 |
| 16 | 16 | 26.7851 | 15.9945 | 0.9048 | 33.1661 | 0.1319 | 0.1275 | 0 | 0 | 0 | 0.1275 | 0 | 100 | 0 |
| Temperature: 300 C. | | | | | | | | | | | | | | |
| 1 | 1 | 26.0412 | 13.6761 | 0.7608 | 27.4327 | 0.1592 | 0.1275 | 0 | 0 | 0 | 0.1275 | 0 | 100 | 0 |
| 1 | 2 | 1.9716 | 2.4686 | 0.0066 | 0.2386 | 0.0092 | 0 | 0 | 0 | 0 | 0 | 0 | 0 | 0 |
| 1 | 3 | 0.3229 | 0.3952 | −0.0391 | −1.4081 | 0.0062 | 0 | 0 | 0 | 0 | 0 | 0 | 0 | 0 |
| 1 | 4 | 0.6417 | 0.8578 | −0.0504 | −1.8187 | −0.0005 | 0 | 0 | 0 | 0 | 0 | 0 | 0 | 0 |
| 1 | 5 | 0.173 | 0.5233 | −0.0449 | −1.6183 | 0.0024 | 0 | 0 | 0 | 0 | 0 | 0 | 0 | 0 |
| 1 | 6 | 0.3624 | 0.0747 | −0.0376 | −1.3546 | −0.0039 | 0 | 0 | 0 | 0 | 0 | 0 | 0 | 0 |
| 1 | 7 | 26.157 | 12.3934 | 0.797 | 28.7383 | 0.1699 | 0.1275 | 0 | 0 | 0 | 0.1275 | 0 | 100 | 0 |
| 1 | 8 | 3.5333 | 0.2801 | −0.0585 | −2.108 | −0.0107 | 0 | 0 | 0 | 0 | 0 | 0 | 0 | 0 |
| 1 | 9 | −1.8657 | −3.8002 | −0.0104 | −0.375 | 0.0197 | 0 | 0 | 0 | 0 | 0 | 0 | 0 | 0 |
| 1 | 10 | 2.592 | 0.129 | −0.014 | −0.5051 | −0.0253 | 0 | 0 | 0 | 0 | 0 | 0 | 0 | 0 |
| 1 | 11 | −3.1613 | −1.397 | −0.0273 | −0.9858 | 0.0043 | 0 | 0 | 0 | 0 | 0 | 0 | 0 | 0 |
| 1 | 12 | −0.5382 | −0.741 | −0.0195 | −0.7042 | −0.0352 | 0 | 0 | 0 | 0 | 0 | 0 | 0 | 0 |
| 1 | 13 | 25.293 | 12.9331 | 0.8097 | 29.194 | 0.1597 | 0.1275 | 0 | 0 | 0 | 0.1275 | 0 | 100 | 0 |
| 1 | 14 | 0.8774 | 0.3654 | −0.018 | −0.648 | 0.0052 | 0 | 0 | 0 | 0 | 0 | 0 | 0 | 0 |
| 1 | 15 | −1.2793 | 0.1383 | −0.0181 | −0.6543 | 0.0027 | 0 | 0 | 0 | 0 | 0 | 0 | 0 | 0 |
| 1 | 16 | 25.6735 | 12.143 | 0.7277 | 26.2368 | 0.1566 | 0.1275 | 0 | 0 | 0 | 0.1275 | 0 | 100 | 0 |
| 2 | 1 | 14.8766 | 10.2106 | 0.3917 | 14.1217 | 0.0524 | 0 | 0 | 0.0319 | 0 | 0.0319 | 0 | 100 | 0 |
| 2 | 2 | 20.4545 | 14.6181 | 0.746 | 26.8969 | 0.1088 | 0 | 0 | 0.0319 | 0 | 0.0319 | 0 | 100 | 0 |
| 2 | 3 | 19.9352 | 12.3858 | 0.6977 | 25.1579 | 0.1196 | 0 | 0 | 0.0319 | 0 | 0.0319 | 0 | 100 | 0 |
| 2 | 4 | 16.0396 | 10.1097 | 0.6511 | 23.4768 | 0.109 | 0 | 0 | 0.0319 | 0 | 0.0319 | 0 | 100 | 0 |
| 2 | 5 | 15.904 | 10.2101 | 0.4597 | 16.5765 | 0.0626 | 0 | 0 | 0.0319 | 0 | 0.0319 | 0 | 100 | 0 |
| 2 | 6 | 14.9915 | 9.8692 | 0.3995 | 14.4034 | 0.0662 | 0 | 0 | 0.0319 | 0 | 0.0319 | 0 | 100 | 0 |
| 2 | 7 | 6.2101 | 5.2473 | 0.1852 | 6.6763 | 0.0252 | 0 | 0 | 0.0319 | 0 | 0.0319 | 0 | 100 | 0 |
| 2 | 8 | 9.4972 | 5.8339 | 0.283 | 10.205 | 0.0496 | 0 | 0 | 0.0319 | 0 | 0.0319 | 0 | 100 | 0 |
| 2 | 9 | 21.1669 | 13.9111 | 0.6435 | 23.2016 | 0.0932 | 0 | 0 | 0.0319 | 0 | 0.0319 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM__micromols | mol % La | mol % Pt | mol % Zr |
|---|---|---|---|---|---|---|---|---|---|---|---|---|---|---|
| 2 | 10 | 8.0932 | 5.8934 | 0.2958 | 10.6661 | 0.0493 | 0 | 0 | 0.0319 | 0 | 0.0319 | 0 | 100 | 0 |
| 2 | 11 | 0.4906 | 0.3109 | −0.0754 | −2.7173 | 0.0004 | 0 | 0 | 0.0319 | 0 | 0.0319 | 0 | 100 | 0 |
| 2 | 12 | 12.7979 | 8.96 | 0.445 | 16.0439 | 0.0703 | 0 | 0 | 0.0319 | 0 | 0.0319 | 0 | 100 | 0 |
| 2 | 13 | 1.7683 | 2.1621 | 0.0286 | 1.0326 | 0.0176 | 0 | 0 | 0.0319 | 0 | 0.0319 | 0 | 100 | 0 |
| 2 | 14 | 11.5049 | 8.9483 | 0.3603 | 12.9899 | 0.0656 | 0 | 0 | 0.0319 | 0.625 | 0.6569 | 0 | 4.85 | 95.15 |
| 2 | 15 | 19.2509 | 11.5249 | 0.6541 | 23.5849 | 0.0881 | 0 | 0.625 | 0.0319 | 0 | 0.6569 | 95.15 | 4.85 | 0 |
| 2 | 16 | −2.2275 | 0.1022 | 0.0038 | 0.136 | 0.001 | 0 | 0 | 0 | 0 | 0 | 0 | 0 | 0 |
| 3 | 1 | 19.5625 | 13.7405 | 0.7553 | 27.2322 | 0.1169 | 0 | 0 | 0.0387 | 0 | 0.0387 | 0 | 100 | 0 |
| 3 | 2 | 23.3448 | 16.4986 | 0.7782 | 28.0599 | 0.1055 | 0 | 0 | 0.0387 | 0 | 0.0387 | 0 | 100 | 0 |
| 3 | 3 | 20.2746 | 14.4888 | 0.7447 | 26.8513 | 0.1236 | 0 | 0 | 0.0387 | 0 | 0.0387 | 0 | 100 | 0 |
| 3 | 4 | 21.042 | 14.6567 | 0.5975 | 21.5435 | 0.0868 | 0 | 0 | 0.0387 | 0 | 0.0387 | 0 | 100 | 0 |
| 3 | 5 | 15.227 | 11.3009 | 0.5184 | 18.6931 | 0.0896 | 0 | 0 | 0.0387 | 0 | 0.0387 | 0 | 100 | 0 |
| 3 | 6 | 16.2981 | 13.1574 | 0.4916 | 17.7266 | 0.0804 | 0 | 0 | 0.0387 | 0 | 0.0387 | 0 | 100 | 0 |
| 3 | 7 | 7.5318 | 7.7146 | 0.2177 | 7.8495 | 0.0364 | 0 | 0 | 0.0387 | 0 | 0.0387 | 0 | 100 | 0 |
| 3 | 8 | 14.1025 | 10.9954 | 0.419 | 15.1061 | 0.0628 | 0 | 0 | 0.0387 | 0 | 0.0387 | 0 | 100 | 0 |
| 3 | 9 | 20.9253 | 15.3432 | 0.7024 | 25.3266 | 0.1019 | 0 | 0 | 0.0387 | 0 | 0.0387 | 0 | 100 | 0 |
| 3 | 10 | 13.728 | 11.1605 | 0.4466 | 16.1033 | 0.0679 | 0 | 0 | 0.0387 | 0 | 0.0387 | 0 | 100 | 0 |
| 3 | 11 | −1.0656 | 0.7638 | −0.03 | −1.0824 | −0.001 | 0 | 0 | 0.0387 | 0 | 0.0387 | 0 | 100 | 0 |
| 3 | 12 | 12.0316 | 9.0087 | 0.4143 | 14.9372 | 0.064 | 0 | 0 | 0.0387 | 0 | 0.0387 | 0 | 100 | 0 |
| 3 | 13 | 2.3735 | 2.427 | 0.0472 | 1.7003 | 0.0158 | 0 | 0 | 0.0387 | 0 | 0.0387 | 0 | 100 | 0 |
| 3 | 14 | 10.011 | 6.6184 | 0.4321 | 15.5784 | 0.078 | 0 | 0 | 0.0387 | 0.625 | 0.6637 | 0 | 5.83 | 94.17 |
| 3 | 15 | 17.1288 | 11.9418 | 0.6936 | 25.0081 | 0.1016 | 0 | 0.625 | 0.0387 | 0 | 0.6637 | 94.17 | 5.83 | 0 |
| 3 | 16 | −0.0207 | −0.0056 | 0.0564 | 2.0341 | −0.003 | 0 | 0 | 0 | 0 | 0 | 0 | 0 | 0 |
| 4 | 1 | 23.9972 | 15.9845 | 0.7717 | 27.8233 | 0.119 | 0 | 0 | 0.0455 | 0 | 0.0455 | 0 | 100 | 0 |
| 4 | 2 | 24.3635 | 16.2531 | 0.7072 | 25.5007 | 0.1199 | 0 | 0 | 0.0455 | 0 | 0.0455 | 0 | 100 | 0 |
| 4 | 3 | 21.4425 | 14.1432 | 0.7498 | 27.0362 | 0.1265 | 0 | 0 | 0.0455 | 0 | 0.0455 | 0 | 100 | 0 |
| 4 | 4 | 19.4479 | 12.996 | 0.6822 | 24.5996 | 0.107 | 0 | 0 | 0.0455 | 0 | 0.0455 | 0 | 100 | 0 |
| 4 | 5 | 16.0527 | 11.3163 | 0.5819 | 20.98 | 0.0935 | 0 | 0 | 0.0455 | 0 | 0.0455 | 0 | 100 | 0 |
| 4 | 6 | 17.5309 | 11.186 | 0.5671 | 20.447 | 0.0842 | 0 | 0 | 0.0455 | 0 | 0.0455 | 0 | 100 | 0 |
| 4 | 7 | 8.0993 | 5.7381 | 0.3374 | 12.166 | 0.0503 | 0 | 0 | 0.0455 | 0 | 0.0455 | 0 | 100 | 0 |
| 4 | 8 | 14.119 | 9.8107 | 0.5489 | 19.7929 | 0.0801 | 0 | 0 | 0.0455 | 0 | 0.0455 | 0 | 100 | 0 |
| 4 | 9 | 23.2762 | 14.9011 | 0.7786 | 28.0723 | 0.1033 | 0 | 0 | 0.0455 | 0 | 0.0455 | 0 | 100 | 0 |
| 4 | 10 | 14.7194 | 10.4363 | 0.5718 | 20.6185 | 0.08 | 0 | 0 | 0.0455 | 0 | 0.0455 | 0 | 100 | 0 |
| 4 | 11 | 1.1453 | 0.3882 | −0.067 | −2.4162 | −0.0168 | 0 | 0 | 0.0455 | 0 | 0.0455 | 0 | 100 | 0 |
| 4 | 12 | 12.7656 | 8.8311 | 0.4759 | 17.1582 | 0.0689 | 0 | 0 | 0.0455 | 0 | 0.0455 | 0 | 100 | 0 |
| 4 | 13 | 4.4502 | 1.323 | 0.0072 | 0.2593 | 0.0135 | 0 | 0 | 0.0455 | 0 | 0.0455 | 0 | 100 | 0 |
| 4 | 14 | 13.3844 | 9.4729 | 0.4141 | 14.9311 | 0.0687 | 0 | 0 | 0.0455 | 0.625 | 0.6705 | 0 | 6.79 | 93.21 |
| 4 | 15 | 20.7018 | 14.4153 | 0.6795 | 24.5002 | 0.0932 | 0 | 0.625 | 0.0455 | 0 | 0.6705 | 93.21 | 6.79 | 0 |
| 4 | 16 | 26.3093 | 12.5646 | 0.7405 | 26.6988 | 0.1561 | 0.1275 | 0 | 0 | 0 | 0.1275 | 0 | 100 | 0 |
| 5 | 1 | 21.4105 | 14.4067 | 0.7125 | 25.6898 | 0.11 | 0 | 0 | 0.0524 | 0 | 0.0524 | 0 | 100 | 0 |
| 5 | 2 | 22.1022 | 14.8036 | 0.819 | 29.5304 | 0.1282 | 0 | 0 | 0.0524 | 0 | 0.0524 | 0 | 100 | 0 |
| 5 | 3 | 22.5933 | 14.8442 | 0.7244 | 26.1201 | 0.1233 | 0 | 0 | 0.0524 | 0 | 0.0524 | 0 | 100 | 0 |
| 5 | 4 | 21.0057 | 13.8057 | 0.6911 | 24.9201 | 0.1153 | 0 | 0 | 0.0524 | 0 | 0.0524 | 0 | 100 | 0 |
| 5 | 5 | 17.672 | 12.2393 | 0.5728 | 20.6522 | 0.0902 | 0 | 0 | 0.0524 | 0 | 0.0524 | 0 | 100 | 0 |
| 5 | 6 | 16.0245 | 11.7967 | 0.5902 | 21.2789 | 0.0941 | 0 | 0 | 0.0524 | 0 | 0.0524 | 0 | 100 | 0 |
| 5 | 7 | 8.682 | 6.8022 | 0.35 | 12.6185 | 0.0569 | 0 | 0 | 0.0524 | 0 | 0.0524 | 0 | 100 | 0 |
| 5 | 8 | 16.2047 | 10.7313 | 0.5656 | 20.3921 | 0.0857 | 0 | 0 | 0.0524 | 0 | 0.0524 | 0 | 100 | 0 |
| 5 | 9 | 21.0729 | 14.0649 | 0.7974 | 28.7515 | 0.124 | 0 | 0 | 0.0524 | 0 | 0.0524 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM__micromols | mol % La | mol % Pt | mol % Zr |
|---|---|---|---|---|---|---|---|---|---|---|---|---|---|---|
| 5 | 10 | 18.1655 | 12.1093 | 0.6249 | 22.5323 | 0.094 | 0 | 0 | 0.0524 | 0 | 0.0524 | 0 | 100 | 0 |
| 5 | 11 | −3.2789 | −1.8833 | 0.0173 | 0.625 | −0.017 | 0 | 0 | 0.0524 | 0 | 0.0524 | 0 | 100 | 0 |
| 5 | 12 | 12.1376 | 7.6528 | 0.5085 | 18.3339 | 0.0689 | 0 | 0 | 0.0524 | 0 | 0.0524 | 0 | 100 | 0 |
| 5 | 13 | 2.8719 | 1.6064 | 0.0398 | 1.4347 | 0.0232 | 0 | 0 | 0.0524 | 0 | 0.0524 | 0 | 100 | 0 |
| 5 | 14 | 11.6313 | 7.1984 | 0.3756 | 13.5442 | 0.064 | 0 | 0 | 0.0524 | 0.625 | 0.6774 | 0 | 7.73 | 92.27 |
| 5 | 15 | 18.7077 | 12.3422 | 0.6784 | 24.4596 | 0.1017 | 0 | 0.625 | 0.0524 | 0 | 0.6774 | 92.27 | 7.73 | 0 |
| 5 | 16 | −0.923 | 0.6423 | 0.0024 | 0.0871 | −0.0005 | 0 | 0 | 0 | 0 | 0 | 0 | 0 | 0 |
| 6 | 1 | 22.0063 | 14.1082 | 0.7772 | 28.0216 | 0.121 | 0 | 0 | 0.0592 | 0 | 0.0592 | 0 | 100 | 0 |
| 6 | 2 | 23.7522 | 14.4251 | 0.8181 | 29.4983 | 0.1363 | 0 | 0 | 0.0592 | 0 | 0.0592 | 0 | 100 | 0 |
| 6 | 3 | 23.7349 | 12.7968 | 0.778 | 28.0518 | 0.1487 | 0 | 0 | 0.0592 | 0 | 0.0592 | 0 | 100 | 0 |
| 6 | 4 | 21.7688 | 12.1769 | 0.7488 | 27.0006 | 0.1335 | 0 | 0 | 0.0592 | 0 | 0.0592 | 0 | 100 | 0 |
| 6 | 5 | 18.6185 | 12.368 | 0.6292 | 22.6862 | 0.1057 | 0 | 0 | 0.0592 | 0 | 0.0592 | 0 | 100 | 0 |
| 6 | 6 | 17.435 | 11.7025 | 0.6457 | 23.2833 | 0.0997 | 0 | 0 | 0.0592 | 0 | 0.0592 | 0 | 100 | 0 |
| 6 | 7 | 9.5496 | 7.4033 | 0.4005 | 14.4418 | 0.0656 | 0 | 0 | 0.0592 | 0 | 0.0592 | 0 | 100 | 0 |
| 6 | 8 | 18.8345 | 12.608 | 0.602 | 21.7077 | 0.0895 | 0 | 0 | 0.0592 | 0 | 0.0592 | 0 | 100 | 0 |
| 6 | 9 | 22.7783 | 14.5707 | 0.7858 | 28.3319 | 0.1268 | 0 | 0 | 0.0592 | 0 | 0.0592 | 0 | 100 | 0 |
| 6 | 10 | 14.2889 | 9.3319 | 0.4808 | 17.3344 | 0.0626 | 0 | 0 | 0.0592 | 0 | 0.0592 | 0 | 100 | 0 |
| 6 | 11 | −1.4423 | −3.1898 | 0.0072 | 0.2597 | −0.0242 | 0 | 0 | 0.0592 | 0 | 0.0592 | 0 | 100 | 0 |
| 6 | 12 | 14.6391 | 9.1343 | 0.5169 | 18.6393 | 0.0784 | 0 | 0 | 0.0592 | 0 | 0.0592 | 0 | 100 | 0 |
| 6 | 13 | 1.3924 | 0.1849 | 0.1067 | 3.8458 | 0.0254 | 0 | 0 | 0.0592 | 0 | 0.0592 | 0 | 100 | 0 |
| 6 | 14 | 12.4467 | 7.9011 | 0.47 | 16.947 | 0.0796 | 0 | 0 | 0.0592 | 0.625 | 0.6842 | 0 | 8.65 | 91.35 |
| 6 | 15 | 20.5551 | 12.4877 | 0.7241 | 26.1085 | 0.1086 | 0 | 0.625 | 0.0592 | 0 | 0.6842 | 91.35 | 8.65 | 0 |
| 6 | 16 | 1.8224 | 1.9194 | 0.0293 | 1.0577 | −0.001 | 0 | 0 | 0 | 0 | 0 | 0 | 0 | 0 |
| 7 | 1 | 20.1793 | 13.5157 | 0.7141 | 25.7483 | 0.1062 | 0 | 0 | 0.066 | 0 | 0.066 | 0 | 100 | 0 |
| 7 | 2 | 23.9199 | 15.0715 | 0.7923 | 28.5691 | 0.1334 | 0 | 0 | 0.066 | 0 | 0.066 | 0 | 100 | 0 |
| 7 | 3 | 24.0921 | 13.8724 | 0.7704 | 27.7794 | 0.1489 | 0 | 0 | 0.066 | 0 | 0.066 | 0 | 100 | 0 |
| 7 | 4 | 22.4883 | 13.3333 | 0.7472 | 26.9401 | 0.1331 | 0 | 0 | 0.066 | 0 | 0.066 | 0 | 100 | 0 |
| 7 | 5 | 18.3753 | 10.967 | 0.6933 | 24.9964 | 0.1147 | 0 | 0 | 0.066 | 0 | 0.066 | 0 | 100 | 0 |
| 7 | 6 | 19.1636 | 11.8882 | 0.594 | 21.4179 | 0.0973 | 0 | 0 | 0.066 | 0 | 0.066 | 0 | 100 | 0 |
| 7 | 7 | 11.6242 | 8.7829 | 0.358 | 12.9075 | 0.0589 | 0 | 0 | 0.066 | 0 | 0.066 | 0 | 100 | 0 |
| 7 | 8 | 18.9461 | 11.9304 | 0.6075 | 21.9057 | 0.0865 | 0 | 0 | 0.066 | 0 | 0.066 | 0 | 100 | 0 |
| 7 | 9 | 20.8727 | 13.268 | 0.8581 | 30.9391 | 0.1366 | 0 | 0 | 0.066 | 0 | 0.066 | 0 | 100 | 0 |
| 7 | 10 | 19.7469 | 12.533 | 0.627 | 22.6084 | 0.0889 | 0 | 0 | 0.066 | 0 | 0.066 | 0 | 100 | 0 |
| 7 | 11 | 0.2661 | −1.0746 | −0.0206 | −0.7417 | −0.0241 | 0 | 0 | 0.066 | 0 | 0.066 | 0 | 100 | 0 |
| 7 | 12 | 14.9635 | 8.7674 | 0.5117 | 18.4485 | 0.0776 | 0 | 0 | 0.066 | 0 | 0.066 | 0 | 100 | 0 |
| 7 | 13 | 2.473 | 1.1259 | 0.0915 | 3.3004 | 0.0134 | 0 | 0 | 0.066 | 0 | 0.066 | 0 | 100 | 0 |
| 7 | 14 | 10.4908 | 6.4436 | 0.4097 | 14.774 | 0.0771 | 0 | 0 | 0.066 | 0.625 | 0.691 | 0 | 9.55 | 90.45 |
| 7 | 15 | 17.9387 | 11.3159 | 0.7335 | 26.449 | 0.109 | 0 | 0.625 | 0.066 | 0 | 0.691 | 90.45 | 9.55 | 0 |
| 7 | 16 | 24.6649 | 12.1883 | 0.7892 | 28.4564 | 0.1735 | 0.1275 | 0 | 0 | 0 | 0.1275 | 0 | 100 | 0 |
| 8 | 1 | 20.4072 | 13.9072 | 0.7031 | 25.3521 | 0.1107 | 0 | 0 | 0.0729 | 0 | 0.0729 | 0 | 100 | 0 |
| 8 | 2 | 23.2299 | 15.5533 | 0.8078 | 29.1272 | 0.1368 | 0 | 0 | 0.0729 | 0 | 0.0729 | 0 | 100 | 0 |
| 8 | 3 | 24.3029 | 13.9797 | 0.7799 | 28.1203 | 0.1564 | 0 | 0 | 0.0729 | 0 | 0.0729 | 0 | 100 | 0 |
| 8 | 4 | 22.2113 | 14.5975 | 0.7495 | 27.0256 | 0.1425 | 0 | 0 | 0.0729 | 0 | 0.0729 | 0 | 100 | 0 |
| 8 | 5 | 18.1577 | 13.0692 | 0.6943 | 25.034 | 0.1167 | 0 | 0 | 0.0729 | 0 | 0.0729 | 0 | 100 | 0 |
| 8 | 6 | 16.4584 | 11.241 | 0.6799 | 24.5135 | 0.1128 | 0 | 0 | 0.0729 | 0 | 0.0729 | 0 | 100 | 0 |
| 8 | 7 | 11.3178 | 9.6452 | 0.4321 | 15.5795 | 0.0596 | 0 | 0 | 0.0729 | 0 | 0.0729 | 0 | 100 | 0 |
| 8 | 8 | 20.8336 | 14.4605 | 0.6457 | 23.2815 | 0.0922 | 0 | 0 | 0.0729 | 0 | 0.0729 | 0 | 100 | 0 |
| 8 | 9 | 23.346 | 15.3942 | 0.8346 | 30.0941 | 0.1169 | 0 | 0 | 0.0729 | 0 | 0.0729 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM__micromols | mol % La | mol % Pt | mol % Zr |
|---|---|---|---|---|---|---|---|---|---|---|---|---|---|---|
| 8 | 10 | 20.3283 | 13.3467 | 0.6964 | 25.1102 | 0.1063 | 0 | 0 | 0.0729 | 0 | 0.0729 | 0 | 100 | 0 |
| 8 | 11 | 6.0017 | 3.7447 | 0.2344 | 8.4523 | 0.0402 | 0 | 0 | 0.0729 | 0 | 0.0729 | 0 | 100 | 0 |
| 8 | 12 | 14.0669 | 9.2173 | 0.572 | 20.6246 | 0.0862 | 0 | 0 | 0.0729 | 0 | 0.0729 | 0 | 100 | 0 |
| 8 | 13 | 0.4343 | −0.3379 | 0.1029 | 3.7103 | 0.0224 | 0 | 0 | 0.0729 | 0 | 0.0729 | 0 | 100 | 0 |
| 8 | 14 | 12.9196 | 8.2041 | 0.4689 | 16.9054 | 0.0749 | 0 | 0 | 0.0729 | 0.625 | 0.6979 | 0 | 10.44 | 89.56 |
| 8 | 15 | 20.3025 | 12.6472 | 0.6618 | 23.8639 | 0.1 | 0 | 0.625 | 0.0729 | 0 | 0.6979 | 89.56 | 10.44 | 0 |
| 8 | 16 | 0.7273 | 0.7062 | −0.0175 | −0.63 | −0.0087 | 0 | 0 | 0 | 0 | 0 | 0 | 0 | 0 |
| 9 | 1 | 19.0866 | 13.801 | 0.6956 | 25.0805 | 0.1067 | 0 | 0 | 0.0797 | 0 | 0.0797 | 0 | 100 | 0 |
| 9 | 2 | 23.4011 | 15.4022 | 0.8062 | 29.0677 | 0.1362 | 0 | 0 | 0.0797 | 0 | 0.0797 | 0 | 100 | 0 |
| 9 | 3 | 24.2636 | 14.0356 | 0.8069 | 29.094 | 0.1585 | 0 | 0 | 0.0797 | 0 | 0.0797 | 0 | 100 | 0 |
| 9 | 4 | 23.0618 | 13.7204 | 0.7603 | 27.4122 | 0.137 | 0 | 0 | 0.0797 | 0 | 0.0797 | 0 | 100 | 0 |
| 9 | 5 | 19.2953 | 12.3324 | 0.6838 | 24.6546 | 0.1191 | 0 | 0 | 0.0797 | 0 | 0.0797 | 0 | 100 | 0 |
| 9 | 6 | 16.4524 | 11.6941 | 0.5833 | 21.033 | 0.0966 | 0 | 0 | 0.0797 | 0 | 0.0797 | 0 | 100 | 0 |
| 9 | 7 | 8.8155 | 6.193 | 0.4081 | 14.7154 | 0.0678 | 0 | 0 | 0.0797 | 0 | 0.0797 | 0 | 100 | 0 |
| 9 | 8 | 18.3421 | 12.4823 | 0.6492 | 23.4094 | 0.095 | 0 | 0 | 0.0797 | 0 | 0.0797 | 0 | 100 | 0 |
| 9 | 9 | 22.5571 | 15.4221 | 0.8241 | 29.7153 | 0.1201 | 0 | 0 | 0.0797 | 0 | 0.0797 | 0 | 100 | 0 |
| 9 | 10 | 18.2863 | 13.1397 | 0.6724 | 24.2444 | 0.0988 | 0 | 0 | 0.0797 | 0 | 0.0797 | 0 | 100 | 0 |
| 9 | 11 | −1.5339 | −0.5868 | −0.0006 | −0.0218 | −0.0198 | 0 | 0 | 0.0797 | 0 | 0.0797 | 0 | 100 | 0 |
| 9 | 12 | 13.9602 | 9.1693 | 0.5547 | 20.0022 | 0.0819 | 0 | 0 | 0.0797 | 0 | 0.0797 | 0 | 100 | 0 |
| 9 | 13 | 1.1827 | 1.2849 | 0.1107 | 3.9916 | 0.0024 | 0 | 0 | 0.0797 | 0 | 0.0797 | 0 | 100 | 0 |
| 9 | 14 | 10.2757 | 6.1288 | 0.3969 | 14.3106 | 0.0711 | 0 | 0 | 0.0797 | 0.625 | 0.7047 | 0 | 11.31 | 88.69 |
| 9 | 15 | 19.4095 | 11.4849 | 0.732 | 26.3918 | 0.1116 | 0 | 0.625 | 0.0797 | 0 | 0.7047 | 88.69 | 11.31 | 0 |
| 9 | 16 | −0.4746 | 0.3 | 0.0649 | 2.3389 | 0.0106 | 0 | 0 | 0 | 0 | 0 | 0 | 0 | 0 |
| 10 | 1 | 19.6155 | 13.2592 | 0.7151 | 25.784 | 0.1137 | 0 | 0 | 0.0865 | 0 | 0.0865 | 0 | 100 | 0 |
| 10 | 2 | 24.4255 | 14.2114 | 0.8452 | 30.474 | 0.1541 | 0 | 0 | 0.0865 | 0 | 0.0865 | 0 | 100 | 0 |
| 10 | 3 | 25.1167 | 12.0723 | 0.8229 | 29.6706 | 0.1783 | 0 | 0 | 0.0865 | 0 | 0.0865 | 0 | 100 | 0 |
| 10 | 4 | 23.9367 | 12.0867 | 0.8302 | 29.934 | 0.1595 | 0 | 0 | 0.0865 | 0 | 0.0865 | 0 | 100 | 0 |
| 10 | 5 | 20.499 | 11.2772 | 0.6949 | 25.0561 | 0.1257 | 0 | 0 | 0.0865 | 0 | 0.0865 | 0 | 100 | 0 |
| 10 | 6 | 18.4277 | 10.342 | 0.652 | 23.5077 | 0.1136 | 0 | 0 | 0.0865 | 0 | 0.0865 | 0 | 100 | 0 |
| 10 | 7 | 10.6829 | 8.2331 | 0.4943 | 17.8212 | 0.0797 | 0 | 0 | 0.0865 | 0 | 0.0865 | 0 | 100 | 0 |
| 10 | 8 | 21.0351 | 13.5697 | 0.6934 | 25.0025 | 0.1016 | 0 | 0 | 0.0865 | 0 | 0.0865 | 0 | 100 | 0 |
| 10 | 9 | 23.3546 | 15.5724 | 0.8319 | 29.9961 | 0.1265 | 0 | 0 | 0.0865 | 0 | 0.0865 | 0 | 100 | 0 |
| 10 | 10 | 20.2733 | 13.206 | 0.7226 | 26.0547 | 0.1094 | 0 | 0 | 0.0865 | 0 | 0.0865 | 0 | 100 | 0 |
| 10 | 11 | −2.2709 | −1.6818 | −0.003 | −0.1081 | −0.0191 | 0 | 0 | 0.0865 | 0 | 0.0865 | 0 | 100 | 0 |
| 10 | 12 | 15.5394 | 9.154 | 0.5767 | 20.7948 | 0.0875 | 0 | 0 | 0.0865 | 0 | 0.0865 | 0 | 100 | 0 |
| 10 | 13 | 2.338 | 0.6958 | 0.1166 | 4.204 | 0.0286 | 0 | 0 | 0.0865 | 0 | 0.0865 | 0 | 100 | 0 |
| 10 | 14 | 11.8371 | 7.0502 | 0.4485 | 16.1702 | 0.0781 | 0 | 0 | 0.0865 | 0.625 | 0.7115 | 0 | 12.16 | 87.84 |
| 10 | 15 | 18.9643 | 11.9052 | 0.7159 | 25.8125 | 0.1082 | 0 | 0.625 | 0.0865 | 0 | 0.7115 | 87.84 | 12.16 | 0 |
| 10 | 16 | 23.3683 | 12.0328 | 0.7792 | 28.0962 | 0.1577 | 0.1275 | 0 | 0 | 0 | 0.1275 | 0 | 100 | 0 |
| 11 | 1 | 18.6802 | 11.5742 | 0.6796 | 24.5045 | 0.1057 | 0 | 0 | 0.0933 | 0 | 0.0933 | 0 | 100 | 0 |
| 11 | 2 | 25.0222 | 13.9863 | 0.8039 | 28.9852 | 0.1512 | 0 | 0 | 0.0933 | 0 | 0.0933 | 0 | 100 | 0 |
| 11 | 3 | 25.6394 | 13.1215 | 0.8122 | 29.2838 | 0.1687 | 0 | 0 | 0.0933 | 0 | 0.0933 | 0 | 100 | 0 |
| 11 | 4 | 24.6744 | 14.5183 | 0.7802 | 28.132 | 0.1536 | 0 | 0 | 0.0933 | 0 | 0.0933 | 0 | 100 | 0 |
| 11 | 5 | 19.3295 | 12.6135 | 0.685 | 24.6995 | 0.1225 | 0 | 0 | 0.0933 | 0 | 0.0933 | 0 | 100 | 0 |
| 11 | 6 | 18.7665 | 11.7823 | 0.6491 | 23.4044 | 0.1112 | 0 | 0 | 0.0933 | 0 | 0.0933 | 0 | 100 | 0 |
| 11 | 7 | 12.0459 | 8.262 | 0.4669 | 16.8355 | 0.0746 | 0 | 0 | 0.0933 | 0 | 0.0933 | 0 | 100 | 0 |
| 11 | 8 | 19.7356 | 12.2924 | 0.7225 | 26.0526 | 0.1072 | 0 | 0 | 0.0933 | 0 | 0.0933 | 0 | 100 | 0 |
| 11 | 9 | 23.3494 | 14.4131 | 0.8518 | 30.7139 | 0.1298 | 0 | 0 | 0.0933 | 0 | 0.0933 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM_micromols | mol % La | mol % Pt | mol % Zr |
|---|---|---|---|---|---|---|---|---|---|---|---|---|---|---|
| 11 | 10 | 19.1323 | 12.6849 | 0.7094 | 25.5779 | 0.105 | 0 | 0 | 0.0933 | 0 | 0.0933 | 0 | 100 | 0 |
| 11 | 11 | −0.9895 | −0.2695 | −0.004 | −0.1435 | −0.0127 | 0 | 0 | 0.0933 | 0 | 0.0933 | 0 | 100 | 0 |
| 11 | 12 | 14.8304 | 10.1963 | 0.582 | 20.9867 | 0.0899 | 0 | 0 | 0.0933 | 0 | 0.0933 | 0 | 100 | 0 |
| 11 | 13 | 2.208 | 2.5587 | 0.1029 | 3.7107 | 0.0204 | 0 | 0 | 0.0933 | 0 | 0.0933 | 0 | 100 | 0 |
| 11 | 14 | 10.9763 | 6.4266 | 0.3918 | 14.1258 | 0.0707 | 0 | 0 | 0.0933 | 0.625 | 0.7183 | 0 | 12.99 | 87.01 |
| 11 | 15 | 18.1906 | 10.6621 | 0.698 | 25.1685 | 0.106 | 0 | 0.625 | 0.0933 | 0 | 0.7183 | 87.01 | 12.99 | 0 |
| 11 | 16 | −0.9643 | −0.7161 | 0.0392 | 1.4143 | −0.0048 | 0 | 0 | 0 | 0 | 0 | 0 | 0 | 0 |
| 12 | 1 | 15.4588 | 10.1833 | 0.5953 | 21.4632 | 0.1001 | 0 | 0 | 0.1002 | 0 | 0.1002 | 0 | 100 | 0 |
| 12 | 2 | 24.7319 | 13.6012 | 0.8478 | 30.5688 | 0.161 | 0 | 0 | 0.1002 | 0 | 0.1002 | 0 | 100 | 0 |
| 12 | 3 | 26.8912 | 12.8758 | 0.8008 | 28.8754 | 0.1851 | 0 | 0 | 0.1002 | 0 | 0.1002 | 0 | 100 | 0 |
| 12 | 4 | 24.6558 | 12.9216 | 0.8196 | 29.5504 | 0.1758 | 0 | 0 | 0.1002 | 0 | 0.1002 | 0 | 100 | 0 |
| 12 | 5 | 20.5267 | 12.1018 | 0.7215 | 26.0139 | 0.1329 | 0 | 0 | 0.1002 | 0 | 0.1002 | 0 | 100 | 0 |
| 12 | 6 | 18.4287 | 11.4481 | 0.6811 | 24.5589 | 0.1172 | 0 | 0 | 0.1002 | 0 | 0.1002 | 0 | 100 | 0 |
| 12 | 7 | 13.4393 | 9.372 | 0.4909 | 17.6995 | 0.0793 | 0 | 0 | 0.1002 | 0 | 0.1002 | 0 | 100 | 0 |
| 12 | 8 | 21.0809 | 13.9911 | 0.7512 | 27.0875 | 0.111 | 0 | 0 | 0.1002 | 0 | 0.1002 | 0 | 100 | 0 |
| 12 | 9 | 23.772 | 15.0448 | 0.8517 | 30.7084 | 0.1339 | 0 | 0 | 0.1002 | 0 | 0.1002 | 0 | 100 | 0 |
| 12 | 10 | 19.8095 | 12.8912 | 0.7381 | 26.6137 | 0.1093 | 0 | 0 | 0.1002 | 0 | 0.1002 | 0 | 100 | 0 |
| 12 | 11 | −1.4941 | −1.399 | −0.0134 | −0.4846 | −0.018 | 0 | 0 | 0.1002 | 0 | 0.1002 | 0 | 100 | 0 |
| 12 | 12 | 16.0743 | 10.6539 | 0.5977 | 21.5507 | 0.092 | 0 | 0 | 0.1002 | 0 | 0.1002 | 0 | 100 | 0 |
| 12 | 13 | 2.0581 | 1.6359 | 0.1105 | 3.986 | 0.0298 | 0 | 0 | 0.1002 | 0 | 0.1002 | 0 | 100 | 0 |
| 12 | 14 | 10.744 | 6.4761 | 0.4184 | 15.0852 | 0.076 | 0 | 0 | 0.1002 | 0.625 | 0.7252 | 0 | 13.81 | 86.19 |
| 12 | 15 | 18.2843 | 10.3265 | 0.6975 | 25.1492 | 0.112 | 0 | 0.625 | 0.1002 | 0 | 0.7252 | 86.19 | 13.81 | 0 |
| 12 | 16 | −0.4083 | −1.1083 | 0.0632 | 2.2805 | 0.02 | 0 | 0 | 0 | 0 | 0 | 0 | 0 | 0 |
| 13 | 1 | 17.3784 | 11.3659 | 0.6531 | 23.5471 | 0.1026 | 0 | 0 | 0.107 | 0 | 0.107 | 0 | 100 | 0 |
| 13 | 2 | 24.8735 | 13.9698 | 0.8645 | 31.1714 | 0.1634 | 0 | 0 | 0.107 | 0 | 0.107 | 0 | 100 | 0 |
| 13 | 3 | 26.731 | 13.2379 | 0.8304 | 29.9397 | 0.1799 | 0 | 0 | 0.107 | 0 | 0.107 | 0 | 100 | 0 |
| 13 | 4 | 25.0125 | 13.3208 | 0.8199 | 29.5626 | 0.1706 | 0 | 0 | 0.107 | 0 | 0.107 | 0 | 100 | 0 |
| 13 | 5 | 20.9959 | 12.5637 | 0.7 | 25.2389 | 0.1263 | 0 | 0 | 0.107 | 0 | 0.107 | 0 | 100 | 0 |
| 13 | 6 | 19.7859 | 13.0643 | 0.6384 | 23.0182 | 0.1112 | 0 | 0 | 0.107 | 0 | 0.107 | 0 | 100 | 0 |
| 13 | 7 | 12.7701 | 8.6484 | 0.4737 | 17.0786 | 0.0821 | 0 | 0 | 0.107 | 0 | 0.107 | 0 | 100 | 0 |
| 13 | 8 | 19.9798 | 12.3643 | 0.7421 | 26.7561 | 0.1113 | 0 | 0 | 0.107 | 0 | 0.107 | 0 | 100 | 0 |
| 13 | 9 | 23.9004 | 15.4262 | 0.8368 | 30.1725 | 0.1326 | 0 | 0 | 0.107 | 0 | 0.107 | 0 | 100 | 0 |
| 13 | 10 | 20.1688 | 14.395 | 0.7685 | 27.7093 | 0.1134 | 0 | 0 | 0.107 | 0 | 0.107 | 0 | 100 | 0 |
| 13 | 11 | −1.5531 | −0.2131 | 0.0003 | 0.0093 | −0.0139 | 0 | 0 | 0.107 | 0 | 0.107 | 0 | 100 | 0 |
| 13 | 12 | 16.261 | 10.9519 | 0.6007 | 21.66 | 0.0928 | 0 | 0 | 0.107 | 0 | 0.107 | 0 | 100 | 0 |
| 13 | 13 | 2.1579 | 1.7026 | 0.1307 | 4.7131 | 0.0287 | 0 | 0 | 0.107 | 0 | 0.107 | 0 | 100 | 0 |
| 13 | 14 | 10.3449 | 7.0881 | 0.4013 | 14.4697 | 0.0725 | 0 | 0 | 0.107 | 0.625 | 0.732 | 0 | 14.62 | 85.38 |
| 13 | 15 | 17.9906 | 12.3676 | 0.6892 | 24.8485 | 0.1057 | 0 | 0.625 | 0.107 | 0 | 0.732 | 85.38 | 14.62 | 0 |
| 13 | 16 | 24.9296 | 12.3107 | 0.7853 | 28.3135 | 0.1895 | 0.1275 | 0 | 0 | 0 | 0.1275 | 0 | 100 | 0 |
| 14 | 1 | 19.7006 | 13.895 | 0.7196 | 25.9447 | 0.1225 | 0 | 0 | 0.1138 | 0 | 0.1138 | 0 | 100 | 0 |
| 14 | 2 | 24.628 | 13.7864 | 0.8645 | 31.1715 | 0.1715 | 0 | 0 | 0.1138 | 0 | 0.1138 | 0 | 100 | 0 |
| 14 | 3 | 27.0603 | 12.7211 | 0.8226 | 29.6605 | 0.2007 | 0 | 0 | 0.1138 | 0 | 0.1138 | 0 | 100 | 0 |
| 14 | 4 | 24.9719 | 12.0514 | 0.83 | 29.9259 | 0.1896 | 0 | 0 | 0.1138 | 0 | 0.1138 | 0 | 100 | 0 |
| 14 | 5 | 20.0669 | 11.3486 | 0.7334 | 26.4431 | 0.1416 | 0 | 0 | 0.1138 | 0 | 0.1138 | 0 | 100 | 0 |
| 14 | 6 | 19.3148 | 11.3116 | 0.7073 | 25.5033 | 0.128 | 0 | 0 | 0.1138 | 0 | 0.1138 | 0 | 100 | 0 |
| 14 | 7 | 13.0698 | 9.2496 | 0.5178 | 18.6703 | 0.0862 | 0 | 0 | 0.1138 | 0 | 0.1138 | 0 | 100 | 0 |
| 14 | 8 | 21.4825 | 14.0766 | 0.7634 | 27.5263 | 0.1153 | 0 | 0 | 0.1138 | 0 | 0.1138 | 0 | 100 | 0 |
| 14 | 9 | 23.8379 | 15.3459 | 0.8607 | 31.0347 | 0.1367 | 0 | 0 | 0.1138 | 0 | 0.1138 | 0 | 100 | 0 |

TABLE III-continued

| R real | C real | COCONV real | H2OCONV real | CO2PROD real | CO2PERPROD real | CH4PROD real | Pt1.0%/ZrO2__ std real | LaNO33 real | PtNH32NO22 real | ZrONO32 real | SUM_micromols | mol % La | mol % Pt | mol % Zr |
|---|---|---|---|---|---|---|---|---|---|---|---|---|---|---|
| 14 | 10 | 21.5278 | 13.8928 | 0.7851 | 28.3081 | 0.1137 | 0 | 0 | 0.1138 | 0 | 0.1138 | 0 | 100 | 0 |
| 14 | 11 | −2.1621 | −1.2165 | −0.0091 | −0.3271 | −0.0078 | 0 | 0 | 0.1138 | 0 | 0.1138 | 0 | 100 | 0 |
| 14 | 12 | 17.3041 | 11.5725 | 0.646 | 23.2923 | 0.0958 | 0 | 0 | 0.1138 | 0 | 0.1138 | 0 | 100 | 0 |
| 14 | 13 | 1.949 | 2.0565 | 0.0896 | 3.2302 | 0.028 | 0 | 0 | 0.1138 | 0 | 0.1138 | 0 | 100 | 0 |
| 14 | 14 | 9.3689 | 6.5087 | 0.3449 | 12.4353 | 0.0636 | 0 | 0 | 0.1138 | 0.625 | 0.7388 | 0 | 15.41 | 84.59 |
| 14 | 15 | 18.4324 | 12.0276 | 0.6914 | 24.9297 | 0.1067 | 0 | 0.625 | 0.1138 | 0 | 0.7388 | 84.59 | 15.41 | 0 |
| 14 | 16 | −0.7558 | −0.6898 | 0.0165 | 0.5934 | 0.0011 | 0 | 0 | 0 | 0 | 0 | 0 | 0 | 0 |
| 15 | 1 | 18.1472 | 11.9418 | 0.6987 | 25.1939 | 0.1082 | 0 | 0 | 0.1207 | 0 | 0.1207 | 0 | 100 | 0 |
| 15 | 2 | 24.7631 | 13.6604 | 0.8641 | 31.1563 | 0.1697 | 0 | 0 | 0.1207 | 0 | 0.1207 | 0 | 100 | 0 |
| 15 | 3 | 26.1211 | 11.8227 | 0.834 | 30.0705 | 0.2037 | 0 | 0 | 0.1207 | 0 | 0.1207 | 0 | 100 | 0 |
| 15 | 4 | 24.5677 | 11.9552 | 0.7923 | 28.5692 | 0.1875 | 0 | 0 | 0.1207 | 0 | 0.1207 | 0 | 100 | 0 |
| 15 | 5 | 20.0898 | 11.474 | 0.7193 | 25.9371 | 0.144 | 0 | 0 | 0.1207 | 0 | 0.1207 | 0 | 100 | 0 |
| 15 | 6 | 19.3675 | 11.6613 | 0.6822 | 24.5972 | 0.1254 | 0 | 0 | 0.1207 | 0 | 0.1207 | 0 | 100 | 0 |
| 15 | 7 | 12.9911 | 8.3415 | 0.5124 | 18.477 | 0.0905 | 0 | 0 | 0.1207 | 0 | 0.1207 | 0 | 100 | 0 |
| 15 | 8 | 19.4851 | 12.9013 | 0.711 | 25.6353 | 0.1146 | 0 | 0 | 0.1207 | 0 | 0.1207 | 0 | 100 | 0 |
| 15 | 9 | 23.6077 | 14.5462 | 0.8618 | 31.074 | 0.1436 | 0 | 0 | 0.1207 | 0 | 0.1207 | 0 | 100 | 0 |
| 15 | 10 | 21.2589 | 13.7735 | 0.7922 | 28.5624 | 0.1207 | 0 | 0 | 0.1207 | 0 | 0.1207 | 0 | 100 | 0 |
| 15 | 11 | −1.3789 | −1.3203 | 0.0019 | 0.0686 | −0.0106 | 0 | 0 | 0.1207 | 0 | 0.1207 | 0 | 100 | 0 |
| 15 | 12 | 16.8366 | 10.3498 | 0.6489 | 23.3953 | 0.1014 | 0 | 0 | 0.1207 | 0 | 0.1207 | 0 | 100 | 0 |
| 15 | 13 | 2.5374 | 0.8067 | 0.138 | 4.9742 | 0.0357 | 0 | 0 | 0.1207 | 0 | 0.1207 | 0 | 100 | 0 |
| 15 | 14 | 11.1396 | 7.0915 | 0.4088 | 14.741 | 0.0773 | 0 | 0 | 0.1207 | 0.625 | 0.7457 | 0 | 16.18 | 83.82 |
| 15 | 15 | 17.5426 | 10.4944 | 0.7045 | 25.4019 | 0.1136 | 0 | 0.625 | 0.1207 | 0 | 0.7457 | 83.82 | 16.18 | 0 |
| 15 | 16 | −0.4051 | −0.4444 | 0.0729 | 2.6294 | 0.0112 | 0 | 0 | 0 | 0 | 0 | 0 | 0 | 0 |
| 16 | 1 | 15.0725 | 8.0994 | 0.5869 | 21.1613 | 0.0985 | 0 | 0 | 0.1275 | 0 | 0.1275 | 0 | 100 | 0 |
| 16 | 2 | 24.67 | 8.6858 | 0.7009 | 25.2716 | 0.2051 | 0 | 0 | 0.1275 | 0 | 0.1275 | 0 | 100 | 0 |
| 16 | 3 | 27.4278 | 6.3099 | 0.707 | 25.4923 | 0.2645 | 0 | 0 | 0.1275 | 0 | 0.1275 | 0 | 100 | 0 |
| 16 | 4 | 24.8032 | 6.1186 | 0.6967 | 25.1217 | 0.2372 | 0 | 0 | 0.1275 | 0 | 0.1275 | 0 | 100 | 0 |
| 16 | 5 | 20.9479 | 7.854 | 0.6707 | 24.1843 | 0.1784 | 0 | 0 | 0.1275 | 0 | 0.1275 | 0 | 100 | 0 |
| 16 | 6 | 19.4346 | 9.972 | 0.6893 | 24.8548 | 0.1408 | 0 | 0 | 0.1275 | 0 | 0.1275 | 0 | 100 | 0 |
| 16 | 7 | 14.3144 | 8.9315 | 0.5183 | 18.6864 | 0.0889 | 0 | 0 | 0.1275 | 0 | 0.1275 | 0 | 100 | 0 |
| 16 | 8 | 20.6449 | 13.6205 | 0.7023 | 25.3217 | 0.1142 | 0 | 0 | 0.1275 | 0 | 0.1275 | 0 | 100 | 0 |
| 16 | 9 | 24.2561 | 14.785 | 0.854 | 30.7919 | 0.1506 | 0 | 0 | 0.1275 | 0 | 0.1275 | 0 | 100 | 0 |
| 16 | 10 | 21.0486 | 14.0733 | 0.6995 | 25.2209 | 0.1084 | 0 | 0 | 0.1275 | 0 | 0.1275 | 0 | 100 | 0 |
| 16 | 11 | −2.2759 | −0.0846 | 0.0413 | 1.4879 | 0.024 | 0 | 0 | 0.1275 | 0 | 0.1275 | 0 | 100 | 0 |
| 16 | 12 | 17.1423 | 10.7518 | 0.5869 | 21.1613 | 0.0898 | 0 | 0 | 0.1275 | 0 | 0.1275 | 0 | 100 | 0 |
| 16 | 13 | 3.0092 | 2.0883 | 0.2069 | 7.4586 | 0.0432 | 0 | 0 | 0.1275 | 0 | 0.1275 | 0 | 100 | 0 |
| 16 | 14 | 12.8714 | 7.6083 | 0.5142 | 18.5415 | 0.1069 | 0 | 0 | 0.1275 | 0.625 | 0.7525 | 0 | 16.94 | 83.06 |
| 16 | 15 | 17.5841 | 9.9481 | 0.6294 | 22.6946 | 0.129 | 0 | 0.625 | 0.1275 | 0 | 0.7525 | 83.06 | 16.94 | 0 |
| 16 | 16 | 25.0686 | 11.1805 | 0.8288 | 29.884 | 0.1822 | 0.1275 | 0 | 0 | 0 | 0.1275 | 0 | 100 | 0 |

What we claim is:

1. A method for producing a hydrogen-rich gas which comprises:

contacting a CO-containing gas with a water gas shift catalyst in the presence of water at a temperature of not more than about 450° C., wherein the water gas shift catalyst consists essentially of:

a) Pt, its oxides or mixtures thereof;

b) at least one of Li, Na, K, Rb, Cs, their oxides and mixtures thereof; and c) at least one of Sc, Y, Ti, Zr, V, Nb, Ta, Cr, Mo, W, Mn, Fe, Co, Ir, Ni, Pd, La, Ce, Pr, Nd, Sm, Eu, their oxides and mixtures thereof.

2. The method according to claim 1, wherein the CO-containing gas is a syngas.

3. The method according to claim 1, wherein element (b) consists essentially of at least one of Li, Na, K, their oxides and mixtures thereof.

4. The method according to claim 3, wherein element (c) consists essentially of Fe, its oxides or mixtures thereof.

5. The method according to claim 3, wherein the water gas shift catalyst is selected from the group consisting of:

Pt, its oxides or mixtures thereof, Li, its oxides or mixtures thereof, and Fe, its oxides or mixtures thereof;

Pt, its oxides or mixtures thereof, Li, its oxides or mixtures thereof, and Co, its oxides or mixtures thereof;

Pt, its oxides or mixtures thereof, Li, its oxides or mixtures thereof, and Ce, its oxides or mixtures thereof;

Pt, its oxides or mixtures thereof, Na, its oxides or mixtures thereof, and Zr, its oxides or mixtures thereof;

Pt, its oxides or mixtures thereof, Na, its oxides or mixtures thereof, and La, its oxides or mixtures thereof;

Pt, its oxides or mixtures thereof, Na, its oxides or mixtures thereof, and Y, its oxides or mixtures thereof;

Pt, its oxides or mixtures thereof, Na, its oxides or mixtures thereof, and Ce, its oxides or mixtures thereof;

Pt, its oxides or mixtures thereof, Na, its oxides or mixtures thereof, and Mo, its oxides or mixtures thereof;

Pt, its oxides or mixtures thereof, Na, its oxides or mixtures thereof, and Fe, its oxides or mixtures thereof;

Pt, its oxides or mixtures thereof, Na, its oxides or mixtures thereof, and Co, its oxides or mixtures thereof;

Pt, its oxides or mixtures thereof, Na, its oxides or mixtures thereof, and Mn, its oxides or mixtures thereof;

Pt, its oxides or mixtures thereof, Na, its oxides or mixtures thereof, Zr, its oxides or mixtures thereof, and Co, its oxides or mixtures thereof;

Pt, its oxides or mixtures thereof, K, its oxides or mixtures thereof, and Ce, its oxides or mixtures thereof;

Pt, its oxides or mixtures thereof, K, its oxides or mixtures thereof, and Fe, its oxides or mixtures thereof; and Pt, its oxides or mixtures thereof, K, its oxides or mixtures thereof, and Co, its oxides or mixtures thereof.

6. The method according to claim 1, wherein the water gas shift catalyst is supported in a carrier selected from alumina, zirconia, titania, ceria, magnesia, lanthania, niobia, zeolite, perovskite, silica clay, yttria, iron oxide or mixtures thereof.

7. The method according to claim 6, wherein element (b) consists essentially of at least one of Li, Na, K, their oxides or mixtures thereof.

8. The method according to claim 7, wherein element (c) consists essentially of Fe, its oxides or mixtures thereof.

9. The method according to claim 7, wherein the supported water gas shift catalyst is selected from:

Pt, its oxides or mixtures thereof, Li, its oxides or mixtures thereof, and Fe, its oxides or mixtures thereof, on $ZrO_2$;

Pt, its oxides or mixtures thereof, Li, its oxides or mixtures thereof, and Co, its oxides or mixtures thereof, on $ZrO_2$;

Pt, its oxides or mixtures thereof, Li, its oxides or mixtures thereof, and Ce, its oxides or mixtures thereof, on $ZrO_2$;

Pt, its oxides or mixtures thereof, Na, its oxides or mixtures thereof, and Zr, its oxides or mixtures thereof, on $Al_2O_3$;

Pt, its oxides or mixtures thereof, Na, its oxides or mixtures thereof, and La, its oxides or mixtures thereof, on $Al_2O_3$;

Pt, its oxides or mixtures thereof, Na, its oxides or mixtures thereof, and Y, its oxides or mixtures thereof, on $Al_2O_3$;

Pt, its oxides or mixtures thereof, Na, its oxides or mixtures thereof, and Ce, its oxides or mixtures thereof, on $Al_2O_3$;

Pt, its oxides or mixtures thereof, Na, its oxides or mixtures thereof, and Mo, its oxides or mixtures thereof, on $Al_2O_3$;

Pt, its oxides or mixtures thereof, Na, its oxides or mixtures thereof, and Fe, its oxides or mixtures thereof, on Al2O3;

Pt, its oxides or mixtures thereof, Na, its oxides or mixtures thereof, and Co, its oxides or mixtures thereof, on Al2O3;

Pt, its oxides or mixtures thereof, Na, its oxides or mixtures thereof, and Mn, its oxides or mixtures thereof, on Al2O3;

Pt, its oxides or mixtures thereof, Na, its oxides or mixtures thereof, Zr, its oxides or mixtures thereof, and Co, its oxides or mixtures thereof, on Al2O3;

Pt, its oxides or mixtures thereof, Na, its oxides or mixtures thereof, and Fe, its oxides or mixtures thereof, on $ZrO_2$;

Pt, its oxides or mixtures thereof, Na, its oxides or mixtures thereof, and Co, its oxides or mixtures thereof, on $ZrO_2$;

Pt, its oxides or mixtures thereof, Na, its oxides or mixtures thereof, and Ce, its oxides or mixtures thereof, on $ZrO_2$;

Pt, its oxides or mixtures thereof, K, its oxides or mixtures thereof, and Fe, its oxides or mixtures thereof, on $ZrO_2$;

Pt, its oxides or mixtures thereof, K, its oxides or mixtures thereof, and Co, its oxides or mixtures thereof, on $ZrO_2$; and Pt, its oxides or mixtures thereof, K, its oxides or mixtures thereof, and Ce, its oxides or mixtures thereof, on $ZrO_2$.

10. The method according to claim 9, wherein the $Al_2O_3$ is $\gamma$-$Al_2O_3$.

11. The method according to claim 6, wherein the carrier comprises at least one member selected from the group consisting of iron oxide zirconia, titania and ceria.

12. The method according to claim 11, wherein the carrier comprises zirconia.

13. The method according to claim 1, wherein the CO-containing gas is contacted with the water gas shift catalyst at a temperature ranging from about 150° C. to about 450° C.

14. The method according to claim 13, wherein the CO-containing gas is contacted with a water gas shift catalyst at a temperature ranging from more than about 350° C. to up to about 450° C.

15. The method according to claim 13, wherein the CO-containing gas is contacted with a water gas shift catalyst at a temperature ranging from about 250° C. to up to about 350° C.

16. The method according to claim 13, wherein the CO-containing gas is contacted with a water gas shift catalyst at a temperature ranging from about 150° C. to up to about 250° C.

17. The method according to claim 1, wherein the CO-containing gas is contacted with the water gas shift catalyst at a pressure of no more than about 75 bar.

18. The method according to claim 17, wherein the CO-containing gas is contacted with the water gas shift catalyst at a pressure of no more than about 50 bar.

19. The method according to claim 17, wherein the CO-containing gas is contacted with the water gas shift catalyst at a pressure of no more than about 15 bar.

20. The method according to claim 17, wherein the CO-containing gas is contacted with the water gas shift catalyst at a pressure of no more than about 1 bar.

21. The method according to claim 1, wherein the water gas shift catalyst comprises about 0.01 wt. % to about 10 wt. %, with respect to the total weight of all catalyst components plus the support material, of each Group 8, 9 or 10 element present in the water gas shift catalyst.

22. The method according to claim 21, wherein the water gas shift catalyst comprises about 0.01 wt. % to about 2 wt. % of each Group 8, 9 or 10 element present in the water gas shift catalyst.

23. The method according to claim 22, wherein the water gas shift catalyst comprises about 0.05 wt. % to about 0.5 wt. % of each Group 8, 9 or 10 element present in the water gas shift catalyst.

24. The method according to claim 1, wherein the water gas shift catalyst comprises about 0.05 wt. % to about 20 wt. %, with respect to the total weight of all catalyst components plus the support material, of each lanthanide element present in the water gas shift catalyst.

* * * * *